US012405706B2

(12) United States Patent
Graham et al.

(10) Patent No.: US 12,405,706 B2
(45) Date of Patent: Sep. 2, 2025

(54) DEVICES, METHODS, AND GRAPHICAL USER INTERFACES FOR PROVIDING FOCUS MODES

(71) Applicant: Apple Inc., Cupertino, CA (US)

(72) Inventors: David C. Graham, Columbus, OH (US); Christopher P. Foss, San Francisco, CA (US); Graham R. Clarke, Scotts Valley, CA (US); Caelan G. Stack, Belmont, CA (US); Kaely Coon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/144,749

(22) Filed: May 8, 2023

(65) Prior Publication Data

US 2023/0367452 A1 Nov. 16, 2023

Related U.S. Application Data

(60) Provisional application No. 63/349,010, filed on Jun. 3, 2022, provisional application No. 63/340,443, filed on May 10, 2022.

(51) Int. Cl.

| | |
|---|---|
| ***G06F 3/0482*** | (2013.01) |
| ***G06F 3/0483*** | (2013.01) |

(Continued)

(52) U.S. Cl.

CPC .......... *G06F 3/0482* (2013.01); *G06F 3/0483* (2013.01); *G06F 9/4418* (2013.01); *G06F 9/451* (2018.02)

(58) Field of Classification Search

CPC ................................................ G06F 3/048–05

See application file for complete search history.

(56) References Cited

U.S. PATENT DOCUMENTS

| | | | |
|---|---|---|---|
| 6,717,520 | B1 | 4/2004 | Dorenbosch |
| 8,218,403 | B2 | 7/2012 | Scott et al. |

(Continued)

FOREIGN PATENT DOCUMENTS

| | | | |
|---|---|---|---|
| AU | 2019100493 | A4 | 6/2019 |
| CN | 102841755 | A | 12/2012 |

(Continued)

OTHER PUBLICATIONS

Samsung.com, "How to use the Focus mode feature in Android Q with One UI 2.0?", available on Nov. 22, 2021, available at <<https://www.samsung.com/ae/support/mobile-devices/how-to-use-the-focus-mode-feature-in-android-q-with-one-ui-20/>>, 9 pages (Year: 2021).*

(Continued)

*Primary Examiner* — Daniel Rodriguez

(74) *Attorney, Agent, or Firm* — Morgan, Lewis & Bockius LLP

(57) ABSTRACT

While a first notification mode is active for the computer system and while the computer system is in a low power state, a computer system detects a first request to wake the computer system. In response, the computer system displays a first wake screen user interface with a first background image. While displaying the first wake screen user interface, the computer system detects a request to switch from the first notification mode to a second notification mode. In response, the computer system switches from the first notification mode to the second notification mode at the computer system. While the second notification mode is active for the computer system and while the computer system is in the low power state, the computer systems detects a second request to wake the computer system. In response the computer system displays a second wake screen user interface with a second background image.

43 Claims, 90 Drawing Sheets

(51) Int. Cl.
*G06F 9/4401* (2018.01)
*G06F 9/451* (2018.01)

(56) References Cited

U.S. PATENT DOCUMENTS 8,477,566 B2 7/2013 Lazaridis et al.
8,553,502 B2 10/2013 Lazaridis et al.
8,768,648 B2 7/2014 Panther et al.
9,032,013 B2* 5/2015 Nukala .................. H04L 63/20 709/202
9,406,103 B1 8/2016 Gray et al.
9,461,833 B1 10/2016 Marra et al.
9,483,879 B2 11/2016 Gourlay et al.
9,541,986 B2 1/2017 Rohrweck
9,590,942 B1 3/2017 Yeskel et al.
9,693,311 B2 6/2017 Cardozo et al.
9,808,185 B2 11/2017 Arnold et al.
9,847,999 B2 12/2017 Van Os et al.
10,055,634 B2 8/2018 Han et al.
10,114,534 B2 10/2018 Kasterstein et al.
10,198,073 B2 2/2019 Chaudhri et al.
10,228,815 B2 3/2019 Forstall et al.
10,261,475 B1 4/2019 Kahn et al.
10,271,283 B2 4/2019 Mujtaba et al.
10,296,128 B1 5/2019 Nold et al.
10,311,745 B2 6/2019 Arnold et al.
10,334,054 B2 6/2019 Van Os et al.
10,338,773 B2 7/2019 Murarka et al.
10,410,035 B2 9/2019 Han et al.
10,521,107 B2 12/2019 Van Os et al.
10,860,207 B2 12/2020 Van Os et al.
10,943,411 B1 3/2021 Powers et al.
11,137,904 B1 10/2021 Tyler et al.
11,354,034 B2 6/2022 Van Os et al.
11,861,159 B2 1/2024 Van Os et al.
2002/0078393 A1 6/2002 Parker
2003/0236935 A1 12/2003 Amemiya et al.
2005/0120306 A1 6/2005 Klassen et al.
2005/0154935 A1 7/2005 Jin
2005/0249023 A1 11/2005 Bodlaender
2006/0116178 A1 6/2006 Vuong et al.
2006/0242651 A1* 10/2006 Zielinski ................ G06F 9/542 719/318
2007/0150842 A1 6/2007 Chaudhri et al.
2007/0211877 A1 9/2007 Martin et al.
2007/0268784 A1 11/2007 Xu
2008/0028322 A1* 1/2008 May .................... G06F 3/04842 715/752
2009/0125917 A1* 5/2009 Parker ..................... H04L 69/24 715/810
2009/0143062 A1 6/2009 Skinner et al.
2009/0143114 A1 6/2009 Vargas et al.
2009/0284389 A1 11/2009 Klassen et al.
2009/0284482 A1 11/2009 Chin
2010/0295789 A1 11/2010 Shin et al.
2011/0119630 A1 5/2011 Stroupe et al.
2011/0231499 A1 9/2011 Stovecek et al.
2011/0283241 A1 11/2011 Miller et al.
2012/0096392 A1 4/2012 Ording et al.
2012/0112908 A1 5/2012 Prykari et al.
2012/0157165 A1* 6/2012 Kim .................... G06F 21/6218 455/566
2012/0233563 A1 9/2012 Chakra et al.
2012/0252426 A1 10/2012 Nagaoka et al.
2012/0311466 A1 12/2012 Kluttz et al.
2012/0315960 A1 12/2012 Kim
2013/0024799 A1 1/2013 Fadell et al.
2013/0029729 A1 1/2013 Logan et al.
2013/0096768 A1 4/2013 Lovett et al.
2013/0100044 A1 4/2013 Zhao et al.
2013/0190032 A1 7/2013 Li
2013/0278484 A1 10/2013 Hwang et al.
2013/0290757 A1 10/2013 Barlow et al.
2013/0332721 A1 12/2013 Chaudhri et al.
2013/0346408 A1 12/2013 Duarte et al.
2014/0055388 A1 2/2014 Yook et al.
2014/0068755 A1 3/2014 King et al.
2014/0106821 A1 4/2014 Nakahara
2014/0115488 A1* 4/2014 Hackborn ......... H04M 1/72427 715/741
2014/0172996 A1 6/2014 Deeter et al.
2014/0184471 A1* 7/2014 Martynov ........... G06F 21/6209 345/1.2
2014/0232671 A1 8/2014 Chaudhri
2014/0241517 A1* 8/2014 Varoglu ................ H04L 51/224 379/201.01
2014/0245202 A1 8/2014 Yoon et al.
2014/0282174 A1 9/2014 Dempski
2014/0283142 A1* 9/2014 Shepherd ............ G06F 3/04817 726/30
2014/0365919 A1 12/2014 Shaw et al.
2015/0067365 A1 3/2015 Nakazima et al.
2015/0072663 A1* 3/2015 Chande .................. H04W 4/02 455/414.1
2015/0094120 A1 4/2015 Suh et al.
2015/0105125 A1* 4/2015 Min ........................ H04M 1/21 455/566
2015/0133098 A1* 5/2015 Warr ....................... H04W 4/16 455/418
2015/0186517 A1 7/2015 Gilad et al.
2015/0189475 A1* 7/2015 Schillings ............ H04W 4/026 455/456.1
2015/0195789 A1 7/2015 Yoon et al.
2015/0249733 A1 9/2015 Miura
2015/0253894 A1 9/2015 McKenzie et al.
2015/0261423 A1 9/2015 Beaumont et al.
2016/0005290 A1 1/2016 Takahashi
2016/0022202 A1 1/2016 Peterson et al.
2016/0034695 A1 2/2016 Won et al.
2016/0065708 A1 3/2016 Yang et al.
2016/0077724 A1* 3/2016 Lee ........................ G06F 3/167 715/703
2016/0124579 A1 5/2016 Tokutake
2016/0154549 A1 6/2016 Chaudhri et al.
2016/0235359 A1 8/2016 Cho et al.
2016/0248865 A1 8/2016 Dotan-Cohen et al.
2016/0255188 A1 9/2016 Chaudhri et al.
2016/0292989 A1 10/2016 Belk et al.
2016/0292994 A1 10/2016 Grimme et al.
2016/0337299 A1 11/2016 Lane et al.
2016/0357358 A1 12/2016 Forster et al.
2016/0357394 A1 12/2016 Tae et al.
2017/0011210 A1 1/2017 Cheong et al.
2017/0099602 A1* 4/2017 Joo ........................ G06F 21/32
2017/0118162 A1 4/2017 Ratiu et al.
2017/0126609 A1 5/2017 Sharifi et al.
2017/0127009 A1 5/2017 Friedrich
2017/0127967 A1 5/2017 Garcia Molina et al.
2017/0185275 A1 6/2017 Ziegler et al.
2017/0189641 A1 7/2017 Moturu et al.
2017/0228114 A1 8/2017 Brett et al.
2017/0301215 A1* 10/2017 Charlton ............... G08B 23/00
2017/0302609 A1 10/2017 Vardhan et al.
2017/0346303 A1 11/2017 Vanblon et al.
2017/0347946 A1 12/2017 Arnold et al.
2017/0347949 A1 12/2017 Arnold et al.
2017/0352287 A1 12/2017 Arnold et al.
2017/0357217 A1 12/2017 Raymann et al.
2017/0357408 A1* 12/2017 Anglin ................. G06F 1/1684
2017/0357419 A1 12/2017 Raymann et al.
2017/0357439 A1 12/2017 Lemay et al.
2018/0032220 A1 2/2018 Anzures et al.
2018/0074693 A1 3/2018 Jones et al.
2018/0088787 A1 3/2018 Bereza et al.
2018/0088795 A1* 3/2018 van Os ................ G06F 3/0488
2018/0088797 A1 3/2018 Mcatee et al.
2018/0101297 A1 4/2018 Yang et al.
2018/0109629 A1 4/2018 Van Os et al.
2018/0121409 A1 5/2018 Karunamuni et al.
2018/0164973 A1 6/2018 Kim et al.
2018/0173928 A1 6/2018 Han et al.
2018/0188925 A1 7/2018 Na et al.
2018/0188935 A1 7/2018 Singh et al.

(56) References Cited

U.S. PATENT DOCUMENTS

| | | | |
|---|---|---|---|
| 2018/0225945 A1 | 8/2018 | Moravek et al. | |
| 2018/0226055 A1 | 8/2018 | Raymann et al. | |
| 2018/0227377 A1 | 8/2018 | Trivedi et al. | |
| 2018/0247440 A1* | 8/2018 | Heo | G06T 11/60 |
| 2018/0267593 A1 | 9/2018 | Ramasamy et al. | |
| 2018/0336530 A1 | 11/2018 | Johnson et al. | |
| 2018/0348976 A1* | 12/2018 | Bai | G06F 3/0484 |
| 2018/0351373 A1 | 12/2018 | Behzadi et al. | |
| 2019/0069154 A1 | 2/2019 | Booth et al. | |
| 2019/0097957 A1 | 3/2019 | Phanshikar et al. | |
| 2019/0150854 A1 | 5/2019 | Chung et al. | |
| 2019/0179493 A1 | 6/2019 | Goenka et al. | |
| 2019/0213060 A1 | 7/2019 | Raymann et al. | |
| 2019/0278901 A1 | 9/2019 | Lewis | |
| 2019/0289079 A1 | 9/2019 | Van Os et al. | |
| 2019/0318608 A1 | 10/2019 | Rao et al. | |
| 2019/0339804 A1* | 11/2019 | Gleeson | G06F 3/0485 |
| 2019/0342251 A1 | 11/2019 | Dascola et al. | |
| 2019/0342252 A1* | 11/2019 | Dascola | H04M 1/72484 |
| 2019/0342447 A1* | 11/2019 | Ko | H04M 1/72472 |
| 2019/0361714 A1 | 11/2019 | Rothkopf | |
| 2020/0012423 A1 | 1/2020 | Cinek et al. | |
| 2020/0098300 A1 | 3/2020 | Verma et al. | |
| 2020/0120201 A1 | 4/2020 | Siritzky | |
| 2020/0133477 A1 | 4/2020 | Van Os et al. | |
| 2020/0228616 A1 | 7/2020 | Nishikawa et al. | |
| 2021/0019437 A1 | 1/2021 | Neves Creto | |
| 2021/0019953 A1 | 1/2021 | Pekelny et al. | |
| 2021/0048933 A1 | 2/2021 | Shah | |
| 2021/0051226 A1 | 2/2021 | Ko et al. | |
| 2021/0060429 A1 | 3/2021 | Juenger et al. | |
| 2021/0122469 A1 | 4/2021 | Wu | |
| 2021/0173664 A1 | 6/2021 | Bai et al. | |
| 2021/0216201 A1 | 7/2021 | Van Os et al. | |
| 2021/0349617 A1 | 11/2021 | Crowley et al. | |
| 2021/0349618 A1 | 11/2021 | Crowley et al. | |
| 2021/0349619 A1 | 11/2021 | Crowley et al. | |
| 2022/0272420 A1 | 8/2022 | Tucker et al. | |
| 2022/0365640 A1 | 11/2022 | Graham et al. | |
| 2022/0404963 A1 | 12/2022 | Van Os et al. | |
| 2023/0035905 A1 | 2/2023 | Dascola et al. | |
| 2023/0161470 A1 | 5/2023 | Crowley et al. | |
| 2023/0303700 A1 | 9/2023 | Lee et al. | |
| 2024/0126429 A1 | 4/2024 | van Os et al. | |
| 2024/0406304 A1 | 12/2024 | Foss et al. | |
| 2024/0430225 A1 | 12/2024 | Dascola et al. | |
| 2025/0173054 A1 | 5/2025 | Graham et al. | |

FOREIGN PATENT DOCUMENTS

| | | | |
|---|---|---|---|
| CN | 103297939 A | | 9/2013 |
| CN | 103514416 A | | 1/2014 |
| CN | 104350794 A | | 2/2015 |
| CN | 105791545 A | | 7/2016 |
| CN | 106022062 A | | 10/2016 |
| CN | 106027363 A | | 10/2016 |
| CN | 106250133 A | | 12/2016 |
| CN | 106462358 A | | 2/2017 |
| CN | 107491257 A | | 12/2017 |
| CN | 107968885 A | | 4/2018 |
| EP | 3 312 713 A1 | | 4/2018 |
| JP | H10-106344 A | | 4/1998 |
| JP | 2011-509541 A | | 3/2011 |
| JP | 4860505 B2 | | 1/2012 |
| JP | 2013157744 | | 8/2013 |
| JP | 2015-045902 A | | 3/2015 |
| JP | 2015-188275 A | | 10/2015 |
| JP | 2016-105630 A | | 6/2016 |
| JP | 2017-126067 A | | 7/2017 |
| JP | 2017-208112 A | | 11/2017 |
| JP | 2018-185830 A | | 11/2018 |
| JP | 2019-111181 A | | 7/2019 |
| JP | 2020010511 | | 1/2020 |
| KR | 2012/0037858 A | | 4/2012 |
| KR | 2019/0115734 A | | 10/2019 |
| WO | WO 2013/184530 A1 | | 12/2013 |
| WO | WO 2014/029361 A1 | | 2/2014 |
| WO | WO 2016/200584 A1 | | 12/2016 |
| WO | WO 2017/027526 A1 | | 2/2017 |
| WO | WO 2017/052043 A1 | | 3/2017 |
| WO | WO 2018/191972 A1 | | 10/2018 |
| WO | WO 2019/217020 A1 | | 11/2019 |
| WO | WO 2019/217196 A2 | | 11/2019 |
| WO | WO 2020/242882 A1 | | 12/2020 |

OTHER PUBLICATIONS

7labs.io, "How to Change Wallpaper Automatically on iPhone or iPad", available on Dec. 6, 2020, available at <<https://7labs.io/mobile/iphone/change-wallpaper-automatically-on-ios-or-ipados.html>>, 6 pages (Year: 2020).*

Office Action, dated Jan. 5, 2023, received in Korean Patent Application No. 2020-0123965, which corresponds with U.S. Appl. No. 16/948,370, 3 pages.

Office Action, dated Apr. 20, 2023, received in Korean Patent Application No. 2020-0123973, which corresponds with U.S. Appl. No. 16/948,375, 5 pages.

Final Office Action, dated Jan. 12, 2024, received in Korean Patent Application No. 2020-0123973, which corresponds with U.S. Appl. No. 16/948,375, 5 pages.

Final Office Action, dated Oct. 19, 2023, received in U.S. Appl. No. 17/483,751, 51 pages.

Office Action, dated Jan. 12, 2024, received in U.S. Appl. No. 18/199,331, 19 pages.

Office Action, dated Dec. 4, 2023, received in Japanese Patent Application No. 2022-135135, which corresponds with U.S. Appl. No. 18/100,530, 6 pages.

Notice of Allowance, dated Aug. 4, 2023, received in U.S. Appl. No. 17/831,384, 8 pages.

Notice of Allowance, dated Jan. 5, 2024, received in Japanese Patent Application No. 2020-142215, which corresponds with U.S. Appl. No. 17/940,858, 2 pages.

Patent, dated Jan. 25, 2024, received in Japanese Patent Application No. 2020- 142215, which corresponds with U.S. Appl. No. 17/940,858, 3 pages.

International Search Report and Written Opinion, dated Nov. 23, 2023, received in International Patent Application No. PCT/US2023/024363, which corresponds with U.S. Appl. No. 18/199,331, 20 pages.

Amadeo, "Twitter Post [online]", https://twitter.com/ronamadeo/status/972152445848694789, Mar. 9, 2018, 2 pages.

Anonymous, "Create a Group of Notifications / Android Developers", https://web.archive.org/20181028202552/https://devloper.android.com/training/notif-user/group, Oct. 27, 2018, 5 pages.

Apple, "iPhone User Guide for iOS 7.1 Software", https://manuals.info.apple.com/en_US/iphone_ios7_user_guide.pdf, Mar. 10, 2014, 162 pages.

Apple, "Stay Focused While Driving with iPhone", https://support.apple.com/guide/iphone/turn-on-do-not-disturb-while-driving-iphae754533b/ios# text=Send%20an%20auto%2Dreply%20text%20message%20that%20you're%20driving&text=Go%20to%20Settings%20%3E%20Do%20Not%20Disturb%20%3E%20Auto%2DReply%20To,re%20not%20in%20your%20Contacts, 2022, 2 pages.

Black, "Samsung Galaxy S7 Silent Alarm Fix", https://www.youtube.com/watch?v=35LQtw7ucaw, Jan. 20, 2017, 4 pages.

Bohn, "Why Android Notifications Are Better Than The iPhone's", https://www.youtube.com/watch?v=bHtkjHSB5Nw, Apr. 18, 2018, 10 pages.

CNET, "Android Lollipop Lock-Screen Notification Tips", https://www.youtube.com/watch?v=LZTxHBOwzIU, Nov. 13, 2014, 3 pages.

Droid Life, "Android 5.0 Feature: Notification Access and Do Not Disturb", https://www.youtube.com/watch?v=SY2kAqCqOko, Oct. 17, 2014, 2 pages.

Frick, "Automatically Turn on Theater Mode on Android Wear Watch When Sleep Tracking", https://forum.urbandroid.org/t/automatically-turn-on-theater-mode-on-android-wear-watch-when-sleep-tracking/398, Mar. 6, 2018, 2 pages.

(56) References Cited

OTHER PUBLICATIONS

Google, "Limit Interruptions with Do Not Disturb on Android", https://support.google.com/android/answer/9069335?hl=en#zippy=%2Cset-what-to-block, 2022, 2 pages.
Hill, "From Oreo to Jelly Bean, Here's How to Turn Off Notifications in Android", https://web.archive.org/web/20180503062117/https://www.ditaltrends.com/android/how-to-turn-off-notifications-in-android, May 3, 2018, 10 pages.
Hill, Here's How to Use Do Not Disturb Mode in Android, https://web.archive.org/web/20180313165228/https://www.digitaltrends.com/mobile/do-not-disturb-mode-in-android, Mar. 13, 2018, 6 pages.
Hill, "How to Turn Off Notifications in Andoid", http://web.archive.org/web/20180203023547/https://www.digitaltrends.com/android/how-to-turn-off-notifications-in-android, Dec. 28, 2017, 16 pages.
iPhoneHacksTV, How to Group Notifications by App in iOS 9 Notification Center—iPhone Hacks, https://www.youtube.com/watch?v=j9kEN1_1yh8, Sep. 16, 2015, 2 pages.
iPhoneTricks.org, "How to Snooze or Stop an iPhone Alarm Without Looking at the Display?", https://www.iphonetricks.org/how-to-snooze-or-stop-an-iphone-alarm-without-looking-at-the-display, Nov. 29, 2016, 5 pages.
Isom, "How to Change iPhone Notification Settings", https://www.youtube.com/watch?v=P2Z4dvieB5k, Mar. 16, 2017, 3 pages.
Jason, "New iOS 8 Features that Apple Didn't Have Time to Tell US About Today", https://web.archive.org/web/20171018064601-features-hidden.html, Jun. 2, 2014, 7 pages.
Klein, "How Manage, Customize, and Block Notifications in Android Lollipop and Marshmellow", http://web.archive.org/web/20171229125502/https:www.howtogeek.com/202404/how-to-tame-notifications-in-android-5.0, Sep. 29, 2016, 11 pages.
Lew, "Correctly Handling Bundled Android Notifications", https://web.archive.org/web/20171210085025/https://blog.danlew.net/20171018064601/http://, Feb. 7, 2017, 5 pages.
MacRumors, "iOS 11: How to Use the Lock Screen and Notification Center", https://www.youtube.com/watch?v=BQDyGNO90Gc, Sep. 19, 2017, 4 pages.
Mcfasa09, "Toggle Theater Mode on Wear 2.0", https://www.reddit.com/r/AndroidWear/comments/64qitr/toggle_theater_mode_on_wear_20, Mar. 18, 2014, 3 pages.
Mediati, "Master Notifications in Android Lollipop with Notification Priority and Downtime" https:/web.archive.org/web/20180503062117/https://www.digitaltrends.com/android/how-to-turn-off-notifications-in-android, Dec. 3, 2014, 7 pages.
Phandroid, "Do Not Disturb" mode will save you from notification hell, https://www.youtube.com/watch?v=R6A2As4VJpl, Jan. 16, 2017, 3 pages.
Raphael, "Oh, Oreo! 8 Things to Try When You Get Andoid 8.0", https://web.archive.org/web/20171224100520/https://www.computerworld.com/article/3219 1126/android/oreo-android-8, Aug. 24, 2017, 10 pages.
Rosenbaun, "How to Keep your Apple Watch Quiet", https://www.theverge.com/2019/10/24/20930506/how-to-apple-watch-do-not-disturb-iphone-quiet-mute-theater-mode, Oct. 24, 2019, 8 pages.
Samsung, "Samsung Goodnight Mode", https:/www.samsung.com/us/support/answer/ANS00080310, 1995-2021, 2 pages.
Sony Xperia Z, "How to turn off alarm when it sounds", https://www.youtube.com/watch?v=eerWJMN7e5s, May 14, 2015, 3 pages.
Summerson, 'Android's Confusing "Do Not Disturb" Settings, Explained', https://www.howtogeek.com/260225/androids-confusing-do-not-disturb-settings-explained, Jul. 3, 2017, 8 pages.
Tantsissa Holdings, "Autosleep Seep Rings", http://autosleep.tantsissa.com/sleeprings, 2016-2010, 6 pages.
Tropical Tech, How to Set Up Do Not Disturb Mode Rules / Schedule in Android / 2018, http://www.youtube.com/watch?v=DLnGcpKHVyM, Sep. 4, 2017, 3 pages.
VikuBalupura, "[Android] Hands-On With Android P—Is This The Beginning of a New Design Language?", http://en.miui.com/thread-1995365-1-1.html, Mar. 10, 2018, 11 pages.
Wallen, "How to Customize Androlid Oreo Notifications With Categories", http://web.archive.org/web/20171017232141/https://www.techrepublic.com/article/how-to-customize-android-oreo-notifications-with-categories, Oct. 17, 2017, 14 pages.
Wayback Machine, "Nights Keeper", http://nightskeeper.com/?page_id=15, 2013, 9 pages.
Whitwam, Android N Feature Spotlight: Do Not Disturb Automatic Rules Get Option ToEnd DND on Next Alarm, https://www.androidpolice.com/2016/03/11/android-n-feature-spotlight-do-not-disturb-gets-option-to-end-automatically-on-next-alarm/, Mar. 11, 2016, 5 pages.
Whitwarm, "Android P Feature Spotlight: Android Will Offer to Hide Notifications From Apps You Frequently Dismiss", https://www.androidpolice.com/2018/03/12/android-P-feature-spotlight-android-will-offer-hide-notifications-apps-frequently-dismiss, Mar. 12, 2018, 5 pages.
Woodpress, "Features—Lighting Launcher", https://www.lightninglauncher.com/wordpress/features, 2021, 3 pages.
XDA Spotlight, "Lock Me Out", https://www.xda-developers.com/curb-android-smartphone-addiction-lock-me-out, Apr. 16, 2018, 7 pages.
YouTube, "Notification Digest", https://support.google.com/youtube/answer/9012820_at_00:38, Dec. 29, 2018, 1 page.
Notice of Allowance, dated Apr. 19, 2019, received in U.S. Appl. No. 15/707,757, 8 pages.
Notice of Allowance, dated Aug. 6, 2019, received in U.S. Appl. No. 15/707,757, 8 pages.
Office Action, dated Jan. 16, 2020, received in U.S. Appl. No. 16/142,599, 13 pages.
Notice of Allowance, dated Jul. 16, 2020, received in U.S. Appl. No. 16/142,599, 7 pages.
Notice of Allowance, dated Sep. 18, 2020, received in U.S. Appl. No. 16/142,599, 7 pages.
Office Action, dated Nov. 6, 2020, received in Chinese Patent Application No. 202010095124.8, which corresponds with U.S. Appl. No. 16/142,599, 11 pages.
Office Action, dated Jul. 7, 2021, received in Chinese Patent Application No. 202010095124.8, which corresponds with U.S. Appl. No. 16/142,599, 1 page.
Notice of Allowance, dated Aug. 9, 2021, received in Chinese Patent Application No. 202010095124.8, which corresponds with U.S. Appl. No. 16/142,599, 2 pages.
Patent, dated Oct. 29, 2021, received in Chinese Patent Application No. 202010095124.8, which corresponds with U.S. Appl. No. 16/142,599, 5 pages.
Office Action, dated Aug. 27, 2018, received in Danish Patent Application No. 201870333, which corresponds with U.S. Appl. No. 16/142,599, 9 pages.
Office Action, dated Nov. 12, 2018, received in Danish Patent Application No. 201870333, which corresponds with U.S. Appl. No. 16/142,599, 3 pages.
Office Action, dated May 14, 2019, received in Danish Patent Application No. 201870333, which corresponds with U.S. Appl. No. 16/142,599, 6 pages.
Office Action, dated Nov. 15, 2019, received in Danish Patent Application No. 201870333, 2 pages.
Intention to Grant, dated Dec. 19, 2019, received in Danish Patent Application No. 201870333, 2 pages.
Notice of Allowance, dated Apr. 2, 2020, received in Danish Patent Application No. 201870333, 4 pages.
Patent, dated May 15, 2020, received in Danish Patent Application No. 201870333, which corresponds with U.S. Appl. No. 16/142,599, 5 pages.
Office Action, dated Sep. 9, 2022, received in European Patent Application No. 1972341.6, which corresponds with U.S. Appl. No. 16/142,599, 8 Pages.
Office Action, dated Apr. 3, 2020, received in U.S. Appl. No. 16/145,068, 35 pages.
Final Office Action, dated Nov. 30, 2020, received in U.S. Appl. No. 16/145,068, 44 pages.
Office Action, dated Jul. 12, 2021, received in U.S. Appl. No. 16/145,068, 82 pages.
Notice of Allowance, dated Feb. 28, 2022, received in U.S. Appl. No. 16/145,068, 25 pages.

(56) References Cited

OTHER PUBLICATIONS

Notice of Allowance, dated Jul. 12, 2022, received in U.S. Appl. No. 16/145,068, 9 pages.
Office Action, dated Aug. 29, 2018, received in Danish Patent Application No. 201870334, which corresponds with U.S. Appl. No. 16/145,068, 9 pages.
Office Action, dated Mar. 5, 2019, received in Danish Patent Application No. 201870334, which corresponds with U.S. Appl. No. 16/145,068, 6 pages.
Office Action, dated Sep. 6, 2019, received in Danish Patent Application No. 201870334, which corresponds with U.S. Appl. No. 16/145,068, 4 pages.
Office Action, dated Apr. 22, 2020, received in Danish Patent Application No. 201870334, which corresponds with U.S. Appl. No. 16/145,068, 2 pages.
Office Action, dated Apr. 6, 2020, received in U.S. Appl. No. 16/145,074, 22 pages.
Final Office Action, dated Nov. 16, 2020, received in U.S. Appl. No. 16/145,074, 33 pages.
Office Action, dated Jun. 28, 2021, received in U.S. Appl. No. 16/145,074, 39 pages.
Notice of Allowance, dated Mar. 11, 2022, received in U.S. Appl. No. 16/145,074, 27 pages.
Notice of Allowance, dated Jul. 28, 2022, received in U.S. Appl. No. 16/145,074, 27 pages.
Office Action, dated Apr. 16, 2021, received in Australian Patent Application No. 2019265367, U.S. Appl. No. 16/145,074, 3 pages.
Notice of Allowance, dated Jan. 18, 2022, received in Australian Patent Application No. 2019265367, U.S. Appl. No. 16/145,074, 3 pages.
Certificate of Grant, dated May 19, 2022, received in Australian Patent Application No. 2019265367, U.S. Appl. No. 16/145,074, 3 pages.
Office Action, dated Jan. 24, 2022, received in Chinese Patent Application No. 201811165505.8, which corresponds with U.S. Appl. No. 16/145,074, 1 page.
Office Action, dated Oct. 19, 2022, received in Chinese Patent Application No. 201811165505.8, which corresponds with U.S. Appl. No. 16/145,074, 2 pages.
Notice of Allowance, dated Jan. 28, 2023, received in Chinese Patent Application No. 201811165505.8, which corresponds with U.S. Appl. No. 16/145,074, 2 pages.
Patent, dated Jun. 27, 2023, received in Chinese Patent Application No. 201811165505.8, which corresponds with U.S. Appl. No. 16/145,074, 5 pages.
Office Action, dated Aug. 31, 2018, received in Danish Patent Application No. 201870335, which corresponds with U.S. Appl. No. 16/145,074, 9 pages.
Office Action, dated Dec. 20, 2018, received in Danish Patent Application No. 201870335, which corresponds with U.S. Appl. No. 16/145,074, 4 pages.
Office Action, dated Aug. 28, 2019, received in Danish Patent Application No. 201870335, which corresponds with U.S. Appl. No. 16/145,074, 5 pages.
Office Action, dated Apr. 20, 2020, received in Danish Patent Application No. 201870335, which corresponds with U.S. Appl. No. 16/145,074, 4 pages.
Office Action, dated Dec. 10, 2021, received in Japanese Patent Application No. 2020-557940, which corresponds with U.S. Appl. No. 16/145,074, 2 pages.
Notice of Allowance, dated Aug. 8, 2022, received in Japanese Patent Application No. 2020-557940, which corresponds with U.S. Appl. No. 16/145,074, 1 page.
Patent, dated Sep. 9, 2022, received in Japanese Patent Application No. 2020- 557940, which corresponds with U.S. Appl. No. 16/145,074, 3 pages.
Office Action, dated Nov. 30, 2021, received in Korean Patent Application No. 2020-7037439, which corresponds with U.S. Appl. No. 16/145,074, 3 pages.
Notice of Allowance, dated Jul. 28, 2022, received in Korean Patent Application No. 2020-7037439, which corresponds with U.S. Appl. No. 16/145,074, 3 pages.
Office Action, dated Jul. 13, 2020, received in U.S. Appl. No. 16/730,921, 7 pages.
Notice of Allowance, dated Jul. 29, 2020, received in U.S. Appl. No. 16/730,921, 8 pages.
Office Action, dated Aug. 12, 2021, received in U.S. Appl. No. 16/948,370, 35 pages.
Final Office Action, dated Apr. 5, 2022, received in U.S. Appl. No. 16/948,370, 44 pages.
Notice of Allowance, dated Sep. 7, 2022, received in U.S. Appl. No. 16/948,370, 12 pages.
Notice of Allowance, dated Jan. 17, 2023, received in U.S. Appl. No. 16/948,370, 13 pages.
Office Action, dated Jun. 25, 2021, received in Australian Patent Application No. 2020233622, which corresponds with U.S. Appl. No. 16/948,370, 8 pages.
Notice of Allowance, dated Feb. 22, 2022, received in Australian Patent Application No. 2020233622, which corresponds with U.S. Appl. No. 16/948,370, 3 pages.
Office Action, dated Dec. 18, 2020, received in Danish Patent Application No. 2020-70595, which corresponds with U.S. Appl. No. 16/948,370, 9 pages.
Office Action, dated Sep. 30, 2021, received in Danish Patent Application No. 2020-70595, which corresponds with U.S. Appl. No. 16/948,370, 5 pages.
Office Action, dated May 19, 2022, received in Danish Patent Application No. 2020- 70595, which corresponds with U.S. Appl. No. 16/948,370, 2 pages.
Intention to Grant, dated Nov. 3, 2022, received in Danish Patent Application No. 2020-70595, which corresponds with U.S. Appl. No. 16/948,370, 2 pages.
Patent, dated Jun. 20, 2023, received in Danish Patent Application No. 2020-70595, which corresponds with U.S. Appl. No. 16/948,370, 8 pages.
Office Action, dated Dec. 2, 2021, received in Indian Patent Application No. 202014040025, which corresponds with U.S. Appl. No. 16/948,370, 8 pages.
Office Action, dated Mar. 4, 2022, received in Japanese Patent Application No. 2020-160012, which corresponds with U.S. Appl. No. 16/948,370, 2 pages.
Notice of Allowance, dated Jan. 6, 2023, received in Japanese Patent Application No. 2020-160012, which corresponds with U.S. Appl. No. 16/948,370, 2 pages.
Patent, dated Jan. 26, 2023, received in Japanese Patent Application No. 2020-160012, which corresponds with U.S. Appl. No. 16/948,370, 3 pages.
Office Action, dated Apr. 20, 2023, received in Korean Patent Application No. 2020-0123965, which corresponds with U.S. Appl. No. 16/948,370, 4 pages.
Office Action, dated Feb. 1, 2021, received in U.S. Appl. No. 16/948,374, 27 pages.
Final Office Action, dated Jun. 11, 2021, received in U.S. Appl. No. 16/948,374, 29 pages.
Office Action, dated Dec. 29, 2021, received in U.S. Appl. No. 16/948,374, 29 pages.
Final Office Action, dated May 6, 2022, received in U.S. Appl. No. 16/948,374, 27 pages.
Notice of Allowance, dated Sep. 28, 2022, received in U.S. Appl. No. 16/948,374, 13 pages.
Office Action, dated May 11, 2021, received in Australian Patent Applcation No. 2020239686, which corresponds with U.S. Appl. No. 16/948,374, 4 pages.
Notice of Allowance, dated Oct. 7, 2021, received in Australian Patent Applcation No. 2020239686, which corresponds with U.S. Appl. No. 16/948,374, 3 pages.
Patent, dated Feb. 10, 2022, received in Australian Patent Application No. 2020239686, which corresponds with U.S. Appl. No. 16/948,374, 3 pages.
Innovation Patent, dated Jun. 9, 2021, received in Australian Patent Application No. 2021102471, which corresponds with U.S. Appl. No. 16/948,374, 5 pages.

(56) References Cited

OTHER PUBLICATIONS

Office Action, dated Jul. 30, 2021, received in Australian Patent Application No. 2021102471, which corresponds with U.S. Appl. No. 16/948,374, 4 pages.
Innovation Patent, dated Jan. 31, 2022, received in Australian Patent Application No. 2021102471, which corresponds with U.S. Appl. No. 16/948,374, 3 pages.
Office Action, dated Dec. 21, 2020, received in Danish Patent Application No. 2020-70599, which corresponds with U.S. Appl. No. 16/948,374, 8 pages.
Office Action, dated Oct. 4, 2021, received in Danish Patent Application No. 2020-70599, which corresponds with U.S. Appl. No. 16/948,374, 2 pages.
Office Action, dated Jun. 2, 2022, received in Danish Patent Application No. 2020-70599, which corresponds with U.S. Appl. No. 16/948,374, 2 pages.
Office Action, dated Dec. 1, 2021, received in Indian Patent Application No. 202014040935, which corresponds with U.S. Appl. No. 16/948,374, 9 pages.
Office Action, dated Nov. 30, 2021, received in Japanese Patent Application No. 2020-160013, which corresponds with U.S. Appl. No. 16/948,374, 2 pages.
Notice of Allowance, dated Sep. 22, 2022, received in Japanese Patent Application No. 2020-160013, which corresponds with U.S. Appl. No. 16/948,374, 2 pages.
Patent, dated Oct. 21, 2022, received in Japanese Patent Application No. 2020-160013, which corresponds with U.S. Appl. No. 16/948,374, 2 pages.
Office Action, dated May 29, 2022, received in Korean Patent Application No. 2020-0123967, which corresponds with U.S. Appl. No. 16/948,374, 3 pages.
Notice of Allowance, dated Dec. 26, 2022, received in Korean Patent Application No. 2020-0123967, which corresponds with U.S. Appl. No. 16/948,374, 2 pages.
Patent, dated Mar. 24, 2023, received in Korean Patent Application No. 2020-0123967, which corresponds with U.S. Appl. No. 16/948,374, 5 pages.
Office Action, dated Jan. 8, 2021, received in U.S. Appl. No. 16/948,375, 19 pages.
Final Office Action, dated Mar. 9, 2021, received in U.S. Appl. No. 16/948,375, 19 pages.
Notice of Allowance, dated Jun. 24, 2021, received in U.S. Appl. No. 16/948,375, 6 pages.
Notice of Allowance, dated Oct. 26, 2021, received in U.S. Appl. No. 16/948,375, 5 pages.
Office Action, dated Apr. 13, 2021, received in Australian Patent Application No. 2020239689, which corresponds with U.S. Appl. No. 16/948,375, 8 pages.
Notice of Allowance, dated Oct. 5, 2021, received in Australian Patent Application No. 2020239689, which corresponds with U.S. Appl. No. 16/948,375, 3 pages.
Patent, dated Feb. 10, 2022, received in Australian Patent Application No. 2020239689, which corresponds with U.S. Appl. No. 16/948,375, 3 pages.
Office Action, dated Jan. 11, 2021, received in Danish Patent Application No. 2020-70629, which corresponds with U.S. Appl. No. 16/948,375, 10 pages.
Office Action, dated Sep. 15, 2022, received in Danish Patent Application No. 2020-70629, which corresponds with U.S. Appl. No. 16/948,375, 5 pages.
Office Action, dated Dec. 1, 2021, received in Indian Patent Application No. 202014040936, which corresponds with U.S. Appl. No. 16/948,375, 10 pages.
Office Action, dated Dec. 6, 2021, received in Japanese Patent Application No. 2020-160014, which corresponds with U.S. Appl. No. 16/948,375, 2 pages.
Notice of Allowance, dated Jul. 29, 2022, received in Japanese Patent Application No. 2020-160014, which corresponds with U.S. Appl. No. 16/948,375, 2 pages.
Patent, dated Aug. 30, 2022, received in Japanese Patent Application No. 2020-160014, which corresponds with U.S. Appl. No. 16/948,375, 4 pages.
Office Action, dated Apr. 22, 2022, received in U.S. Appl. No. 17/084,579, 10 pages.
Office Action, dated May 5, 2022, received in U.S. Appl. No. 17/084,579, 11 pages.
Final Office Action, dated Oct. 11, 2022, received in U.S. Appl. No. 17/084,579, 12 pages.
Office Action, dated Jul. 26, 2021, received in U.S. Appl. No. 17/112,883, 9 pages.
Notice of Allowance, dated Feb. 4, 2022, received in U.S. Appl. No. 17/112,883, 8 pages.
Office Action, dated Jul. 27, 2022, received in U.S. Appl. No. 17/483,751, 30 pages.
Final Office Action, dated Dec. 20, 2022, received in U.S. Appl. No. 17/483,751, 43 pages.
Office Action, dated Apr. 14, 2023, received in U.S. Appl. No. 17/483,751, 43 pages.
Notice of Allowance, dated Feb. 2, 2022, received in U.S. Appl. No. 17/483,757, 35 pages.
Notice of Allowance, dated Mar. 30, 2022, received in U.S. Appl. No. 17/483,757, 5 pages.
Office Action, dated May 18, 2023, received in Australian Patent Application No. 2022203663, which corresponds with U.S. Appl. No. 18/100,530, 3 pages.
Office Action, dated Feb. 7, 2023, received in U.S. Appl. No. 17/831,384, 9 pages.
Office Action, dated Nov. 21, 2022, received in Korean Patent Application No. 2022-7032607, which corresponds with U.S. Appl. No. 17/940,858, 5 pages.
Notice of Allowance, dated May 30, 2023, received in Korean Patent Application No. 2022-7032607, which corresponds with U.S. Appl. No. 17/940,858, 2 pages.
Invitation to Pay Additional Fees, dated Jun. 17, 2019, received in International Patent Application No. PCT/US2019/026353, which corresponds with U.S. Appl. No. 16/142,599, 19 pages.
International Search Report and Written Opinion, dated Aug. 7, 2019, received in International Patent Application No. PCT/US2019/026353, which corresponds with U.S. Appl. No. 16/142,599, 26 pages.
International Search Report and Written Opinion, dated May 28, 2019, received in International Patent Application No. PCT/US2019/026349, which corresponds with U.S. Appl. No. 16/145,068, 16 pages.
Invitation to Pay Additional Fees, dated Aug. 6, 2021, received in International Patent Application No. PCT/US2021/031131, which corresponds with U.S. Appl. No. 16/948,370, 5 pages.
International Search Report and Written Opinion, dated Nov. 2, 2022, received in International Patent Application No. PCT/US2022028806, which corresponds with U.S. Appl. No. 17/483,751, 20 pages.
Office Action, dated Sep. 7, 2023, received in Australian Patent Application No. 2022203663, which corresponds with U.S. Appl. No. 18/100,530, 4 pages.
Patent, dated Aug. 29, 2023, received in Korean Patent Application No. 2022-7032607, which corresponds with U.S. Appl. No. 17/940,858, 4 pages.
Office Action, dated Oct. 10, 2023, received in U.S. Appl. No. 17/940,858, 32 pages.
Office Action, dated Sep. 19, 2023, received in Korean Patent Application No. 2023-7029431, 9 pages.
Invitation to Pay Additional Fees, dated Sep. 20, 2023, received in International Patent Application No. PCT/US2023/021750, 10 pages.
Invitation to Pay Additional Fees, dated Oct. 2, 2023, received in International Patent Application No. PCT/US2023/024363, 15 pages.
Office Action, dated Jul. 1, 2024, received in Korean Patent Application No. 2020-0123973, which corresponds with U.S. Appl. No. 16/948,375, 5 pages.
Office Action, dated May 7, 2024, received in U.S. Appl. No. 18/100,530, 28 pages.

(56) References Cited

OTHER PUBLICATIONS

Notice of Allowance, dated Apr. 8, 2024, received in Japanese Patent Application No. 2022-135135, which corresponds with U.S. Appl. No. 18/100,530, 2 pages.
Notice of Allowance, dated Apr. 8, 2024, received in U.S. Appl. No. 17/940,858, 9 pages.
Notice of Allowance, dated May 29, 2024, received in Korean Patent Application No. 2023-7029431, 3 pages.
Office Action, dated Jul. 9, 2024, received in U.S. Appl. No. 18/398,059, 10 pages.
Amadeo, "Google Pixel 3 hands-on—Not the best first impression", https://arstechnica.com/gadgets/2028/10/scratching-the-surface-of-googles-newest-smartphone-hands-on-with-the-pixel-3#h1, 16 pages.
Android, Ambient Mode: Android's Proactive Google Assistant, https://www.youtube.com/watch?v=vaRzJo_19nY, 2 pages.
Johnson, "Google Pixel Stand (2nd gen) review: nice but not a must-have", https://www.theverge.com/22894924/google-pixel-stand-2nd_gen_review_price-specs, 11 pages.
MGT—Max Games Tech, How to Change Watch faces on Apple Watch 6 (Use Swipe or Digital Crown), https://www.youtube.com/watch?v=N2YmeYy4Z9c, 2021, 2 pages.
Wells, "Google Assistant's Ambient Mode: What It Is and How to Use It", https://www.lifewire.com/ambient-mode-in-google-assistant-5191407, 8 pages.
Notice of Allowance, dated Nov. 21, 2024, received in Korean Patent Application No. 2020-0123965, which corresponds with U.S. Appl. No. 16/948,370, 3 pages.
Notice of Allowance, dated Sep. 13, 2024, received in Korean Patent Application No. 2020-0123973, which corresponds with U.S. Appl. No. 16/948,375, 2 pages.
Notice of Allowance, dated Sep. 16, 2024, received in U.S. Appl. No. 17/483,751, 11 pages.
Notice of Allowance, dated Jan. 22, 2025, received in U.S. Appl. No. 17/483,751, 11 pages.
Office Action, dated Nov. 12, 2024, received in Chinese Patent Application No. 202111351532.6, 1 page.
Final Office Action, dated Sep. 13, 2024, received in U.S. Appl. No. 18/199,331, 18 pages.
Office Action, dated Jan. 14, 2025, received in U.S. Appl. No. 18/199,331, 20 pages.
Patent, dated Jul. 23, 2024, received in Korean Patent Application No. 2023-7029431, 6 pages.
Notice of Allowance, dated Jan. 15, 2025, received in U.S. Appl. No. 18/398,059, 8 pages.
Office Action, dated Jul. 31, 2024, received in Korean Patent Application No. 2024-7024732, 7 pages.
Patent, dated Jan. 10, 2025, received in Korean Patent Application No. 2020-0123965, which corresponds with U.S. Appl. No. 16/948,370, 3 pages.
Notice of Allowance, dated Feb. 24, 2025, received in U.S. Appl. No. 17/084,579, 7 pages.
Notice of Allowance, dated Mar. 7, 2025, received in Japanese Patent Application No. 2023-567948, which corresponds with U.S. Appl. No. 17/483,751, 2 pages.
Final Office Action, dated Feb. 6, 2025, received in U.S. Appl. No. 18/100,530, 30 pages.
Office Action, dated Mar. 19, 2025, received in Indian Patent Application No. 202217070342, which corresponds with U.S. Appl. No. 18/100,530, 9 pages.
Patent, dated Apr. 9, 2025, received in Japanese Patent Application No. 2023-567948, which corresponds with U.S. Appl. No. 17/483,751, 5 pages.
Office Action, dated May 30, 2025, received in Chinese Patent Application No. 202111351532.6, 2 pages.
Notice of Allowance, dated Apr. 30, 2025, received in Korean Patent Application No. 2024-7024732, 2 pages.
Notice of Allowance, dated Jun. 4, 2025, received in U.S. Appl. No. 18/398,059, 8 pages.

* cited by examiner

Figure 8B:
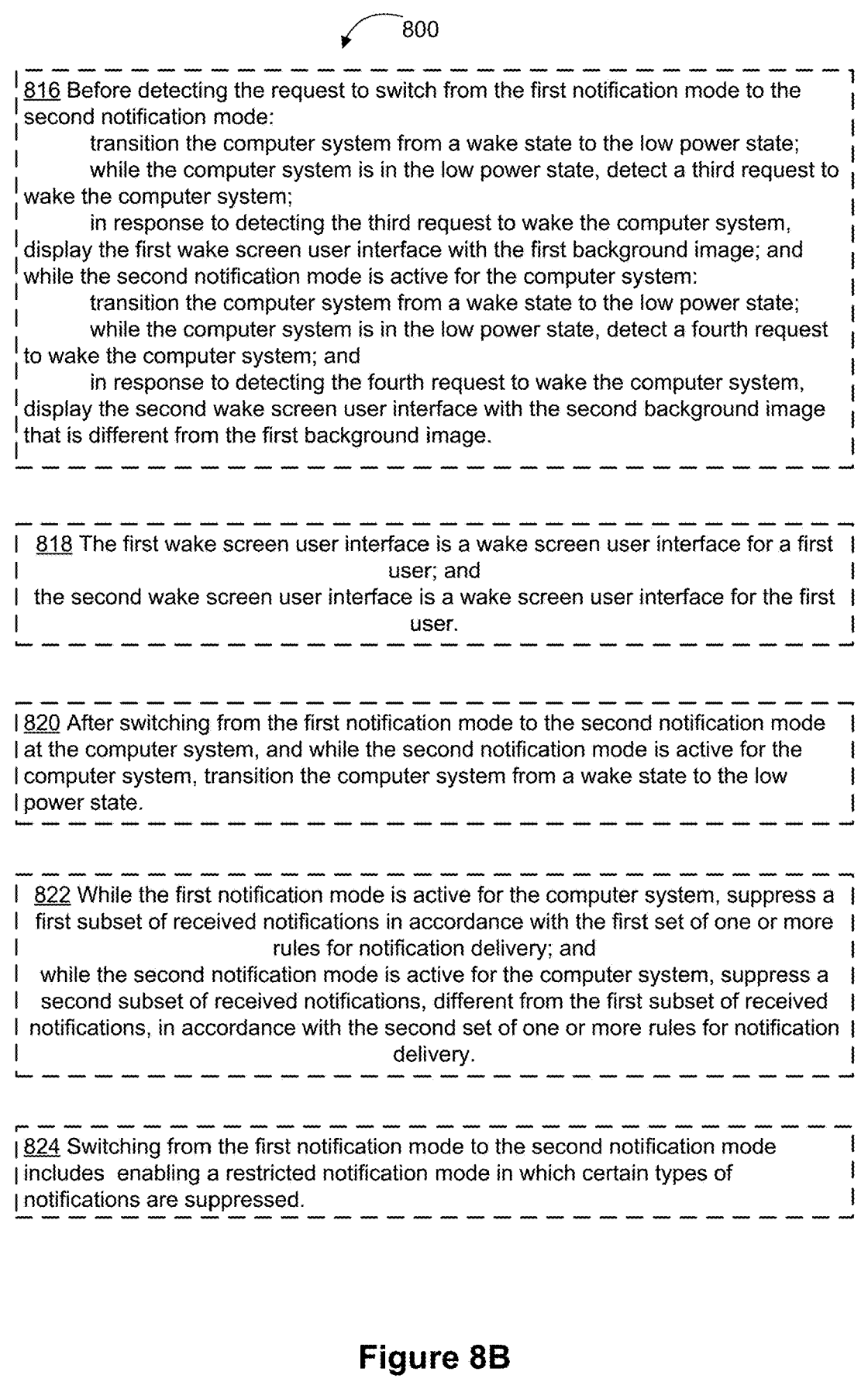

800

816 Before detecting the request to switch from the first notification mode to the second notification mode:
transition the computer system from a wake state to the low power state;
while the computer system is in the low power state, detect a third request to wake the computer system;
in response to detecting the third request to wake the computer system, display the first wake screen user interface with the first background image; and
while the second notification mode is active for the computer system:
transition the computer system from a wake state to the low power state;
while the computer system is in the low power state, detect a fourth request to wake the computer system; and
in response to detecting the fourth request to wake the computer system, display the second wake screen user interface with the second background image that is different from the first background image.

818 The first wake screen user interface is a wake screen user interface for a first user; and
the second wake screen user interface is a wake screen user interface for the first user.

820 After switching from the first notification mode to the second notification mode at the computer system, and while the second notification mode is active for the computer system, transition the computer system from a wake state to the low power state.

822 While the first notification mode is active for the computer system, suppress a first subset of received notifications in accordance with the first set of one or more rules for notification delivery; and
while the second notification mode is active for the computer system, suppress a second subset of received notifications, different from the first subset of received notifications, in accordance with the second set of one or more rules for notification delivery.

824 Switching from the first notification mode to the second notification mode includes enabling a restricted notification mode in which certain types of notifications are suppressed.

Figure 8C:
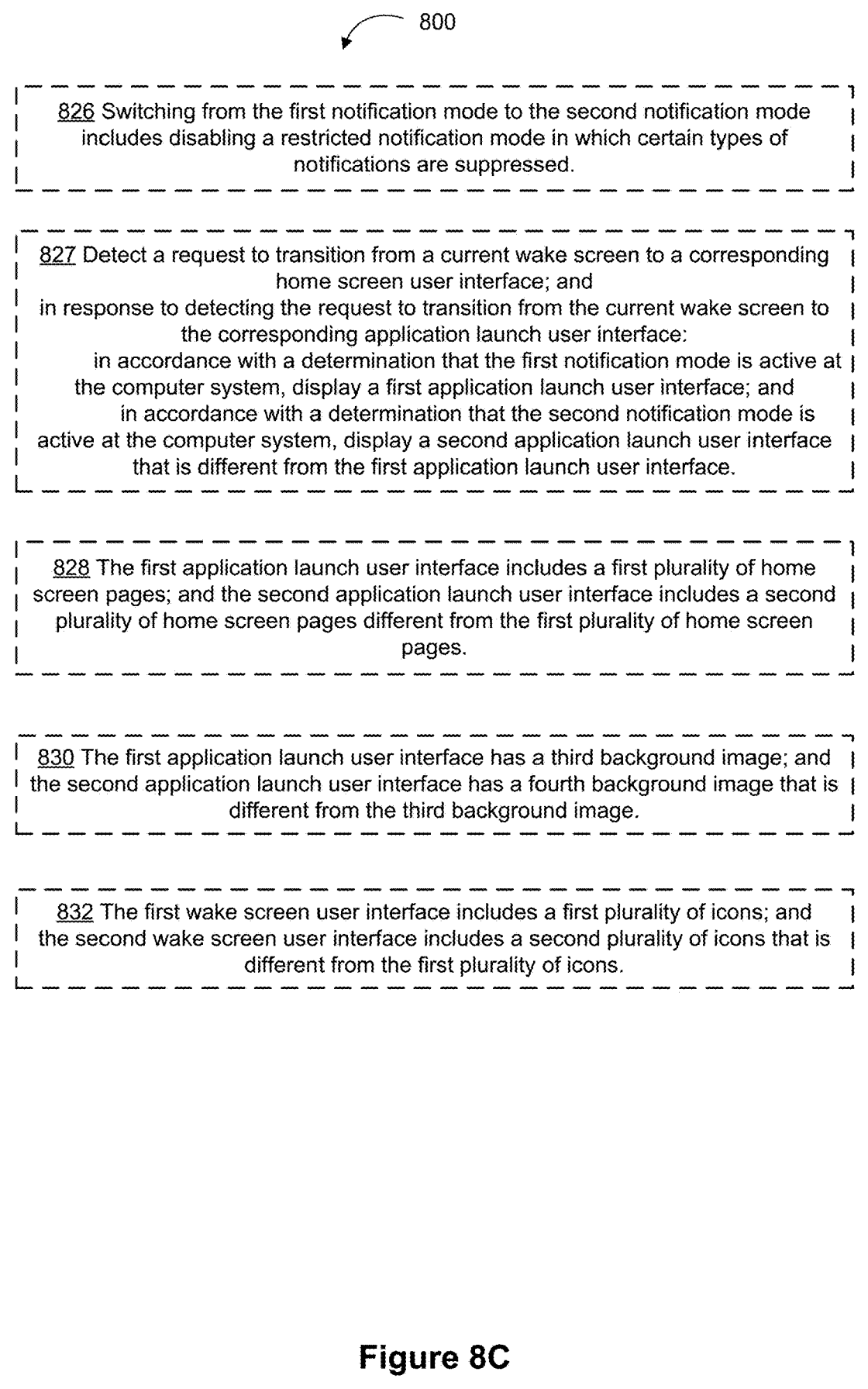

826 Switching from the first notification mode to the second notification mode includes disabling a restricted notification mode in which certain types of notifications are suppressed.

827 Detect a request to transition from a current wake screen to a corresponding home screen user interface; and
in response to detecting the request to transition from the current wake screen to the corresponding application launch user interface:
in accordance with a determination that the first notification mode is active at the computer system, display a first application launch user interface; and
in accordance with a determination that the second notification mode is active at the computer system, display a second application launch user interface that is different from the first application launch user interface.

828 The first application launch user interface includes a first plurality of home screen pages; and the second application launch user interface includes a second plurality of home screen pages different from the first plurality of home screen pages.

830 The first application launch user interface has a third background image; and the second application launch user interface has a fourth background image that is different from the third background image.

832 The first wake screen user interface includes a first plurality of icons; and the second wake screen user interface includes a second plurality of icons that is different from the first plurality of icons.

Figure 8D:
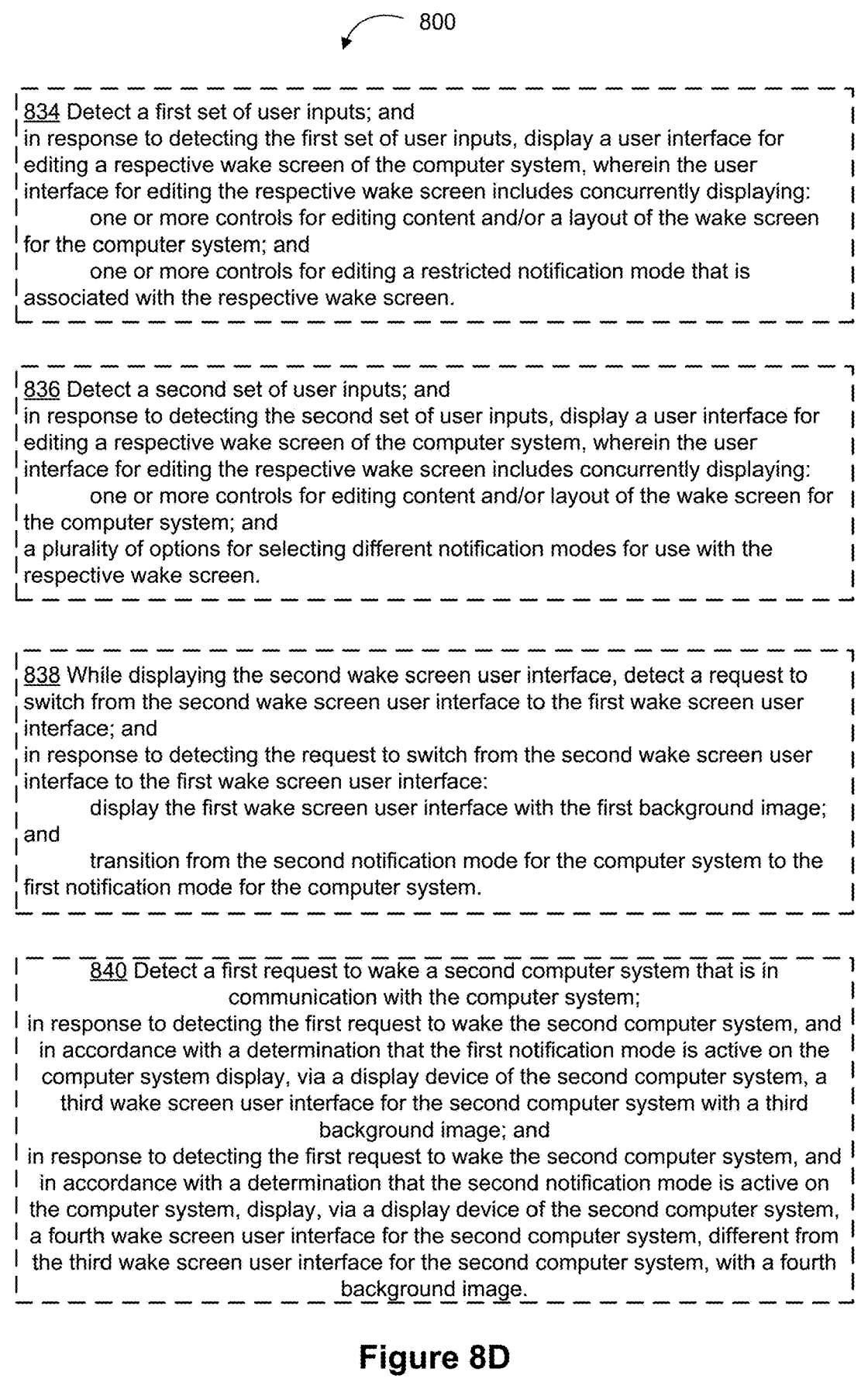

834 Detect a first set of user inputs; and
in response to detecting the first set of user inputs, display a user interface for editing a respective wake screen of the computer system, wherein the user interface for editing the respective wake screen includes concurrently displaying:
one or more controls for editing content and/or a layout of the wake screen for the computer system; and
one or more controls for editing a restricted notification mode that is associated with the respective wake screen.

836 Detect a second set of user inputs; and
in response to detecting the second set of user inputs, display a user interface for editing a respective wake screen of the computer system, wherein the user interface for editing the respective wake screen includes concurrently displaying:
one or more controls for editing content and/or layout of the wake screen for the computer system; and
a plurality of options for selecting different notification modes for use with the respective wake screen.

838 While displaying the second wake screen user interface, detect a request to switch from the second wake screen user interface to the first wake screen user interface; and
in response to detecting the request to switch from the second wake screen user interface to the first wake screen user interface:
display the first wake screen user interface with the first background image; and
transition from the second notification mode for the computer system to the first notification mode for the computer system.

840 Detect a first request to wake a second computer system that is in communication with the computer system;
in response to detecting the first request to wake the second computer system, and in accordance with a determination that the first notification mode is active on the computer system display, via a display device of the second computer system, a third wake screen user interface for the second computer system with a third background image; and
in response to detecting the first request to wake the second computer system, and in accordance with a determination that the second notification mode is active on the computer system, display, via a display device of the second computer system, a fourth wake screen user interface for the second computer system, different from the third wake screen user interface for the second computer system, with a fourth background image.

Figure 8E:
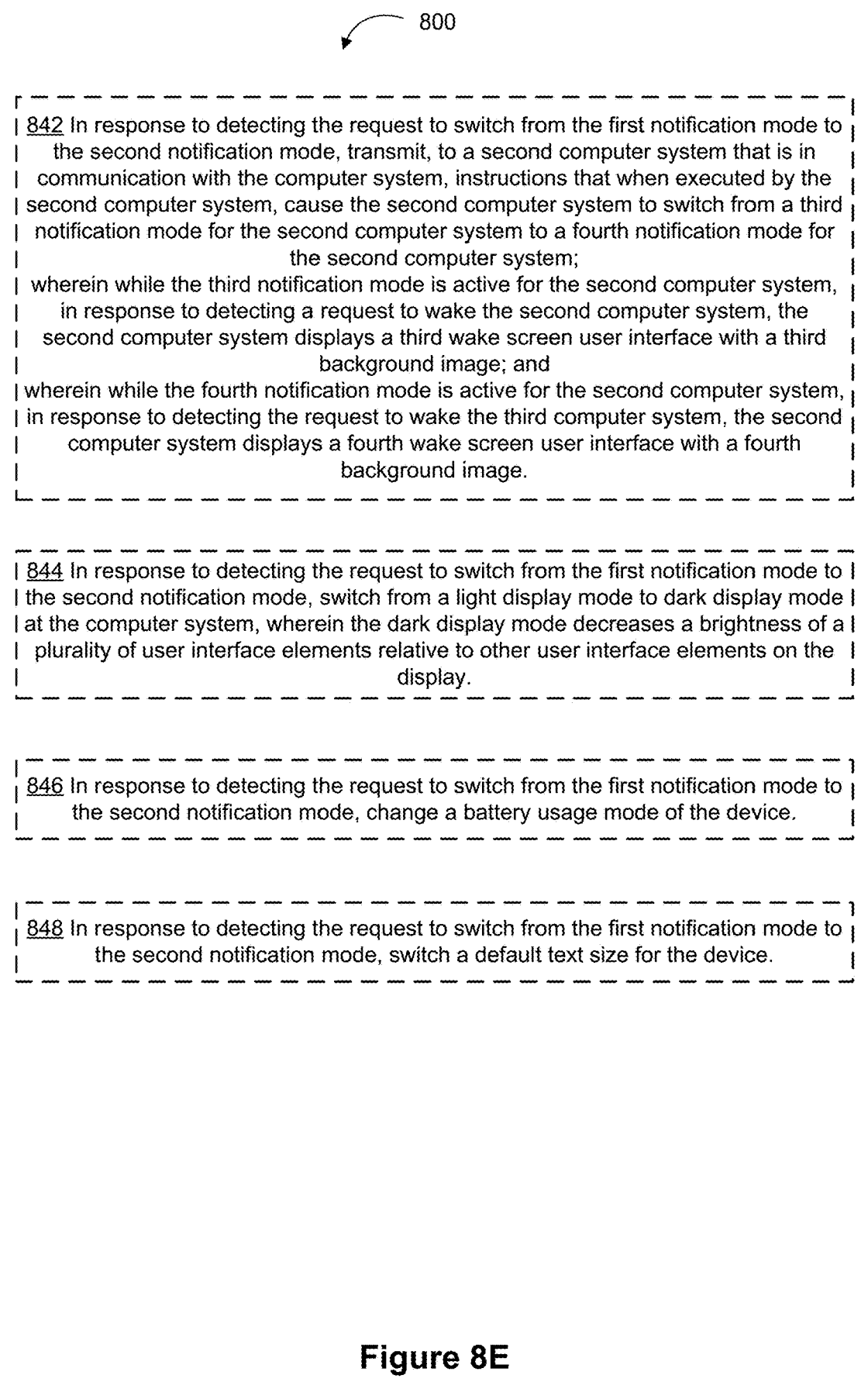

842 In response to detecting the request to switch from the first notification mode to the second notification mode, transmit, to a second computer system that is in communication with the computer system, instructions that when executed by the second computer system, cause the second computer system to switch from a third notification mode for the second computer system to a fourth notification mode for the second computer system;
wherein while the third notification mode is active for the second computer system, in response to detecting a request to wake the second computer system, the second computer system displays a third wake screen user interface with a third background image; and
wherein while the fourth notification mode is active for the second computer system, in response to detecting the request to wake the third computer system, the second computer system displays a fourth wake screen user interface with a fourth background image.

844 In response to detecting the request to switch from the first notification mode to the second notification mode, switch from a light display mode to dark display mode at the computer system, wherein the dark display mode decreases a brightness of a plurality of user interface elements relative to other user interface elements on the display.

846 In response to detecting the request to switch from the first notification mode to the second notification mode, change a battery usage mode of the device.

848 In response to detecting the request to switch from the first notification mode to the second notification mode, switch a default text size for the device.

Figure 9A:
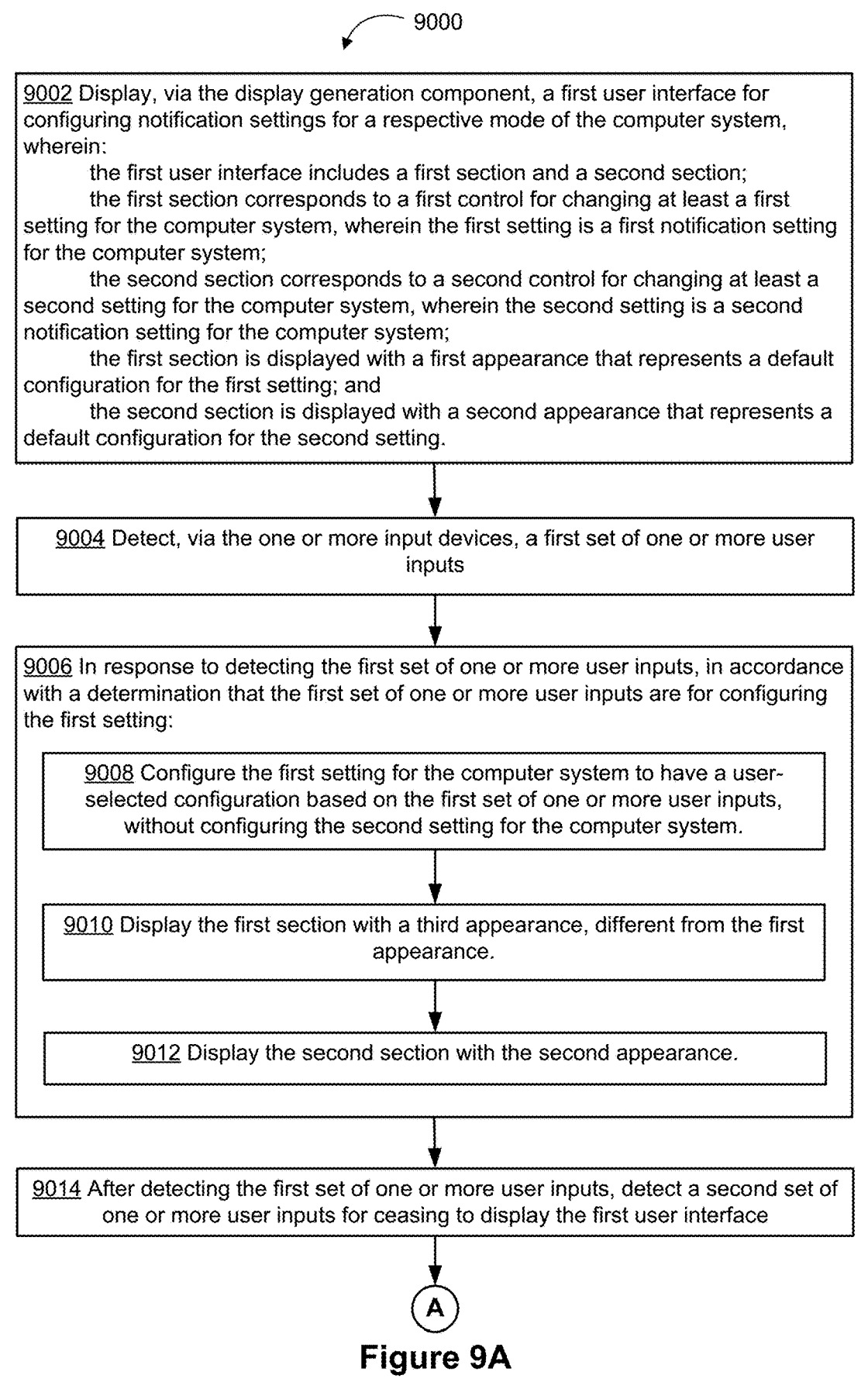

9002 Display, via the display generation component, a first user interface for configuring notification settings for a respective mode of the computer system, wherein:
the first user interface includes a first section and a second section;
the first section corresponds to a first control for changing at least a first setting for the computer system, wherein the first setting is a first notification setting for the computer system;
the second section corresponds to a second control for changing at least a second setting for the computer system, wherein the second setting is a second notification setting for the computer system;
the first section is displayed with a first appearance that represents a default configuration for the first setting; and
the second section is displayed with a second appearance that represents a default configuration for the second setting.

9004 Detect, via the one or more input devices, a first set of one or more user inputs 9006 In response to detecting the first set of one or more user inputs, in accordance with a determination that the first set of one or more user inputs are for configuring the first setting:

9008 Configure the first setting for the computer system to have a user-selected configuration based on the first set of one or more user inputs, without configuring the second setting for the computer system.

9010 Display the first section with a third appearance, different from the first appearance.

9012 Display the second section with the second appearance.

9014 After detecting the first set of one or more user inputs, detect a second set of one or more user inputs for ceasing to display the first user interface

Figure 9B:
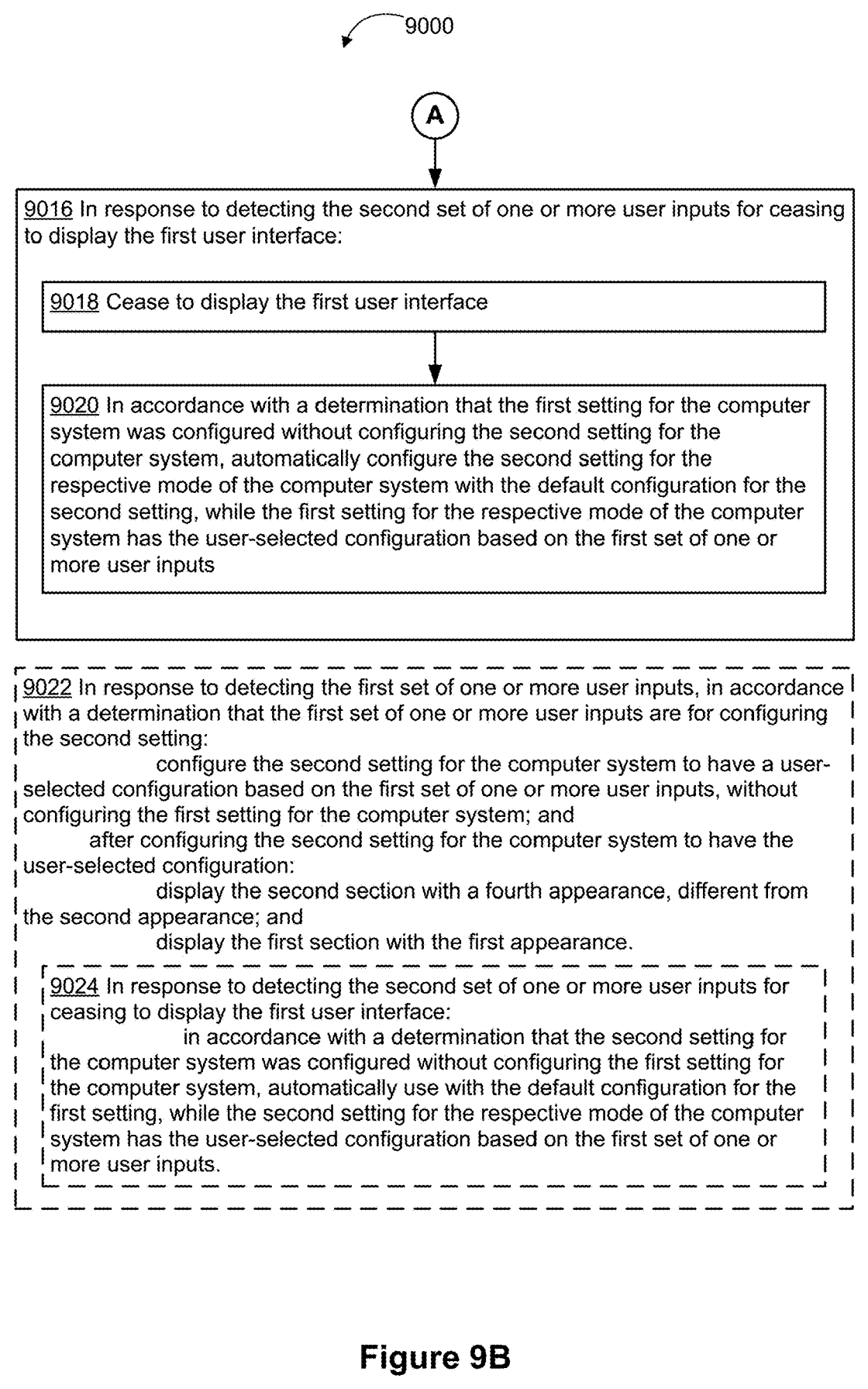

9016 In response to detecting the second set of one or more user inputs for ceasing to display the first user interface:

9018 Cease to display the first user interface

9020 In accordance with a determination that the first setting for the computer system was configured without configuring the second setting for the computer system, automatically configure the second setting for the respective mode of the computer system with the default configuration for the second setting, while the first setting for the respective mode of the computer system has the user-selected configuration based on the first set of one or more user inputs 9022 In response to detecting the first set of one or more user inputs, in accordance with a determination that the first set of one or more user inputs are for configuring the second setting:

configure the second setting for the computer system to have a user-selected configuration based on the first set of one or more user inputs, without configuring the first setting for the computer system; and after configuring the second setting for the computer system to have the user-selected configuration:

display the second section with a fourth appearance, different from the second appearance; and display the first section with the first appearance.

9024 In response to detecting the second set of one or more user inputs for ceasing to display the first user interface:

in accordance with a determination that the second setting for the computer system was configured without configuring the first setting for the computer system, automatically use with the default configuration for the first setting, while the second setting for the respective mode of the computer system has the user-selected configuration based on the first set of one or more user inputs.

Figure 9C:
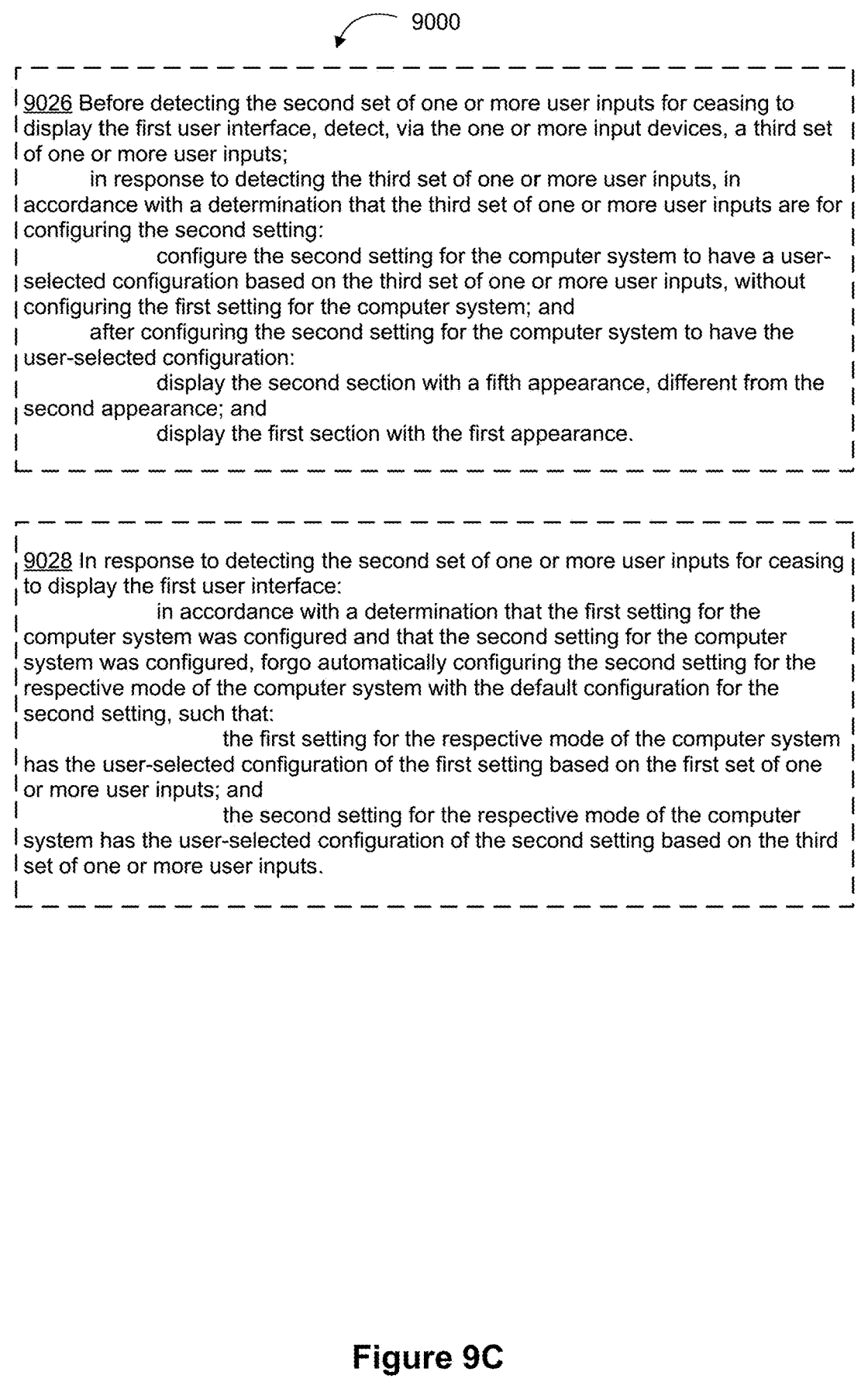

9026 Before detecting the second set of one or more user inputs for ceasing to display the first user interface, detect, via the one or more input devices, a third set of one or more user inputs;

in response to detecting the third set of one or more user inputs, in accordance with a determination that the third set of one or more user inputs are for configuring the second setting:

configure the second setting for the computer system to have a user-selected configuration based on the third set of one or more user inputs, without configuring the first setting for the computer system; and after configuring the second setting for the computer system to have the user-selected configuration:

display the second section with a fifth appearance, different from the second appearance; and display the first section with the first appearance.

9028 In response to detecting the second set of one or more user inputs for ceasing to display the first user interface:

in accordance with a determination that the first setting for the computer system was configured and that the second setting for the computer system was configured, forgo automatically configuring the second setting for the respective mode of the computer system with the default configuration for the second setting, such that:

the first setting for the respective mode of the computer system has the user-selected configuration of the first setting based on the first set of one or more user inputs; and the second setting for the respective mode of the computer system has the user-selected configuration of the second setting based on the third set of one or more user inputs.

Figure 9D:
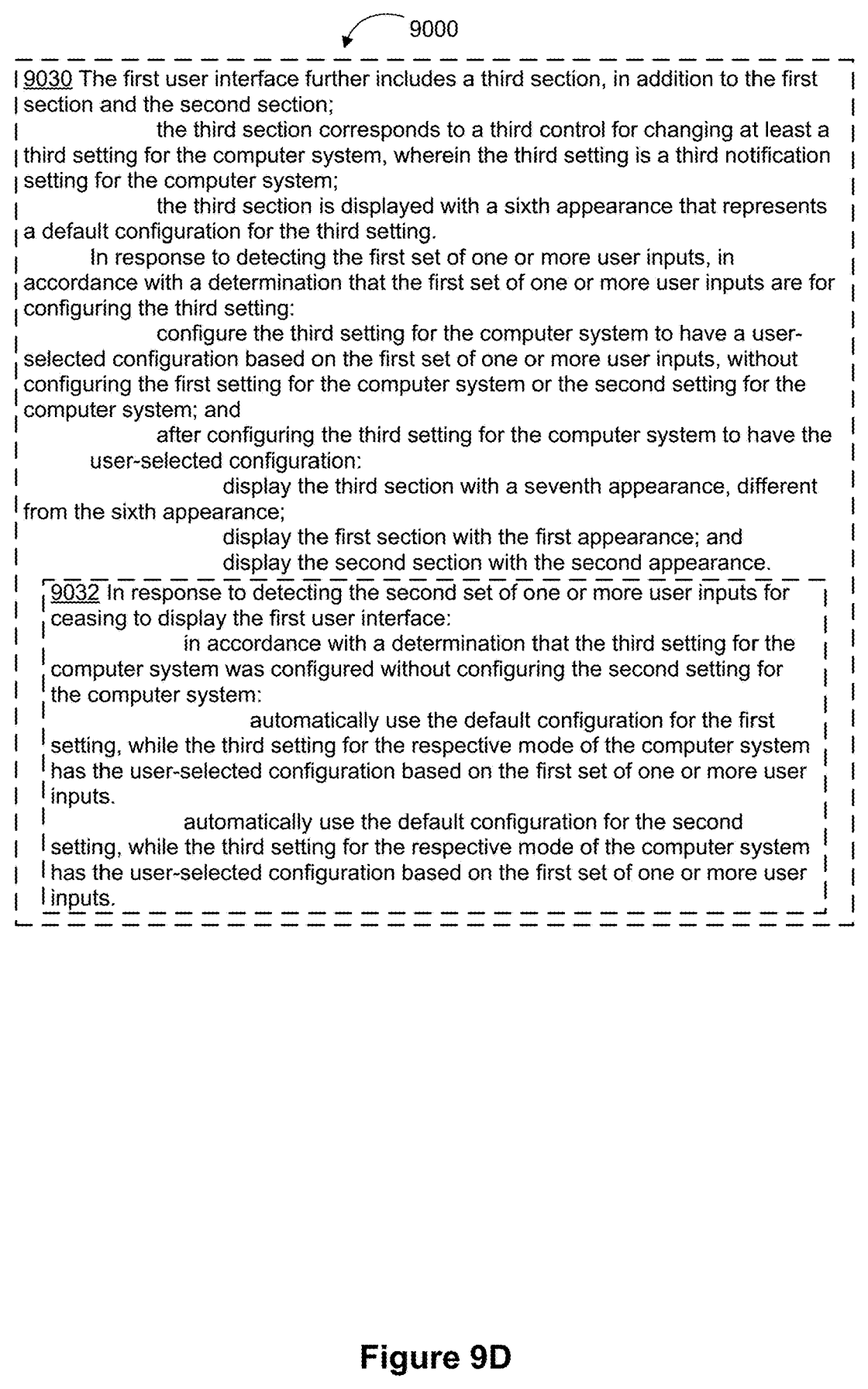

9030 The first user interface further includes a third section, in addition to the first section and the second section;

the third section corresponds to a third control for changing at least a third setting for the computer system, wherein the third setting is a third notification setting for the computer system;

the third section is displayed with a sixth appearance that represents a default configuration for the third setting.

In response to detecting the first set of one or more user inputs, in accordance with a determination that the first set of one or more user inputs are for configuring the third setting:

configure the third setting for the computer system to have a user-selected configuration based on the first set of one or more user inputs, without configuring the first setting for the computer system or the second setting for the computer system; and after configuring the third setting for the computer system to have the user-selected configuration:

display the third section with a seventh appearance, different from the sixth appearance;

display the first section with the first appearance; and display the second section with the second appearance.

9032 In response to detecting the second set of one or more user inputs for ceasing to display the first user interface:

in accordance with a determination that the third setting for the computer system was configured without configuring the second setting for the computer system:

automatically use the default configuration for the first setting, while the third setting for the respective mode of the computer system has the user-selected configuration based on the first set of one or more user inputs.

automatically use the default configuration for the second setting, while the third setting for the respective mode of the computer system has the user-selected configuration based on the first set of one or more user inputs.

Figure 9E:
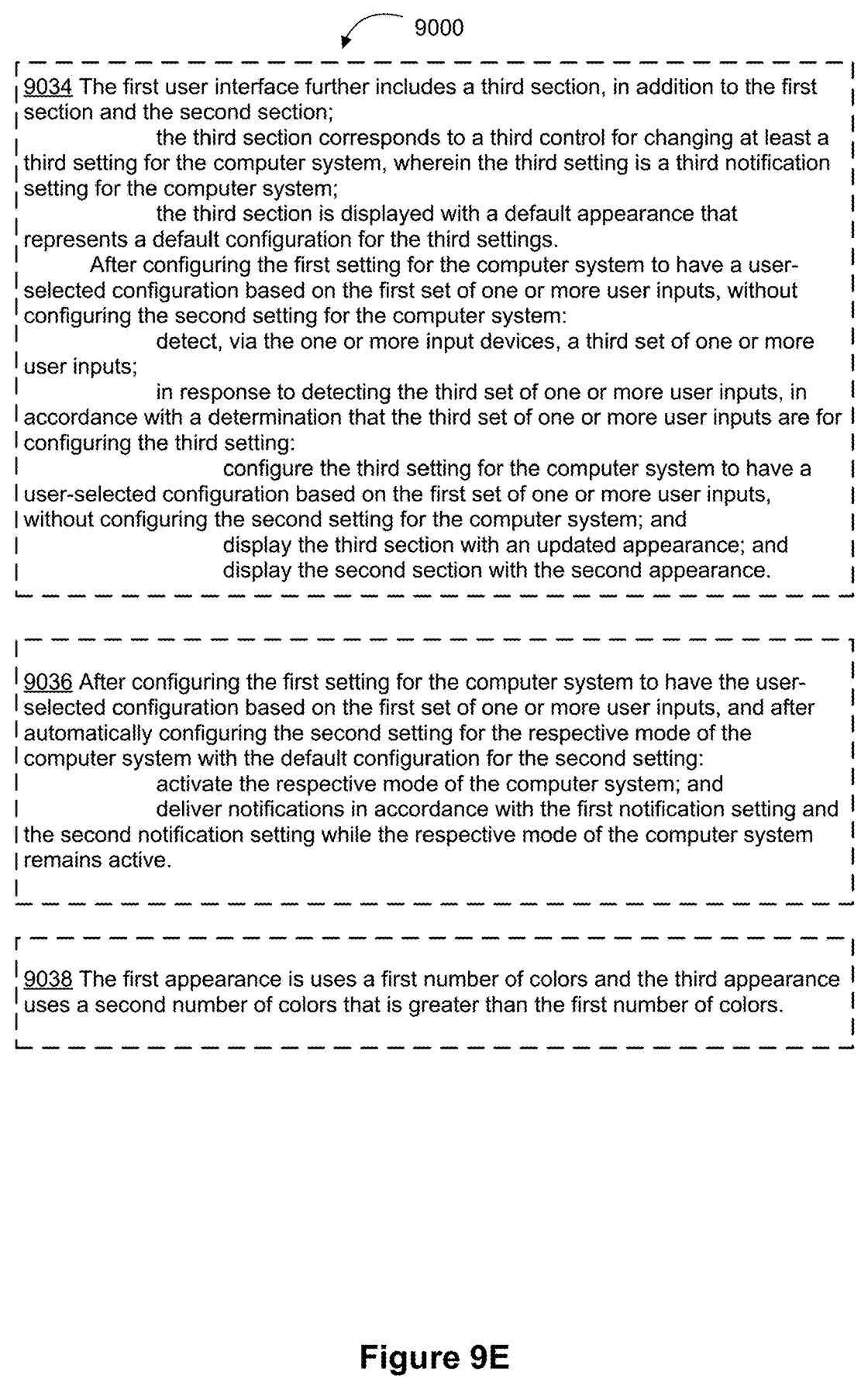

9034 The first user interface further includes a third section, in addition to the first section and the second section;

the third section corresponds to a third control for changing at least a third setting for the computer system, wherein the third setting is a third notification setting for the computer system;

the third section is displayed with a default appearance that represents a default configuration for the third settings.

After configuring the first setting for the computer system to have a user-selected configuration based on the first set of one or more user inputs, without configuring the second setting for the computer system:

detect, via the one or more input devices, a third set of one or more user inputs;

in response to detecting the third set of one or more user inputs, in accordance with a determination that the third set of one or more user inputs are for configuring the third setting:

configure the third setting for the computer system to have a user-selected configuration based on the first set of one or more user inputs, without configuring the second setting for the computer system; and display the third section with an updated appearance; and display the second section with the second appearance.

9036 After configuring the first setting for the computer system to have the user-selected configuration based on the first set of one or more user inputs, and after automatically configuring the second setting for the respective mode of the computer system with the default configuration for the second setting:

activate the respective mode of the computer system; and deliver notifications in accordance with the first notification setting and the second notification setting while the respective mode of the computer system remains active.

9038 The first appearance is uses a first number of colors and the third appearance uses a second number of colors that is greater than the first number of colors.

Figure 9F:
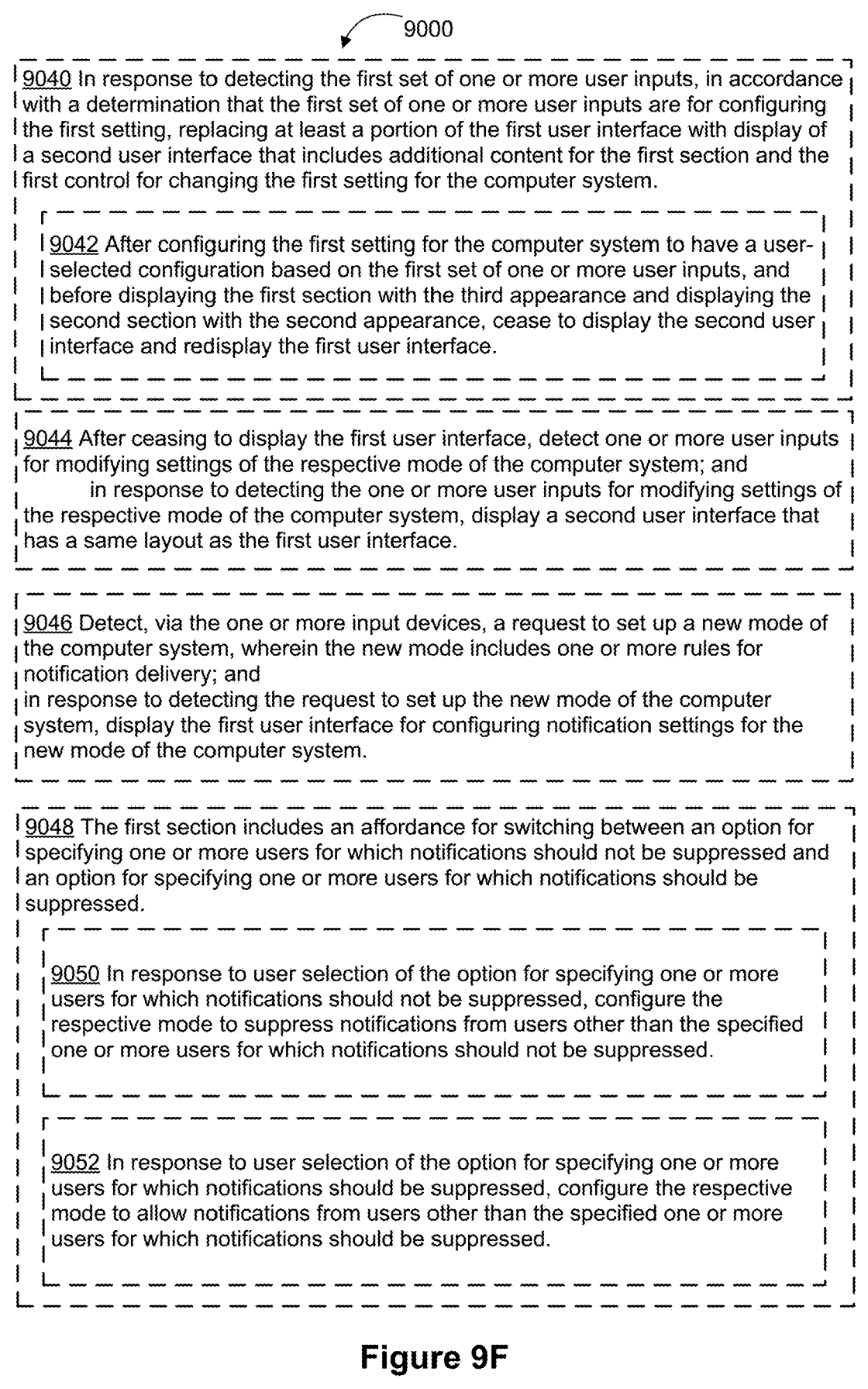

9040 In response to detecting the first set of one or more user inputs, in accordance with a determination that the first set of one or more user inputs are for configuring the first setting, replacing at least a portion of the first user interface with display of a second user interface that includes additional content for the first section and the first control for changing the first setting for the computer system.

9042 After configuring the first setting for the computer system to have a user-selected configuration based on the first set of one or more user inputs, and before displaying the first section with the third appearance and displaying the second section with the second appearance, cease to display the second user interface and redisplay the first user interface.

9044 After ceasing to display the first user interface, detect one or more user inputs for modifying settings of the respective mode of the computer system; and
in response to detecting the one or more user inputs for modifying settings of the respective mode of the computer system, display a second user interface that has a same layout as the first user interface.

9046 Detect, via the one or more input devices, a request to set up a new mode of the computer system, wherein the new mode includes one or more rules for notification delivery; and
in response to detecting the request to set up the new mode of the computer system, display the first user interface for configuring notification settings for the new mode of the computer system.

9048 The first section includes an affordance for switching between an option for specifying one or more users for which notifications should not be suppressed and an option for specifying one or more users for which notifications should be suppressed.

9050 In response to user selection of the option for specifying one or more users for which notifications should not be suppressed, configure the respective mode to suppress notifications from users other than the specified one or more users for which notifications should not be suppressed.

9052 In response to user selection of the option for specifying one or more users for which notifications should be suppressed, configure the respective mode to allow notifications from users other than the specified one or more users for which notifications should be suppressed.

Figure 9G:
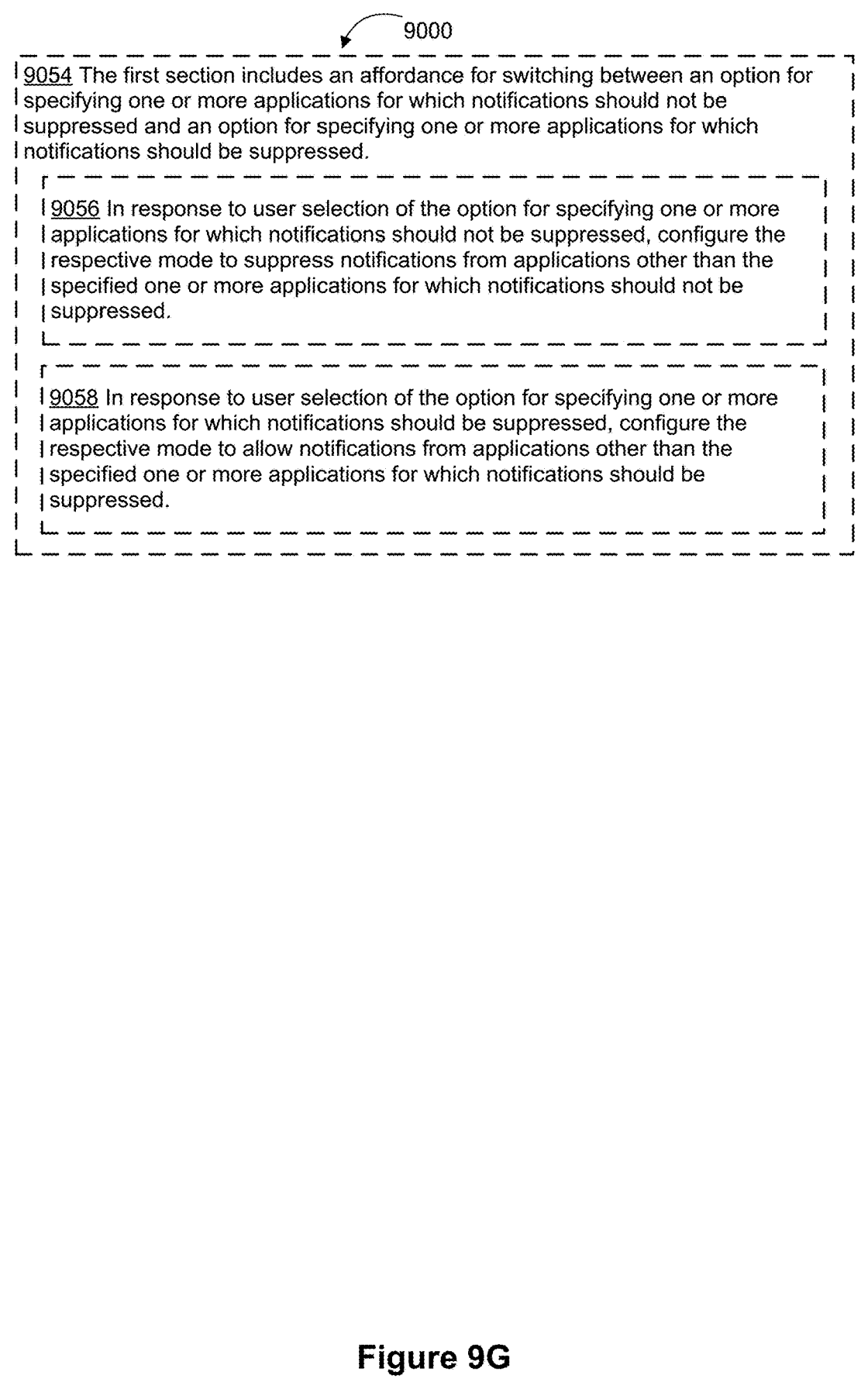

9054 The first section includes an affordance for switching between an option for specifying one or more applications for which notifications should not be suppressed and an option for specifying one or more applications for which notifications should be suppressed.

9056 In response to user selection of the option for specifying one or more applications for which notifications should not be suppressed, configure the respective mode to suppress notifications from applications other than the specified one or more applications for which notifications should not be suppressed.

9058 In response to user selection of the option for specifying one or more applications for which notifications should be suppressed, configure the respective mode to allow notifications from applications other than the specified one or more applications for which notifications should be suppressed.

Figure 10A:
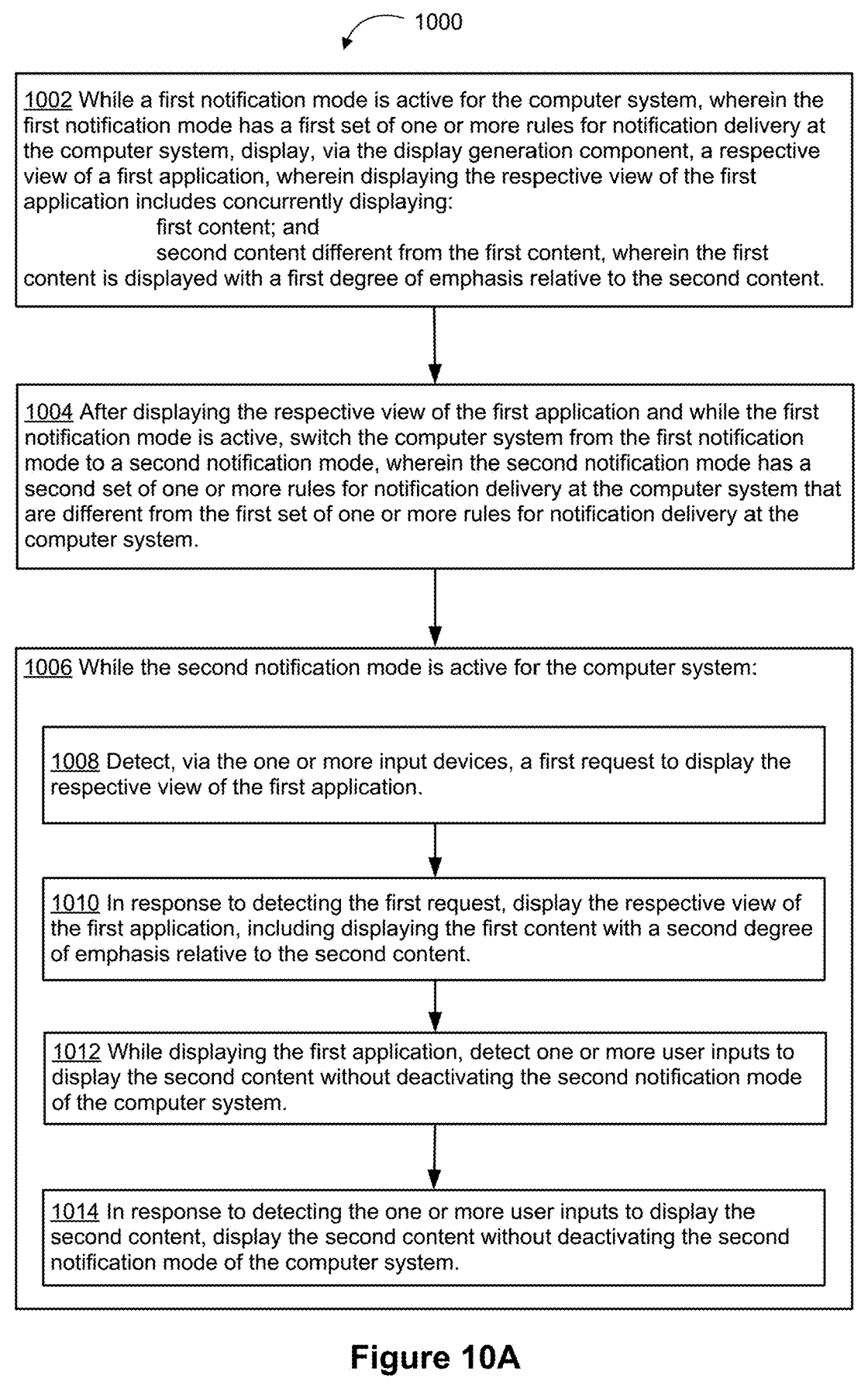

1002 While a first notification mode is active for the computer system, wherein the first notification mode has a first set of one or more rules for notification delivery at the computer system, display, via the display generation component, a respective view of a first application, wherein displaying the respective view of the first application includes concurrently displaying:
first content; and
second content different from the first content, wherein the first content is displayed with a first degree of emphasis relative to the second content.

1004 After displaying the respective view of the first application and while the first notification mode is active, switch the computer system from the first notification mode to a second notification mode, wherein the second notification mode has a second set of one or more rules for notification delivery at the computer system that are different from the first set of one or more rules for notification delivery at the computer system.

1006 While the second notification mode is active for the computer system:

1008 Detect, via the one or more input devices, a first request to display the respective view of the first application.

1010 In response to detecting the first request, display the respective view of the first application, including displaying the first content with a second degree of emphasis relative to the second content.

1012 While displaying the first application, detect one or more user inputs to display the second content without deactivating the second notification mode of the computer system.

1014 In response to detecting the one or more user inputs to display the second content, display the second content without deactivating the second notification mode of the computer system.

Figure 10B:
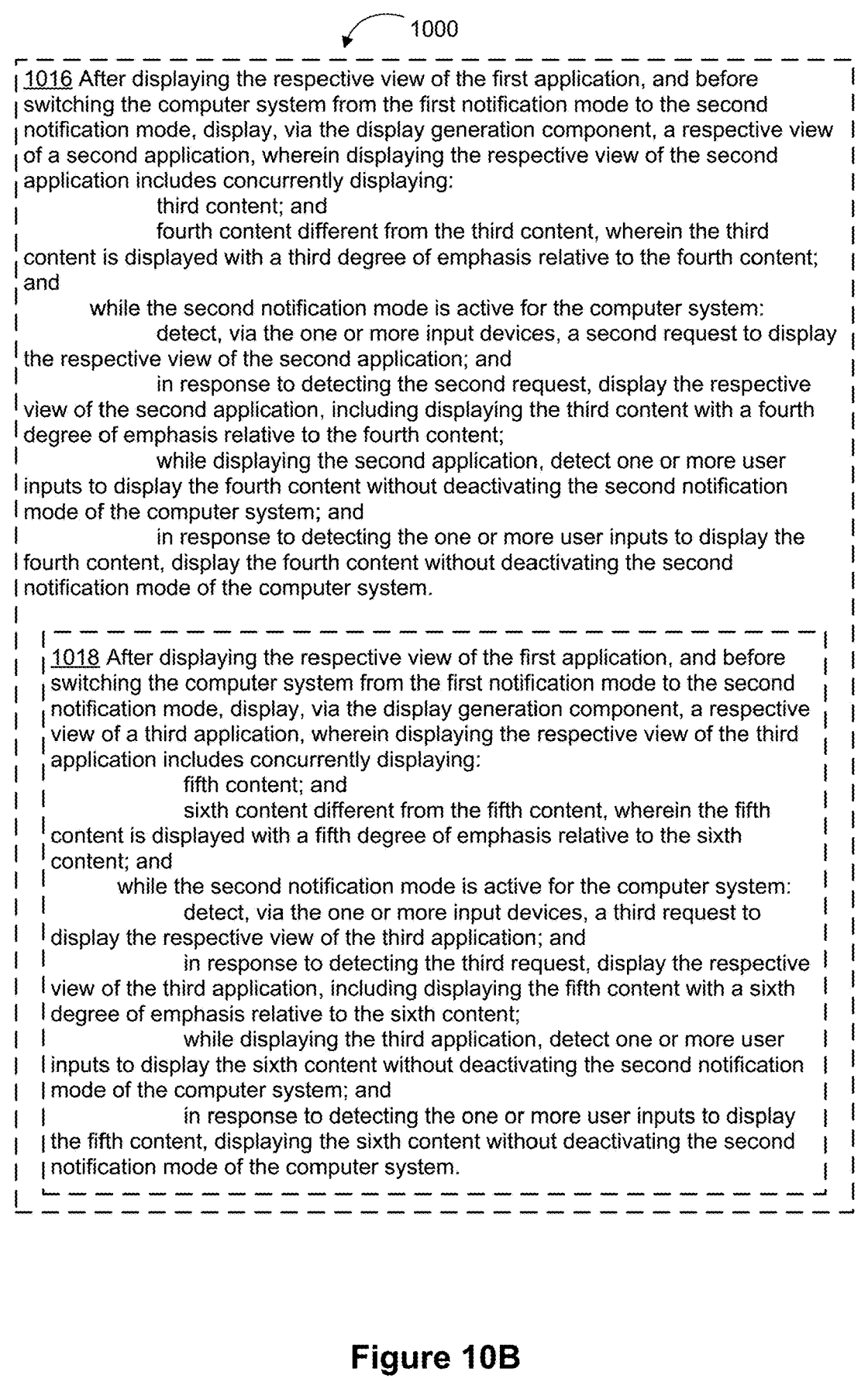

1016 After displaying the respective view of the first application, and before switching the computer system from the first notification mode to the second notification mode, display, via the display generation component, a respective view of a second application, wherein displaying the respective view of the second application includes concurrently displaying:

third content; and fourth content different from the third content, wherein the third content is displayed with a third degree of emphasis relative to the fourth content; and while the second notification mode is active for the computer system:

detect, via the one or more input devices, a second request to display the respective view of the second application; and in response to detecting the second request, display the respective view of the second application, including displaying the third content with a fourth degree of emphasis relative to the fourth content;

while displaying the second application, detect one or more user inputs to display the fourth content without deactivating the second notification mode of the computer system; and in response to detecting the one or more user inputs to display the fourth content, display the fourth content without deactivating the second notification mode of the computer system.

1018 After displaying the respective view of the first application, and before switching the computer system from the first notification mode to the second notification mode, display, via the display generation component, a respective view of a third application, wherein displaying the respective view of the third application includes concurrently displaying:

fifth content; and sixth content different from the fifth content, wherein the fifth content is displayed with a fifth degree of emphasis relative to the sixth content; and while the second notification mode is active for the computer system:

detect, via the one or more input devices, a third request to display the respective view of the third application; and in response to detecting the third request, display the respective view of the third application, including displaying the fifth content with a sixth degree of emphasis relative to the sixth content;

while displaying the third application, detect one or more user inputs to display the sixth content without deactivating the second notification mode of the computer system; and in response to detecting the one or more user inputs to display the fifth content, displaying the sixth content without deactivating the second notification mode of the computer system.

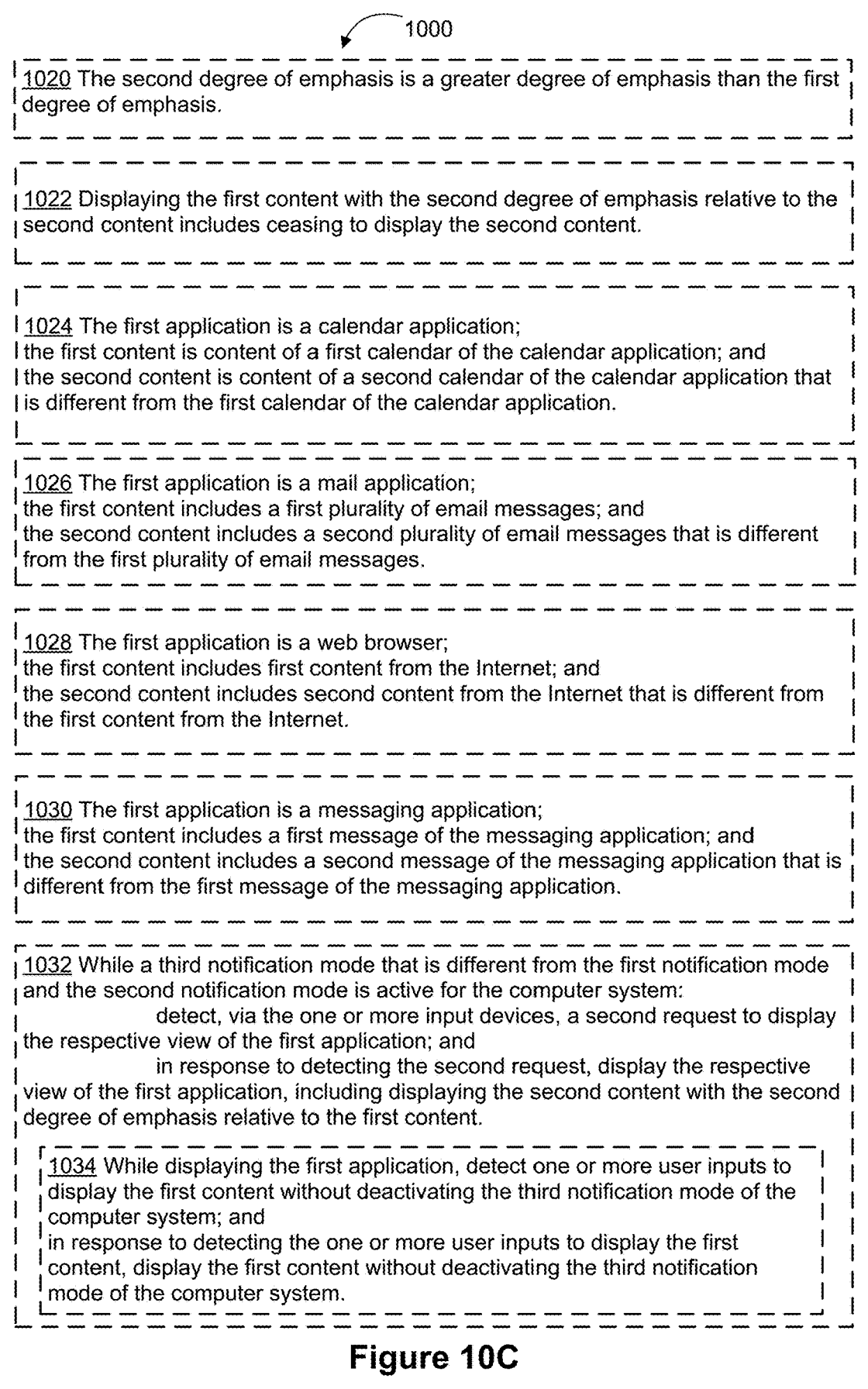

1020 The second degree of emphasis is a greater degree of emphasis than the first degree of emphasis.

1022 Displaying the first content with the second degree of emphasis relative to the second content includes ceasing to display the second content.

1024 The first application is a calendar application;
the first content is content of a first calendar of the calendar application; and
the second content is content of a second calendar of the calendar application that is different from the first calendar of the calendar application.

1026 The first application is a mail application;
the first content includes a first plurality of email messages; and
the second content includes a second plurality of email messages that is different from the first plurality of email messages.

1028 The first application is a web browser;
the first content includes first content from the Internet; and
the second content includes second content from the Internet that is different from the first content from the Internet.

1030 The first application is a messaging application;
the first content includes a first message of the messaging application; and
the second content includes a second message of the messaging application that is different from the first message of the messaging application.

1032 While a third notification mode that is different from the first notification mode and the second notification mode is active for the computer system:
detect, via the one or more input devices, a second request to display the respective view of the first application; and
in response to detecting the second request, display the respective view of the first application, including displaying the second content with the second degree of emphasis relative to the first content.

1034 While displaying the first application, detect one or more user inputs to display the first content without deactivating the third notification mode of the computer system; and
in response to detecting the one or more user inputs to display the first content, display the first content without deactivating the third notification mode of the computer system.

Figure 10C

Focus Mode: Personal

Mail: Unfiltered

Calendar: Filtered

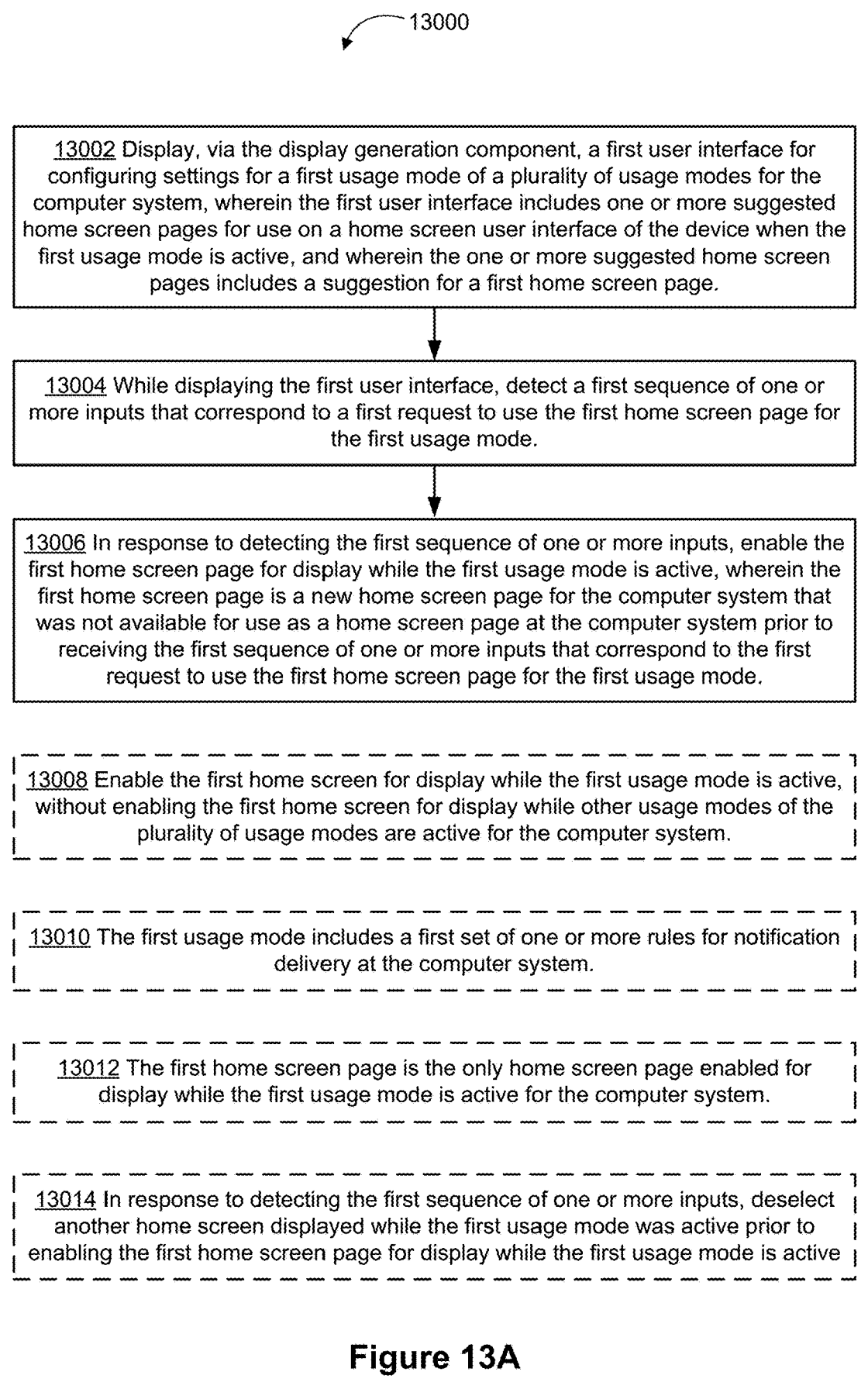

13000

13002 Display, via the display generation component, a first user interface for configuring settings for a first usage mode of a plurality of usage modes for the computer system, wherein the first user interface includes one or more suggested home screen pages for use on a home screen user interface of the device when the first usage mode is active, and wherein the one or more suggested home screen pages includes a suggestion for a first home screen page.

13004 While displaying the first user interface, detect a first sequence of one or more inputs that correspond to a first request to use the first home screen page for the first usage mode.

13006 In response to detecting the first sequence of one or more inputs, enable the first home screen page for display while the first usage mode is active, wherein the first home screen page is a new home screen page for the computer system that was not available for use as a home screen page at the computer system prior to receiving the first sequence of one or more inputs that correspond to the first request to use the first home screen page for the first usage mode.

13008 Enable the first home screen for display while the first usage mode is active, without enabling the first home screen for display while other usage modes of the plurality of usage modes are active for the computer system.

13010 The first usage mode includes a first set of one or more rules for notification delivery at the computer system.

13012 The first home screen page is the only home screen page enabled for display while the first usage mode is active for the computer system.

13014 In response to detecting the first sequence of one or more inputs, deselect another home screen displayed while the first usage mode was active prior to enabling the first home screen page for display while the first usage mode is active

Figure 13A

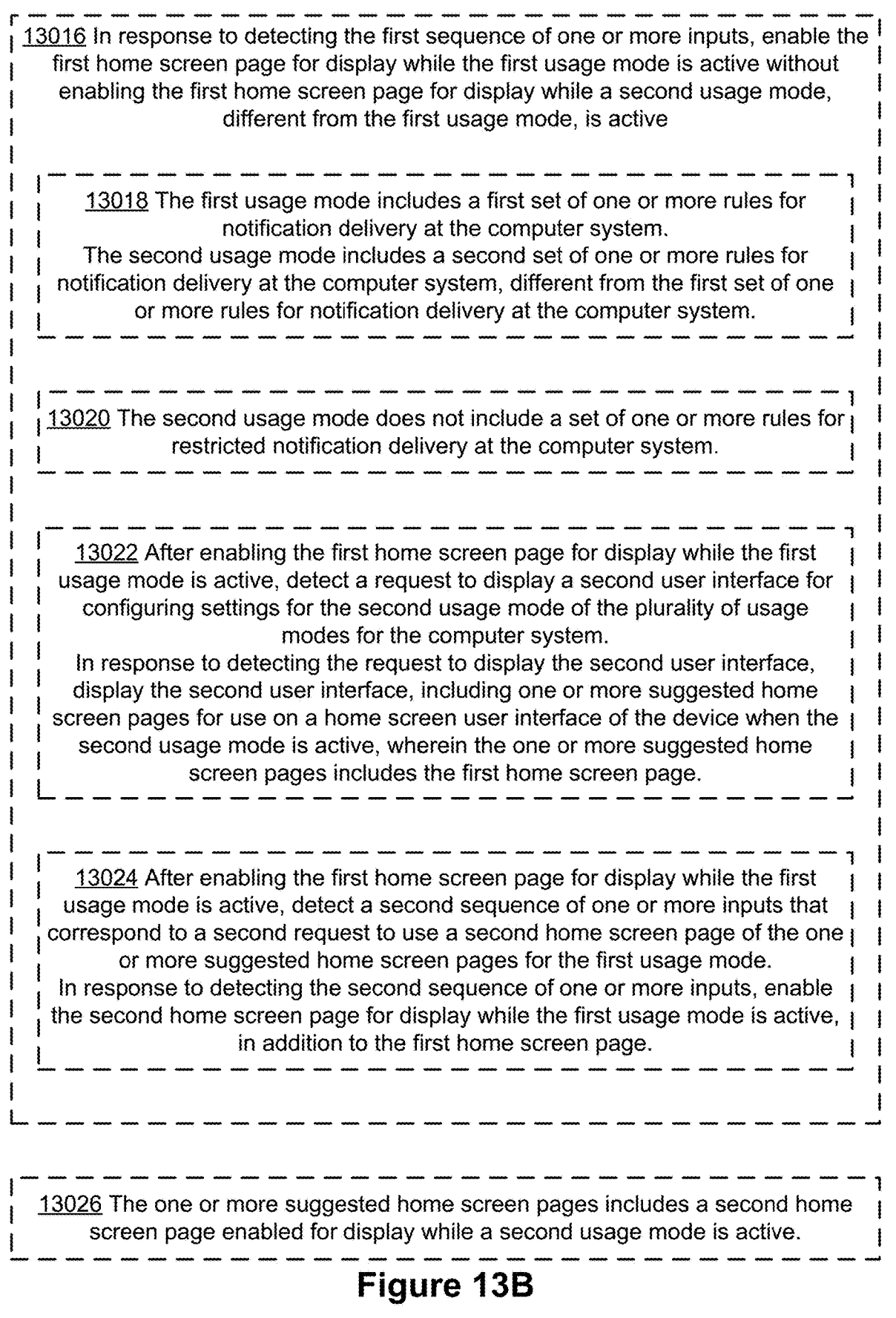

13016 In response to detecting the first sequence of one or more inputs, enable the first home screen page for display while the first usage mode is active without enabling the first home screen page for display while a second usage mode, different from the first usage mode, is active 13018 The first usage mode includes a first set of one or more rules for notification delivery at the computer system.
The second usage mode includes a second set of one or more rules for notification delivery at the computer system, different from the first set of one or more rules for notification delivery at the computer system.

13020 The second usage mode does not include a set of one or more rules for restricted notification delivery at the computer system.

13022 After enabling the first home screen page for display while the first usage mode is active, detect a request to display a second user interface for configuring settings for the second usage mode of the plurality of usage modes for the computer system.
In response to detecting the request to display the second user interface, display the second user interface, including one or more suggested home screen pages for use on a home screen user interface of the device when the second usage mode is active, wherein the one or more suggested home screen pages includes the first home screen page.

13024 After enabling the first home screen page for display while the first usage mode is active, detect a second sequence of one or more inputs that correspond to a second request to use a second home screen page of the one or more suggested home screen pages for the first usage mode.
In response to detecting the second sequence of one or more inputs, enable the second home screen page for display while the first usage mode is active, in addition to the first home screen page.

13026 The one or more suggested home screen pages includes a second home screen page enabled for display while a second usage mode is active.

Figure 13B

Figure 13C:
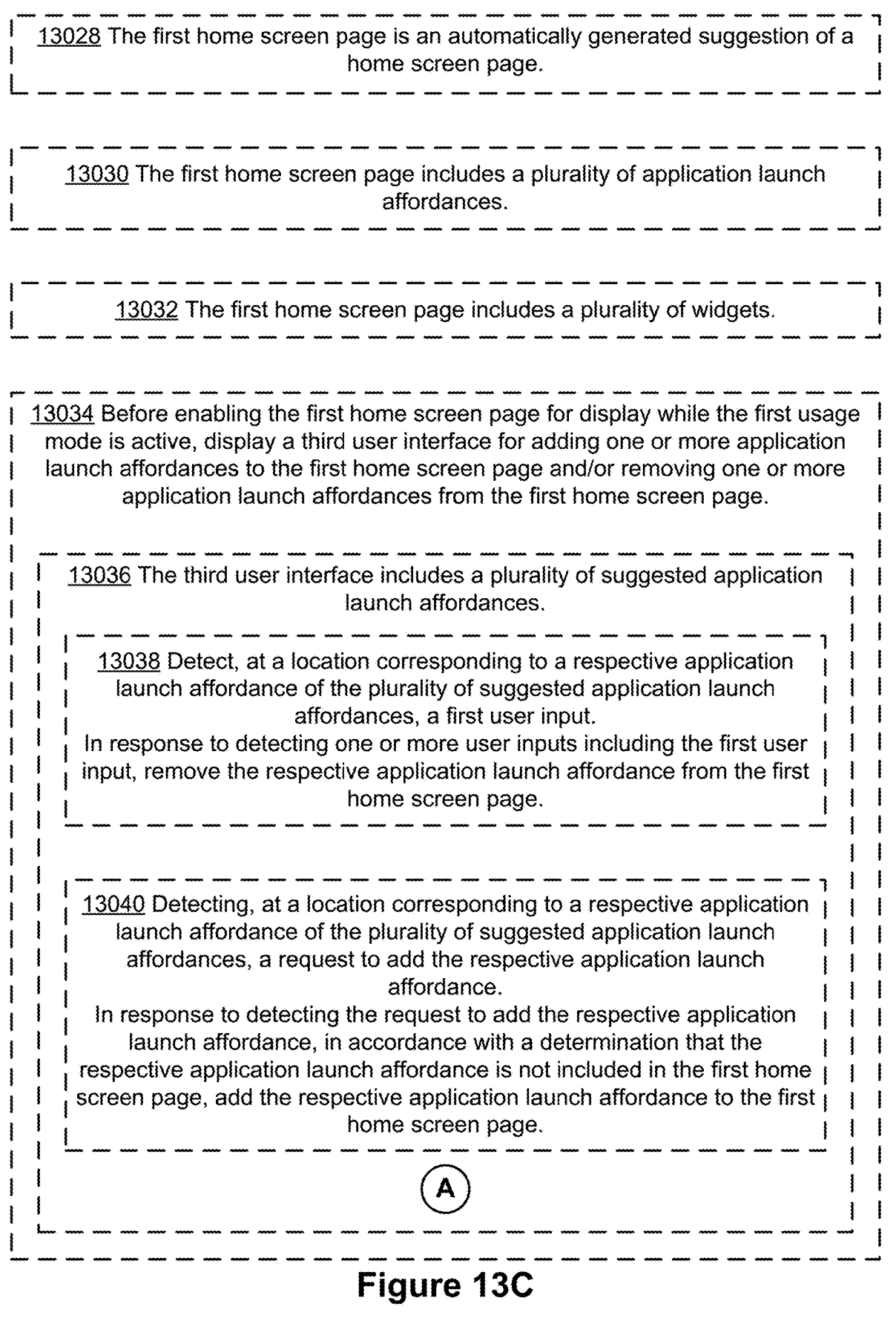

13028 The first home screen page is an automatically generated suggestion of a home screen page.

13030 The first home screen page includes a plurality of application launch affordances.

13032 The first home screen page includes a plurality of widgets.

13034 Before enabling the first home screen page for display while the first usage mode is active, display a third user interface for adding one or more application launch affordances to the first home screen page and/or removing one or more application launch affordances from the first home screen page.

13036 The third user interface includes a plurality of suggested application launch affordances.

13038 Detect, at a location corresponding to a respective application launch affordance of the plurality of suggested application launch affordances, a first user input.
In response to detecting one or more user inputs including the first user input, remove the respective application launch affordance from the first home screen page.

13040 Detecting, at a location corresponding to a respective application launch affordance of the plurality of suggested application launch affordances, a request to add the respective application launch affordance.
In response to detecting the request to add the respective application launch affordance, in accordance with a determination that the respective application launch affordance is not included in the first home screen page, add the respective application launch affordance to the first home screen page.

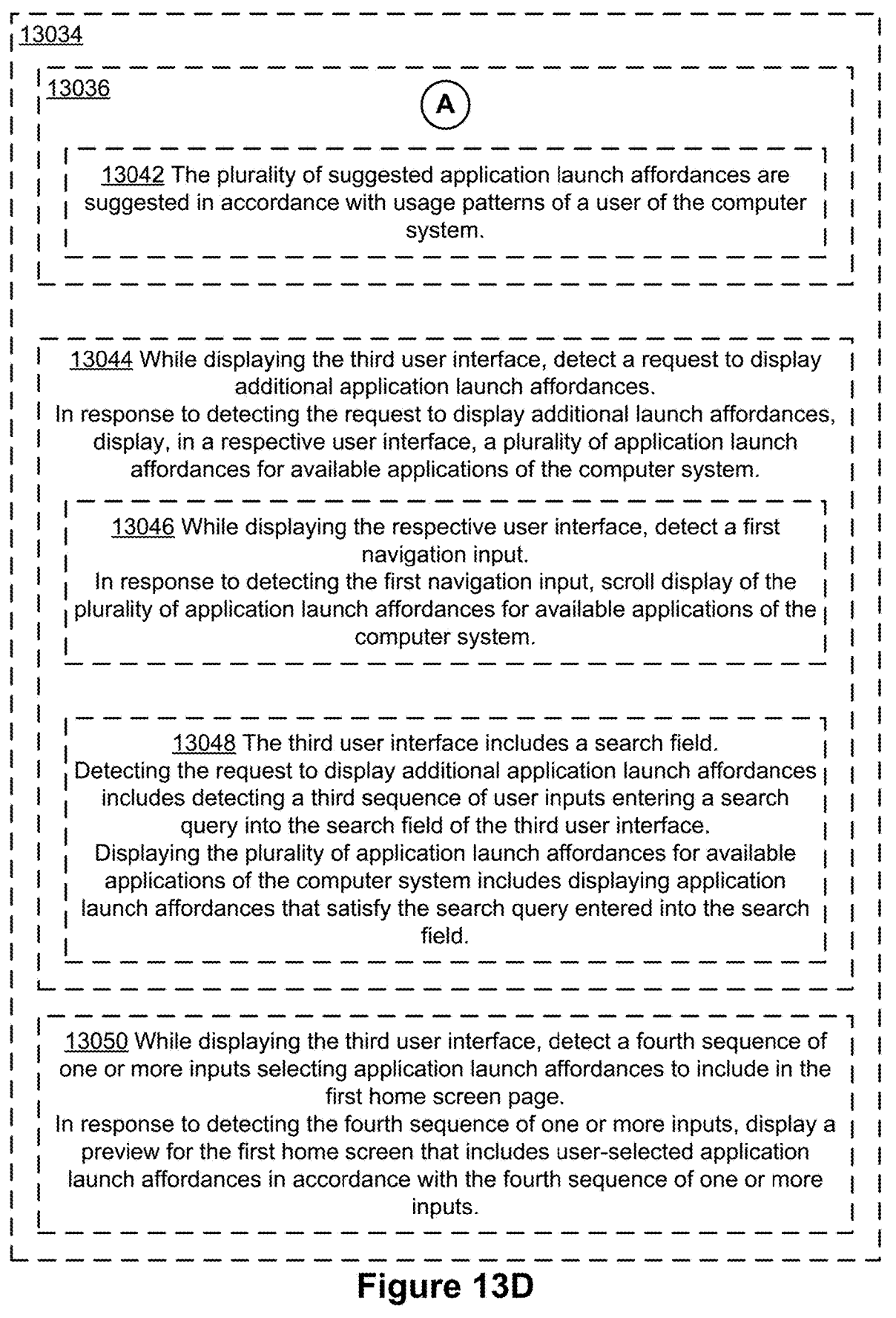

13042 The plurality of suggested application launch affordances are suggested in accordance with usage patterns of a user of the computer system.

13044 While displaying the third user interface, detect a request to display additional application launch affordances.
In response to detecting the request to display additional launch affordances, display, in a respective user interface, a plurality of application launch affordances for available applications of the computer system.

13046 While displaying the respective user interface, detect a first navigation input.
In response to detecting the first navigation input, scroll display of the plurality of application launch affordances for available applications of the computer system.

13048 The third user interface includes a search field.
Detecting the request to display additional application launch affordances includes detecting a third sequence of user inputs entering a search query into the search field of the third user interface.
Displaying the plurality of application launch affordances for available applications of the computer system includes displaying application launch affordances that satisfy the search query entered into the search field.

13050 While displaying the third user interface, detect a fourth sequence of one or more inputs selecting application launch affordances to include in the first home screen page.
In response to detecting the fourth sequence of one or more inputs, display a preview for the first home screen that includes user-selected application launch affordances in accordance with the fourth sequence of one or more inputs.

Figure 13D

Figure 13E:
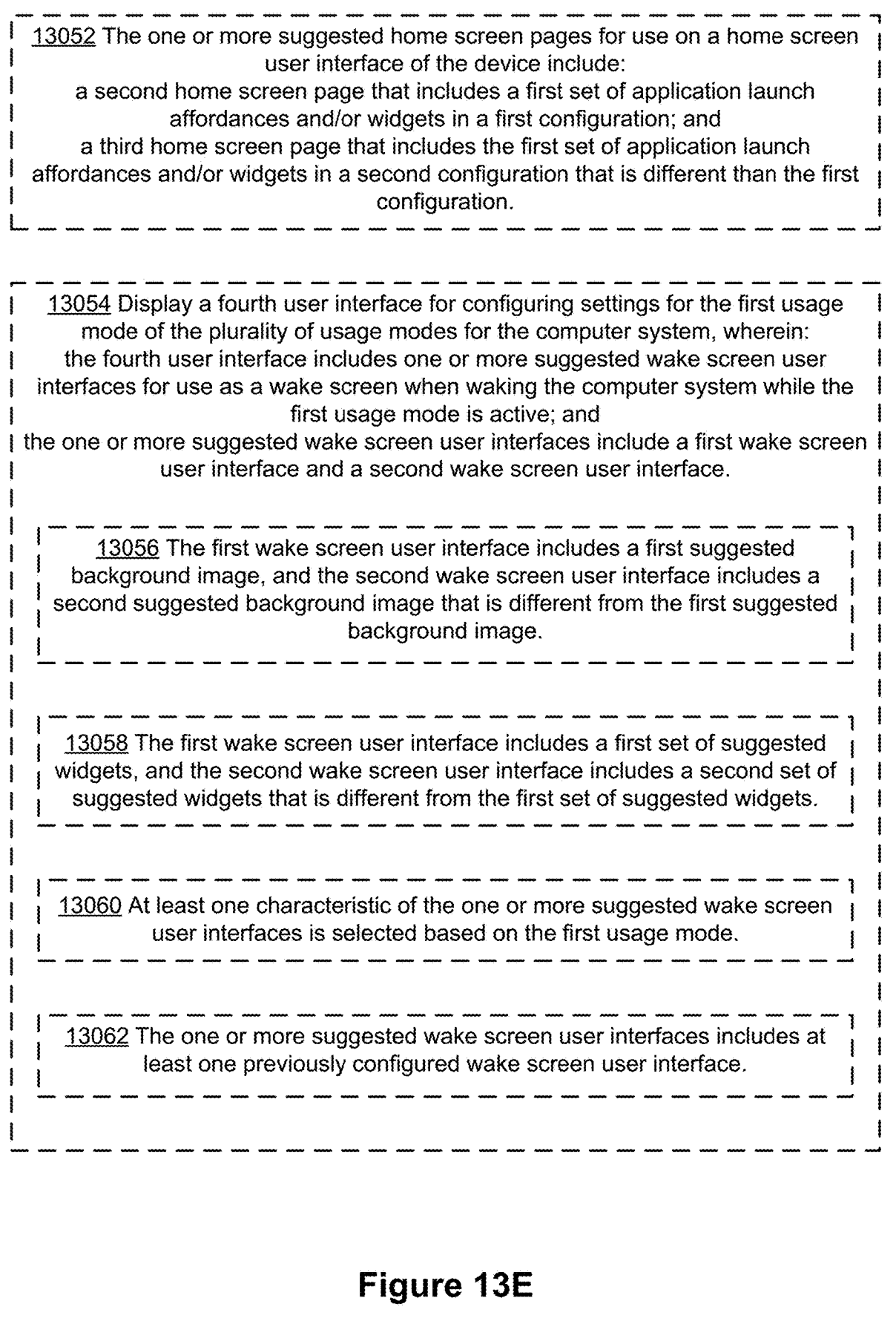

13052 The one or more suggested home screen pages for use on a home screen user interface of the device include:
a second home screen page that includes a first set of application launch affordances and/or widgets in a first configuration; and
a third home screen page that includes the first set of application launch affordances and/or widgets in a second configuration that is different than the first configuration.

13054 Display a fourth user interface for configuring settings for the first usage mode of the plurality of usage modes for the computer system, wherein:
the fourth user interface includes one or more suggested wake screen user interfaces for use as a wake screen when waking the computer system while the first usage mode is active; and
the one or more suggested wake screen user interfaces include a first wake screen user interface and a second wake screen user interface.

13056 The first wake screen user interface includes a first suggested background image, and the second wake screen user interface includes a second suggested background image that is different from the first suggested background image.

13058 The first wake screen user interface includes a first set of suggested widgets, and the second wake screen user interface includes a second set of suggested widgets that is different from the first set of suggested widgets.

13060 At least one characteristic of the one or more suggested wake screen user interfaces is selected based on the first usage mode.

13062 The one or more suggested wake screen user interfaces includes at least one previously configured wake screen user interface.

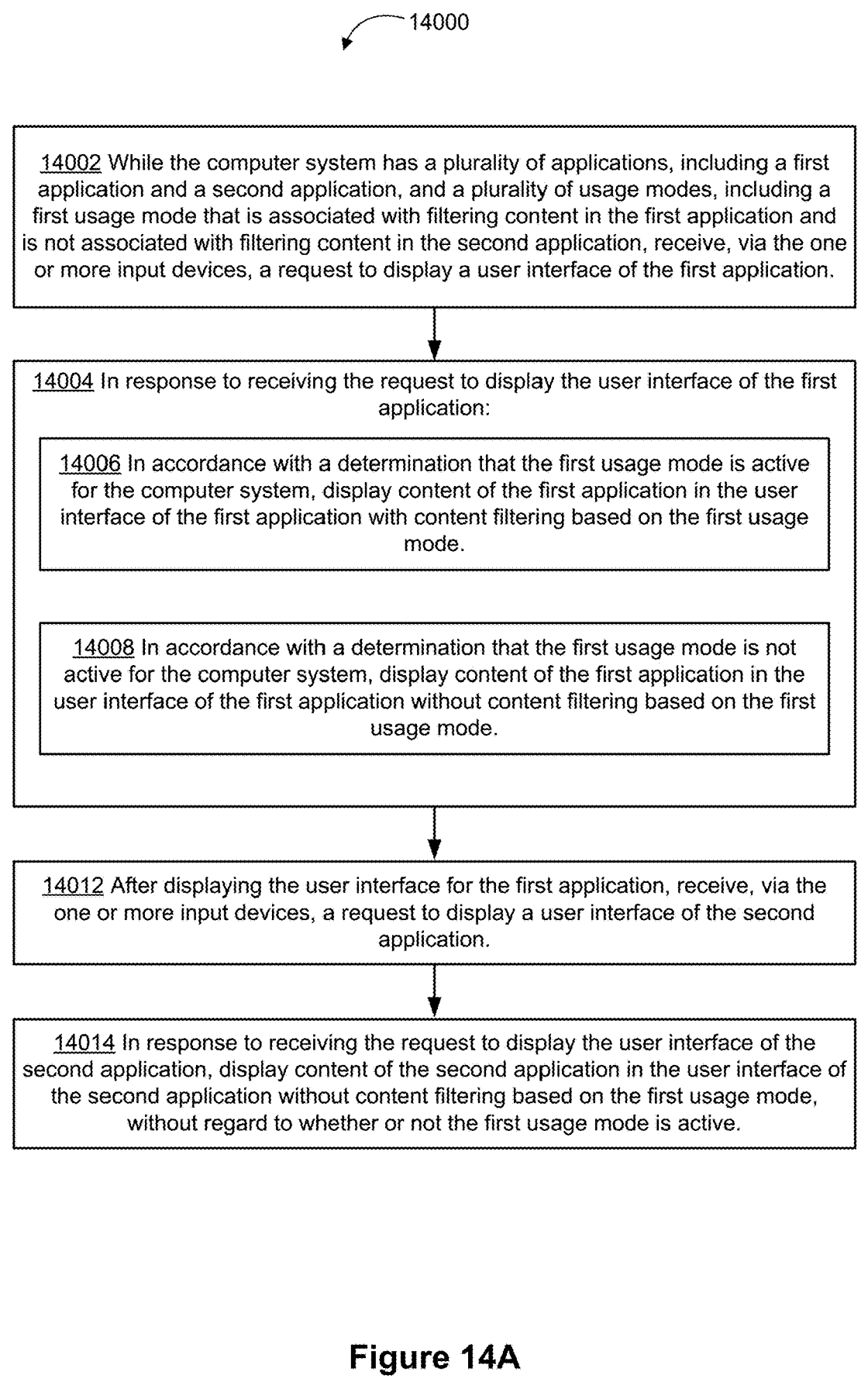

14002 While the computer system has a plurality of applications, including a first application and a second application, and a plurality of usage modes, including a first usage mode that is associated with filtering content in the first application and is not associated with filtering content in the second application, receive, via the one or more input devices, a request to display a user interface of the first application.

14004 In response to receiving the request to display the user interface of the first application:

14006 In accordance with a determination that the first usage mode is active for the computer system, display content of the first application in the user interface of the first application with content filtering based on the first usage mode.

14008 In accordance with a determination that the first usage mode is not active for the computer system, display content of the first application in the user interface of the first application without content filtering based on the first usage mode.

14012 After displaying the user interface for the first application, receive, via the one or more input devices, a request to display a user interface of the second application.

14014 In response to receiving the request to display the user interface of the second application, display content of the second application in the user interface of the second application without content filtering based on the first usage mode, without regard to whether or not the first usage mode is active.

Figure 14A

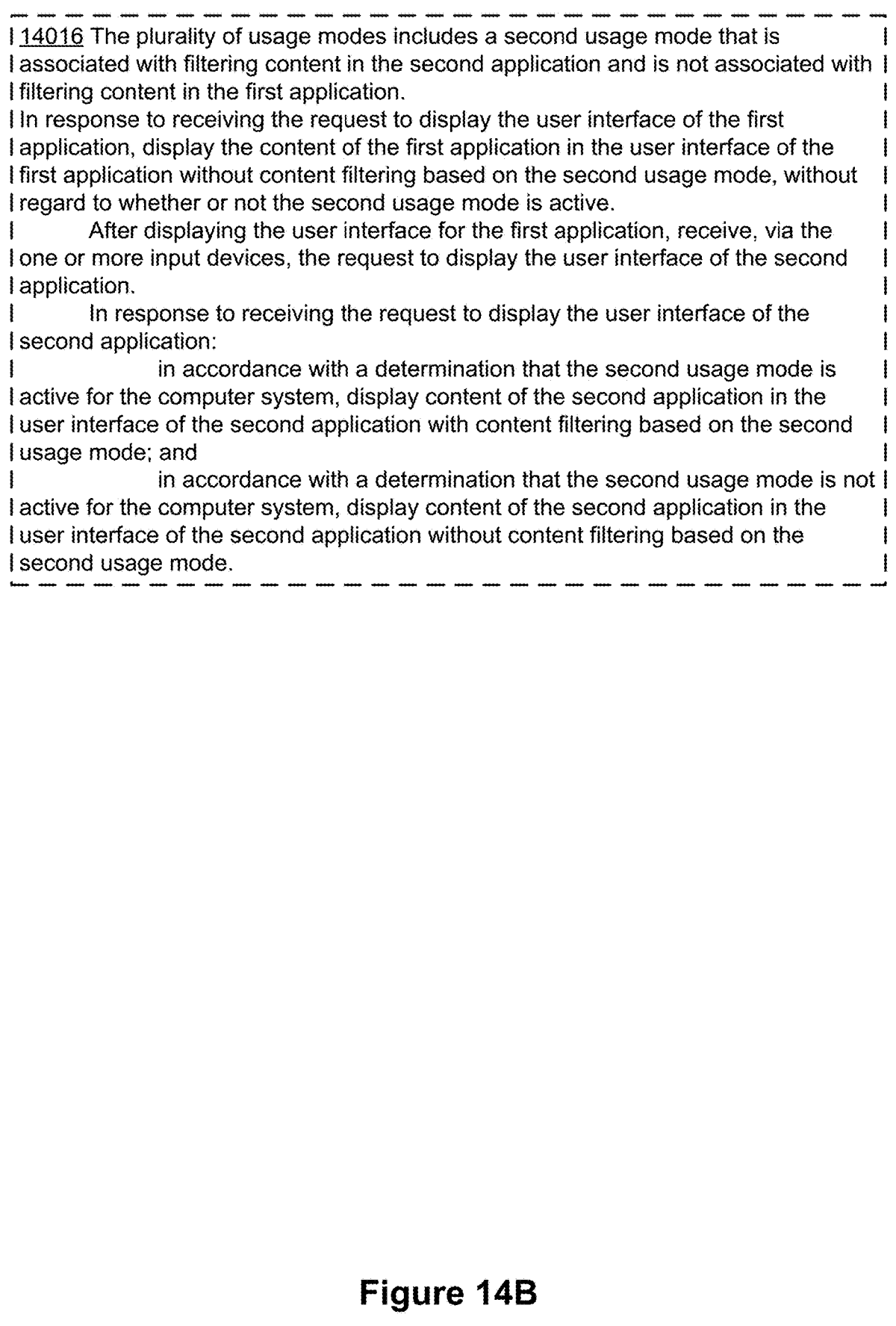

14016 The plurality of usage modes includes a second usage mode that is associated with filtering content in the second application and is not associated with filtering content in the first application.
In response to receiving the request to display the user interface of the first application, display the content of the first application in the user interface of the first application without content filtering based on the second usage mode, without regard to whether or not the second usage mode is active.

After displaying the user interface for the first application, receive, via the one or more input devices, the request to display the user interface of the second application.

In response to receiving the request to display the user interface of the second application:

in accordance with a determination that the second usage mode is active for the computer system, display content of the second application in the user interface of the second application with content filtering based on the second usage mode; and in accordance with a determination that the second usage mode is not active for the computer system, display content of the second application in the user interface of the second application without content filtering based on the second usage mode.

Figure 14B

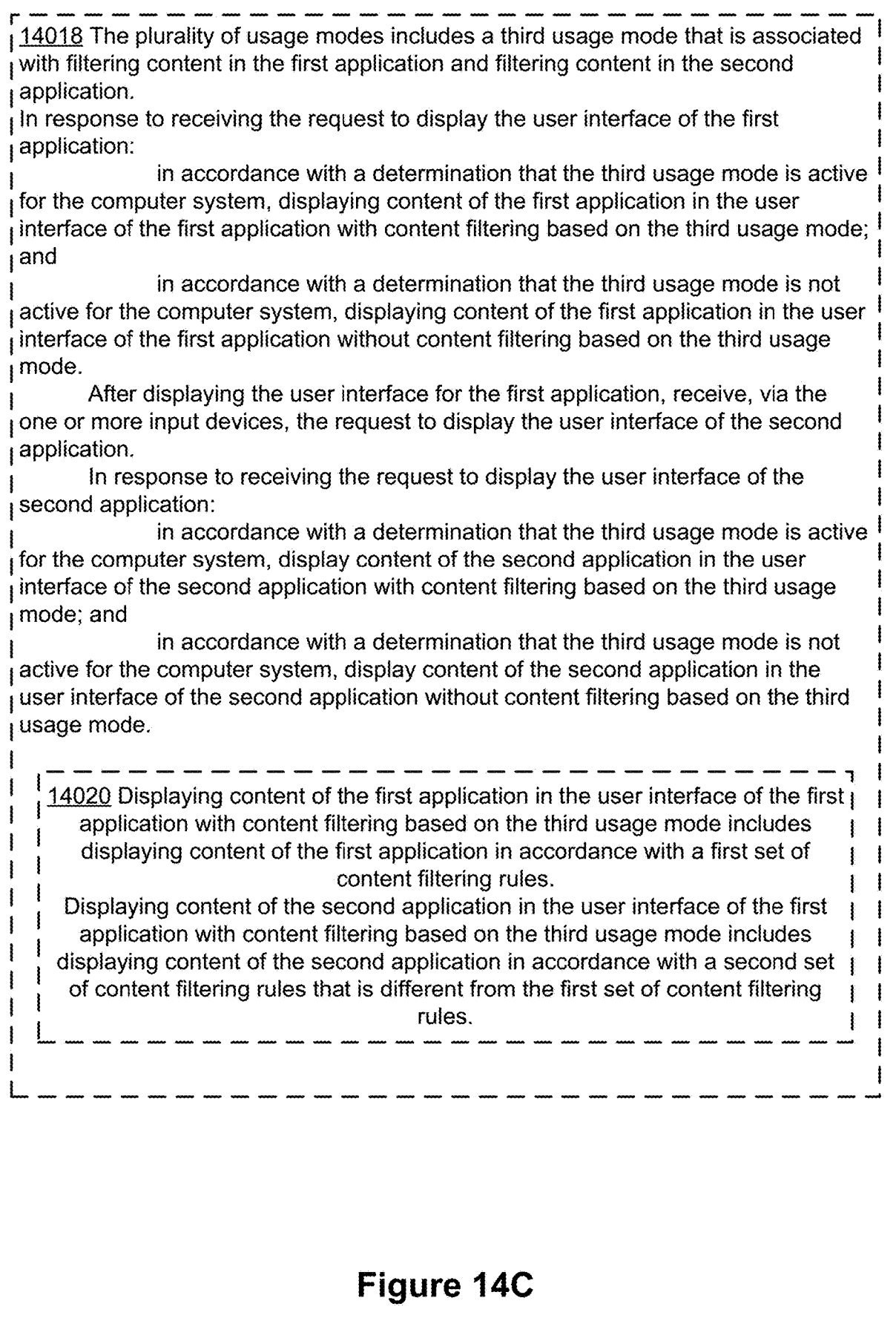

14018 The plurality of usage modes includes a third usage mode that is associated with filtering content in the first application and filtering content in the second application.
In response to receiving the request to display the user interface of the first application:

in accordance with a determination that the third usage mode is active for the computer system, displaying content of the first application in the user interface of the first application with content filtering based on the third usage mode; and in accordance with a determination that the third usage mode is not active for the computer system, displaying content of the first application in the user interface of the first application without content filtering based on the third usage mode.

After displaying the user interface for the first application, receive, via the one or more input devices, the request to display the user interface of the second application.

In response to receiving the request to display the user interface of the second application:

in accordance with a determination that the third usage mode is active for the computer system, display content of the second application in the user interface of the second application with content filtering based on the third usage mode; and in accordance with a determination that the third usage mode is not active for the computer system, display content of the second application in the user interface of the second application without content filtering based on the third usage mode.

14020 Displaying content of the first application in the user interface of the first application with content filtering based on the third usage mode includes displaying content of the first application in accordance with a first set of content filtering rules.
Displaying content of the second application in the user interface of the first application with content filtering based on the third usage mode includes displaying content of the second application in accordance with a second set of content filtering rules that is different from the first set of content filtering rules.

Figure 14C

Figure 14D:
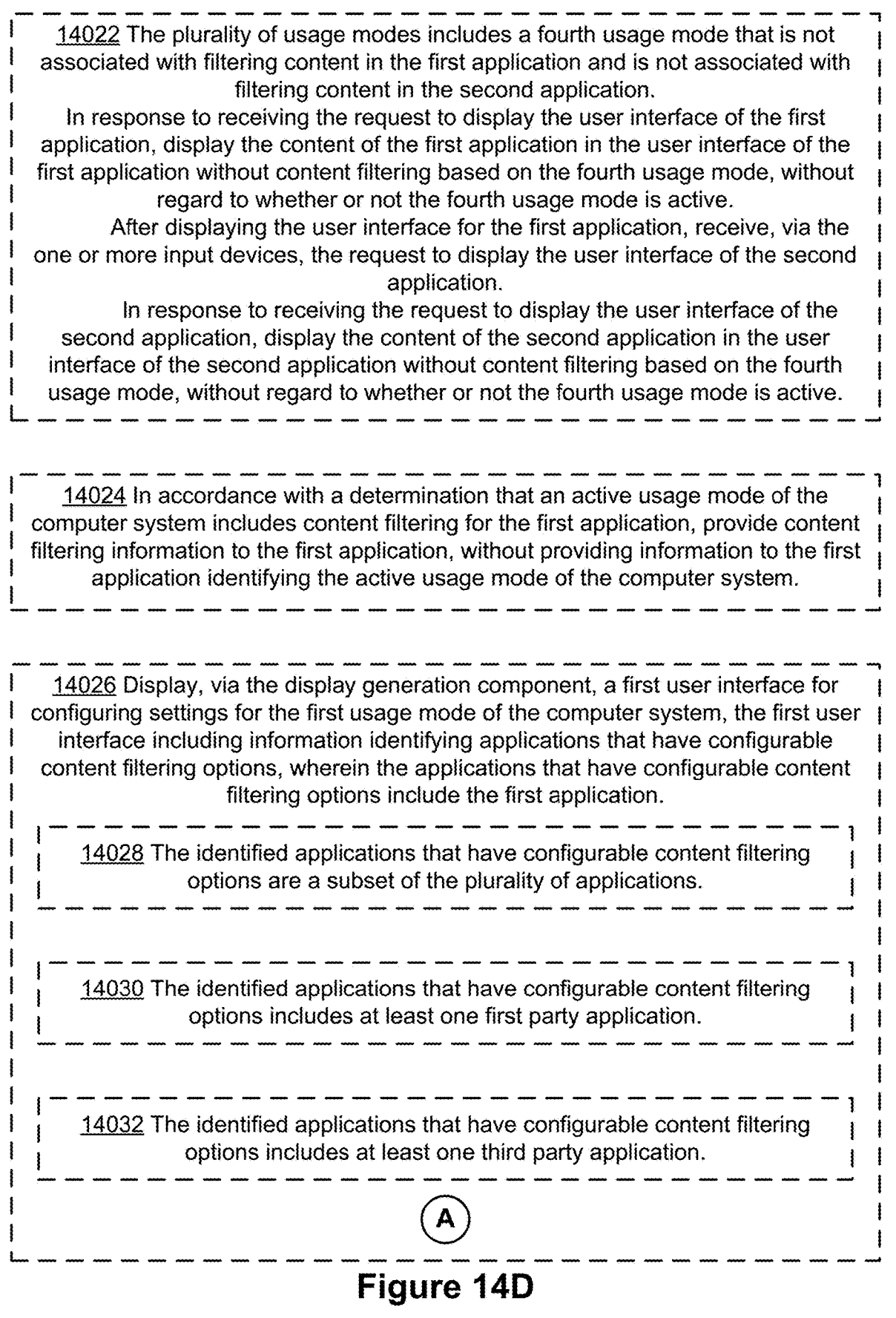

14022 The plurality of usage modes includes a fourth usage mode that is not associated with filtering content in the first application and is not associated with filtering content in the second application.
In response to receiving the request to display the user interface of the first application, display the content of the first application in the user interface of the first application without content filtering based on the fourth usage mode, without regard to whether or not the fourth usage mode is active.
After displaying the user interface for the first application, receive, via the one or more input devices, the request to display the user interface of the second application.
In response to receiving the request to display the user interface of the second application, display the content of the second application in the user interface of the second application without content filtering based on the fourth usage mode, without regard to whether or not the fourth usage mode is active.

14024 In accordance with a determination that an active usage mode of the computer system includes content filtering for the first application, provide content filtering information to the first application, without providing information to the first application identifying the active usage mode of the computer system.

14026 Display, via the display generation component, a first user interface for configuring settings for the first usage mode of the computer system, the first user interface including information identifying applications that have configurable content filtering options, wherein the applications that have configurable content filtering options include the first application.

14028 The identified applications that have configurable content filtering options are a subset of the plurality of applications.

14030 The identified applications that have configurable content filtering options includes at least one first party application.

14032 The identified applications that have configurable content filtering options includes at least one third party application.

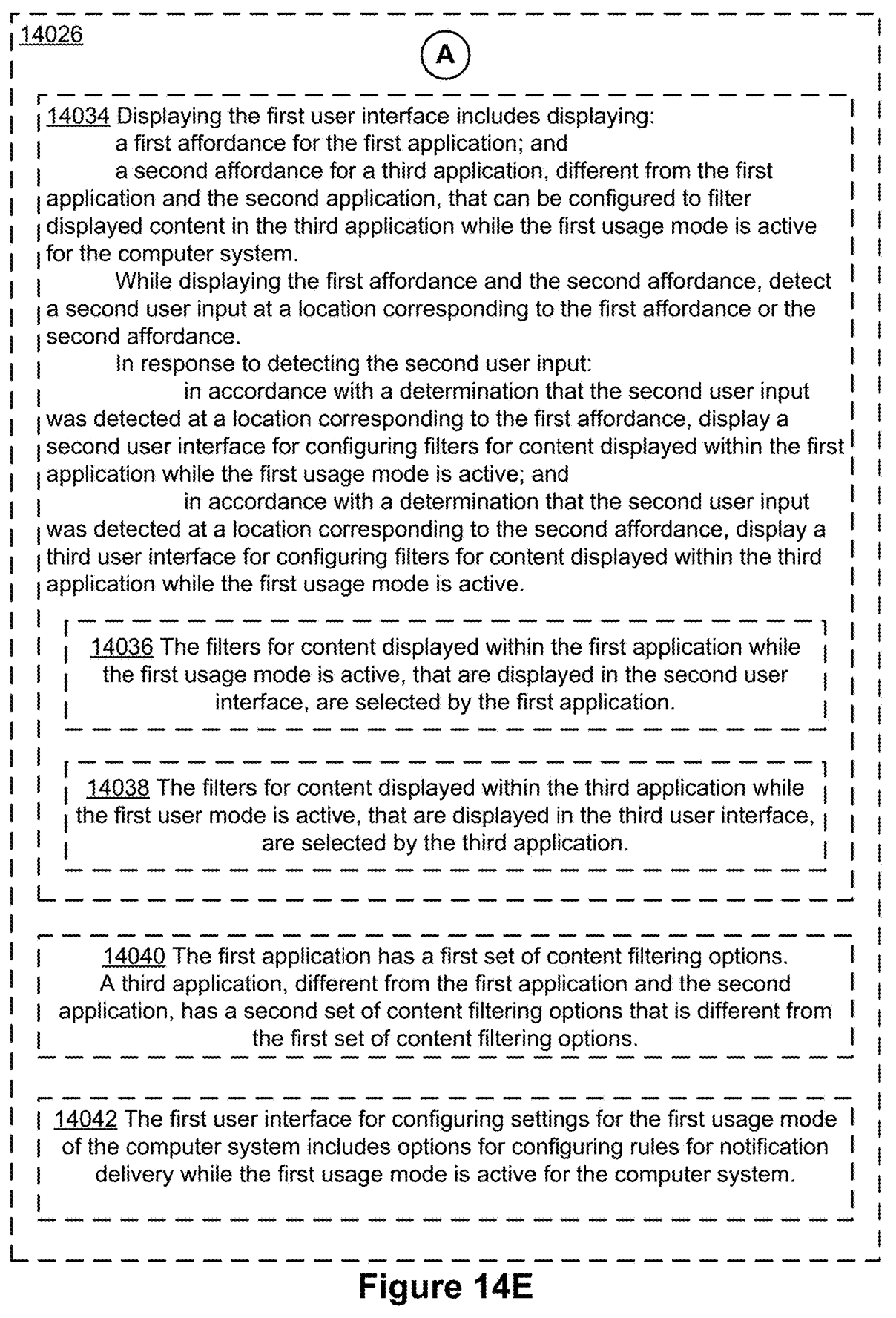

14034 Displaying the first user interface includes displaying:

a first affordance for the first application; and a second affordance for a third application, different from the first application and the second application, that can be configured to filter displayed content in the third application while the first usage mode is active for the computer system.

While displaying the first affordance and the second affordance, detect a second user input at a location corresponding to the first affordance or the second affordance.

In response to detecting the second user input:

in accordance with a determination that the second user input was detected at a location corresponding to the first affordance, display a second user interface for configuring filters for content displayed within the first application while the first usage mode is active; and in accordance with a determination that the second user input was detected at a location corresponding to the second affordance, display a third user interface for configuring filters for content displayed within the third application while the first usage mode is active.

14036 The filters for content displayed within the first application while the first usage mode is active, that are displayed in the second user interface, are selected by the first application.

14038 The filters for content displayed within the third application while the first user mode is active, that are displayed in the third user interface, are selected by the third application.

14040 The first application has a first set of content filtering options. A third application, different from the first application and the second application, has a second set of content filtering options that is different from the first set of content filtering options.

14042 The first user interface for configuring settings for the first usage mode of the computer system includes options for configuring rules for notification delivery while the first usage mode is active for the computer system.

Figure 14E

DEVICES, METHODS, AND GRAPHICAL USER INTERFACES FOR PROVIDING FOCUS MODES

RELATED APPLICATIONS

This application claims priority to U.S. Provisional Patent Application No. 63/349,010, filed Jun. 3, 2022, and U.S. Provisional Patent Application No. 63/340,443, filed May 10, 2022, each of which is hereby incorporated by reference in its entirety.

TECHNICAL FIELD

This relates generally to electronic devices with touch-sensitive surfaces, including but not limited to electronic devices with touch-sensitive surfaces that provide different focus modes (e.g., a "Work" focus mode, a "Personal" focus mode, a "Sleep" focus mode).

BACKGROUND

The use of portable electronic devices (e.g., computer systems) has increased significantly in recent years, with many applications typically residing in the memory of such devices. Example applications include communications applications (e.g., messaging and telephone), calendar applications, news applications, media playback applications (e.g., podcast, music, and video), payment applications, reminder applications, social media applications, and service delivery applications. These applications generate events, which contain information of varying degrees of importance to users. Notifications that correspond to the generated events may be displayed. Example notifications include digital images, video, text, icons, control elements (such as buttons) and/or other graphics to notify users of events. Example applications that generate notifications include messaging applications (e.g., iMessage or Messages from Apple Inc. of Cupertino, California), calendar applications (e.g., iCal or Calendar from Apple Inc. of Cupertino, California), news applications (e.g., Apple News from Apple Inc. of Cupertino, California), media playback applications (e.g., Podcasts, Apple Music and iTunes from Apple Inc. of Cupertino, California), payment applications (e.g., Apple Pay from Apple Inc. of Cupertino, California), reminder applications (e.g., Reminders from Apple Inc. of Cupertino, California), social media applications, and service delivery applications.

The types of notifications that a user wants to receive while working, playing, or sleeping may be quite different. But current user interfaces for adjusting when alerts and other notifications are provided (and which notifications are provided) are cumbersome and inefficient. For example, to change alert settings, some devices require the user to navigate to obscure, hard-to-find settings user interfaces of the devices' operating systems. At present, there is no simple way for a user to easily adjust the provision of notifications in different contexts. Existing methods take longer than necessary, thereby wasting energy. This latter consideration is particularly important in battery-operated devices.

SUMMARY

Accordingly, there is a need for electronic devices with faster, more efficient methods and interfaces for providing adjusting provision of notifications, e.g., by providing different focus modes. Such methods and interfaces optionally complement or replace conventional methods for providing reduced notification modes. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system that is in communication with a display generation component and one or more input devices. The method includes, while a first notification mode is active for the computer system, wherein the first notification mode has a first set of one or more rules for notification delivery at the computer system and while the computer system is in a low power state, detecting, via the one or more input devices, a first request to wake the computer system. The method includes, in response to detecting the first request to wake the computer system, displaying, via the display generation component, a first wake screen user interface with a first background image. The method includes, while displaying the first wake screen user interface, detecting a request to switch from the first notification mode to a second notification mode, which has a second set of one or more rules for notification delivery that are different from the first set of one or more rules for notification delivery. The method includes, in response to detecting the request to switch from the first notification mode to the second notification mode, switching from the first notification mode to the second notification mode at the computer system. The method includes, while the second notification mode is active for the computer system and while the computer system is in the low power state, detecting, via the one or more input devices, a second request to wake the computer system. The method includes in response to detecting the second request to wake the computer system, displaying, via the display generation component, a second wake screen user interface with a second background image that is different from the first background image, instead of displaying the first wake screen user interface.

In accordance with some embodiments, a method is performed at a computer system that is in communication with a display generation component and one or more input devices. The method includes displaying, via the display generation component, a first user interface for configuring notification settings for a respective mode of the computer system. The first user interface includes a first section and a second section. The first section corresponds to a first control for changing at least a first setting for the computer system. The first setting is a first notification setting for the computer system. The second section corresponds to a second control for changing at least a second setting for the computer system. The second setting is a second notification setting for the computer system. The first section is displayed with a first appearance that represents a default configuration for the first setting. The second section is displayed with a second appearance that represents a default configuration for the second setting. The method includes detecting, via the one or more input devices, a first set of one or more user inputs. The method includes, in response to detecting the first set of one or more user inputs, in accordance with a determination that the first set of one or more user inputs are for configuring the first setting: configuring the first setting for the computer system to have a user-selected configuration based on the first set of one or more user inputs, without configuring the second setting for the computer system; displaying the first section with a third appearance, different from the first appearance; and displaying the second section with the second appearance. The method includes, after detecting the first set of one or more user inputs, detecting a second set of one or more user inputs for ceasing to display the first user interface. The method includes in response to detecting the second set of one or more user inputs for ceasing to display the first user interface: ceasing to display the first user interface; and in accordance with a determination that the first setting for the computer system was configured without configuring the second setting for the computer system, automatically configuring the second setting for the respective mode of the computer system with the default configuration for the second setting, while the first setting for the respective mode of the computer system has the user-selected configuration based on the first set of one or more user inputs.

In accordance with some embodiments, a method is performed at a computer system that is in communication with a display generation component and one or more input devices. The method includes, while a first notification mode is active for the computer system, wherein the first notification mode has a first set of one or more rules for notification delivery at the computer system, displaying, via the display generation component, a respective view of a first application, wherein displaying the respective view of the first application includes concurrently displaying: first content; and second content different from the first content, wherein the first content is displayed with a first degree of emphasis relative to the second content. The method includes after displaying the respective view of the first application and while the first notification mode is active, switching the computer system from the first notification mode to a second notification mode, wherein the second notification mode has a second set of one or more rules for notification delivery at the computer system that are different from the first set of one or more rules for notification delivery at the computer system. The method includes while the second notification mode is active for the computer system: detecting, via the one or more input devices, a first request to display the respective view of the first application; and in response to detecting the first request, displaying the respective view of the first application, including displaying the first content with a second degree of emphasis relative to the second content. The method includes, while displaying the first application, detecting one or more user inputs to display the second content without deactivating the second notification mode of the computer system. The method includes, in response to detecting the one or more user inputs to display the second content, displaying the second content without deactivating the second notification mode of the computer system.

In accordance with some embodiments, a method is performed at a computer system that is in communication with a display generation component and one or more input devices. The method includes displaying, via the display generation component, a first user interface for configuring settings for a first usage mode of a plurality of usage modes for the computer system, wherein the first user interface includes one or more suggested home screen pages for use on a home screen user interface of the computer system when the first usage mode is active, and wherein the one or more suggested home screen pages includes a suggestion for a first home screen page. The method includes, while displaying the first user interface, detecting a first sequence of one or more inputs that correspond to a first request to use the first home screen page for the first usage mode. The method includes, in response to detecting the first sequence of one or more inputs, enabling the first home screen page for display while the first usage mode is active, wherein the first home screen page is a new home screen page for the computer system that was not available for use as a home screen page at the computer system prior to receiving the first sequence of one or more inputs that correspond to the first request to use the first home screen page for the first usage mode.

In accordance with some embodiments, a method is performed at a computer system that is in communication with a display generation component and one or more input devices. The method includes, while the computer system has a plurality of applications, including a first application and a second application, and a plurality of usage modes, including a first usage mode that is associated with filtering content in the first application and is not associated with filtering content in the second application, receiving, via the one or more input devices, a request to display a user interface of the first application. The method includes, in response to receiving the request to display the user interface of the first application: in accordance with a determination that the first usage mode is active for the computer system, displaying content of the first application in the user interface of the first application with content filtering based on the first usage mode; and in accordance with a determination that the first usage mode is not active for the computer system, displaying content of the first application in the user interface of the first application without content filtering based on the first usage mode. The method includes, after displaying the user interface for the first application, receiving, via the one or more input devices, a request to display a user interface of the second application. The method includes, in response to receiving the request to display the user interface of the second application, displaying content of the second application in the user interface of the second application without content filtering based on the first usage mode, without regard to whether or not the first usage mode is active.

In accordance with some embodiments, an electronic device includes a display, a touch-sensitive surface, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions that, when executed by an electronic device with a display, a touch-sensitive surface, optionally one or more sensors to detect intensities of contacts with the touch-sensitive surface, and optionally one or more tactile output generators, cause the device to perform or cause performance of the operations of any of the methods described herein. In accordance with some embodiments, a graphical user interface on an electronic device with a display, a touch-sensitive surface, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, an electronic device includes: a display, a touch-sensitive surface, optionally one or more sensors to detect intensities of contacts with the touch-sensitive surface, and optionally one or more tactile output generators; and means for performing or causing performance of the operations of any of the methods described herein. In accordance with some embodiments, an information processing apparatus, for use in an electronic device with a display, a touch-sensitive surface, optionally one or more sensors to detect intensities of contacts with the touch-sensitive surface, and optionally one or more tactile output generators, includes means for performing or causing performance of the operations of any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8E are flow diagrams of a process for switching between different focus modes, in accordance with some embodiments.

FIGS. 9A-9G are flow diagrams of a process for configuring a focus mode, in accordance with some embodiments.

FIGS. 10A-10C are flow diagrams of a process for configuring a focus mode, in accordance with some embodiments.

FIGS. 13A-13E Are flow diagrams of a process for configuring a focus mode, in accordance with some embodiments, FIGS. 14A-14E are flow diagrams of a process for filtering content while a focus mode is active, in accordance with some embodiments.

DESCRIPTION OF EMBODIMENTS

Many electronic devices have modes that allow a user to configure rules for notifications delivery, which can be used to suppress or defer a subset of notifications while the mode is active. Configuring and activating such modes can be cumbersome and difficult with existing graphical user interfaces and methods. For example, with existing methods, a user many need to constantly return to a specific graphical user interface in order to activate a mode, deactivate an active mode, or change between active modes. Further, while existing modes are useful for managing notifications, they lack the ability to customize display of other content while the mode is active. For example, while a mode may suppress certain notifications while a user is at work, the user may still see content related to those notifications, such as emails or text messages, when opening the corresponding applications. In the embodiments described below, improved methods for configuring, activating, and switching between modes is provided, as well as improved methods for customizing displayed content in application user interfaces while a mode is active. These methods streamline the user's ability to leverage such modes to increase the user's productivity and focus.

The processes described below enhance the operability of the devices and make the user-device interfaces more efficient (e.g., by helping the user to provide proper inputs and reducing user mistakes when operating/interacting with the device) through various techniques, including by providing improved visual, audio, and/or tactile feedback to the user, reducing the number of inputs needed to perform an operation, providing additional control options without cluttering the user interface with additional displayed controls, performing an operation when a set of conditions has been met without requiring further user input, and/or additional techniques. These techniques also reduce power usage and improve battery life of the device by enabling the user to use the device more quickly and efficiently.

Figure 2:
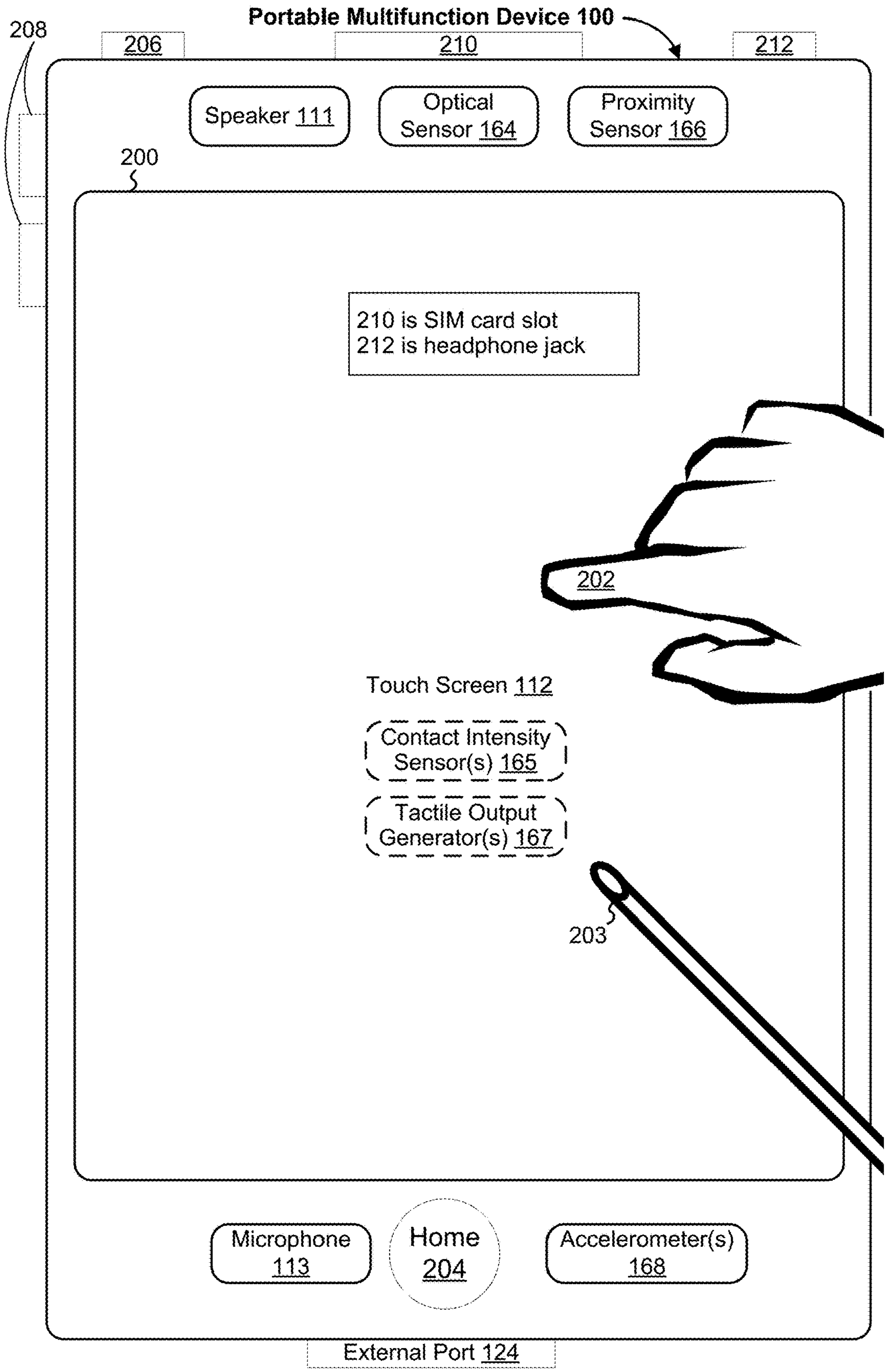
FIG. 2 illustrates a portable multifunction device having a touch screen in accordance with some embodiments.
Figure 3:
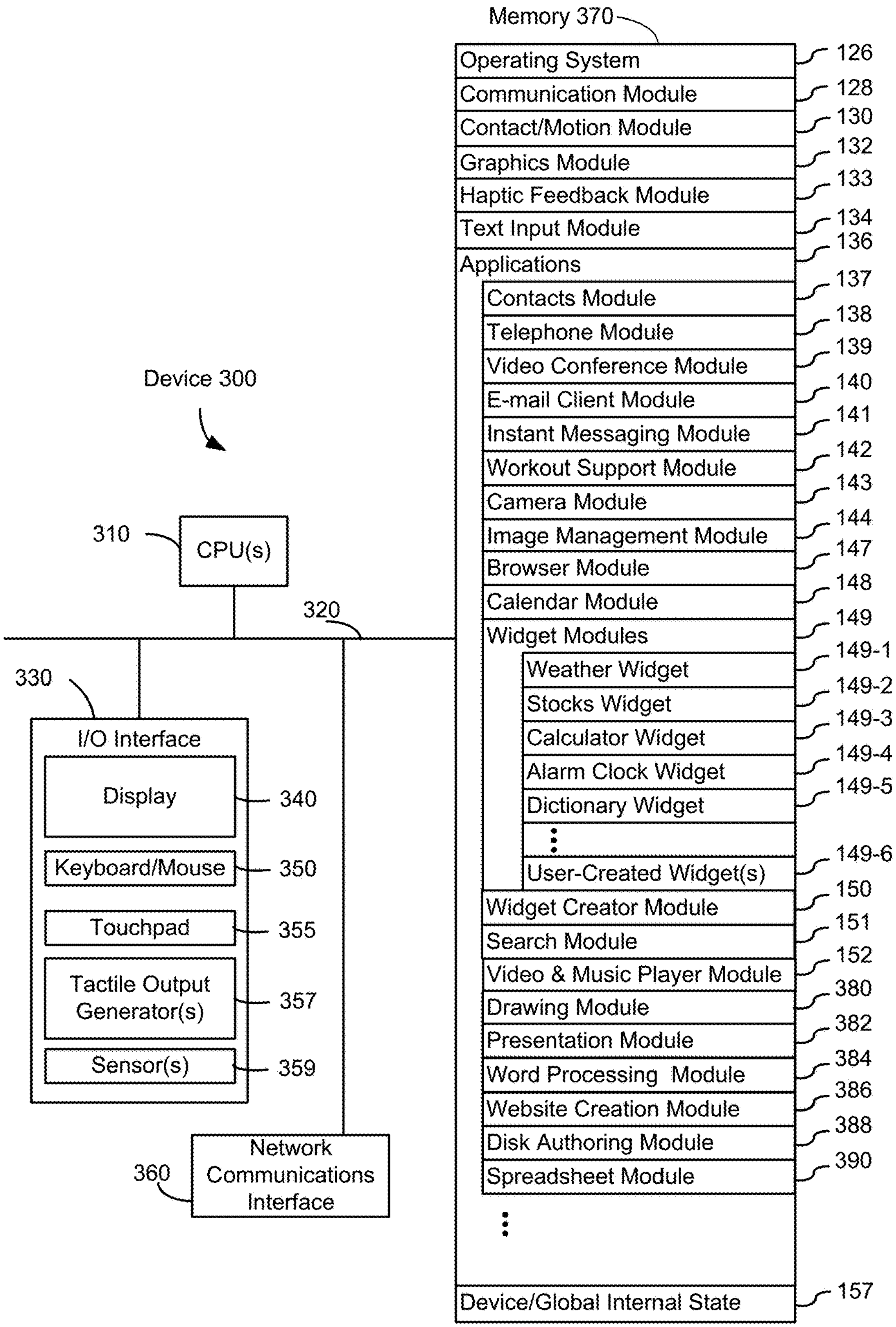
FIG. 3 is a block diagram of an example multifunction device with a display and a touch-sensitive surface in accordance with some embodiments.
Figure 4A:
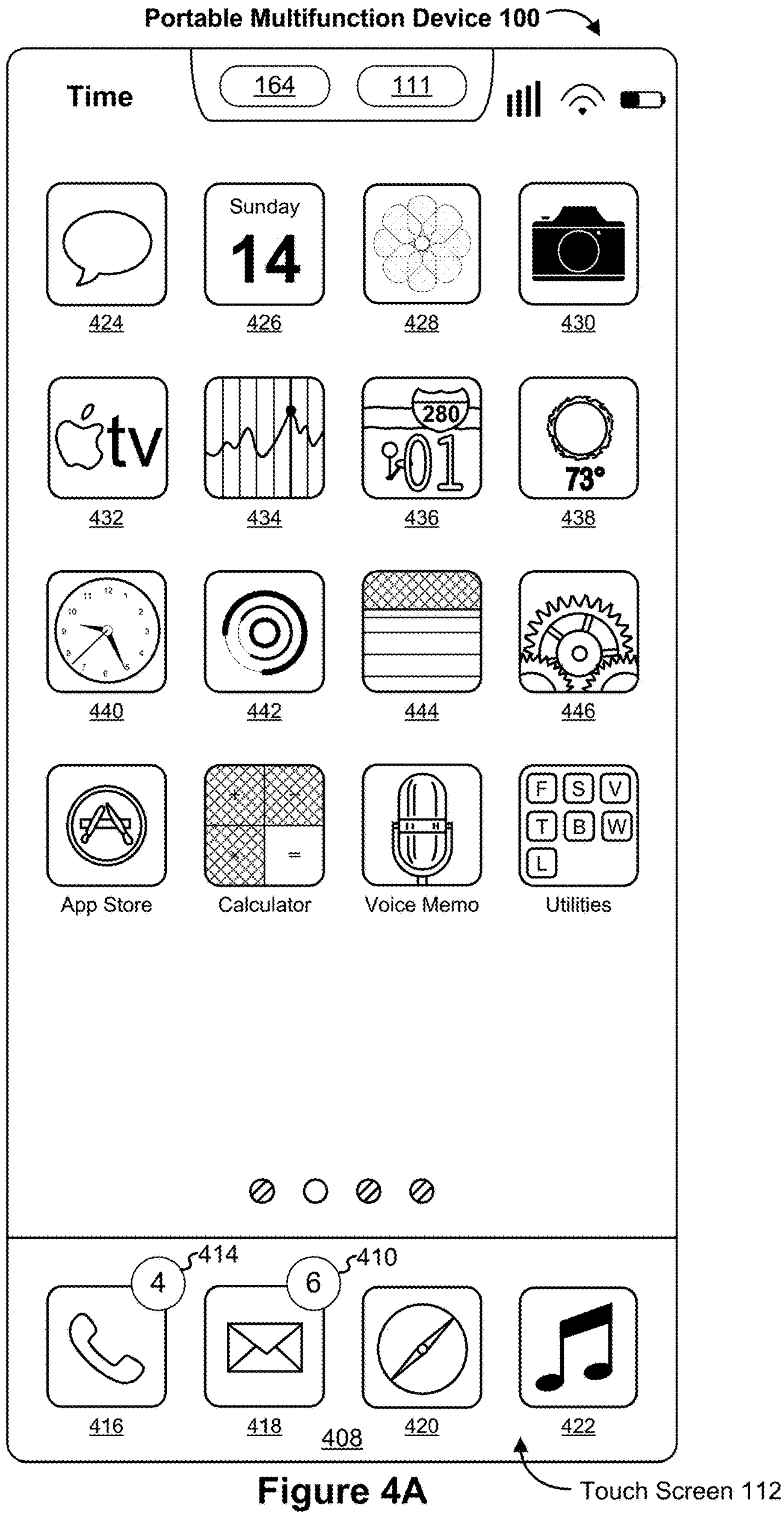
FIG. 4A illustrates an example user interface for a menu of applications on a portable multifunction device in accordance with some embodiments.
Figure 4B:
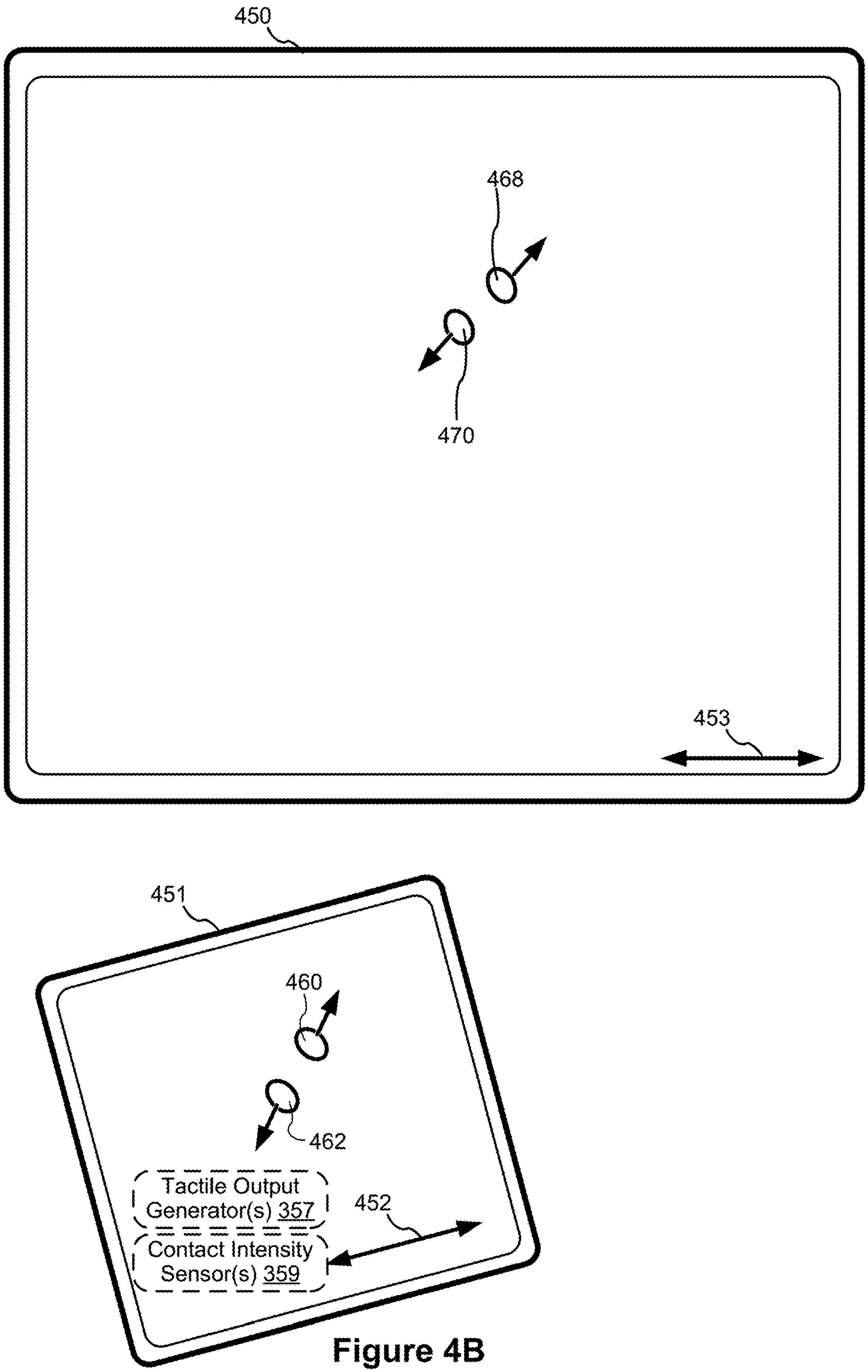
FIG. 4B illustrates an example user interface for a multifunction device with a touch-sensitive surface that is separate from the display in accordance with some embodiments.
Figure 5A:
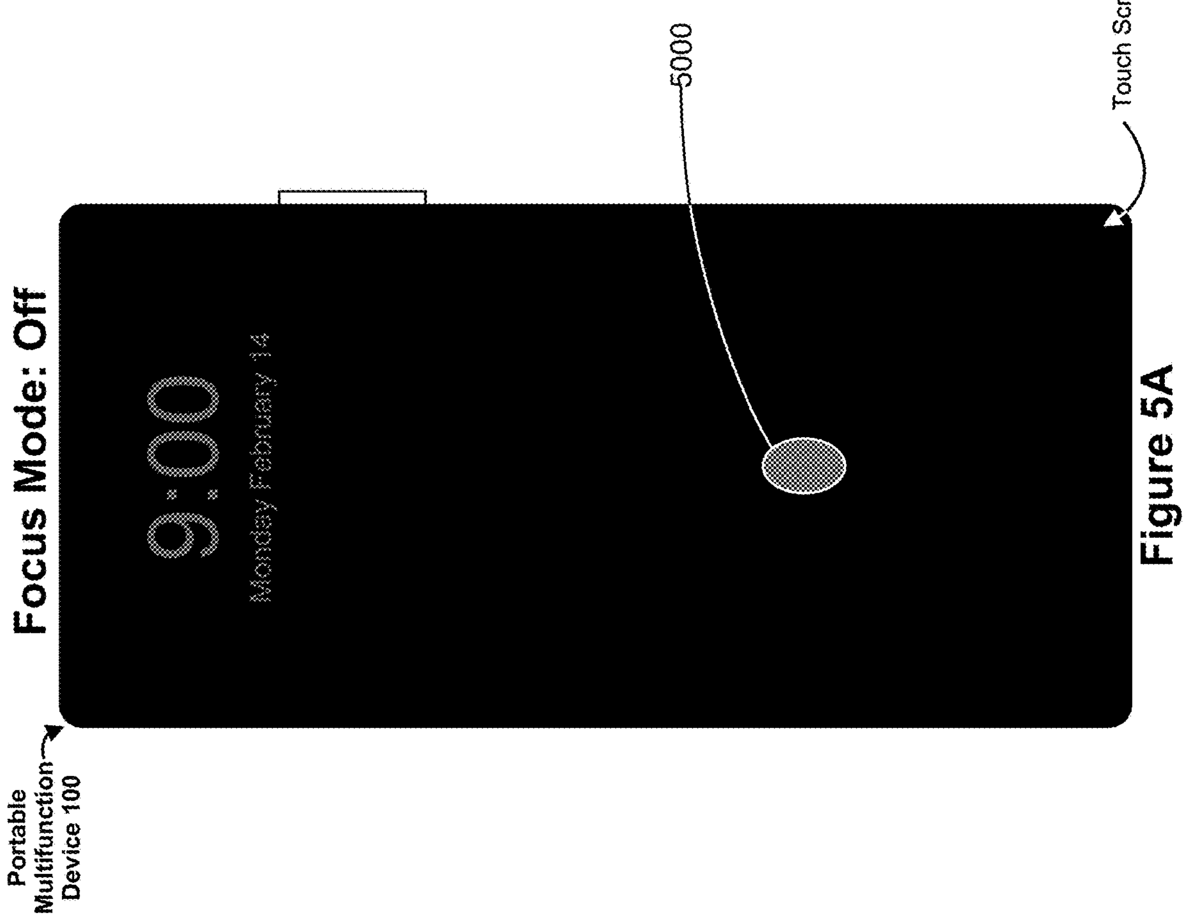
Figures 6A, 6B:
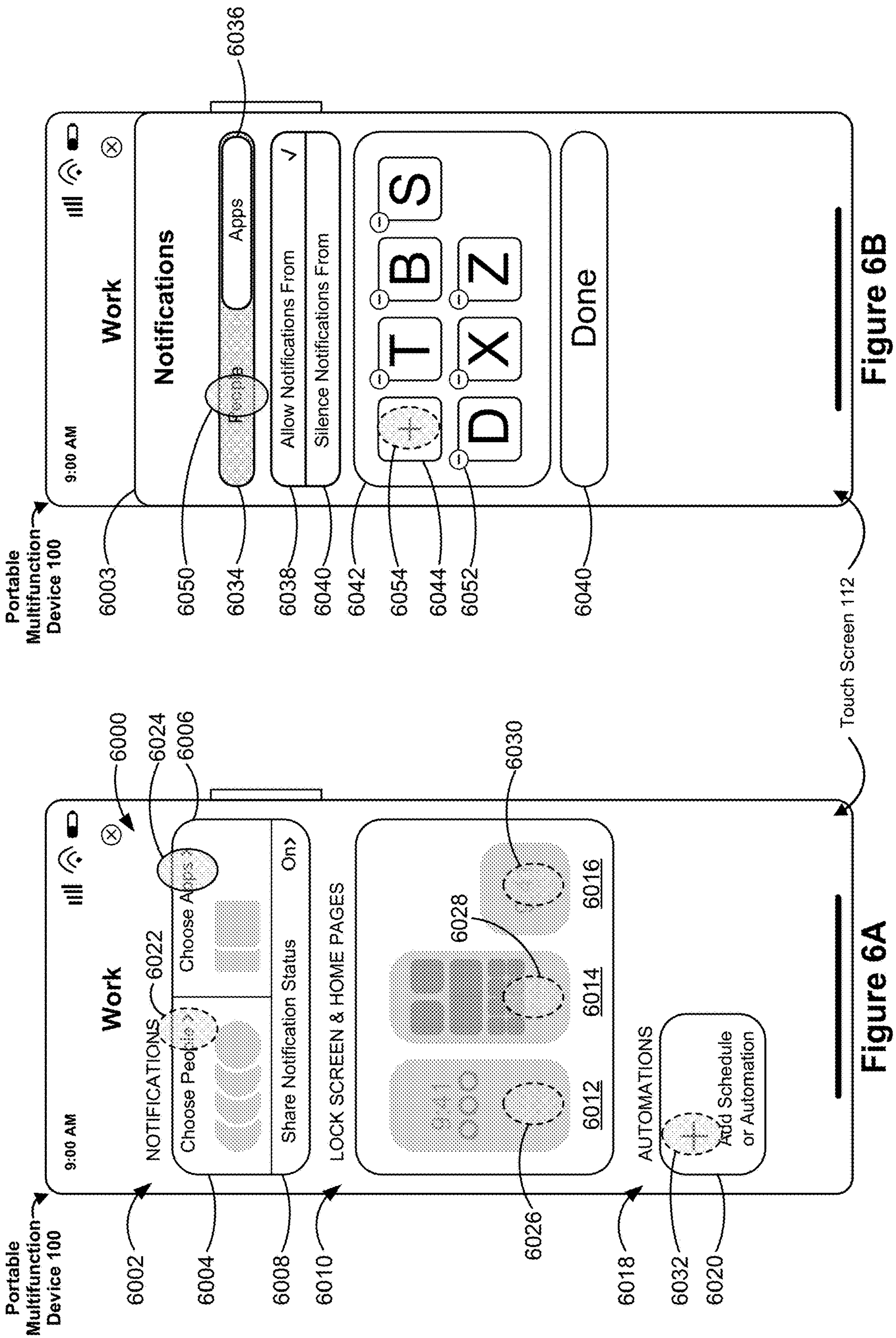
FIGS. 6A-6R illustrate example user interfaces for configuring a focus mode in accordance with some embodiments.
Figure 6R:
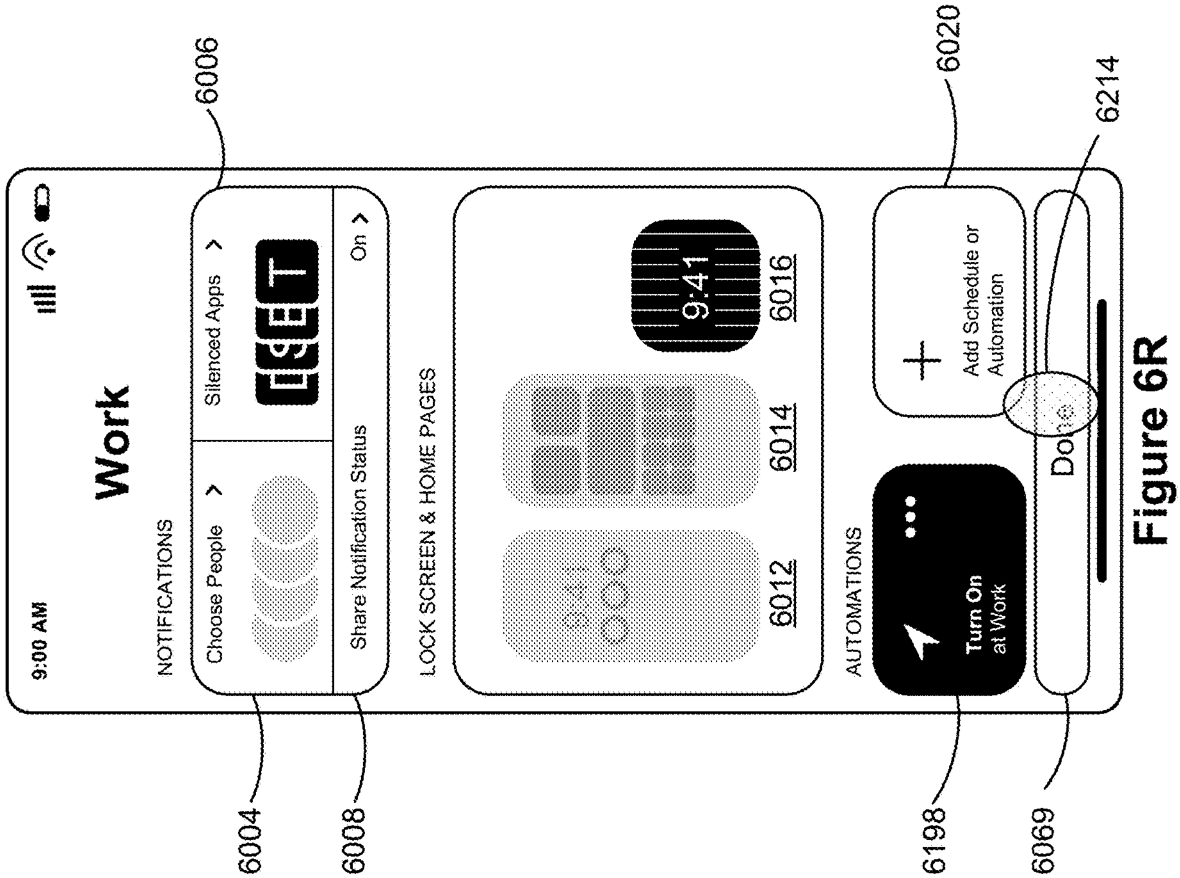
Figure 7A:
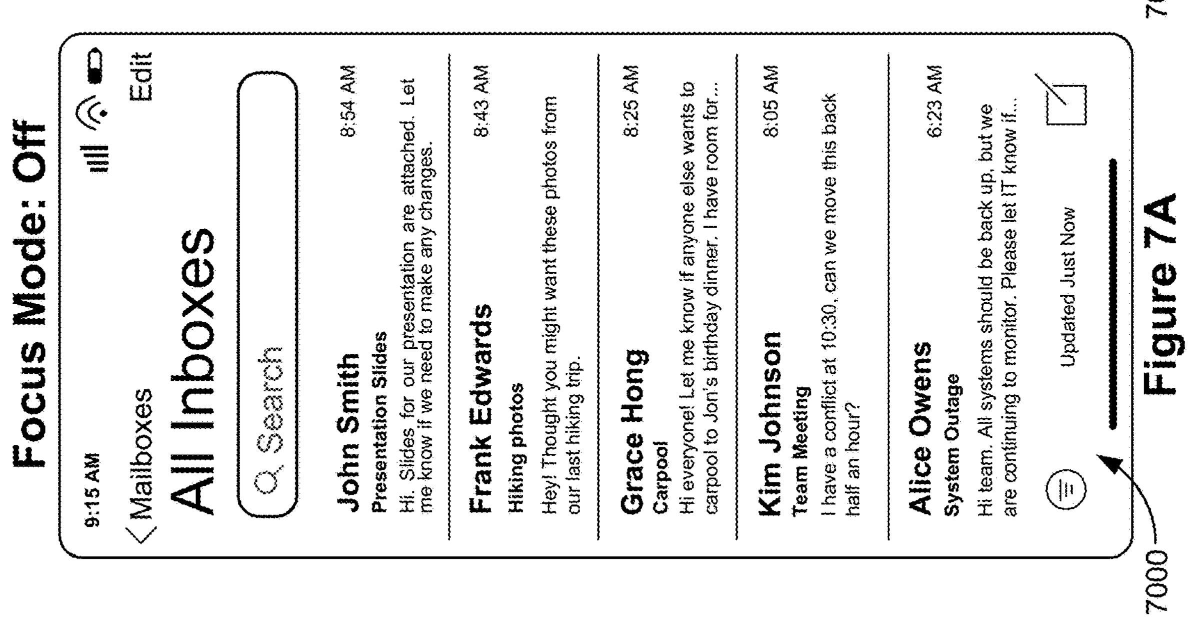
FIGS. 7A-7Z illustrate example user interfaces for emphasizing content by default while a focus mode is active, and changing emphasized content while the focus mode remains active, in accordance with some embodiments.

Below, FIGS. 1A-1B, 2, and 3 provide a description of example devices. FIGS. 4A-4B an example user interfaces on example devices. FIGS. 5A-5AC illustrate example user interfaces for switching between different focus modes in accordance with some embodiments. FIGS. 6A-6R illustrate example user interfaces for configuring a focus mode in accordance with some embodiments. FIGS. 7A-7Z illustrate example user interfaces for emphasizing content by default while a focus mode is active, and changing emphasized content while the focus mode remains active, in accordance with some embodiments. FIGS. 8A-8E are flow diagrams of a process for switching between different focus modes, in accordance with some embodiments. FIGS. 9A-9G are flow diagrams of a process for configuring a focus mode, in accordance with some embodiments. FIGS. 10A-10C are flow diagrams of a process for configuring a focus mode, in accordance with some embodiments.

The user interfaces in FIGS. 5A-5AC, 6A-6R, and 7A-Z are used to illustrate the processes in FIGS. 8A-8E, 9A-9G, and 10A-10C.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
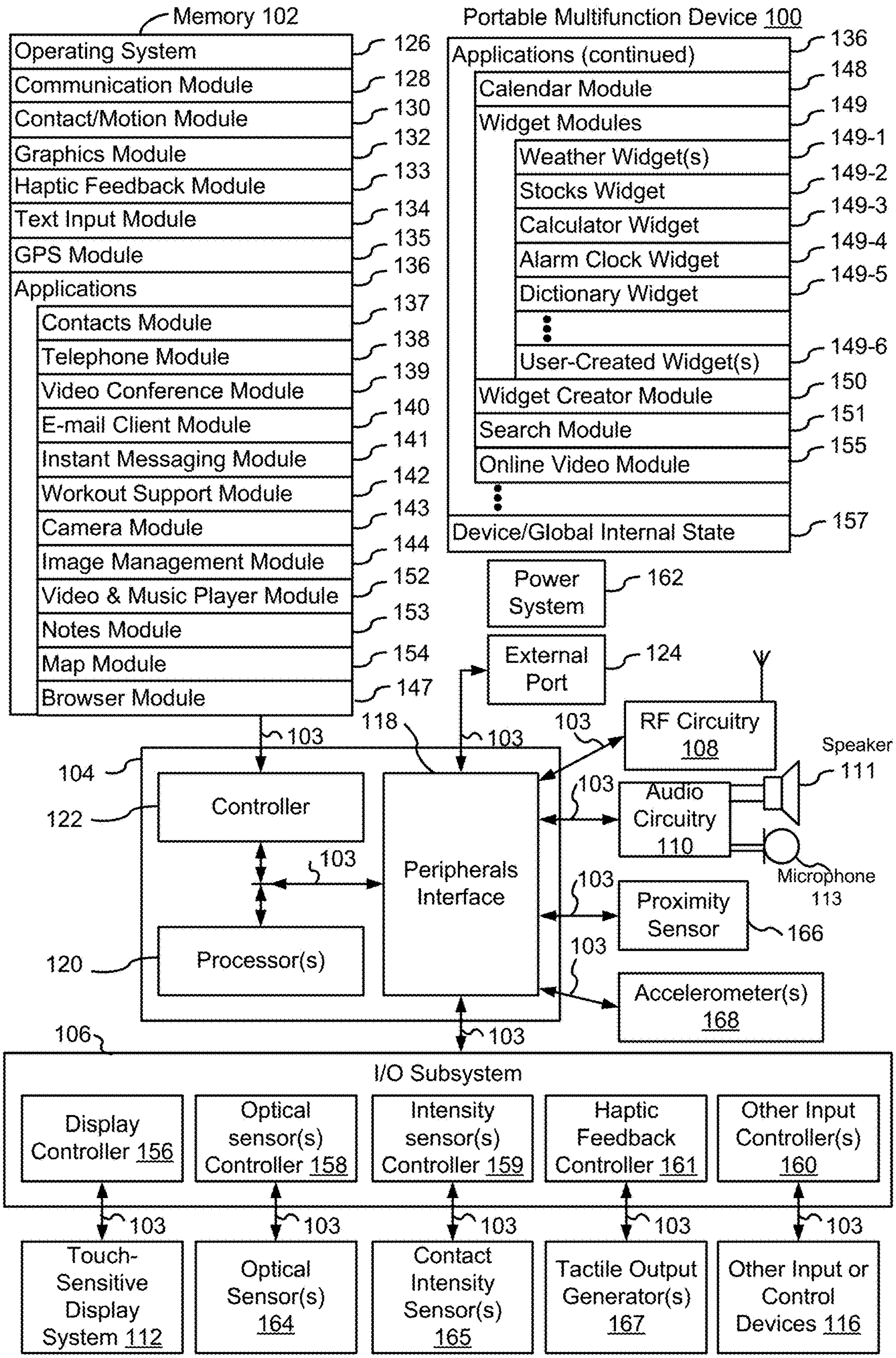
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a tactile output pattern specifies characteristics of a tactile output, such as the amplitude of the tactile output, the shape of a movement waveform of the tactile output, the frequency of the tactile output, and/or the duration of the tactile output.

When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device. Thus, the waveform, frequency and amplitude can be adjusted to indicate to the user that different operations have been performed. As such, tactile outputs with tactile output patterns that are designed, selected, and/or engineered to simulate characteristics (e.g., size, material, weight, stiffness, smoothness, etc.); behaviors (e.g., oscillation, displacement, acceleration, rotation, expansion, etc.); and/or interactions (e.g., collision, adhesion, repulsion, attraction, friction, etc.) of objects in a given environment (e.g., a user interface that includes graphical features and objects, a simulated physical environment with virtual boundaries and virtual objects, a real physical environment with physical boundaries and physical objects, and/or a combination of any of the above) will, in some circumstances, provide helpful feedback to users that reduces input errors and increases the efficiency of the user's operation of the device. Additionally, tactile outputs are, optionally, generated to correspond to feedback that is unrelated to a simulated physical characteristic, such as an input threshold or a selection of an object. Such tactile outputs will, in some circumstances, provide helpful feedback to users that reduces input errors and increases the efficiency of the user's operation of the device.

In some embodiments, a tactile output with a suitable tactile output pattern serves as a cue for the occurrence of an event of interest in a user interface or behind the scenes in a device. Examples of the events of interest include activation of an affordance (e.g., a real or virtual button, or toggle switch) provided on the device or in a user interface, success or failure of a requested operation, reaching or crossing a boundary in a user interface, entry into a new state, switching of input focus between objects, activation of a new mode, reaching or crossing an input threshold, detection or recognition of a type of input or gesture, etc. In some embodiments, tactile outputs are provided to serve as a warning or an alert for an impending event or outcome that would occur unless a redirection or interruption input is timely detected. Tactile outputs are also used in other contexts to enrich the user experience, improve the accessibility of the device to users with visual or motor difficulties or other accessibility needs, and/or improve efficiency and functionality of the user interface and/or the device. Tactile outputs are optionally accompanied with audio outputs and/or visible user interface changes, which further enhance a user's experience when the user interacts with a user interface and/or the device, and facilitate better conveyance of information regarding the state of the user interface and/or the device, and which reduce input errors and increase the efficiency of the user's operation of the device.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. In some embodiments, tactile output generator(s) 167 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 167 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module

132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (e.g., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
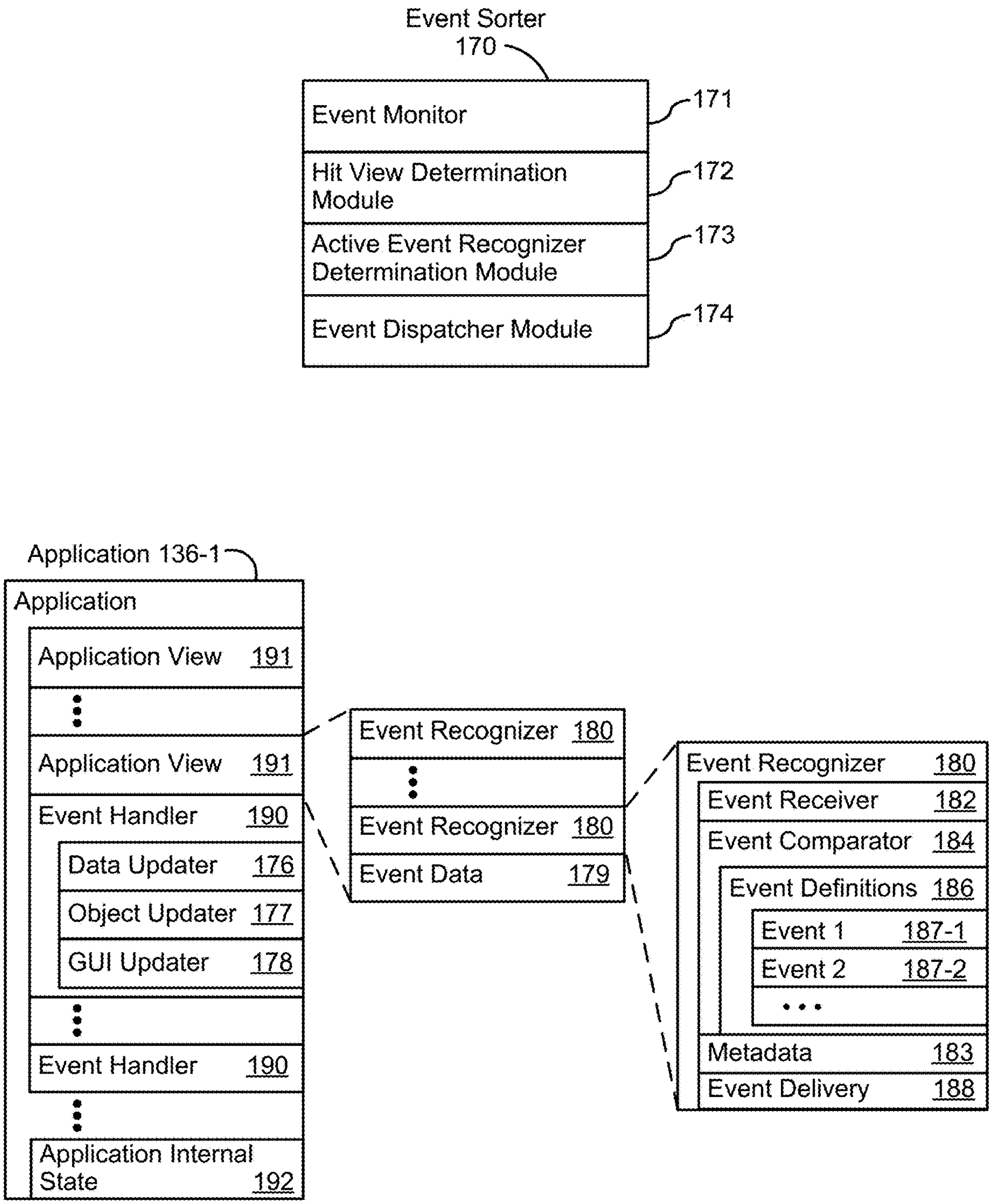
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 167 for generating tactile outputs for a user of device 100.

FIG. 3 is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) for wireless communication(s), such as cellular and Wi-Fi signals;
- Time;
- a Bluetooth indicator;
- a Battery status indicator;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser"; and
  - Icon 422 for video and music player module 152, labeled "Music"; and
- Icons for other applications, such as:
  - Icon 424 for IM module 141, labeled "Messages";
  - Icon 426 for calendar module 148, labeled "Calendar";
  - Icon 428 for image management module 144, labeled "Photos";
  - Icon 430 for camera module 143, labeled "Camera";
  - Icon 432 for online video module 155, labeled "Online Video";
  - Icon 434 for stocks widget 149-2, labeled "Stocks";
  - Icon 436 for map module 154, labeled "Maps";
  - Icon 438 for weather widget 149-1, labeled "Weather";
  - Icon 440 for alarm clock widget 149-4, labeled "Clock";
  - Icon 442 for workout support module 142, labeled "Workout Support";
  - Icon 444 for notes module 153, labeled "Notes"; and
  - Icon 446 for a settings application or module, which provides access to settings for device 100 and its various applications 136.

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 4A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, (optionally) one or more tactile output generators for generating tactile outputs, and (optionally) one or more sensors to detect intensities of contacts with the touch-sensitive surface.

FIGS. 5A-5AC, 6A-6R, and 7A-7Z illustrate example user interfaces for providing different focus modes in accordance with some embodiments. The user interfaces in these figures are used to illustrate the processes described below, including the processes in FIGS. 8A-8E, 9A-9G, and 10A-10C. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5AC illustrate example user interfaces for switching between different focus modes in accordance with some embodiments. For clarity and ease of explanation, each figure denotes the active focus mode (e.g., no mode, or the specific focus mode) that is active in the particular figure. If a focus mode is active, some user interfaces (e.g., home screen user interfaces) display a corresponding visual indication (e.g., in the upper right of the display). The visual indications correspond to icons associated with each focus mode (e.g., as shown in FIG. 5E).

FIG. 5A shows a portable multifunction device 100 in a low power (e.g., a sleep state or an off state). In some embodiments, while the portable multifunction device is in the low power state, some user interface elements (e.g., a time and date, as shown in FIG. 5A) are visible (e.g., but are displayed with a reduced prominence compared to when the portable multifunction device 100 is not in the low power state). While the portable multifunction device 100 is in the low power state, in response to a user input 5000 (e.g., a tap gesture, a long press, or a swipe gesture), the portable multifunction device 100 transitions out of the low power state. Note that, in some embodiments, any of a number of user inputs wakes the portable multifunction device 100 (e.g., lifting the portable multifunction device 100, or pressing a physical button on the side of portable multifunction device 100).

Figure 5B:
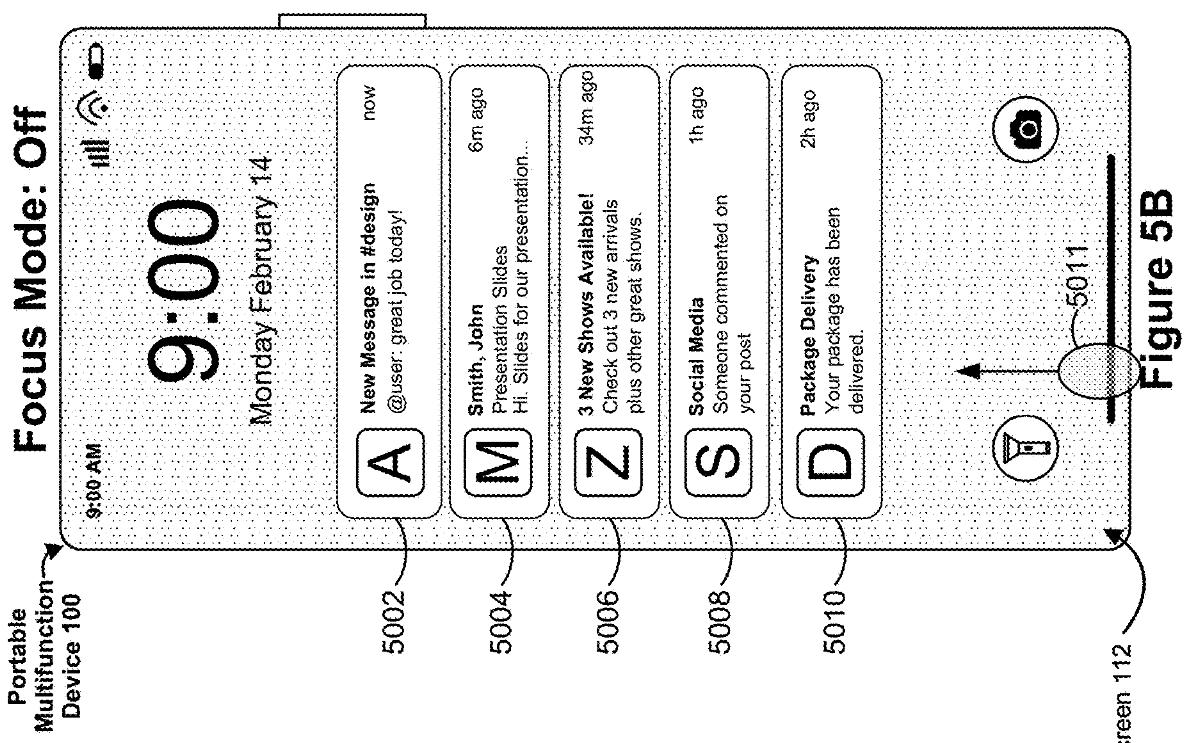
FIGS. 5A-5AC illustrate example user interfaces for switching between different focus modes in accordance with some embodiments.

FIG. 5B shows the display (e.g., touch screen 112) of the portable multifunction device 100 after transitioning out of the low power state. The portable multifunction device 100 displays a wake user interface (e.g., an initial user interface that is displayed upon transiting out of the low power state, such as a lock screen user interface, or another wake screen user interface) that includes a plurality of notifications, including a notification 5002 for an application A, a notification 5004 for an application M, a notification 5006 for an application Z, a notification 5008 for an application S, and a notification 5010 for a notification D.

Figures 2, 5C:
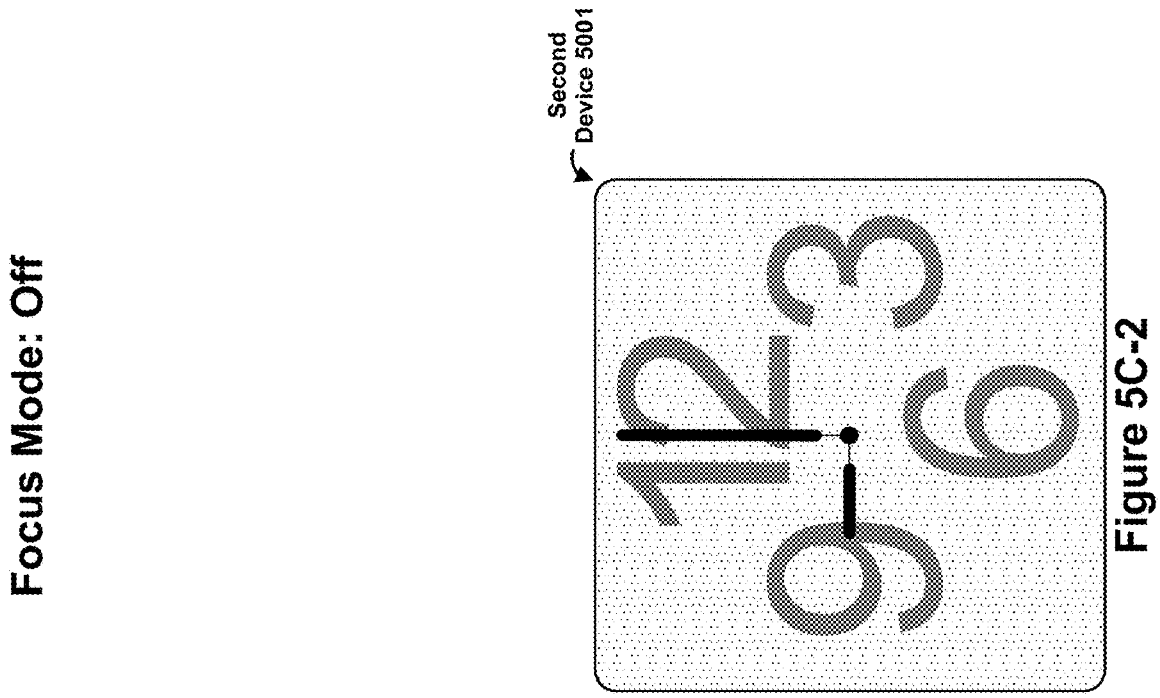
Figures 1, 5C:
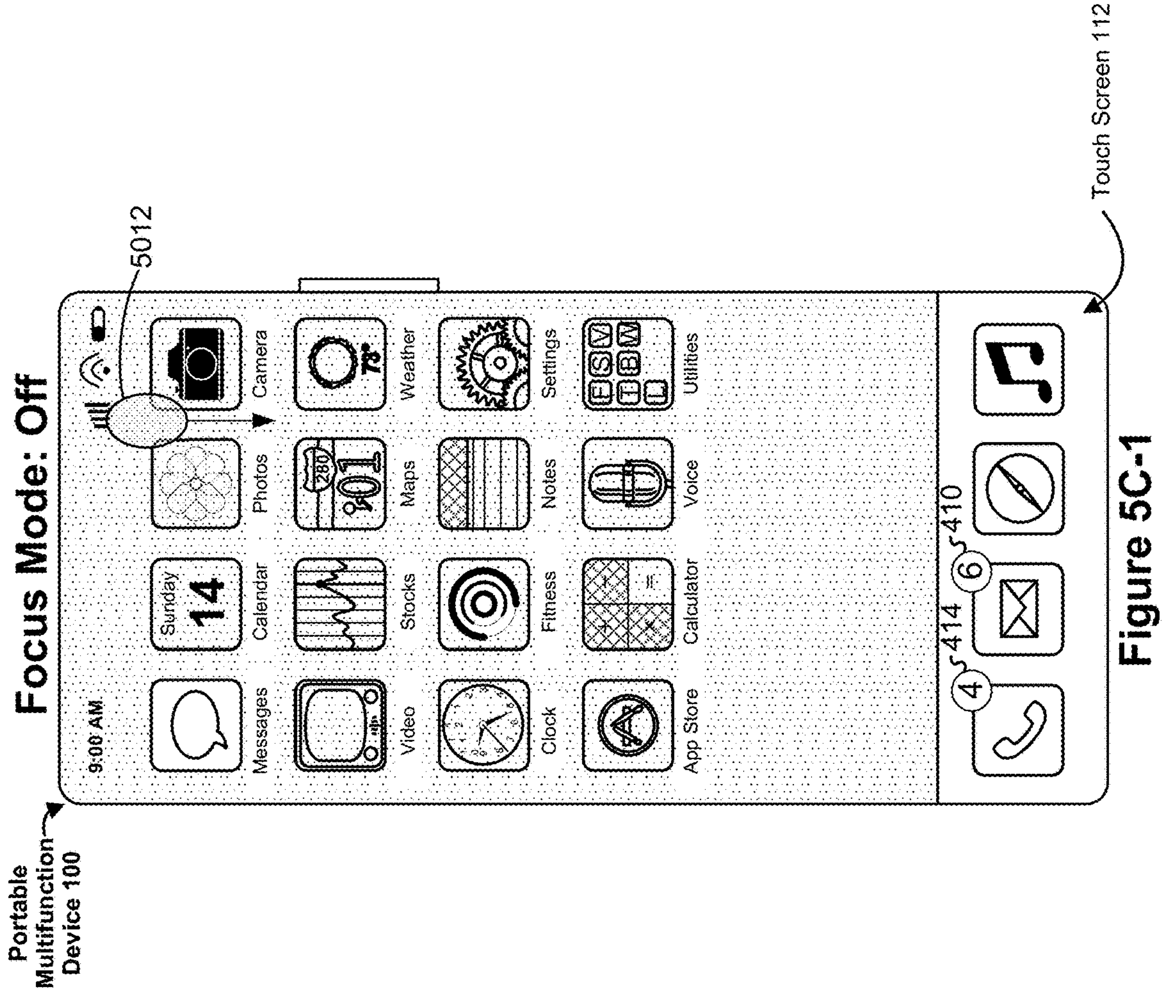
Figure 5E:
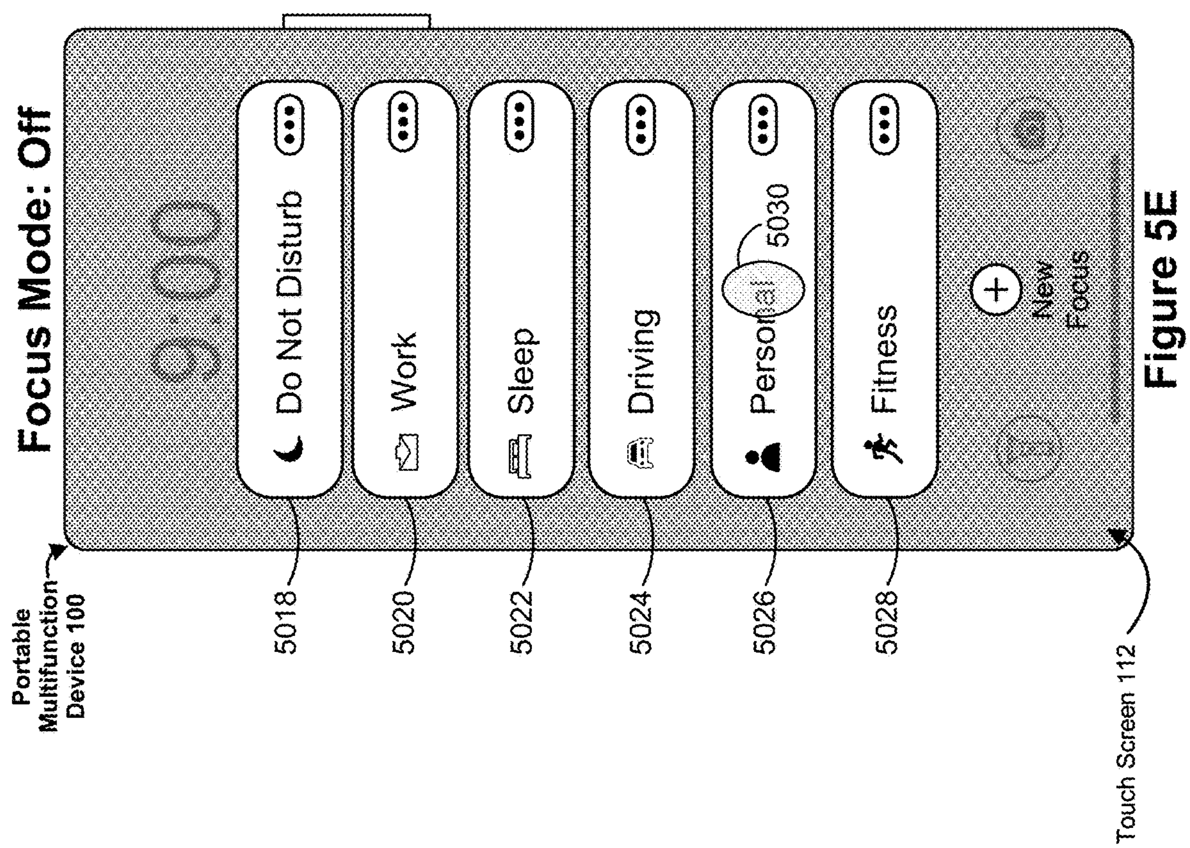

As shown in FIG. 5C-1, while displaying the wake user interface, in response to detecting an upward swipe gesture 5011 (FIG. 5B), the portable multifunction device 100 transitions to displaying a home screen user interface. The home screen user interface includes a plurality of application launch affordances, and optionally includes one or more of the applications A, M, Z, S, and/or D. FIG. 5C-2 shows a corresponding home screen user interface fora second device 5001. In some embodiments, the second device 5001 is smart watch device that is paired with the portable multifunction device 100.

Figure 5D:
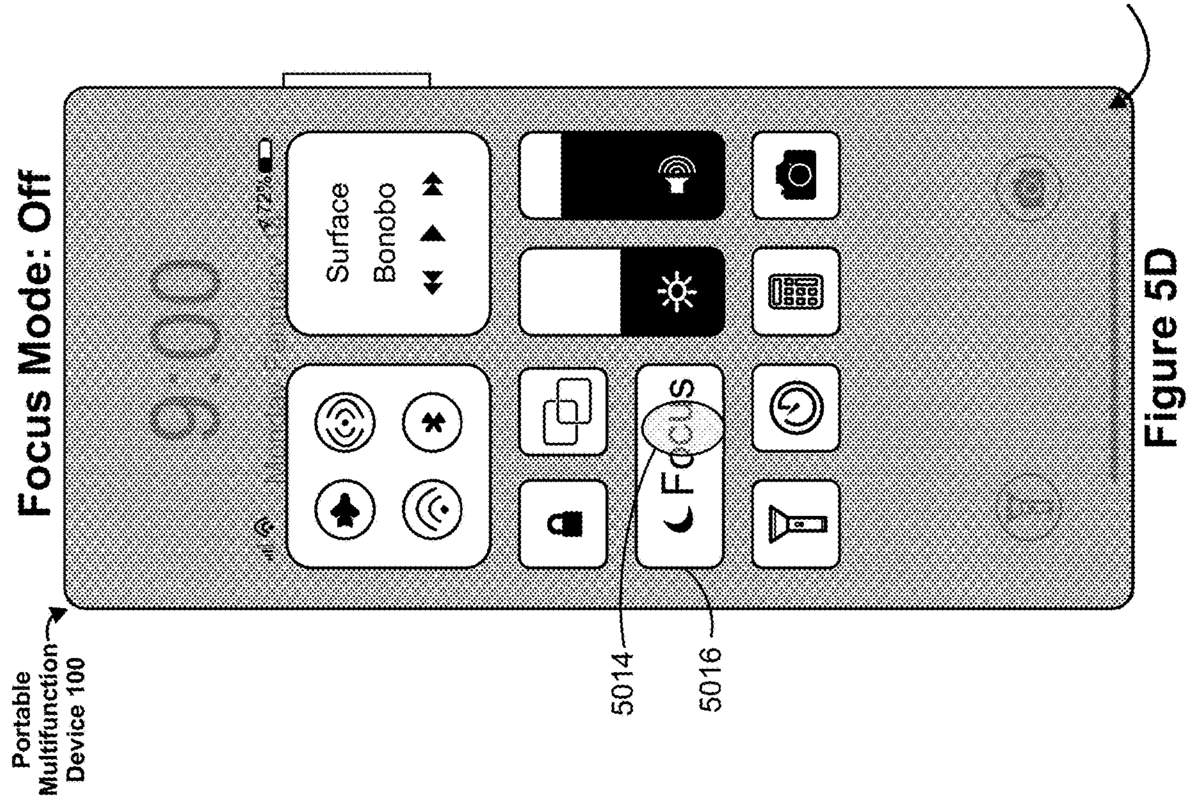

As shown in FIG. 5D, in response to detecting a downward swipe gesture 5012 (e.g., in the upper right corner of the display of the portable multifunction device 100, as shown in FIG. 5C-1), the portable multifunction device 100 displays a system user interface for accessing system functions of the portable multifunction device. One such system function is a function for enabling (or disabling) a focus mode of the portable multifunction device 100. Different focus modes have different notification settings, which affect which notifications are delivered, suppressed, and/or deferred. For example, while a "Work" mode is active, notifications associated with users who are not whitelisted as work contacts are suppressed (e.g., are not delivered when initially received, and are instead delivered when the "Work" mode is deactivated).

As shown in FIG. 5E, in response to detecting a user input 5014 on a focus mode affordance 5016 (FIG. 5D), the portable multifunction device 100 displays affordances for available focus modes, including a "Do Not Disturb" mode affordance 5018, a "Work" mode affordance 5020, a "Sleep" mode affordance 5022, a "Driving" mode affordance 5024, a "Personal" mode affordance 5026, and a "Fitness" mode affordance 5028. In some embodiments, the portable multifunction device 100 displays only focus modes that have already been configured (e.g., previously set up and configured by the user). In other embodiments, the portable multifunction device 100 displays some focus modes even if those focus modes are not yet configured (e.g., and when selected, will prompt the user to either configure the focus mode, and/or provide suggested settings for configuring the focus mode, as described in greater detail below with reference to FIGS. 50 and 5P).

Figures 2, 5F:
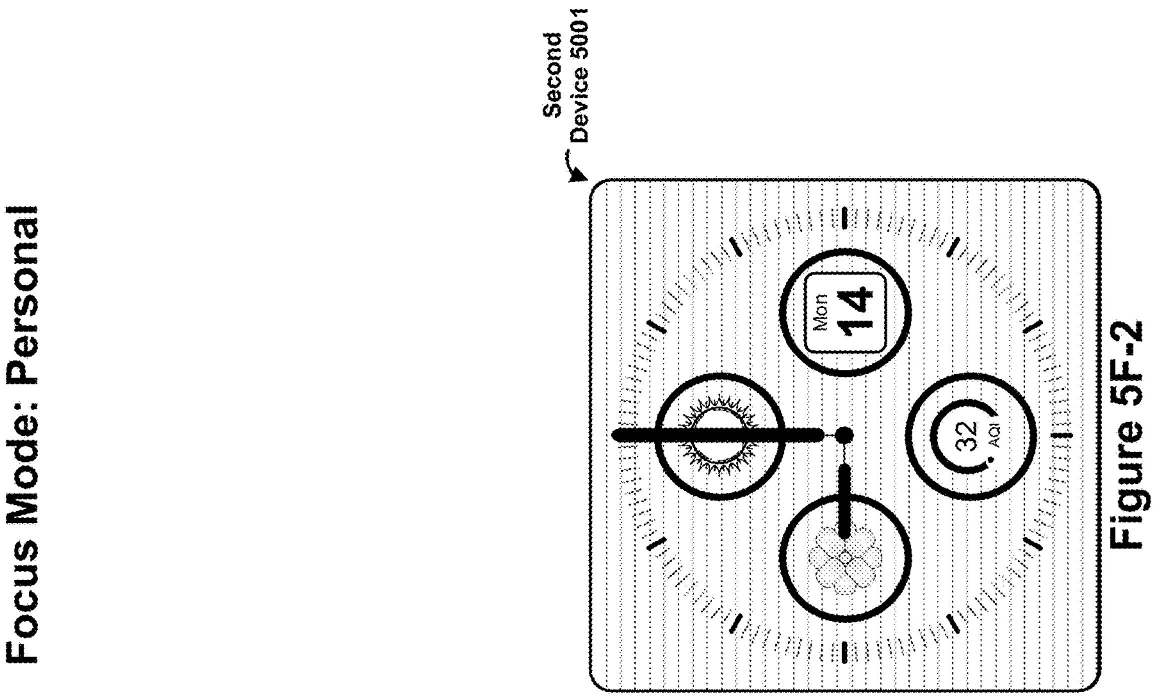
Figures 1, 5F:
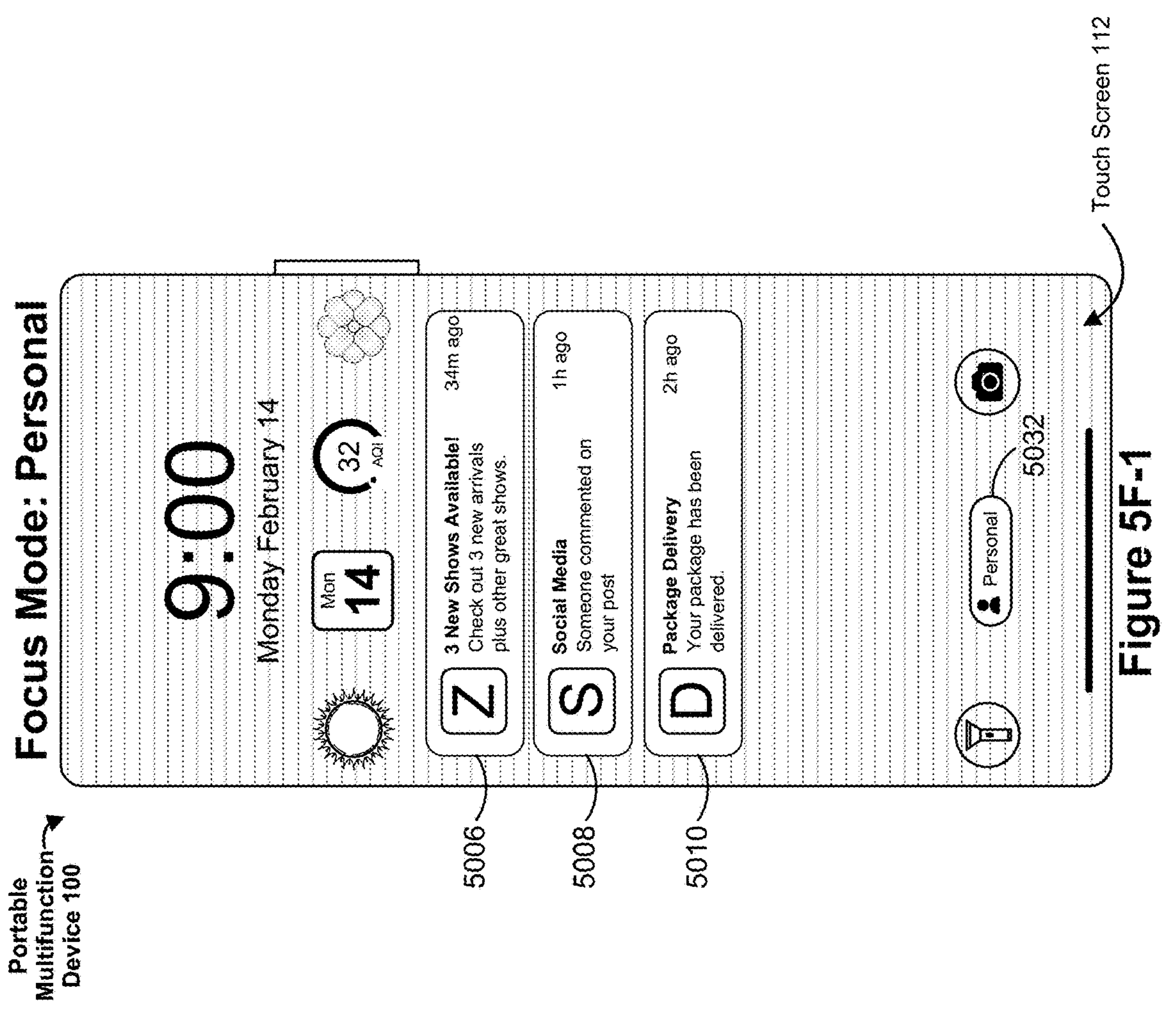

As shown in FIG. 5F-1, in response to detecting a user input 5030 on the "Personal" mode affordance 5026 (FIG. 5E), the portable multifunction device 100 activates the "Personal" mode. The notification 5006 for the application Z, the notification 5008 for the application S, and the notification 5010 for the application D are displayed on the wake user interface of the portable multifunction device 100. The notification 5002 for the application A, and the notification 5004 for the application M, however, are no longer displayed (e.g., because notification settings for the "Personal" mode do not allow notifications for the Application A and/or M, and/or do not allow notifications from the contact John Smith).

The wake user interface of the portable multifunction device also includes a mode indicator 5032 that shows that the "Personal" mode is active. FIG. 5F-1 also shows that while the "Personal" mode is active, a different background image is displayed on the wake user interface (e.g., as shown by the horizontal lines in FIG. 5F-1, compared to the light grey background of the wake user interface in FIG. 5B). As shown in FIG. 5F-2, because the "Personal" mode is active for the portable multifunction device 100, the background image of the second device 5001 is also different (e.g., as compared to FIG. 5C-2). In some embodiments, when the "Personal" mode is no longer active (e.g., is deactivated by the user), the background images of the portable multifunction device 100 and the portable multifunction device 5001 return to the background images shown in FIGS. 5B and 5C-2.

Figure 5G:
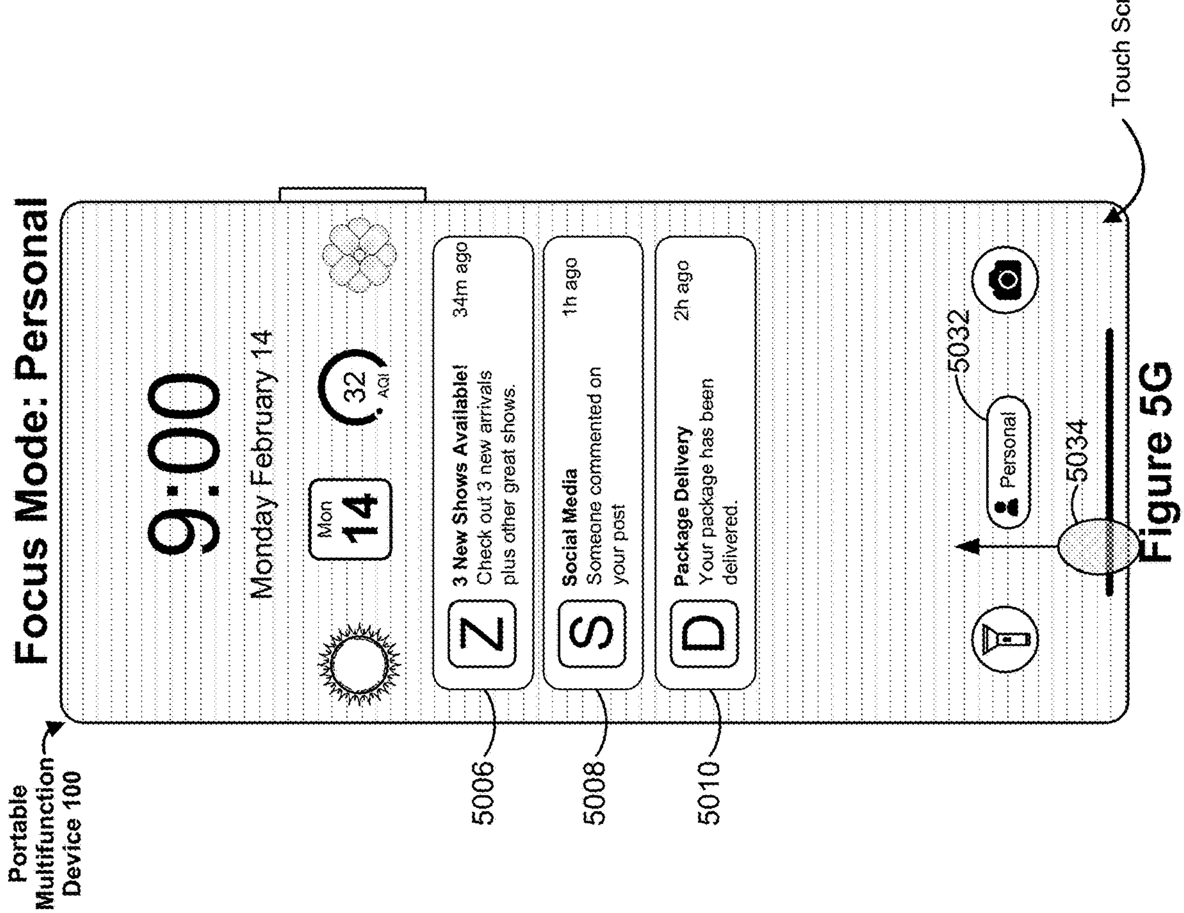
Figure 5H:
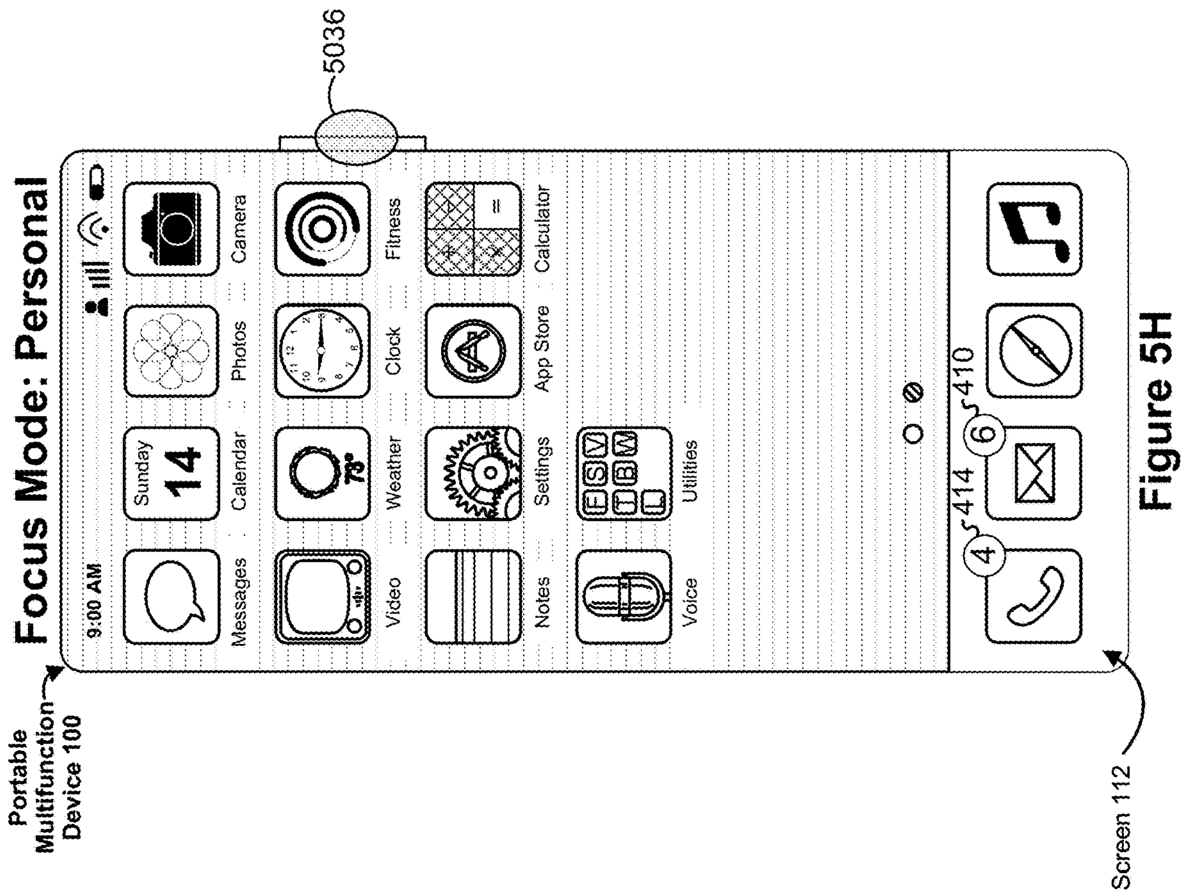

As shown in FIG. 5G, while displaying the wake user interface, the user performs an upward swipe gesture 5034. In response to detecting the upward swipe gesture 5034, the portable multifunction device 100 transitions to displaying the home screen user interface. As shown in FIG. 5H, while the "Personal" mode is active, the background image of the home screen user interface is different (e.g., as compared to the home screen user interface in FIG. 5C-1), and the home screen user interface includes different application launch affordances (e.g., in accordance with settings of the "Personal" mode).

As shown in Figure SI, in response to a user input 5036 (e.g., on a lock button or other input mechanism of the portable multifunction device 100), the portable multifunction device 100 returns to the low power state. In some embodiments, the portable multifunction device 100 reenters the low power state after a threshold amount of time (e.g., 5 second, 10 second, 30 seconds, 1 minute) without user activity (e.g., without detecting any user inputs on the touch screen 112 of the portable multifunction device 100).

Figure 5J:
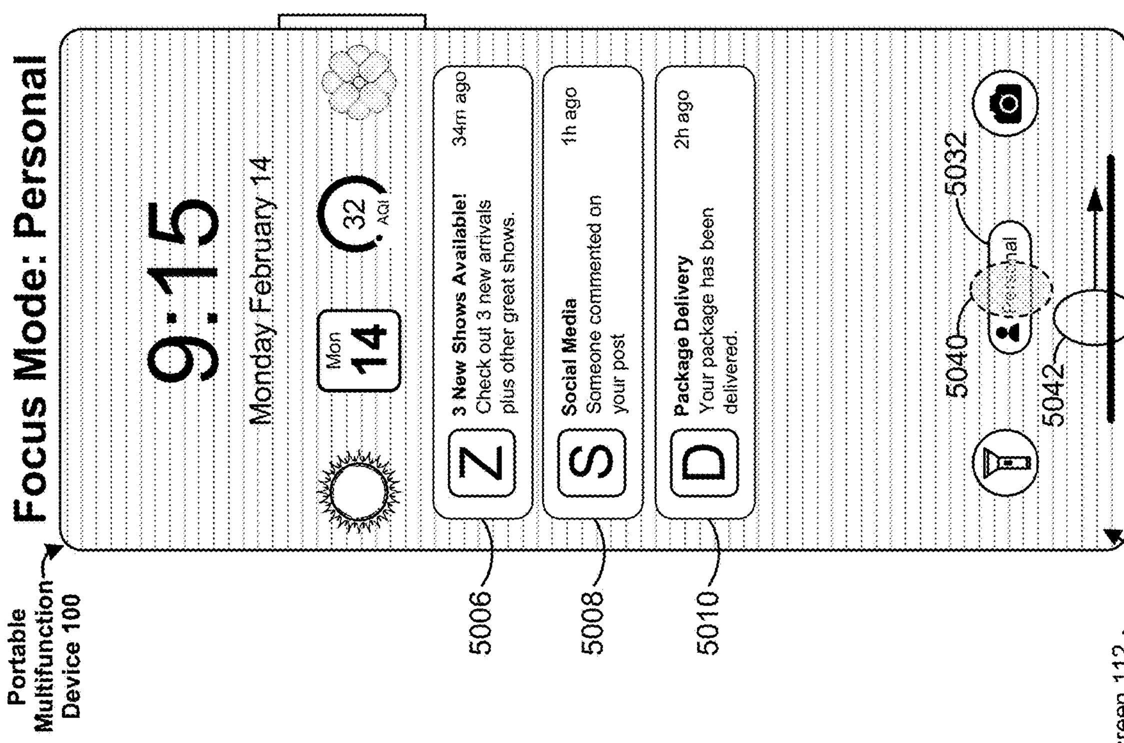

As shown in FIG. 5J, in response to detecting a user input 5038 (e.g., a user input that is the same as the user input 5000 described above with reference to FIG. 5A, as shown in Figure SI), the portable multifunction device 100 transitions out of the low power state. FIG. 5J also shows that the "Personal" mode remains active, even though the portable multifunction device 100 transitioned to the low power state, and even though 15 minutes have passed since the user activated the "Personal" mode.

In some embodiments, in response to detecting a user input 5040 on the mode indicator 5032, the portable multifunction device 100 redisplays the available focus modes (e.g., a similar user interface as shown in FIG. 5E), for selecting a different focus mode. Alternatively, in response to detecting a rightward swipe gesture 5042 in FIG. 5J, the portable multifunction device 100 transitions out of the "Personal" mode and into the "Fitness" mode. In some embodiments, the portable multifunction device 100 transitions to different focus modes in a predetermined order. For example, because the "Fitness" mode is displayed below the "Personal" mode in the list of focus modes, as shown in FIG. 5E, in response to detecting the rightward swipe gesture 5042, the portable multifunction device 100 transitions from the "Personal" mode to the "Fitness" mode. In response to a second and third rightward swipe gesture, the portable multifunction device 100 would then transition to the "Do Not Disturb" mode, and then the "Work" mode (and so on, for subsequent rightward swipe gestures).

Figure 5I:
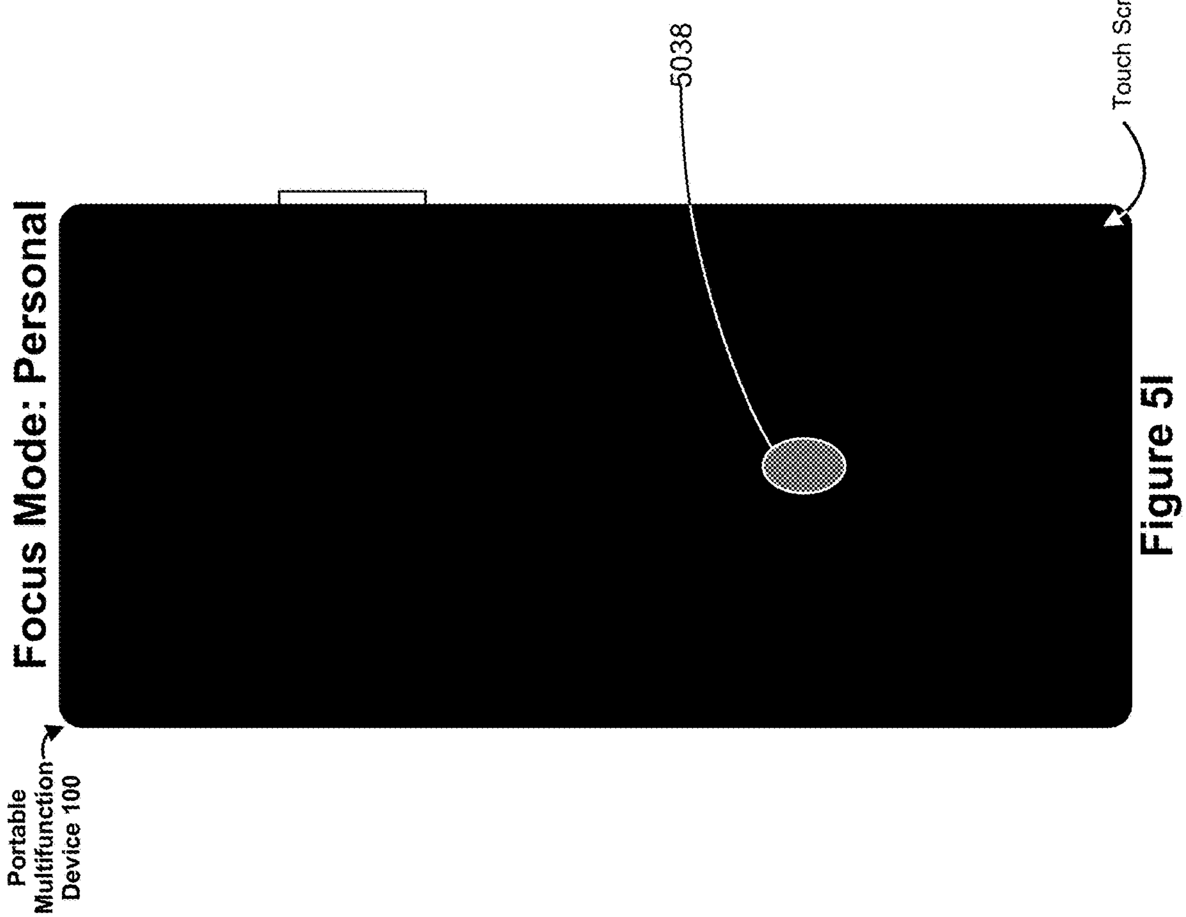
Figures 2, 5K:
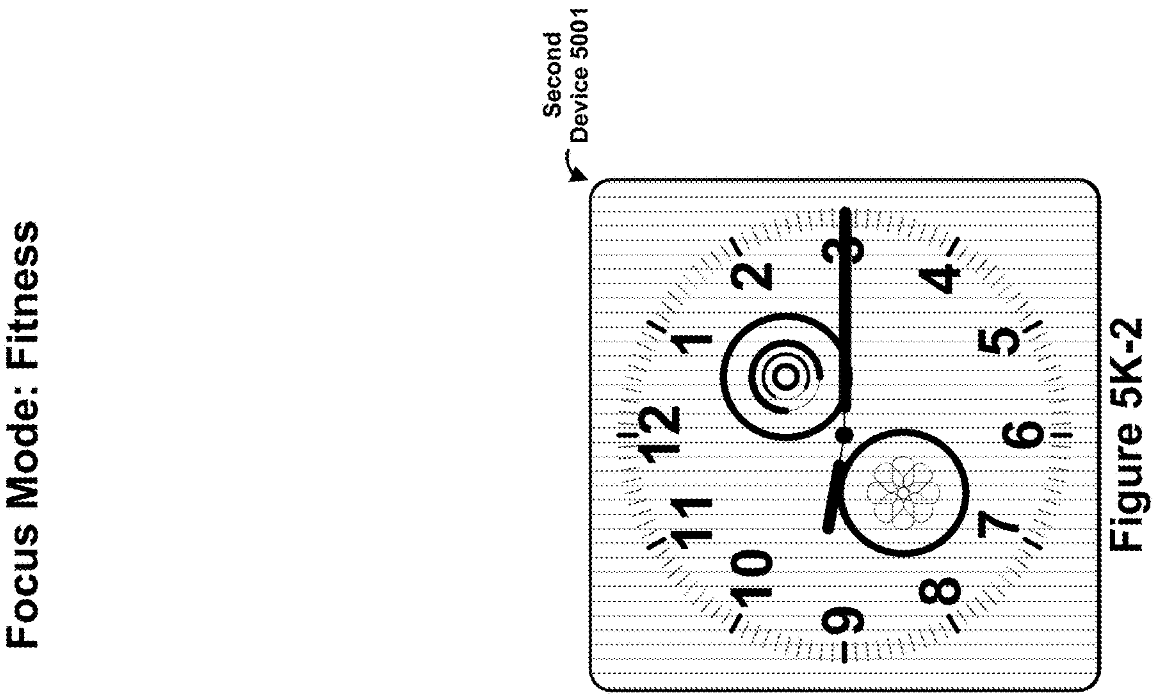
Figures 1, 5K:
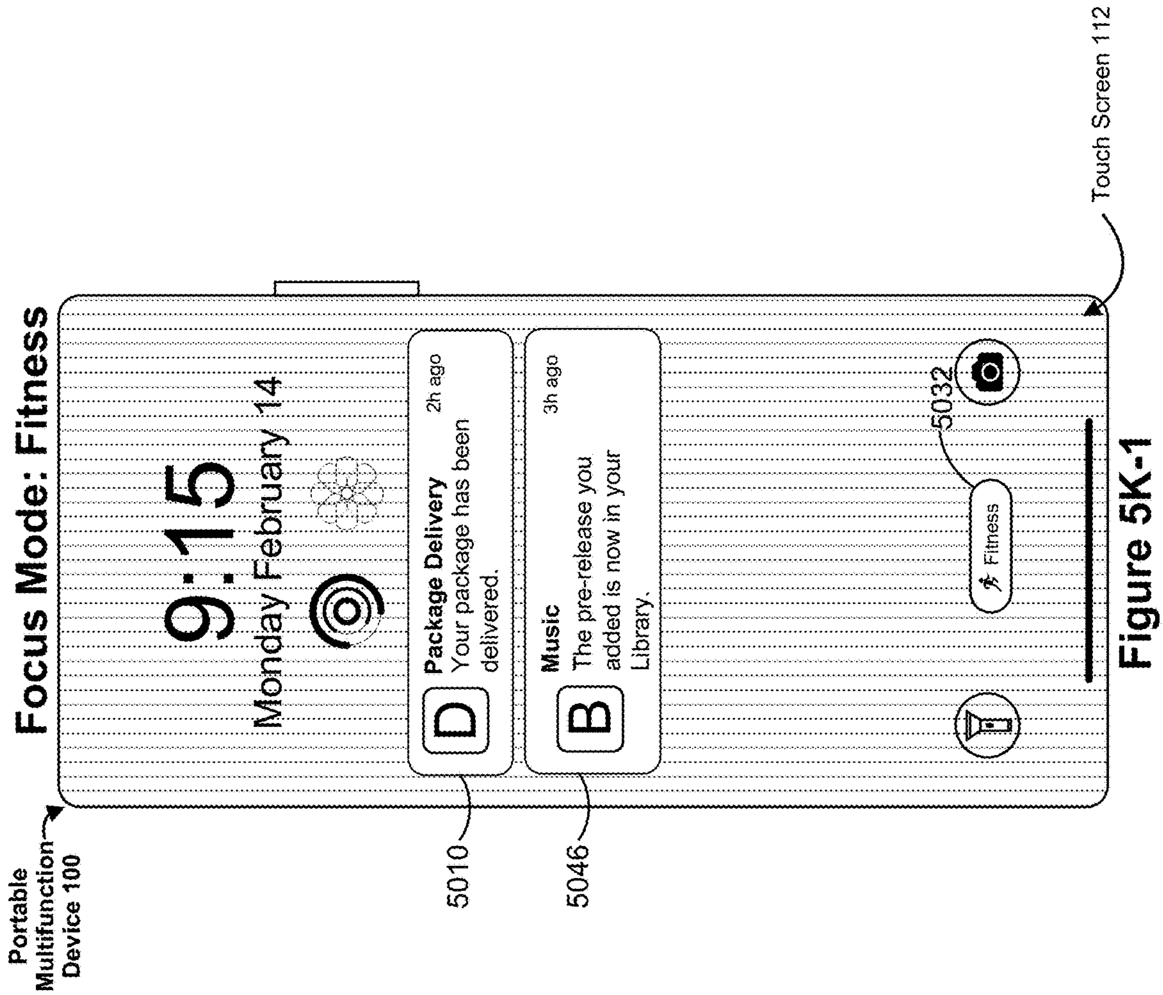

As shown in FIG. 5K-1, while the "Fitness" mode is active, different notifications are displayed on the wake user interface (e.g., as compared to when the "Personal" mode is active as in FIG. 5F-1, or when no focus mode is active as shown in FIG. 5C). The notification 5010 for the application D is displayed, along with a notification 5046 for an application B (e.g., in accordance with notification settings for the "Fitness" mode). The portable multifunction device also displays a different background image for the wake user interface (e.g., as shown by the vertical lines in FIG. 5K-1, which are different from the horizontal lines for the "Personal" mode shown in FIG. 5F-1, and the light grey background image in FIG. 5B).

As shown in FIG. 5K-2, because the "Fitness" mode is active for the portable multifunction device 100, the background image of the second device 5001 is also different (e.g., as compared to FIGS. 5C-2 and 5F-2). In some embodiments, when the "Fitness" mode is no longer active (e.g., is deactivated by the user), the background images of the portable multifunction device 100 and the portable multifunction device 5001 return to the background images shown in FIGS. 5B and 5C-2.

Figure 5M:
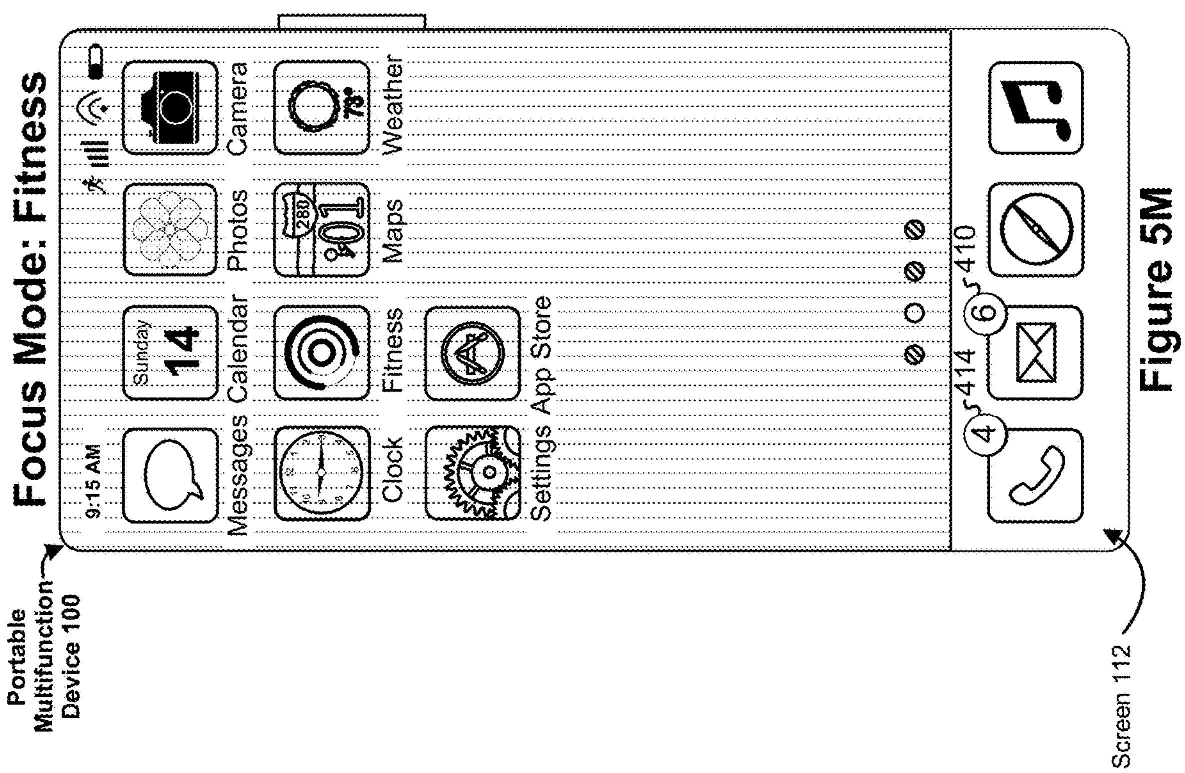
Figure 5L:
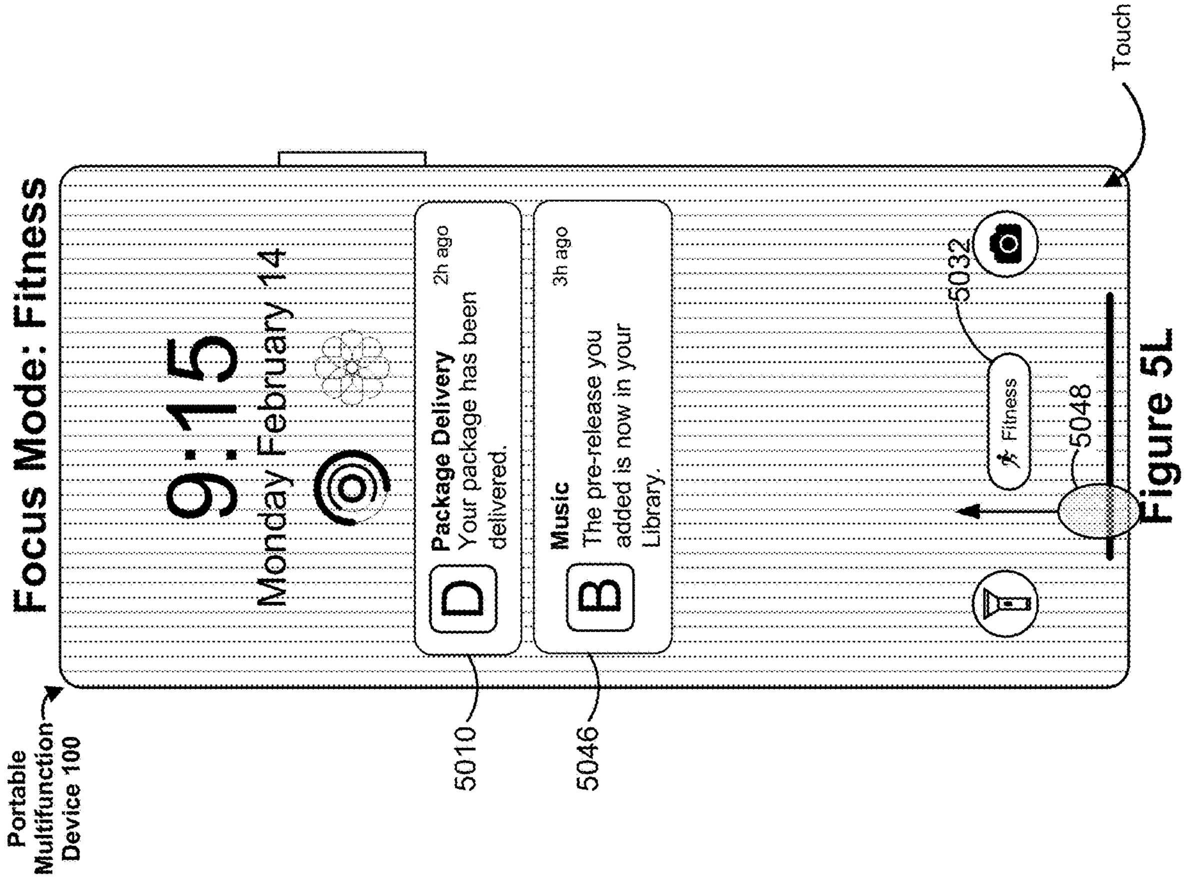

As shown in FIG. 5M, in response to detecting an upward swipe gesture 5048 in FIG. 5L, the portable multifunction device transitions to displaying the home screen user interface. As shown in FIG. 5M, the home screen user interface also has a different background image (e.g., as compared to the home screen user interface in the "Personal" mode, or when no focus mode is active), and also includes different application launch affordances. FIGS. 5L and 5M also show that while the "Fitness" focus mode is active, some visual characteristics of the wake user interface and the home screen user interface are different. Specifically, the text size of some user interface elements (e.g., the notifications 5010 and 5046 in FIG. 5L, or the text associated with application launch affordances in FIG. 5M) in FIGS. 5L and 5M are larger, compared to similar user interfaces while different focus modes are active (e.g., in contrast to FIGS. 5G and 5H, respectively). Other visual characteristics are described in further detail below, with reference to FIG. 6F.

Figure 5O:
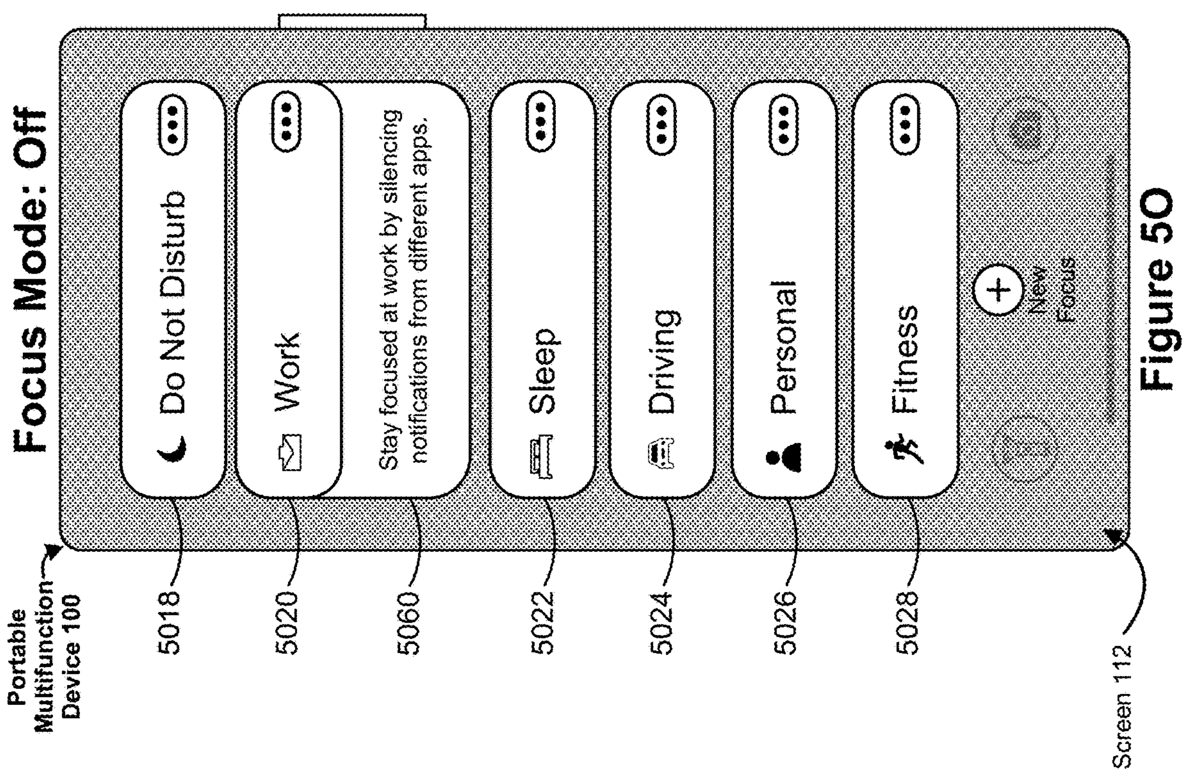
Figure 5N:
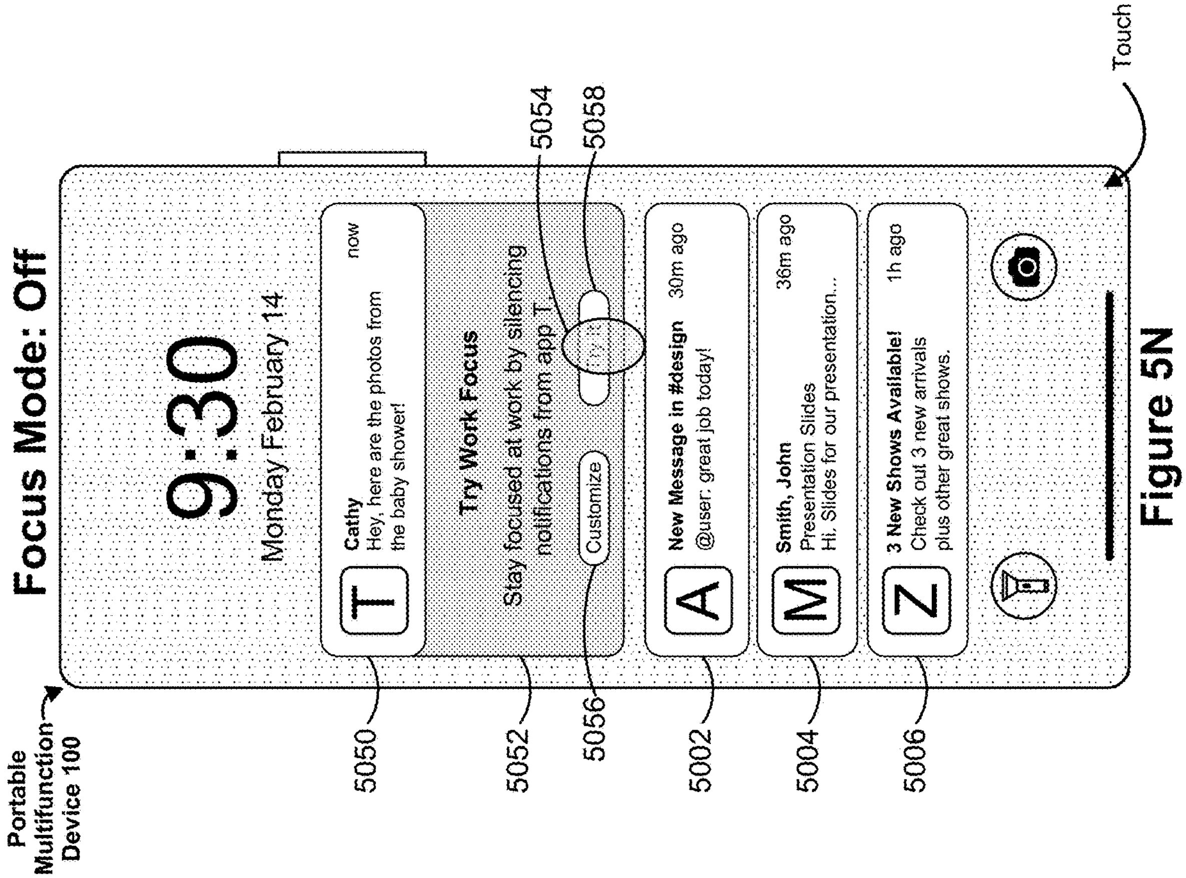

FIG. 5N shows the portable multifunction device 100 when the time is 9:30, and when no focus mode is active (e.g., because the user completed a workout and has manually disabled the "Fitness" mode for the portable multifunction device 100). FIG. 5N also shows a new notification 5050 for an application T. The notification 5050 is accompanied by a suggestion 5052 for trying the "Work" mode of the portable multifunction device 100. In some embodiments, the suggestion 5052 appears only for focus modes that have not been previously configured by the user. The user can fully customize and configure the "Work" mode by selecting a "Customize" affordance 5056. Alternatively, the user can select the "Try It" affordance 5058 for a simplified customization and configuration experience (e.g., as described in greater detail with reference to FIG. 5P).

In some embodiments, the portable multifunction device 100 generates suggestions based on available user data. For example, because the user frequently dismisses (or ignores) notifications from the application T during common work hours (e.g., from 9 AM to 5 PM), the portable multifunction device 100 displays the suggestion 5052 attached to (e.g., extending from) the notification 5050. In some embodiments, the portable multifunction device 100 uses different criteria to determine when, or whether, to display a suggestion. For example, the user data may account for levels of user interaction with particular contacts in addition to, or in place of, timing criteria (e.g., common work hours). The user data may also account for the user's location, such as whether the user is at a "home" location, or a "work location," when a user interacts with or ignores certain notifications.

FIG. 5O shows that a suggestion 5060 may also be displayed in other contexts. For example, when displaying the list of focus modes (e.g., in response to user interaction as described above with reference to FIGS. 5C-1 to 5E), the portable multifunction device displays the suggestion 5052 for trying the "Work" mode. In some embodiments, the suggestion 5060 is based on the same criteria as the suggestion 5052. In some embodiments, the suggestion 5060 is based on more limited criteria. For example, the suggestion 5060 appears when the portable multifunction device 100 detects the user is a "work" location, but does not account for user data relating to user interaction with notifications (e.g., because no notifications are concurrently displayed with the suggestion 5060, and so the suggestion 5060 is not associated with any specific notification).

Figure 5P:
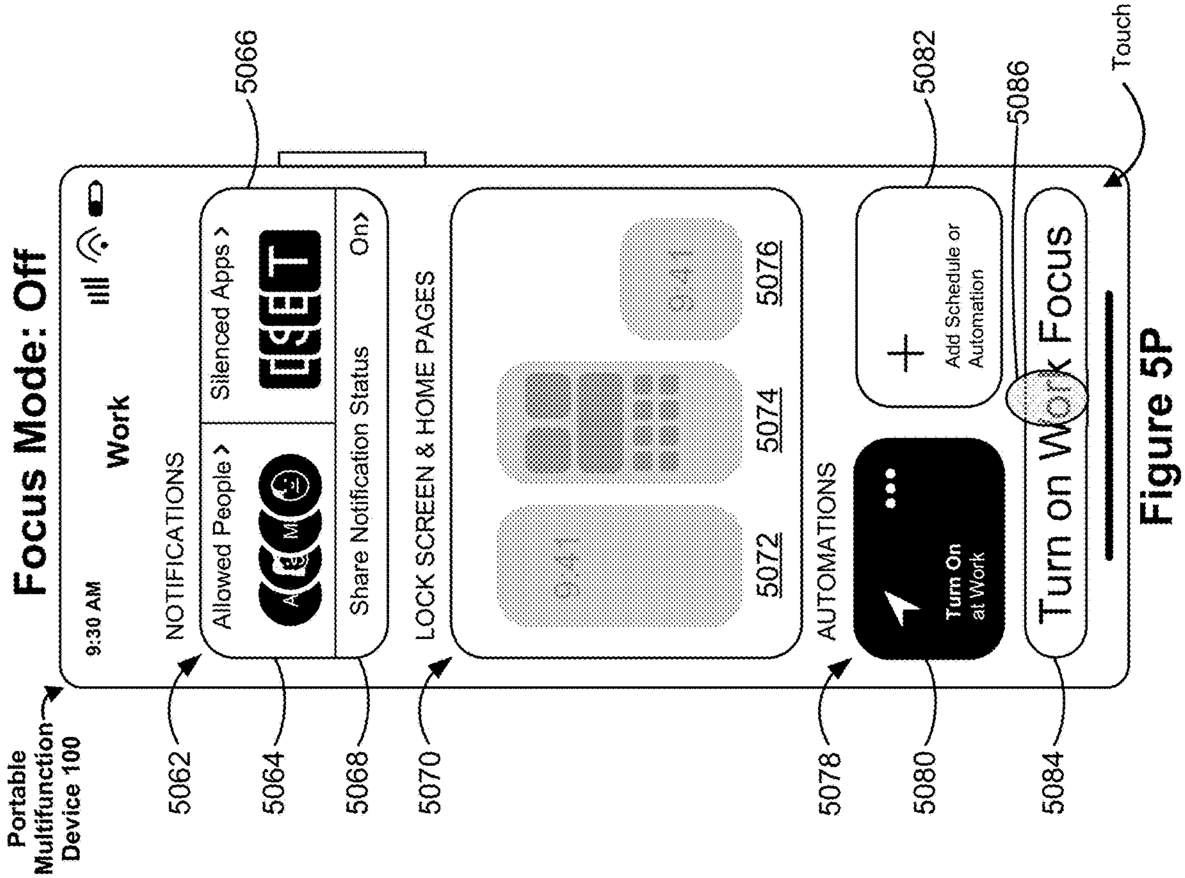

Returning to FIG. 5N, the portable multifunction device 100 detects a user input 5054 on the "Try It" affordance 5058. In response to detecting the user input 5054, and as shown in FIG. 5P, the portable multifunction device 100 transitions to a user interface for configuring the "Work" mode. The user interface for configuring the "Work" mode includes a "Notifications" section 5062, a "Lock Screen and Home Pages" section 5070 and an "Automations section 5078," each with associated settings for the "Work" mode.

Since the user selected the "Try It" affordance 5058, and not the "Customize" affordance 5056, several sections of the user interface for configuration the "Work" mode are pre-configured for the user. The preconfigured sections are shown with black backgrounds. For example, the portable multifunction device pre-configures the contact list 5064 to include a list of contacts for which notifications will be delivered while the "Work" mode is active (e.g., and notifications associated with contacts who are not in the list of contacts will not be delivered while the "Work" mode is active). The portable multifunction device also pre-configures an application list 5066, which includes a list of applications for which notifications will not be delivered while the "Work" mode is active. The application list 5066 includes the application T, as the suggestion 5052 that prompted the user to configure the "Work" mode (in FIG. 5N) is associated with the application T. The portable multifunction device preconfigures an automation 5080 that enables the "Work" mode when the portable multifunction device detects the user is at the "work" location. Some settings such as a notification status setting 5068 are pre-configured to use default values (e.g., with a default value that enables other users to see (e.g., as a status indicator in a messaging application) when the "Work" mode is active for the portable multifunction device 100).

Additional settings such as a lock screen setting 5072, a home screen setting 5074, and a second device settings 5076 are displayed with a grey background indicating that they can optionally be configured by the user, but have not been preconfigured by the portable multifunction device. In some embodiments, if the user does not configure these settings, the portable multifunction device 100 selects default values for the unconfigured settings. For example, if the user does not configure a wake screen, home screen, or second device screen, the portable multifunction 100 defaults to using the same background images currently in use in the wake screen, home screen, and/or second device screen, respectively. The user can also add additional automations (e.g., for configuring different rule criteria for activating the "Work" mode) by selecting an schedule or automation affordance 5082.

If the user is satisfied with preconfigured settings, or has finished any additional customizations for the "Work" mode, the user can select an affordance 5084 for enabling the "Work" mode. In response to detecting a user input 5086 on the affordance 5084, the portable multifunction device 100 transitions to the "Work" mode.

Figure 5Q:
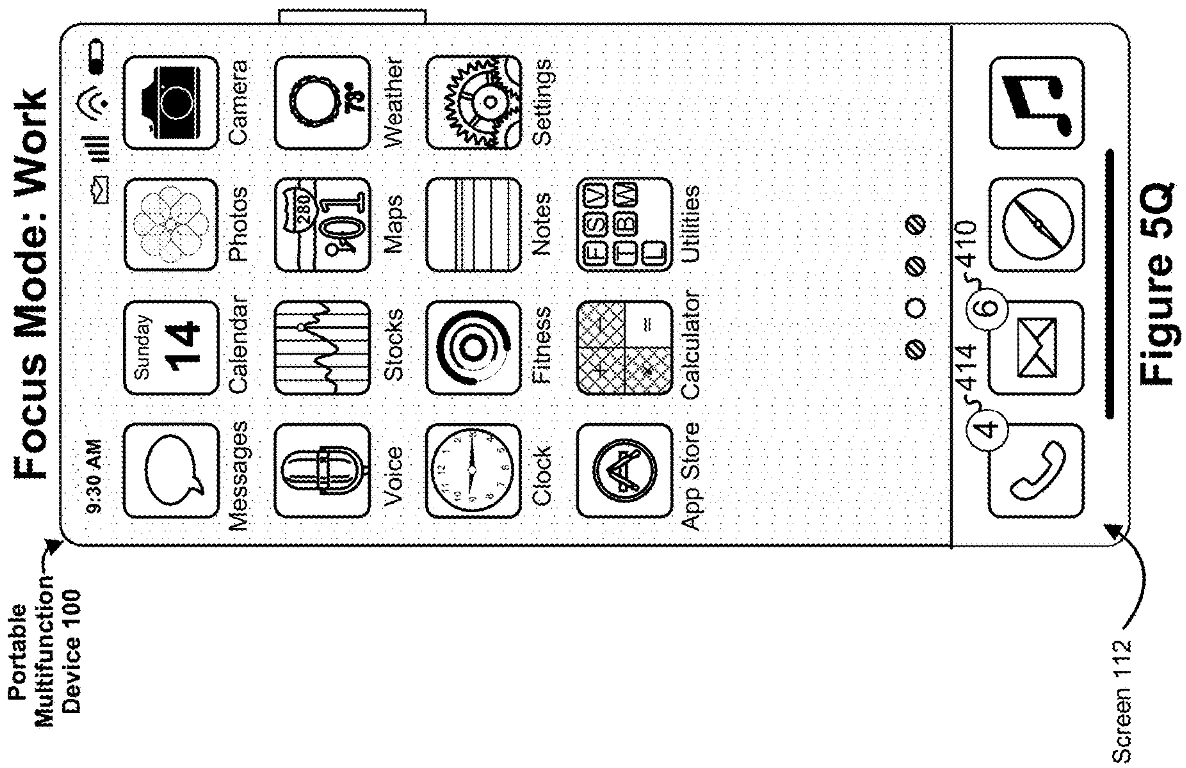

As shown in FIG. 5Q, the work mode is active for the portable multifunction device. As the user did not configure the home screen setting 5074, the portable multifunction device 100 displays the home screen user interface with the same background image as when no focus mode is active (e.g., the background image of 5Q is light grey, which is the same as FIG. 5C-1). In some embodiments, as shown in FIG. 5Q, the home screen user interface includes a different set of application launch affordances (e.g., compared to FIG. 5C-1, where no focus mode is active) based on the application list 5066 (in FIG. 5P). In some embodiments, the displayed application launch affordances are selected as part of the home screen setting 5074 (e.g., FIG. 5Q would include the same application launch affordances as FIG. 5C-1, if the user did not configure the home screen setting 5074).

Figure 5S:
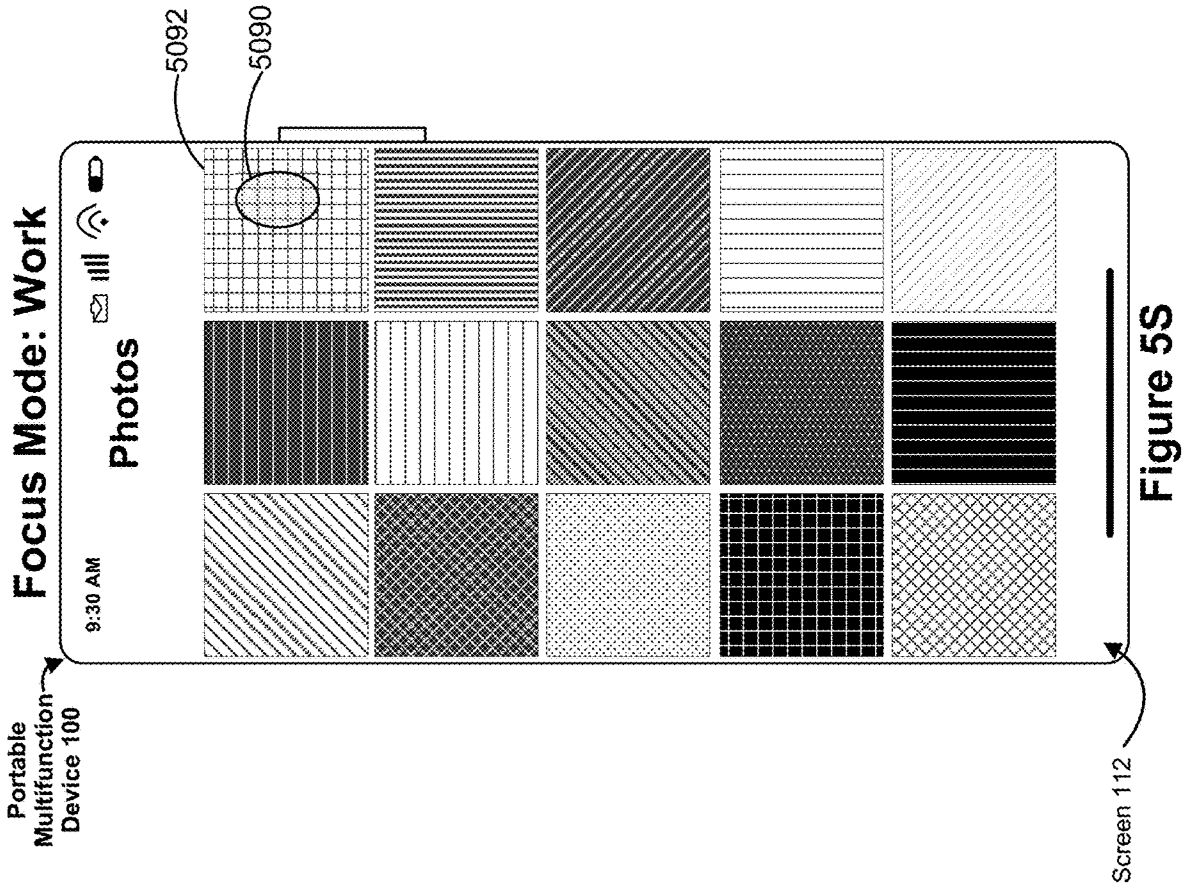
Figure 5R:
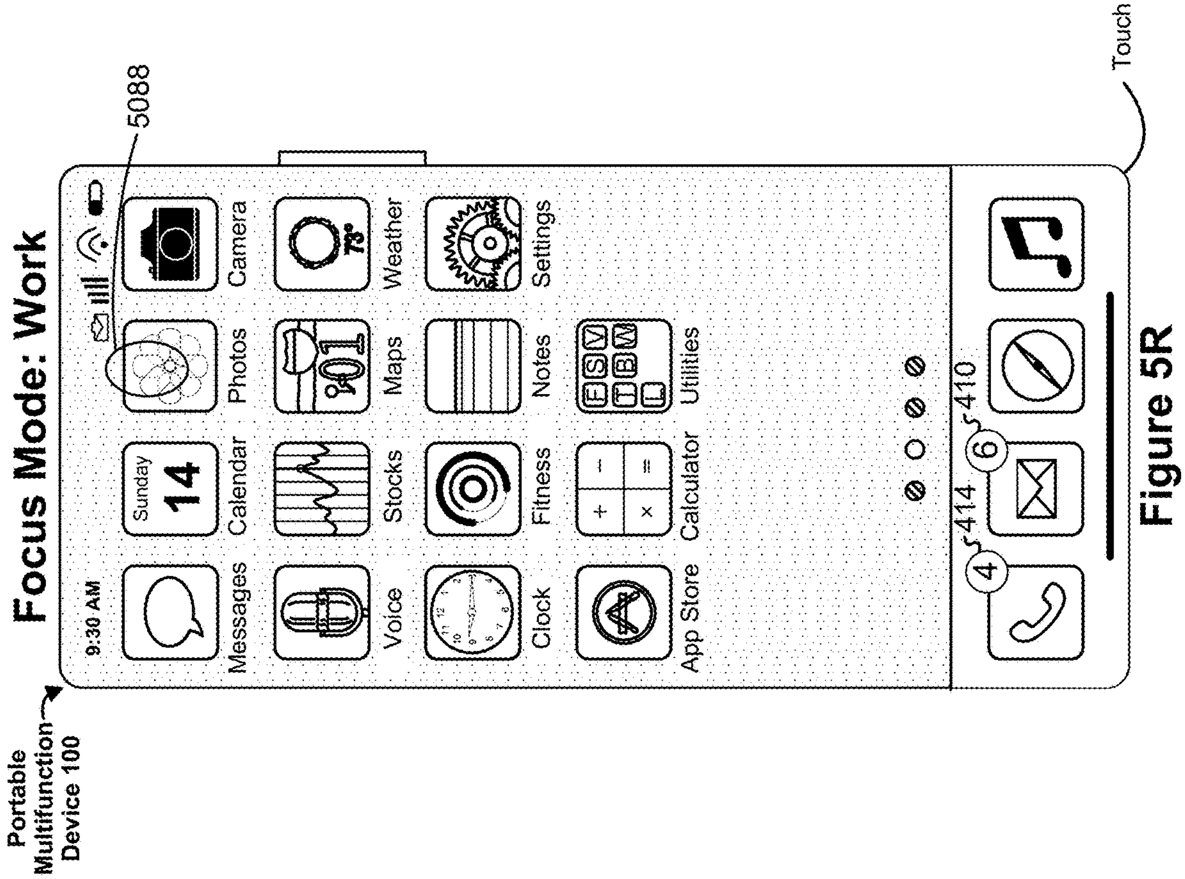

FIGS. 5R-5AC show methods of associating a background image with a focus mode. As shown in FIG. 5R, the portable multifunction device 100 detects a user input 5088 on a "Photos" application launch affordance. In response, as shown in FIG. 5S, the portable multifunction device 100 displays a user interface for a "Photos" application. Note that, for ease of replication, the images 5092 shown in FIG. 5S are represented as different fill patterns. It should be understood, however, that the imagines 5092 may include other types of images, such as photograph obtained by the user using portable multifunction device 100 or a different device.

Figure 5U:
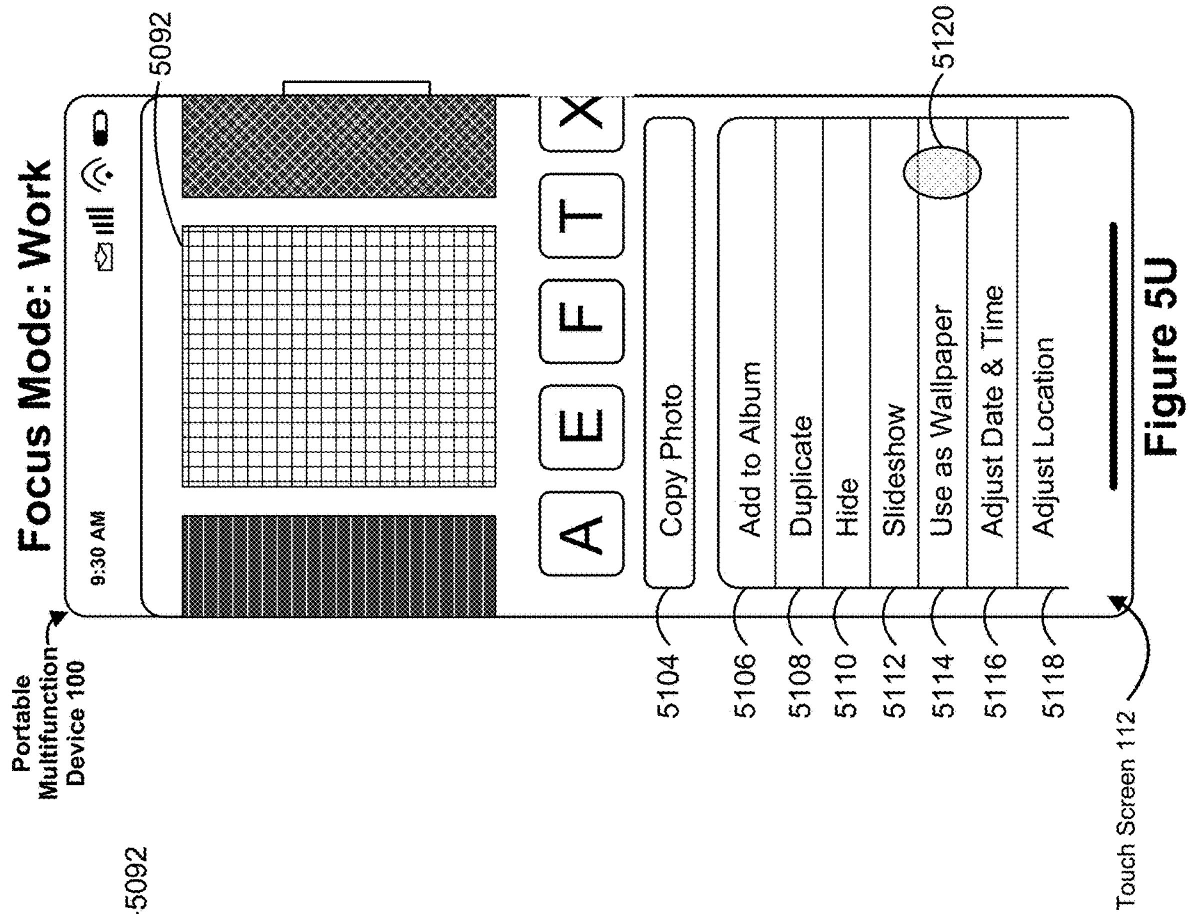
Figure 5T:
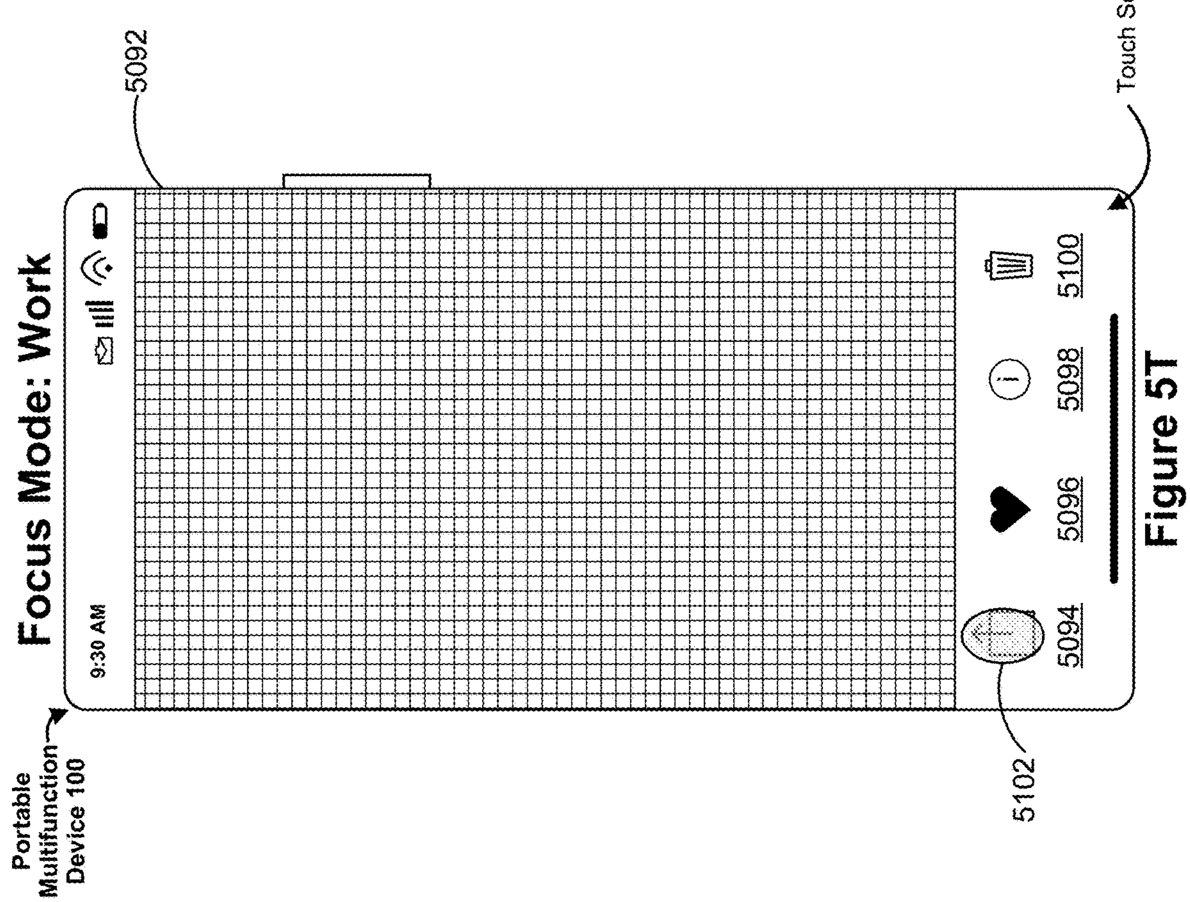

In response to detecting a user input 5090 (FIG. 5S) on an image 5092 in the user interface for the "Photos" application, and as shown in FIG. 5T, the portable multifunction device 100 opens an editing user interface for editing the image 5092. The editing user interface includes an interaction affordance 5094, a favorites affordance 5096, an information affordance 5098, and a delete affordance 5100.

In response to detecting a user input 5102 (FIG. 5T) on the interaction affordance 5094, and as shown in FIG. 5U, the portable multifunction device 100 displays additional options for interacting with the photo 5092. The additional options include a "Copy Photo" option 5104, an "Add to Album" option 5106, a "Duplicate" option 5108, a "Hide" option 5110, a "Slideshow" option 5112, a "Use as Wallpaper" option 5114, an "Adjust Date and Time" option 5116, and an "Adjust Location" option 5118. The "Use as Wallpaper" option 5114 is an option for configuring a background image for a home screen user interface and/or a wake user interface of the portable multifunction device 100.

Figure 5W:
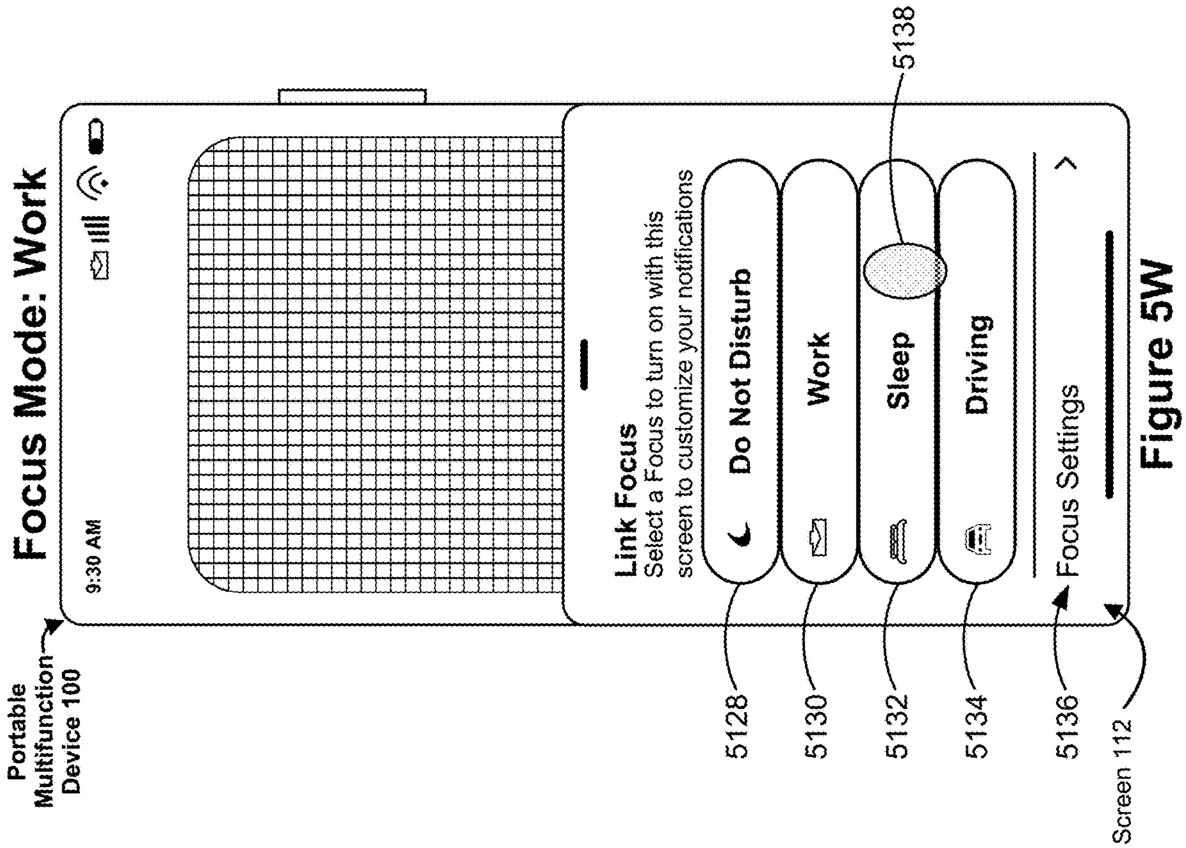
Figure 5V:
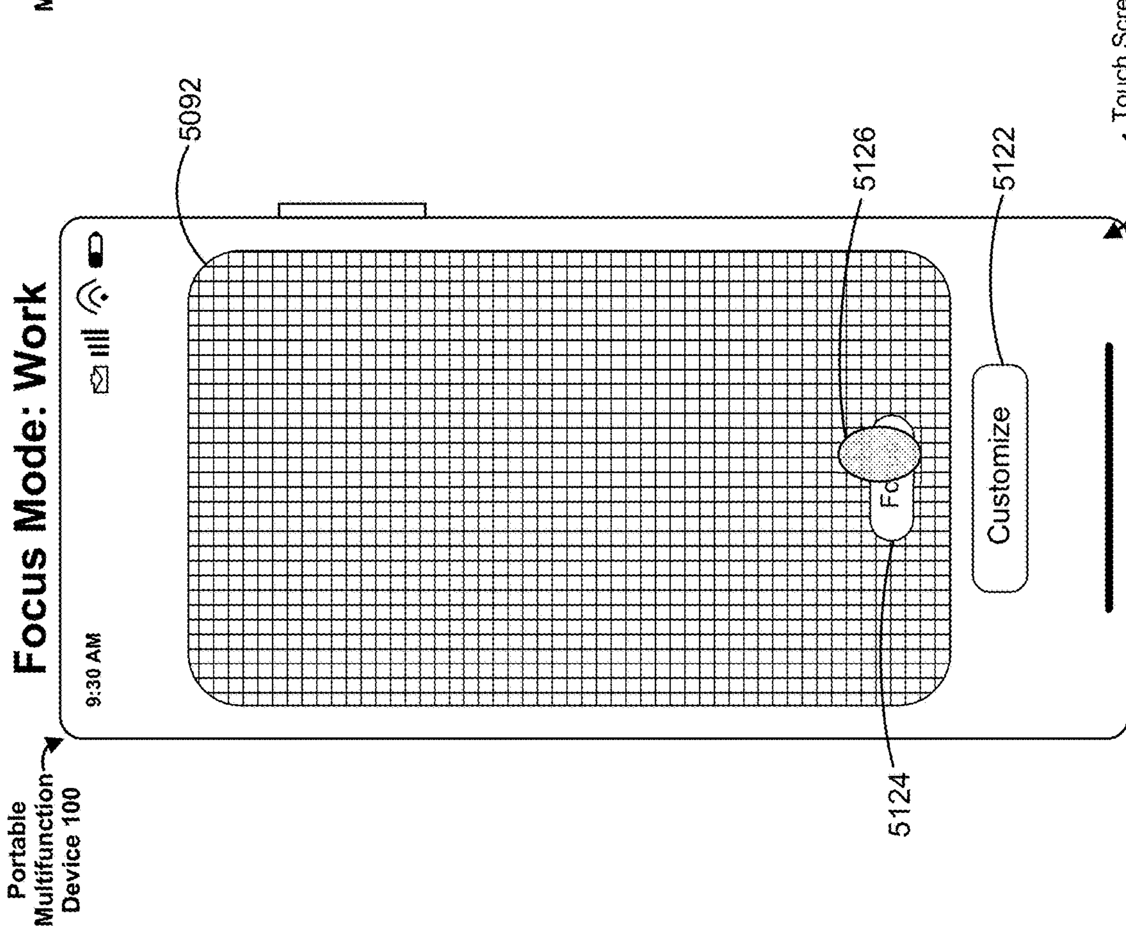

In response to detecting a user input 5120 (FIG. 5U) on the "Use as Wallpaper" option 5114, and as shown in FIG. 5V, the portable multifunction device 100 displays a wallpaper configuration user interface, which includes a "Customize" affordance 5122 (e.g., for adjusting a size, zoom, and/or orientation of the image 5092 when used as a wallpaper) and a focus indicator 5124 (e.g., for associating a focus mode with the image 5092, when the image 5092 is used as a background image or wallpaper). In some embodiments, the focus indicator 5124 displays a generic term or name (e.g., "Focus") when no specific focus mode is currently associated with the image 5092.

In response to detecting a user input 5126 (FIG. 5V) on the "Focus" affordance 5124, and as shown in FIG. 5W, the portable multifunction device 100 displays a list of focus mode affordances, including a "Do Not Disturb" affordance 5128, a "Work" affordance 5130, a "Sleep" affordance 5132, and a "Driving" affordance 5134. In some embodiments, each of these available focus modes has a corresponding affordance, and the list of affordances can be scrolled to display additional affordances (e.g., affordances for the "Personal" mode and "Fitness" mode of the portable multifunction device 100) which are not shown in FIG. 5W.

Figure 5Y:
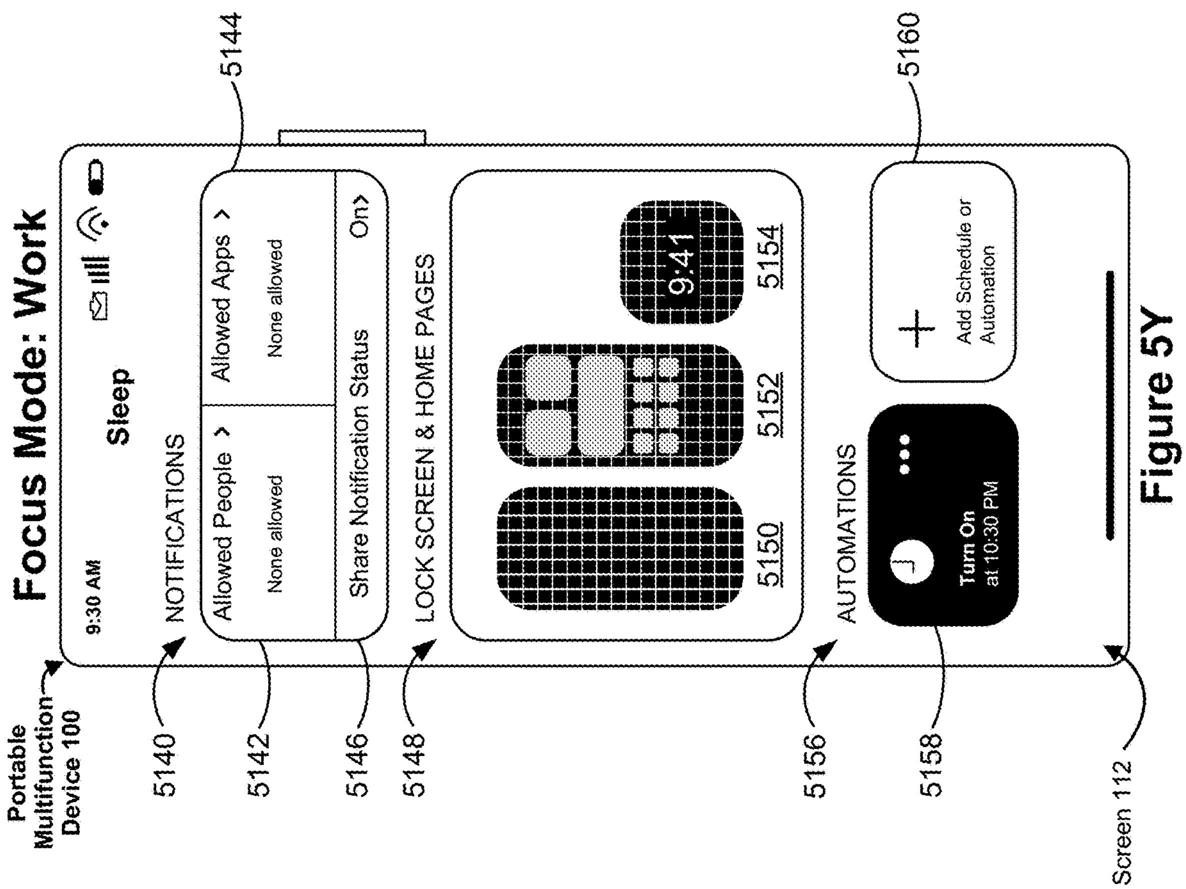
Figure 5X:
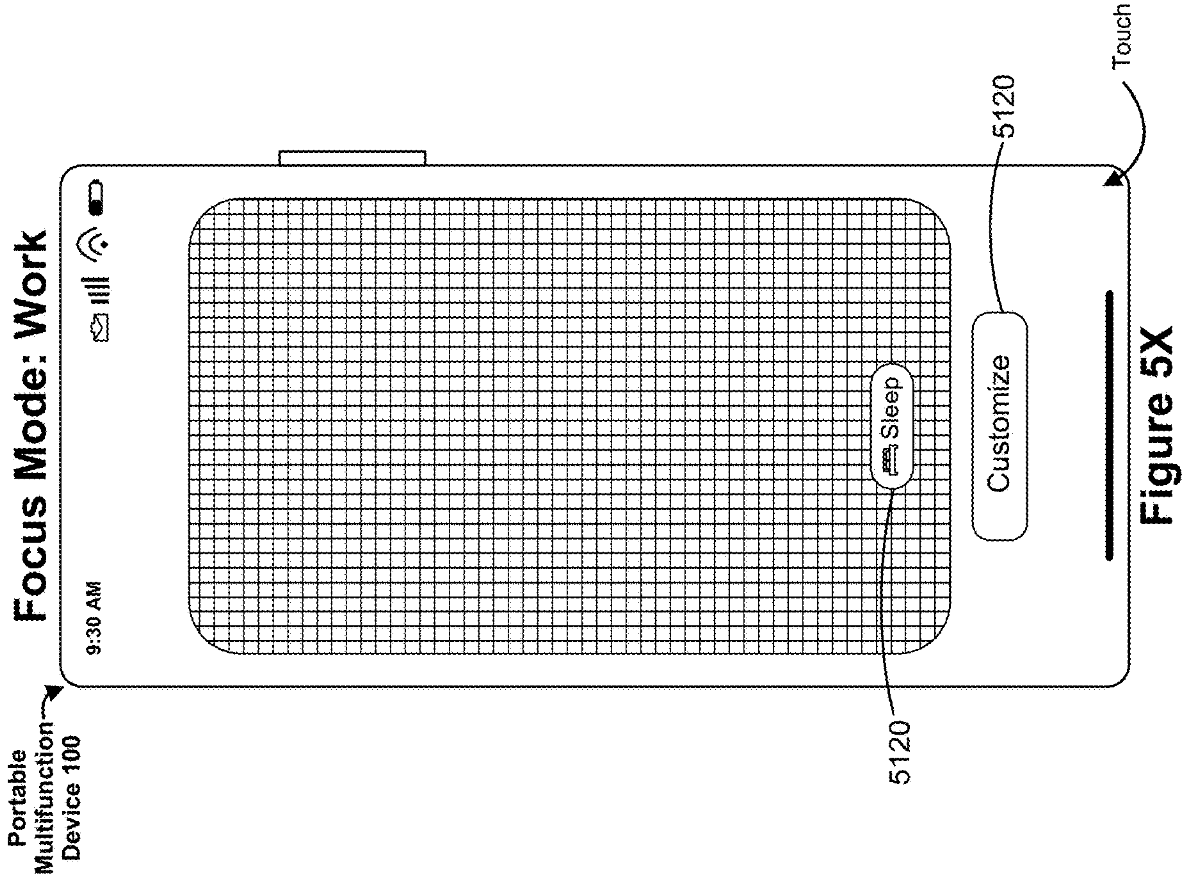

In response to detecting a user input 5138 (FIG. 5W) on the "Sleep" affordance 5132, and as shown in FIG. 5X, the portable multifunction device 100 updates the focus indicator 5120 to indicate that the "Sleep" mode has been associated with the image 5092.

FIG. 5Y shows that, after associating the "Sleep" mode with the image 5092, if the user navigates to settings for the "Sleep" mode of the portable multifunction device 100 (e.g., via the "Settings" application launch affordance in FIG. 5R), a lock screen setting 5150, a home screen setting 5152, and a second device setting 5154 are automatically configured with the image 5092 as the background image for the lock screen user interface, wake user interface, and second device, respectively. In some embodiments, the settings shown in FIG. 5Y correspond to the settings shown in FIG. 5P (e.g., the portable multifunction device 100 preconfigures some settings in the streamlined configuration experience from selecting the "Try It" affordance in FIG. 5N, but still displays all available settings).

Figure 5Z:
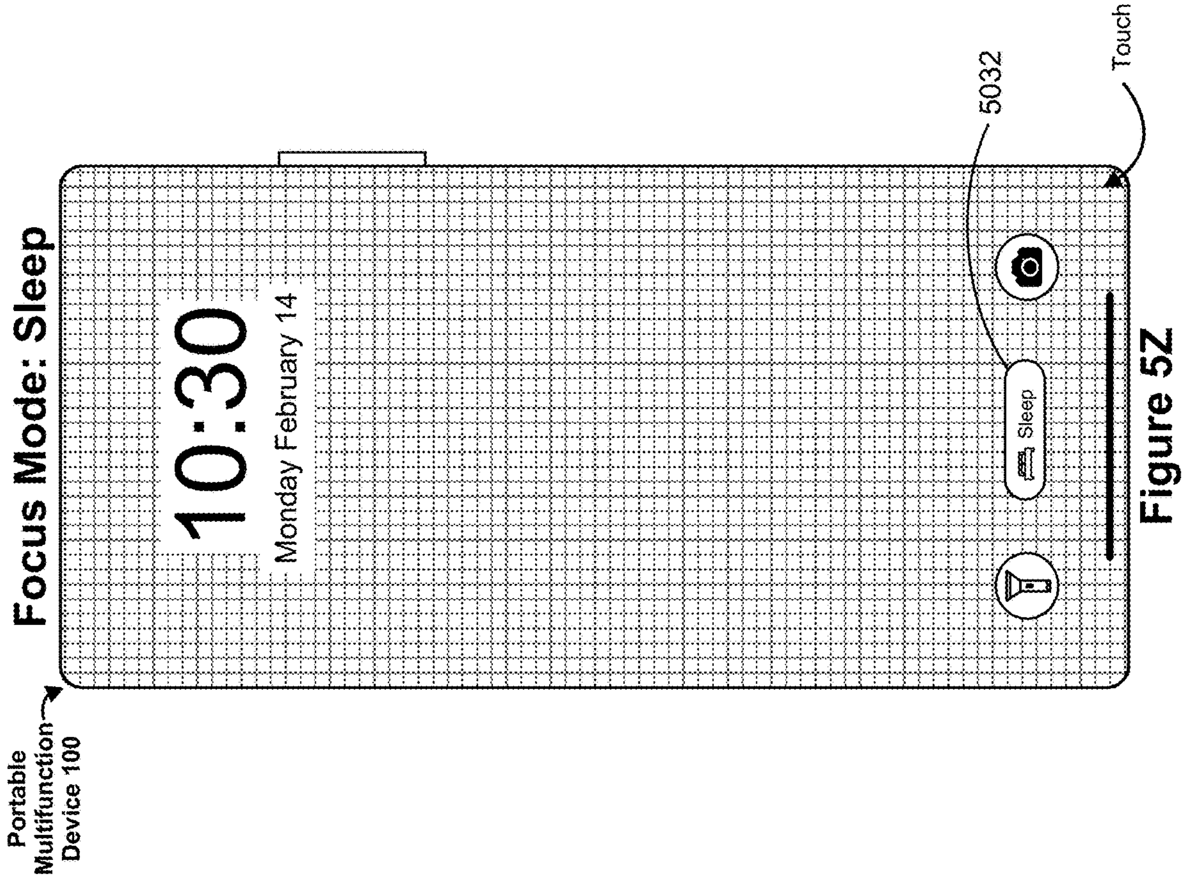
Figure 5A:
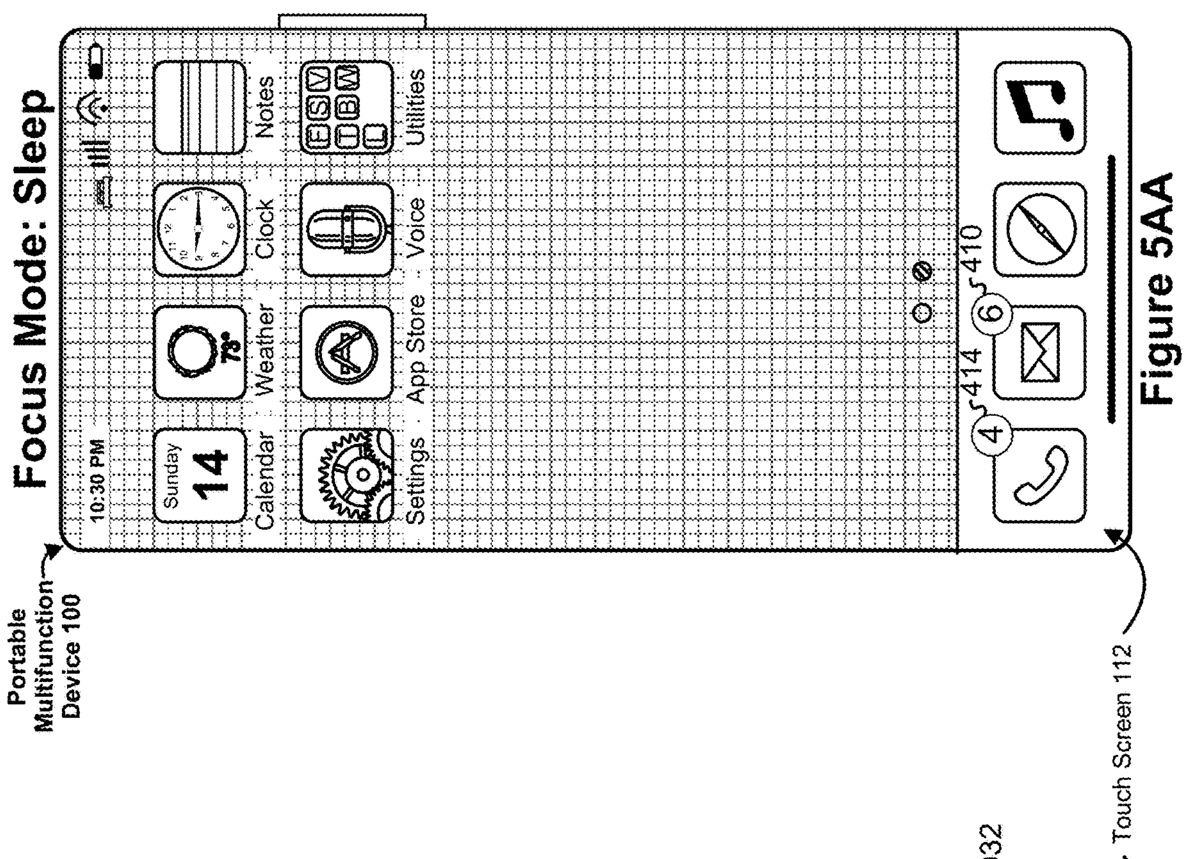
Figure 5A:
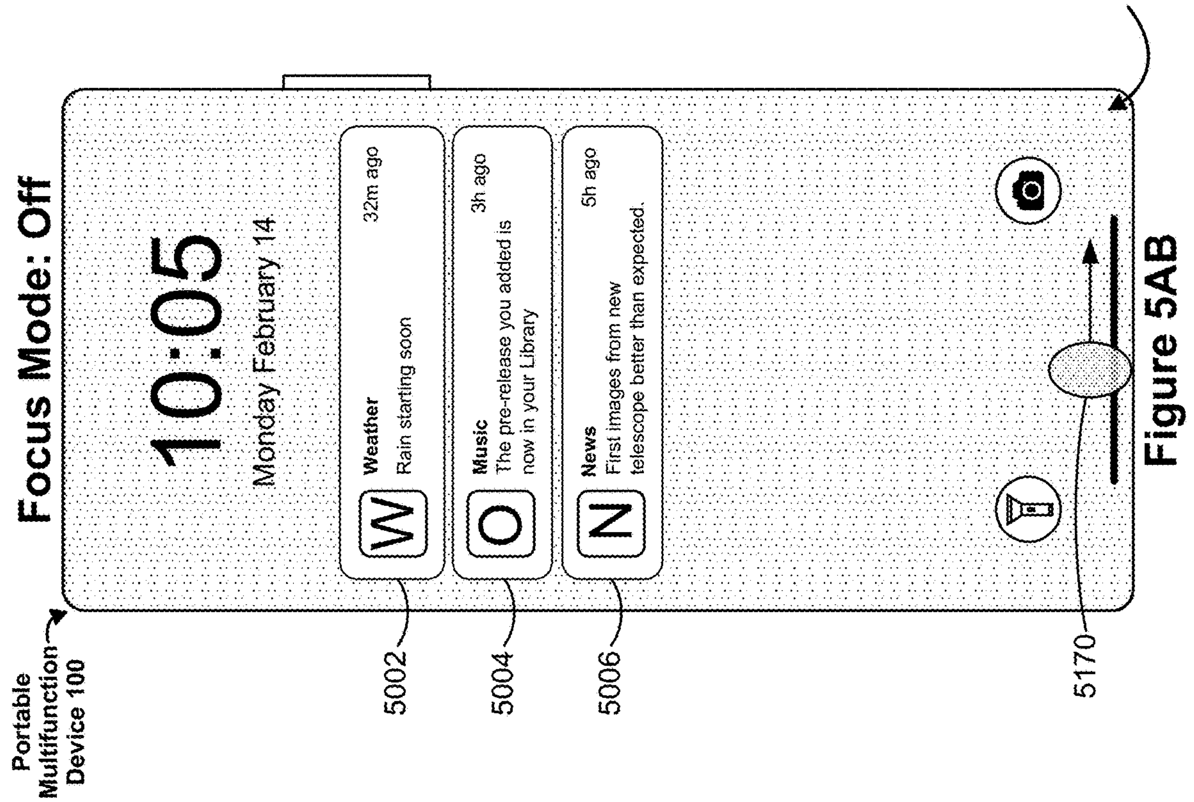
Figure 5A:
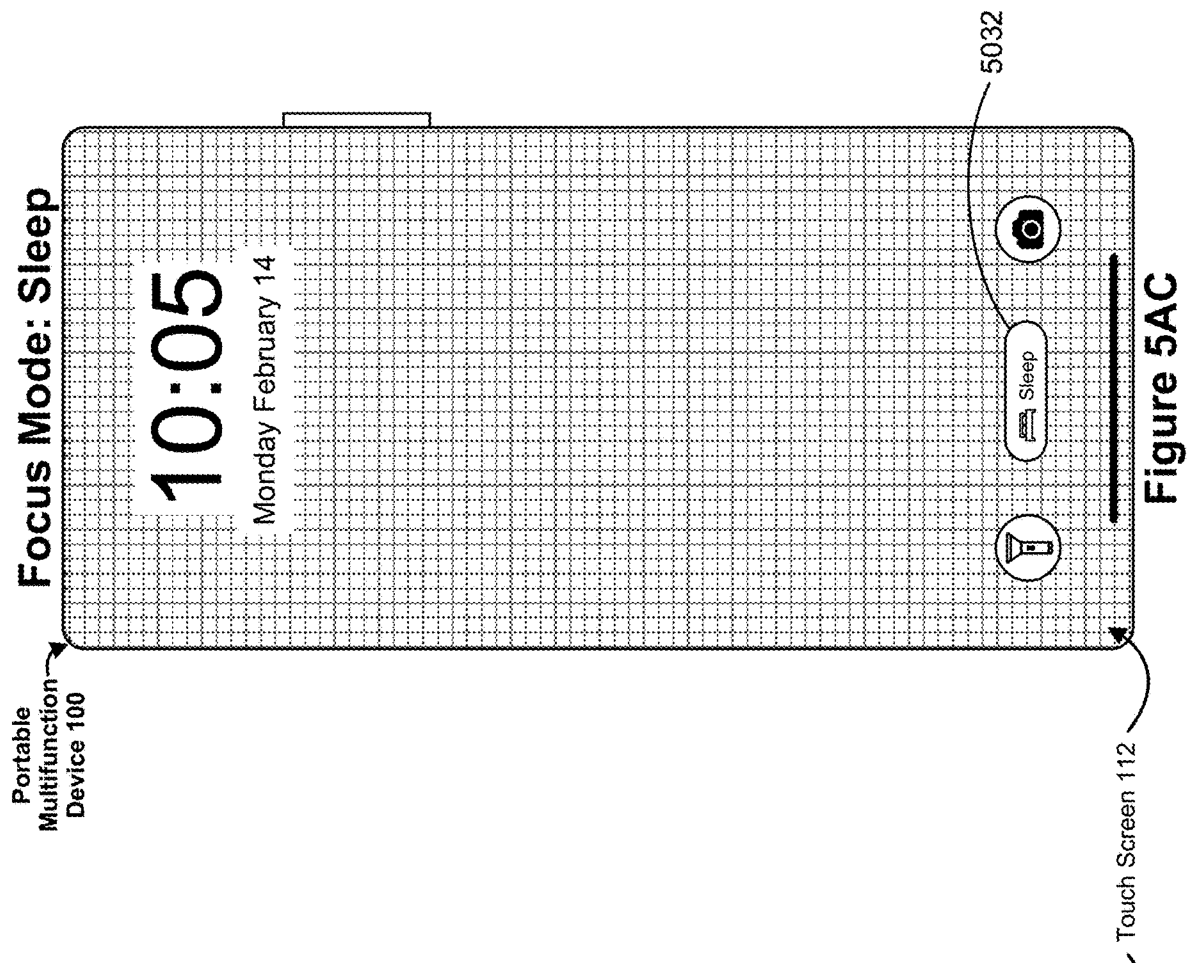

FIG. 5Z shows the display of portable multifunction device 100 at 10:30. The settings for the "Sleep" mode shown in FIG. 5Y include an automation that causes the "Sleep" mode to become active at 10:30 PM (e.g., as shown in an automation setting 5158 in FIG. 5Y). As shown in 5Z, the mode indicator 5032 indicates that the "Sleep" mode is active. The wake user interface displayed in FIG. 5Z also uses the image 5092 (shown as the cross pattern background in FIG. 5Z) as the background image for the wake user interface. FIG. 5AA shows the corresponding home screen user interface at 10:30, when the "Sleep" mode is active. The home screen user interface also has the image 5092 as the background image for the home user interface.

FIG. 5AB shows an alternative to FIGS. 5Z and 5AA. In FIG. 5AB, the current time is 10:05 PM, which is before the "Sleep" mode automatically becomes active (at 10:30 PM). As the "Sleep" mode is not active, and no other focus mode is active, the wake user interface has the light grey background image (e.g., the same background image as in FIG. 5B).

In response to detecting a rightward swipe gesture 5170 (FIG. 5AB), and as shown in FIG. 5AC, the portable multifunction device 100 transitions to the "Sleep" mode. In some embodiments, the rightward swipe gesture 5170 includes two consecutive swipes (e.g., to first transition to the "Work" mode, and then from the "Work" mode to the "Sleep" mode, in accordance with a predetermined order of focus modes). As the "Sleep" mode is now active for the portable multifunction device 100, the background image for the wake user interface is the image 5096 (e.g., the same background image as in FIG. 5Z).

FIGS. 6A-6R illustrate example user interfaces for configuring a focus mode in accordance with some embodiments.

FIG. 6A shows a user interface 6000 for configuring settings of the "Work" mode of the portable multifunction device 100. The user interface 6000 includes multiple sections, including a "Notifications" section 6002, a "Lock Screen and Home Pages" section 6010, and an "Automations" section 6018. In some embodiments, some sections include additional sections (e.g., subsections). In some embodiments, a section includes both additional sections and individual settings. For example, the "Notifications" section 6002 includes two additional sections (a contacts section 6004 and an applications section 6006) as well as an individual setting (a "Share Notification Status" settings 6008). The "Lock Screen and Home Pages" section 6010 includes a wake screen section 6012, a home screen section 6014, and a second device section 6016. The "Automations" section 6018 includes a new automation affordance 6020.

A user can select one or more sections in the user interface 6002 to configure different settings for the "Work" mode. For example, detecting a user input 6022 on or directed to the contacts section 6004 displays a user interface 6003 for specifying one or more contacts for which notifications are allowed, or for which notifications will be suppressed or silenced, when the "Work" mode is active. Detecting a user input 6026 on the wake user interface section 6012 displays a user interface for configuring a background image for a wake user interface while the "Work" mode is active. Detecting a user input 6028 on the home screen section 6014 enters a mode where the user can provide inputs to the device to configure a background image for a home screen user interface while the "Work" mode is active. Detecting a user input 6030 on the second device section 6016 configures a background image for a user interface of the second device 5001 while the "Work" mode is active for the portable multifunction device 100. Detecting a user input 6024 on the applications section 6006 configures one or more applications for which notifications are allowed, or for which notifications will be suppressed or silenced, when the "Work" mode is active.

FIG. 6B shows the user interface 6003 for configuring application-related settings for the "Work" mode. The user interface 6003 includes a toggle with a "People" option 6034 and an "Apps" option 6036. As shown in FIG. 6B, the "Apps" option 6036 is currently selected, so the user interface 6003 displays application settings for the "Work" mode (e.g., for selecting a list of applications to allow or suppress/silence notifications for, while the "Work" mode is active). The "People" option 6034 corresponds to settings for the contacts section 6004, and the "Apps" option 6036 corresponds to settings for the applications section 6006 (e.g., so the user can easily navigate between sections without having to return to the user interface 6001).

The user interface 6003 also includes a toggle with a "Allow Notifications From" option 6038 and a "Silence Notifications From" option 6040. As shown by the checkmark next to the "Silence Notifications From" option 6040, the "Work" mode is currently configured to silence notifications from the applications listed in an application list 6042 (e.g., whereas notifications from non-listed applications are allowed). The application list 6042 include a plus affordance 7054 for adding additional applications to the application list 6042 (e.g., via a user input 6054 on the plus affordance 6044). FIG. 6B shows the application list 6042 currently includes an application T, an application B, an application S, an application D, an application X, and an application Z. The applications listed in the application list 6042 include respective affordances for removing respective applications from the application list 6042. For example, the minus affordance 6052 can be selected to remove the application D from the application list 6042. The user interface 6003 also include a "Done" affordance 6040 for exiting the user interface 6003 (e.g., after the user has finished configuring the application-related settings for the "Work" mode via the user interface 6003).

Figures 6C, 6D:
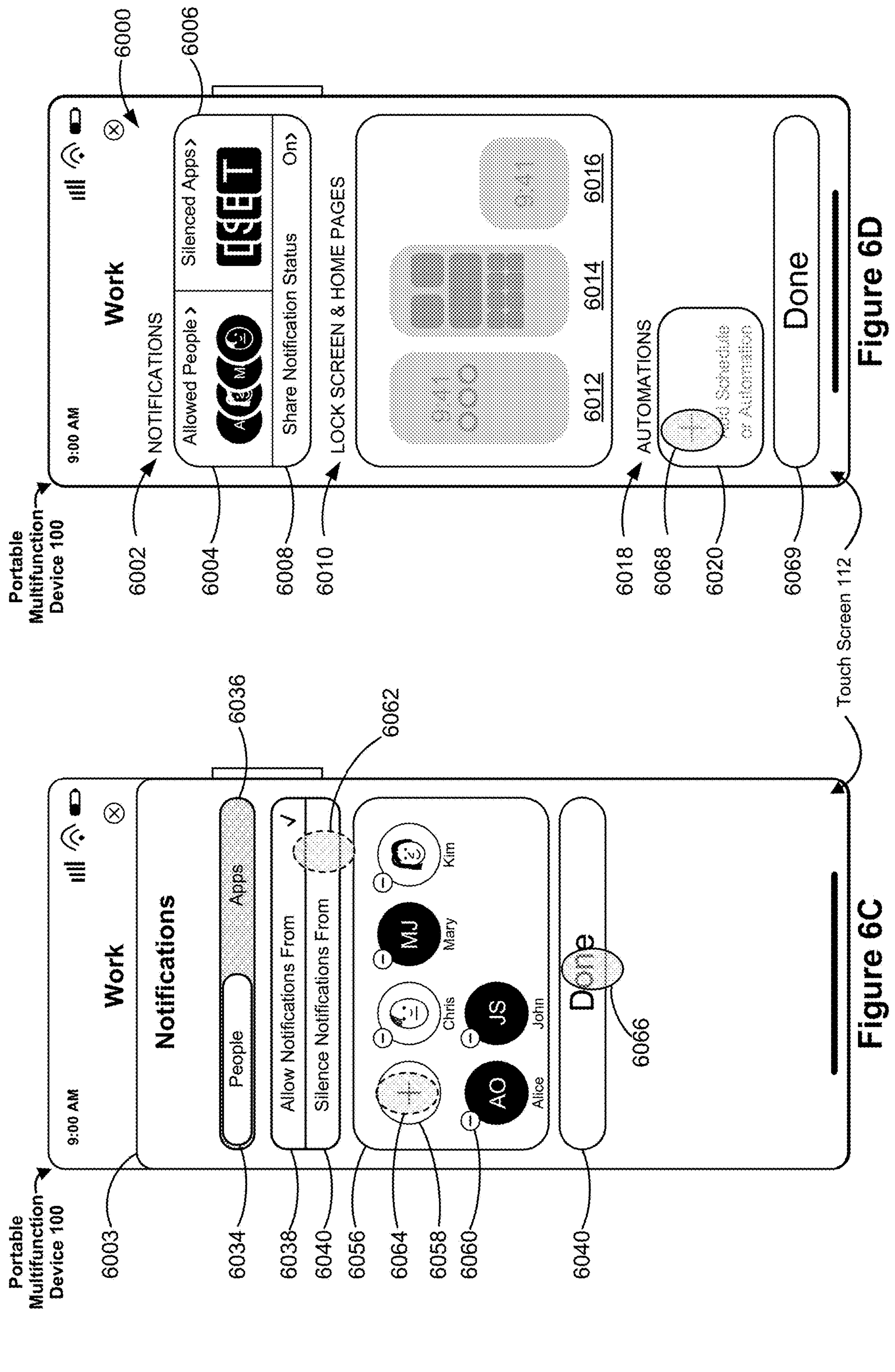
Figure 6F:
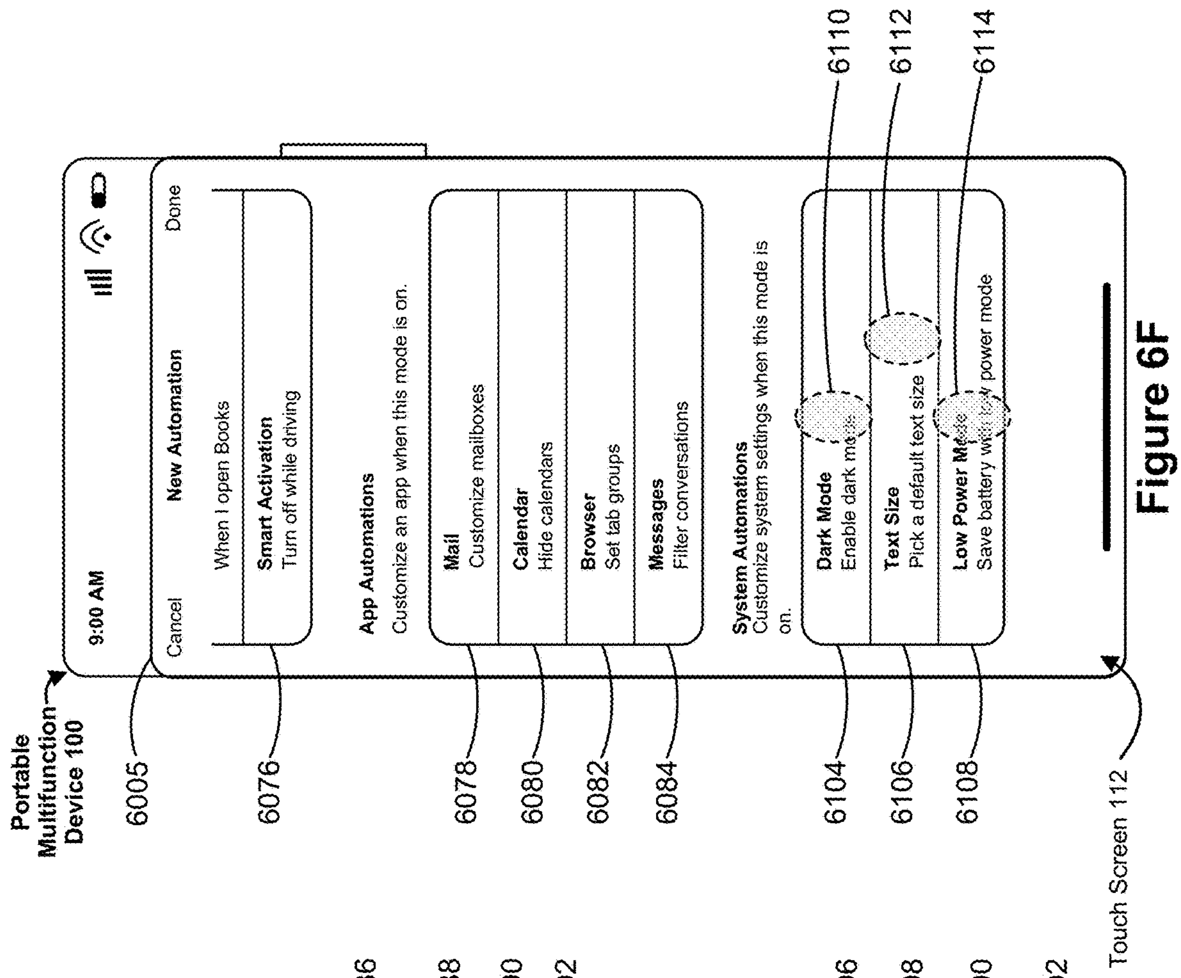

In response to detecting a user input 6050 (FIG. 6B) on the "People" option 6034, and as shown in FIG. 6C, the user interface 6003 transitions to displaying contact-related options for the "Work" mode. The contact-related options for the "Work" mode are analogous to the application-related options for the "Work" mode described above with reference to FIG. 6B. FIG. 6C shows that the "Allow Notifications From" option 6038 is selected, so notifications associated with the contacts listed in a contact list 6056 are allowed (e.g., will be delivered and/or displayed) while the "Work" mode is active. The contact list 6056 includes a plus affordance 6058 for adding additional contacts to the contact list 6056 (e.g., via a user input 6064 on the plus affordance 6058). Contacts in the contact list 6056 includes respective minus affordances for removing respective users from the contact list 6056. For example, a minus affordance 6060 can be used to remove Alice from the contact list 6056. After configuring the contact-related settings for the "Work" mode, the user can exit the user interface 6003 via a user input 6066 on the "Done" affordance 6040.

As shown in FIG. 6D, after the user has configured the contact-related settings for the contacts section 6004, and the application-related settings for the applications section 6006, the visual appearance of the contacts section 6004 and the applications section 6006 updates with a black background to indicate these sections have been configured. In FIG. 6D, the unconfigured sections of the user interface 6001 are displayed with white or grey backgrounds, while the configured sections are displayed with black backgrounds. In some embodiments, the unconfigured sections are displayed in black and white, and configured sections are displayed in color. In some embodiments, the unconfigured settings are displayed with a monochromatic appearance (e.g., with an appearance that includes only a single color), and the configured sections are displayed with a polychromatic appearance (e.g., with an appearance that includes a plurality of colors).

Figure 6E:
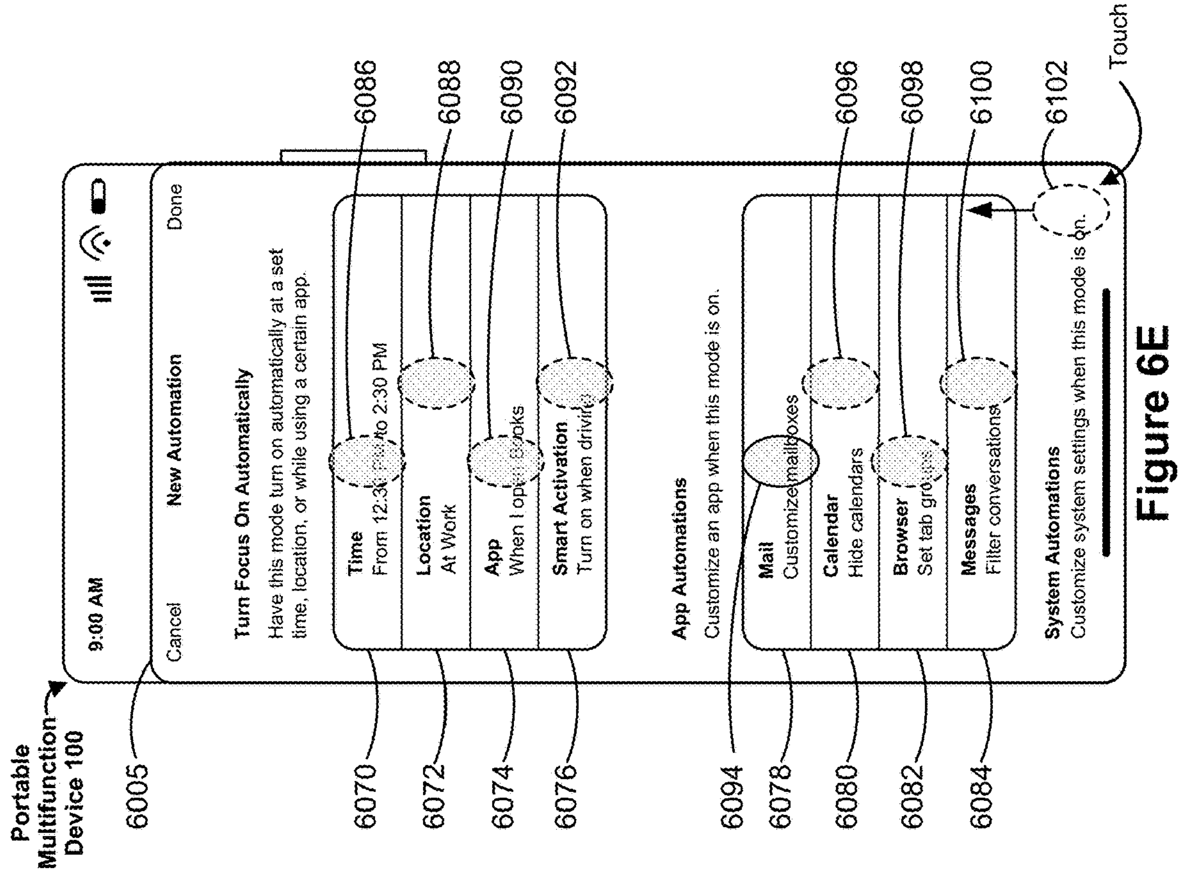
Figure 6H:
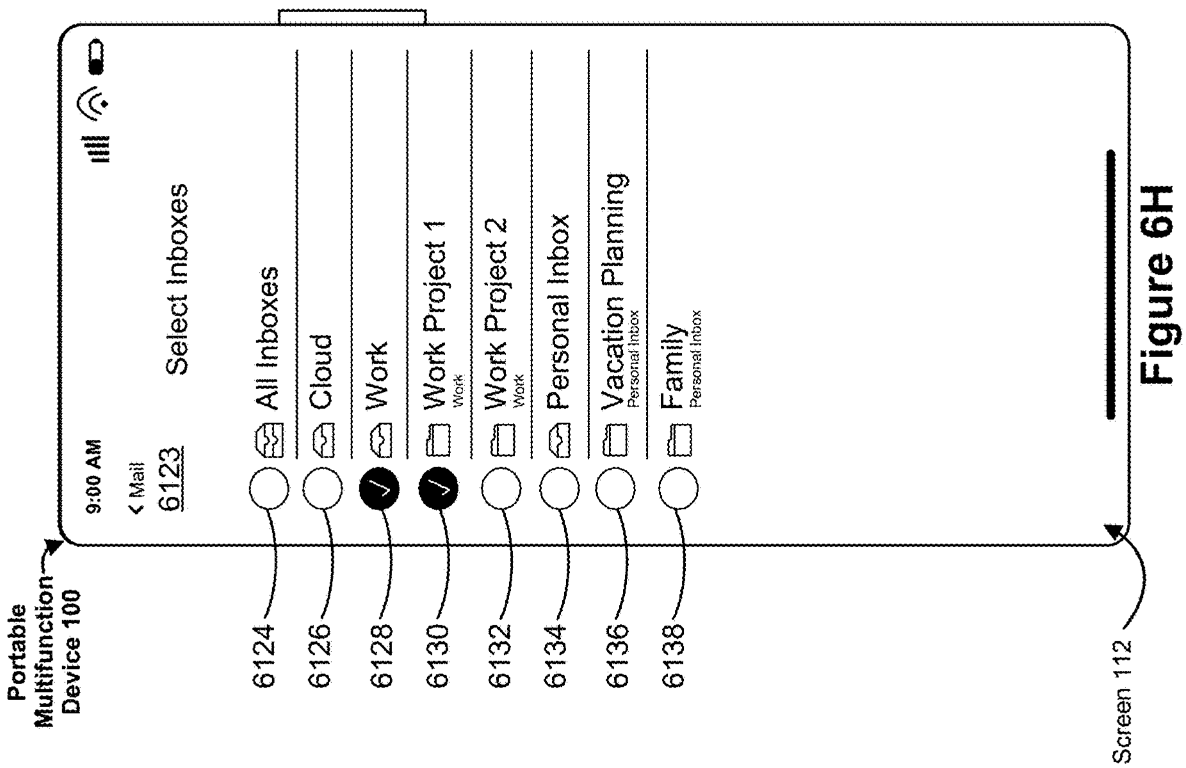

As shown in FIG. 6E, in response to detecting a user input 6068 (FIG. 6D) on the add automation affordance 6020, the portable multifunction device 100 displays a user interface 6005 for configuring automation settings for the "Work" mode. The automation settings include timing settings 6070 (e.g., for automatically activating the "Work" mode at one or more specified times, or for automatically activating the "Work" modes if the current time is between a specified start time and end time), location settings 6072 (e.g., for automatically activating the "Work" mode when the portable multifunction device is at a specified location), application criteria 6074 (e.g., for automatically activating the "Work" mode when a specified application is in use), and smart activation criteria 6076 (e.g., for automatically activating the "Work" mode when the portable multifunction device 100 detects that the user is driving (e.g., based on location data, or based on a Bluetooth connection with a vehicle)). The user can configure these settings via a user input 6086, 6088, 6090, and 6092, respectively.

The user interface 6005 also includes automation settings for configuring what content is emphasized by default when certain applications are in use when the "Work" mode is active. In some embodiments, emphasizing content includes displaying the content without displaying content that is not emphasized. In some embodiments, emphasizing content includes changing a level of prominence (e.g., a brightness, a text size, and/or a border thickness) of emphasized content relative to content that is not emphasized. In some embodiments, emphasizing content includes changing an order in which content is displayed (e.g., emphasized content is displayed above content that is not emphasized).

For example, detecting a user input 6094 on or directed to a mail setting 6078 displays a user interface 6116 for configuring which inboxes are emphasized by default in a mail application when the "Work" mode is active. Detecting a user input 6096 on or directed to a calendar setting 6080 displays a user interface 6140 for configuring which calendars display content that is emphasized by default while the "Work" mode is active. Detecting a user input 6098 on or directed to a browser setting 6082 displays a user interface 6162 for configuring a default tab group (e.g., that includes one or more web pages) to display by default when a web browser application is launched while the "Work" mode is active. Detecting a user input 6100 on a messages setting 6084 displays a user interface 6184 for configuring a list of users for which messages will be emphasized while the "Work" mode is active.

As shown in FIG. 6F, the user interface 6005 includes automation settings for adjusting additional settings for the portable multifunction device while the "Work" mode is active. For example, detecting a user input 6110 on a dark mode setting 6104 configures a dark mode to be automatically enabled while the "Work" mode is active. While the dark mode is enabled, a brightness of one or more user interface elements is decreased relative to other user interface elements on the display (e.g., and without dimming or reducing a brightness of the display itself). Detecting a user input 6112 on a text size setting 6106 configures a text size for user interface elements while the "Work" mode is active. Detecting a user input 6114 on a low power mode setting 6108 configures a low power mode to be enabled while the "Work" mode is active. While the low power mode is active, the portable multifunction device 100 prioritizes conserving battery power, and certain functions of the portable multifunction device 100 are limited or disabled while the low power mode is active. For example, while the low power mode is active, the portable multifunction device 100 may reduce the frequency at which certain applications (e.g., a mail application) are refreshed (e.g., to retrieve new email messages).

Figure 6G:
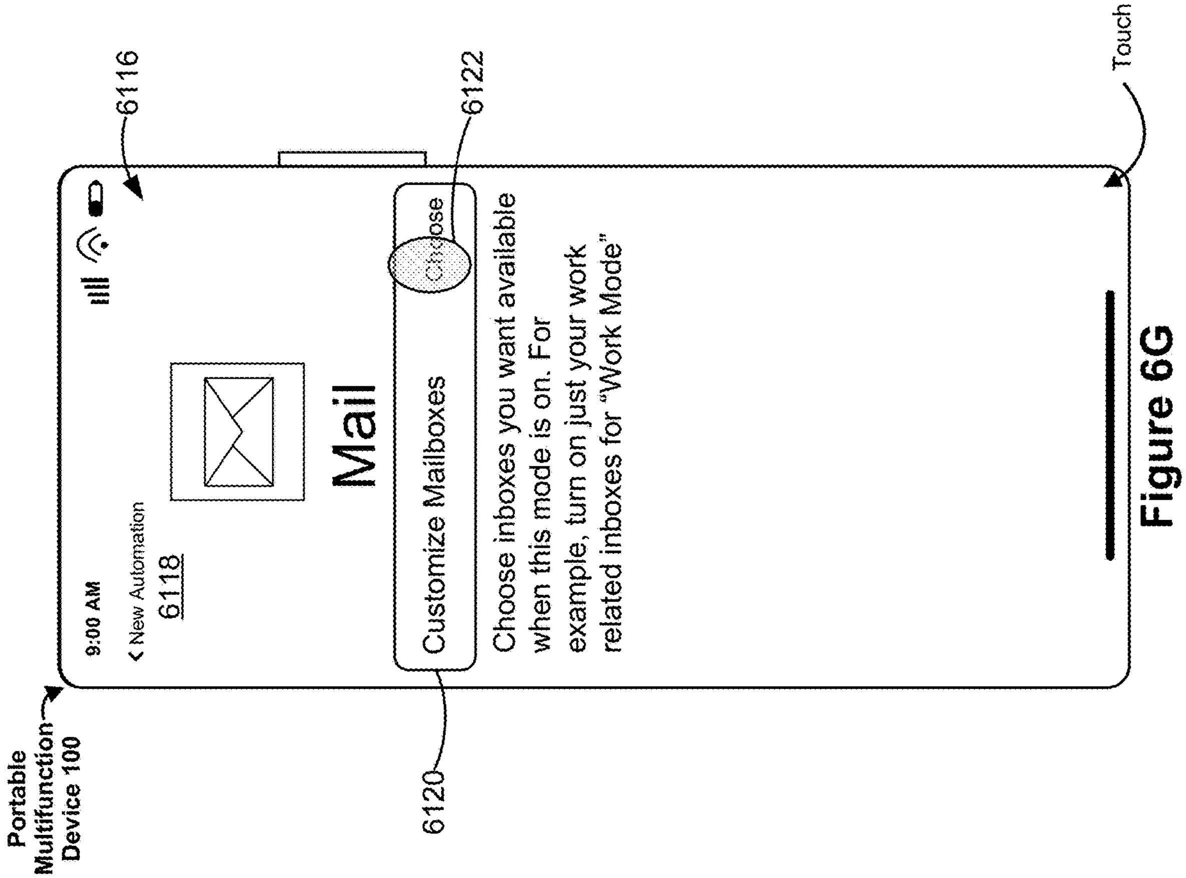
Figure 6J:
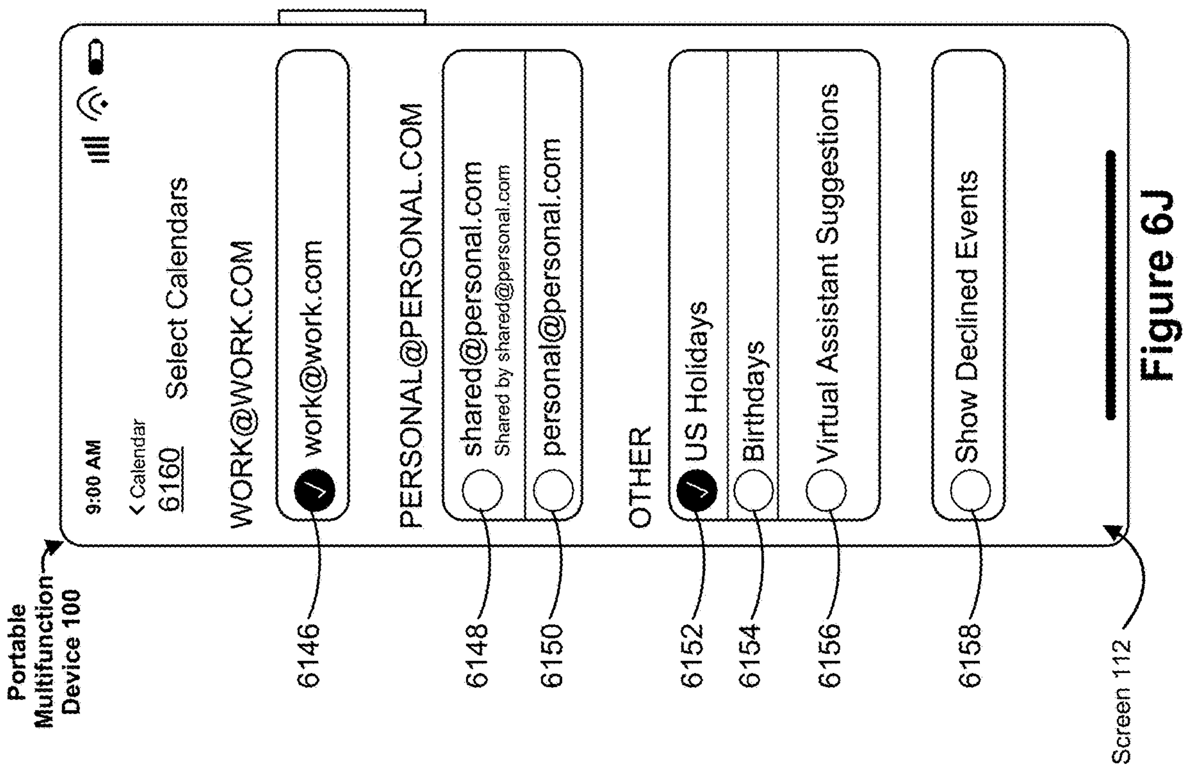

In response to the user input 6094 on the mail setting 6078 (FIG. 6E), and as shown in FIG. 6G, the portable multifunction device 100 displays the user interface 6116 for configuring settings of a mail application while the "Work" mode is active. The user interface 6116 includes a brief description of the available automations for the mail application. The user can select an affordance 6120 via a user input 6122, for configuring one or more inboxes which will be emphasized by default while the "Work" mode is active.

FIG. 6H shows various options for selecting one or more inboxes for which content will be emphasized by default while the "Work" mode is active. The options include an "All Inboxes" option 6124 (e.g., for emphasizing all content for the mail application while the "Work" mode is active), a "Cloud" inbox option 6126 (e.g., for a cloud-based inbox), a "Work" inbox option 6128 (e.g., for an inbox associated with a work email), a "Work Project 1" folder option 6130 (e.g., for an individual folder associated with the work email), a "Work Project 2" folder option 6132 (e.g., for a folder different from "Work Project 1," associated with the work email), a "Personal Inbox" option 6134 (e.g., for an inbox associated with a personal email), a "Vacation Planning" folder option 6136 (e.g., for an individual folder associated with the personal email), and a "Family" folder option 6138 (e.g., for a folder different from "Vacation Planning," associated with the personal email). The "Work" inbox option 6128 and the "Work Project 1" option 6130 are selected, so content from the "Work" inbox and the "Work Project 1" folder will be emphasized by default while the "Work" mode is active. After selecting one or more inboxes, the user can return the user interface 6116 by selecting an affordance 6123, and after returning to the user interface 6116 (shown in FIG. 6G), the user can return to the user interface 6005 (in FIG. 6E) by selecting an affordance 6118.

Figure 6I:
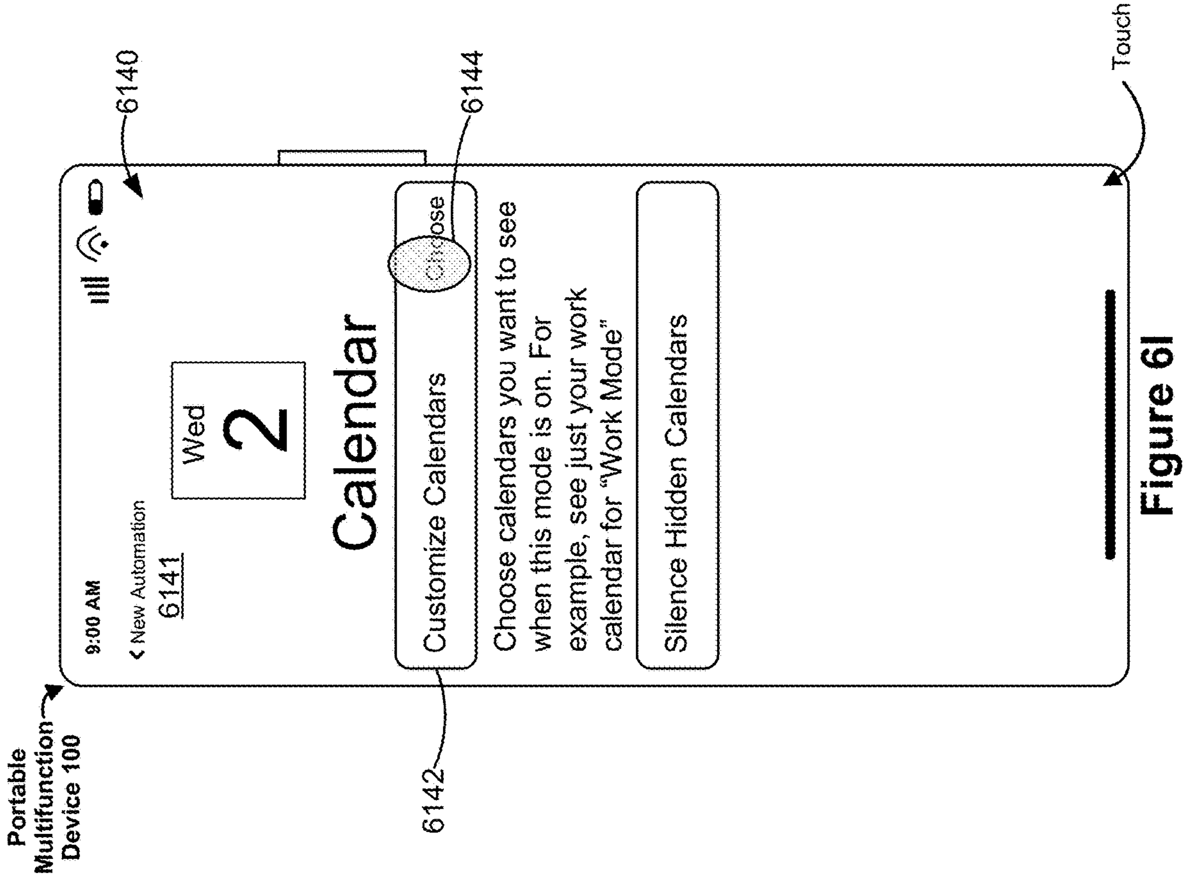

Returning to FIG. 6E, in response to detecting the user input 6096 on the calendar setting 6080, the portable multifunction device 100 displays the user interface 6140 for configuring settings of a calendar application while the "Work" mode is active, as shown in FIG. 6I. The user interface 6140 includes a brief description of the available automations for the calendar application. As shown in FIG. 6I, the user can select an affordance 6142 via a user input 6144, for configuring one or more calendars for which content will be emphasized by default while the "Work" mode is active.

FIG. 6J shows various options for selecting which calendars for which content will be emphasized by default while the "Work" mode is active. The options include a work email option 6146 (e.g., for a work email), a shared email option 6148 (e.g., for emails shared with a personal account), and a personal email option 6150 (e.g., for a personal email). In some embodiments, the options also include external content, such as a holidays option 6152 (e.g., based on an external calendar that identifies US holidays), a birthday option 6154 (e.g., based on information stored on the portable multifunction device 100), and a virtual assistant option 6156 (e.g., that suggests content from a virtual assistant). The options also include a "Show Declined Events" option 6158, for configuring whether declined events appear as emphasized content while the "Work" mode is active. After selecting one or more calendars, the user can return the user interface 6140 by selecting an affordance 6160, and after returning to the user interface 6140 (shown in FIG. 6I), the user can return to the user interface 6005 (in FIG. 6E) by selecting an affordance 6141.

Figure 6K:
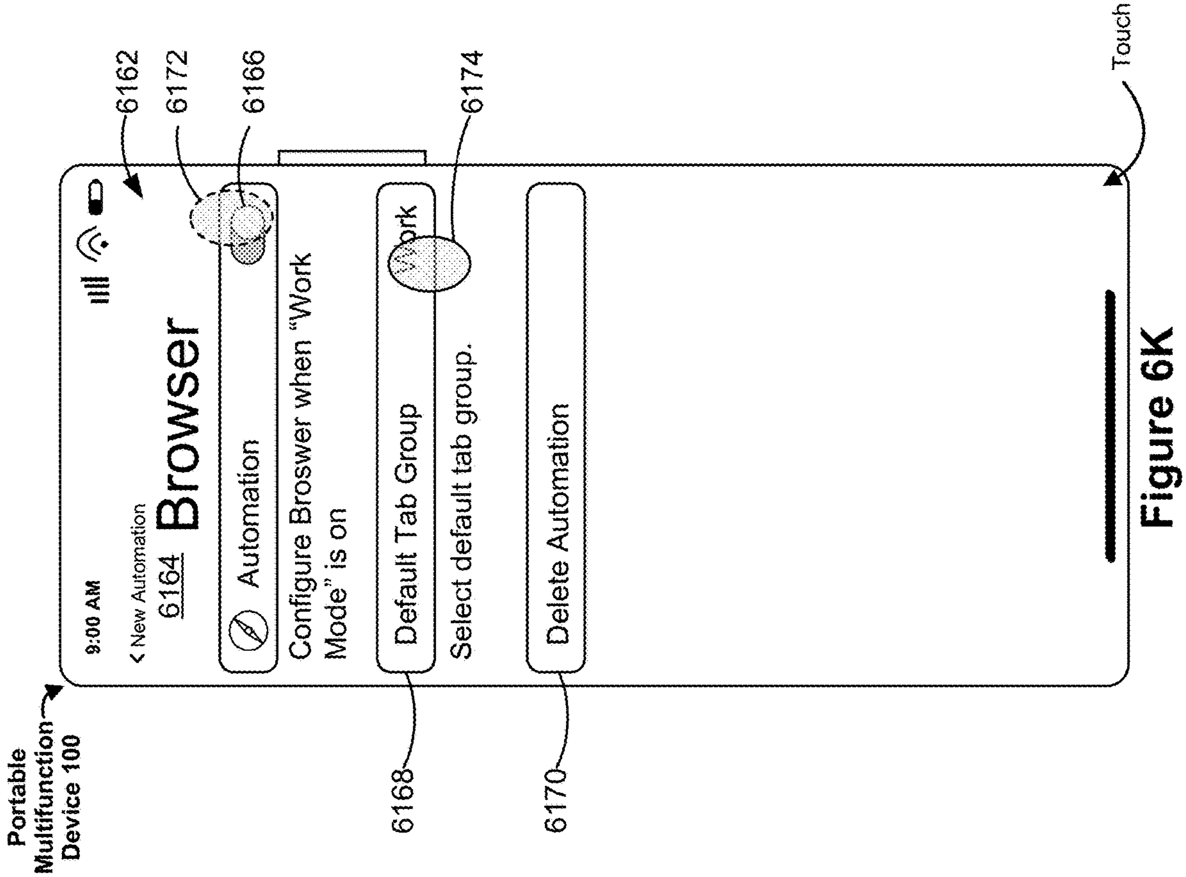

Returning to FIG. 6E, in response to detecting the user input 6098 on the browser setting 6082, the portable multifunction device 100 displays the user interface 6162 for configuring settings of a web browser application while the "Work" mode is active, as shown in FIG. 6K. The user interface 6162 includes a toggle 6166, which can be toggled by a user input 6172, for enabling or disabling emphasized content in the web browser application while the "Work" mode is active, and an affordance 6170 deleting the current automation for the web browser application.

Figure 6L:
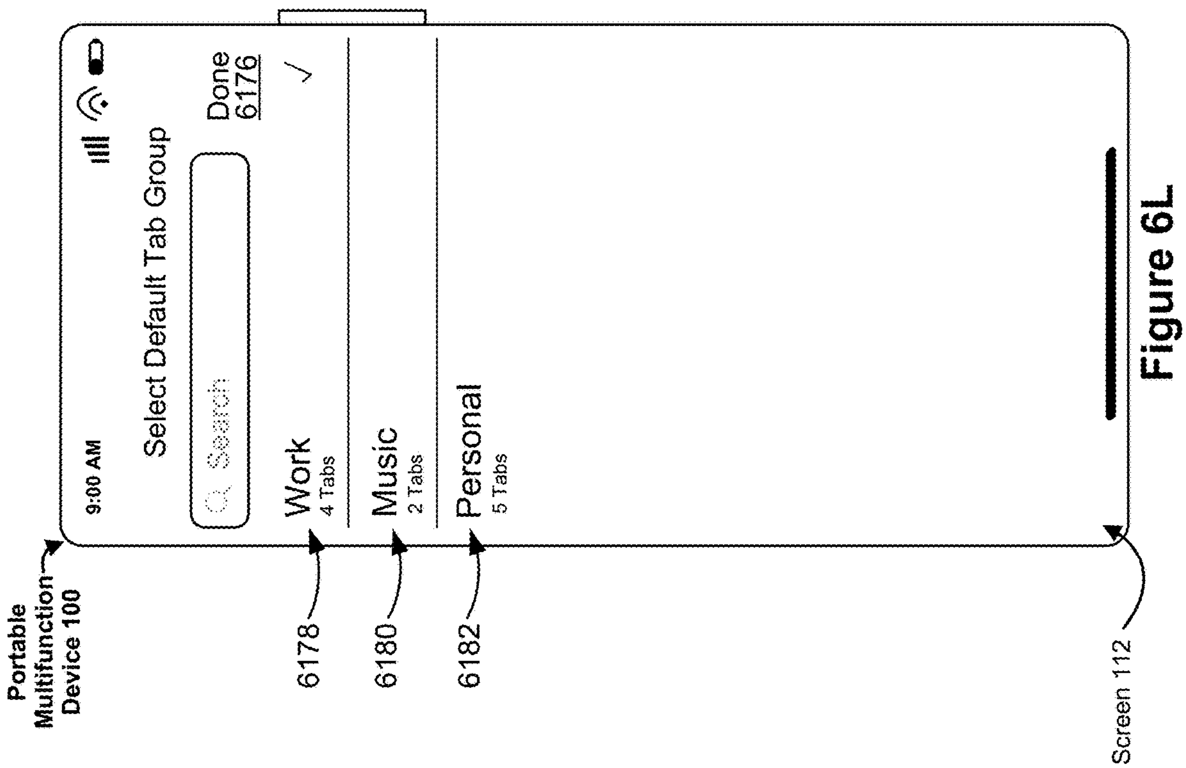
Figure 6N:
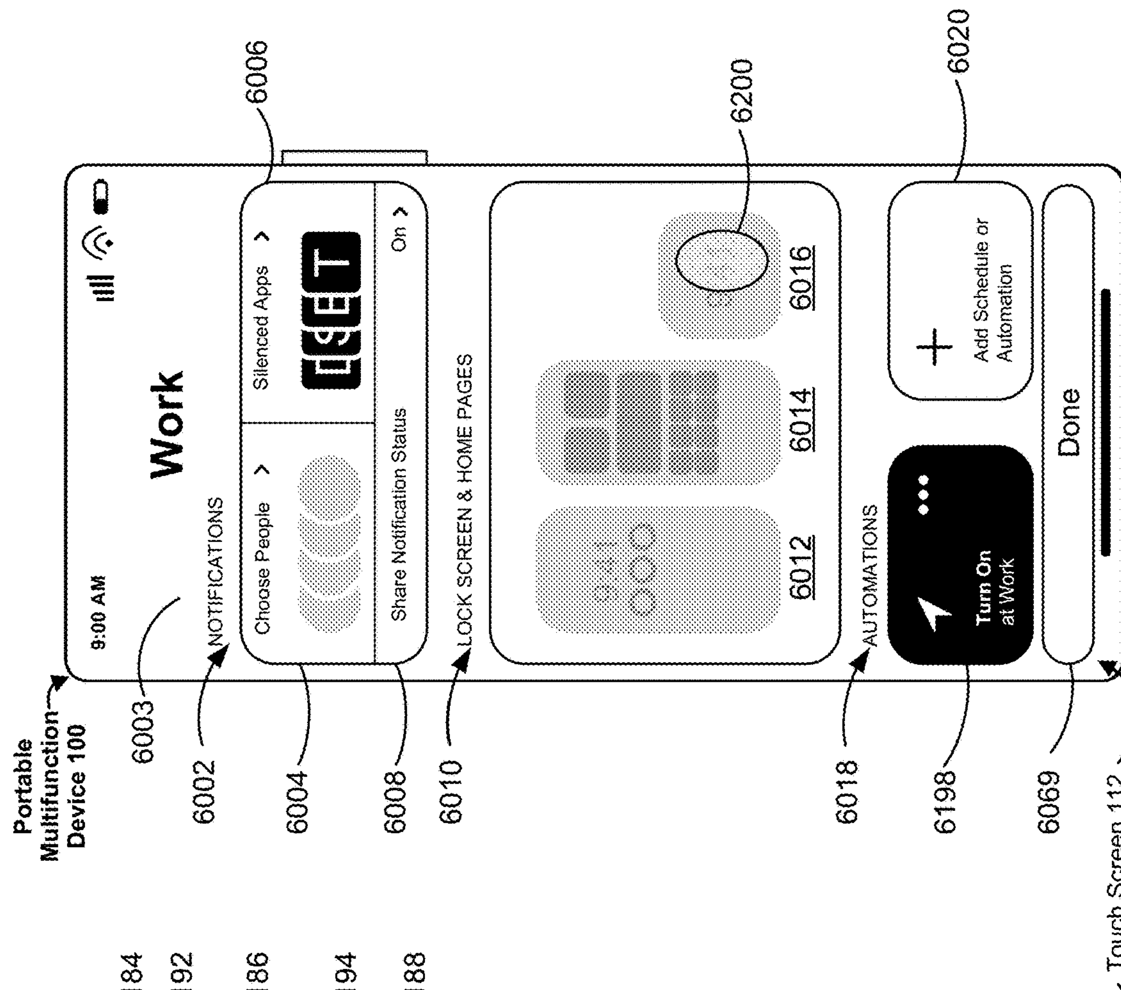

The user can select an affordance 6168 via a user input 6174, and as shown in FIG. 6L, to select a default tab group which will be emphasized by default while the "Work" mode is active. As shown in FIG. 6L, the user can select between a "Work" tab group 6178, a "Music" tab group 6180, and a "Personal" tab group 6182. As shown by the checkmark next to the "Work" tab group 6178, the user has selected the "Work" tab group to be the default tab group for which content will be emphasized by default while the "Work" mode is active. After selecting a default tab group, the user can return the user interface 6162 by selecting an affordance 6160, and after returning to the user interface 6160 (shown in FIG. 6K), the user can return to the user interface 6005 (in FIG. 6E) by selecting an affordance 6164.

Figure 6M:
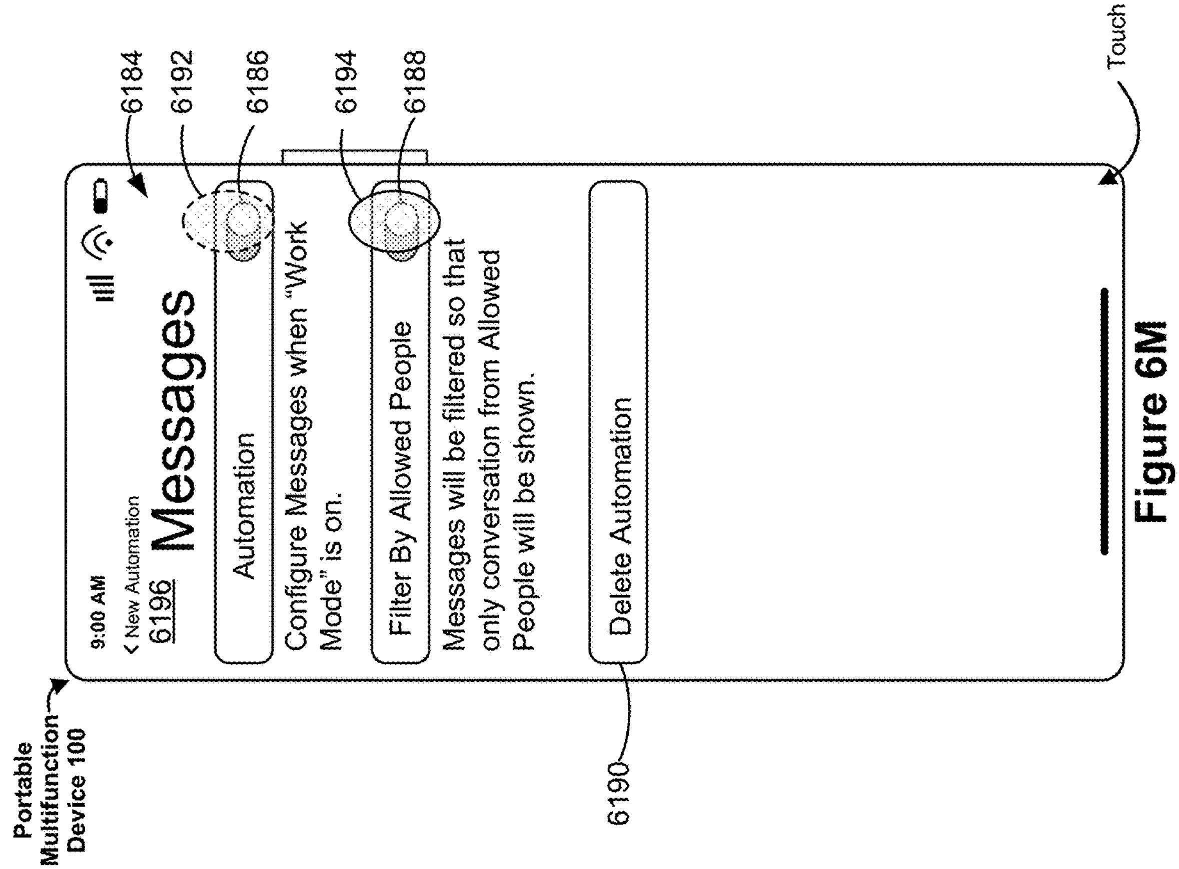
Figure 6P:
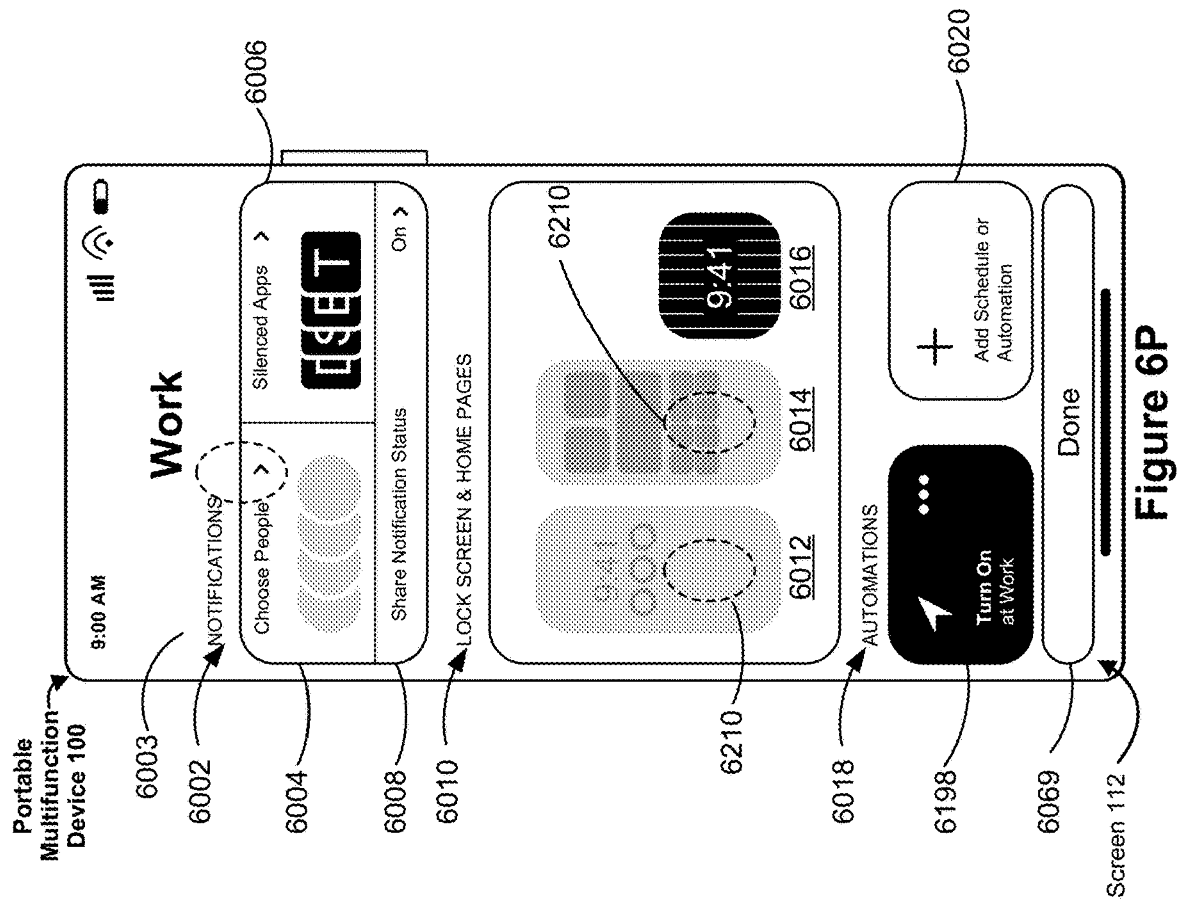

Returning to FIG. 6E, in response to detecting the user input 6100 on the messages setting 6084, the portable multifunction device 100 displays the user interface 6184 for configuring settings of a messaging application while the "Work" mode is active, as shown in FIG. 6M. The user interface 6184 includes a toggle 6186, which can be toggled by a user input 6192, for enabling or disabling emphasized content in the messaging application while the "Work" mode is active; a toggle 6188, which can be toggled by a user input 6194, for configuring whether or not to use the settings of the contacts section 6004 to determine how to emphasize content in the messaging application while the "Work" mode is active; and an affordance 6190 deleting the current automation for the messaging application. After configuring the settings for the messaging application, the user can return to the user interface 6005 (in FIG. 6E) by selecting an affordance 6196.

FIG. 6N shows that after configuring automations for the "Work" mode, the user interface 6003 updates to include an automation indicator 6198. In some embodiments, as shown in FIG. 6N, the new automation affordance 6020 is not visually updated (e.g., replaced by the automation indicator 6198) so that the user can add new automations (e.g., at a later time, or when reconfiguring the settings of the "Work" mode).

Figure 6O:
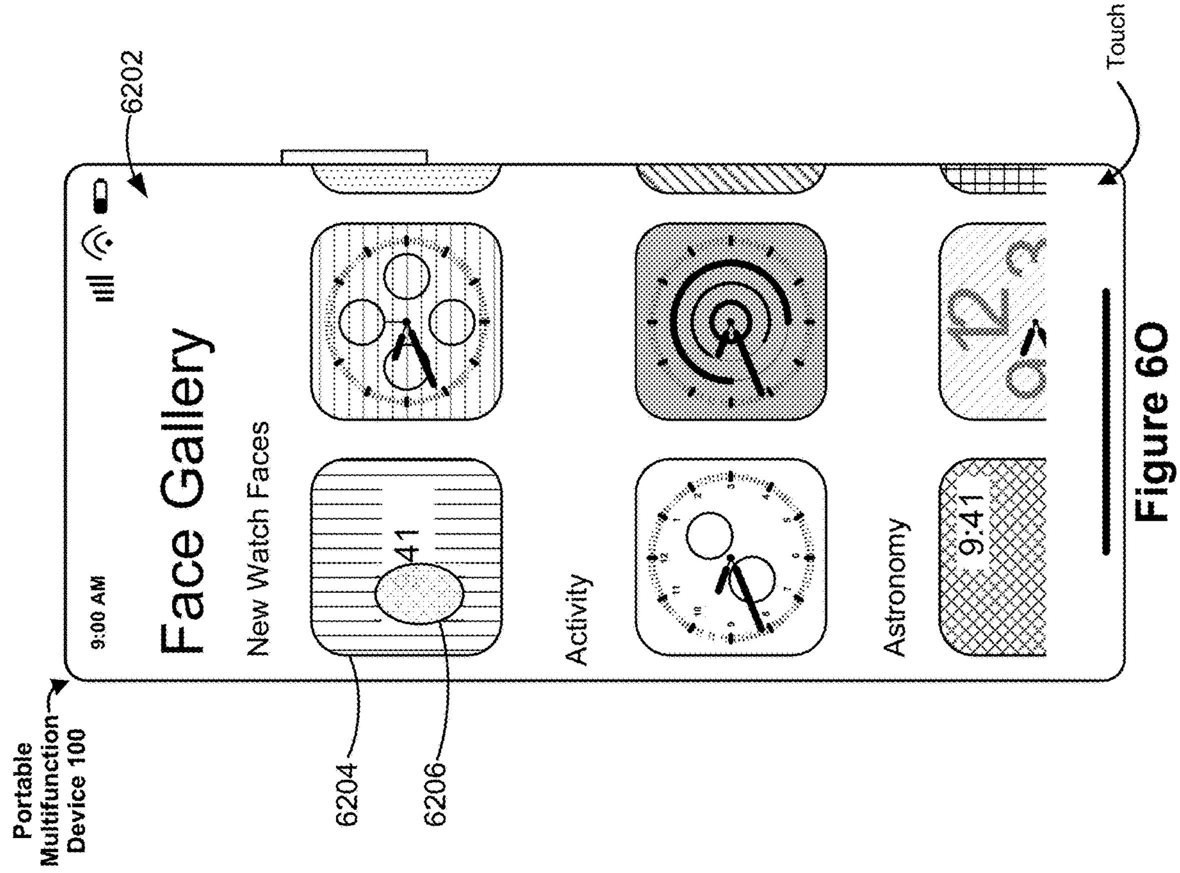

In response to detecting a user input 6200 (FIG. 6N) on the second device setting 6916, and as shown in FIG. 6O, the portable multifunction device 100 displays a user interface 6202 for selecting a user interface for the second device 5001. In some embodiments, the user interface 6202 includes user interfaces that are preconfigured (e.g., default user interfaces) or have been previously configured by the user (e.g., via an application associated with the second device 5001). This allows the user to select a user interface for the second device 5001, without being overwhelmed by too many available options (e.g., by reducing the cognitive burden on the user as the user is already configuring a focus mode).

The user may select a user interface 6204 via the user input 6206. In response, the portable multifunction device redisplays the user interface 6003, as shown in FIG. 6P. As shown in FIG. 6P, the second device section 6016 is updated with a visual representation of the user interface 6204 selected for the second device 5001.

Figures 1, 6Q:
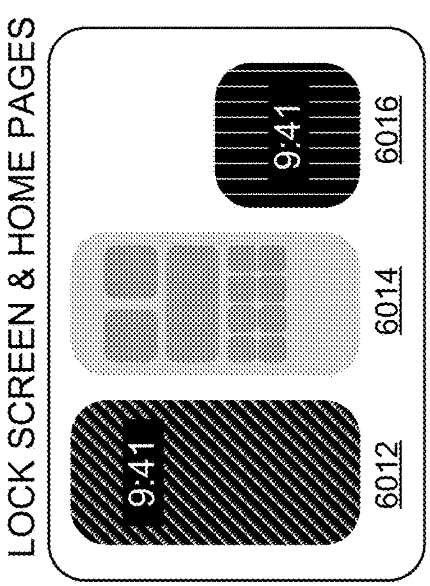
Figures 2, 6Q:
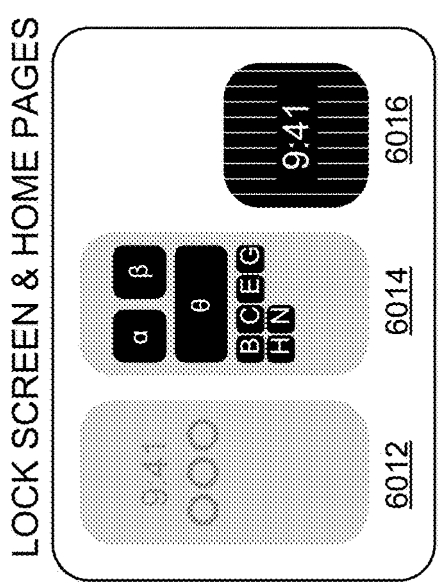

The user can optionally continue to configure the remaining sections of the user interface 6003, for example, via the user input 6210 on the wake screen section 6012 (e.g., resulting in the "Lock Screen and Home Pages" section 6010 updating as shown in FIG. 6Q-1), or via the user input 6212 on the home screen section 6014 (e.g., resulting in the "Lock Screen and Home Pages" section 6010 updating as shown in FIG. 6Q-2).

FIG. 6R shows that, if the user does not wish to further configure the "Work" mode, the user can select a "Done" affordance 6069 via a user input 6214 to complete the configuration of the "Work" mode. In some embodiments, in response to the user input 6214 on the "Done" affordance 6069, the portable multifunction device 100 configures the "Work" mode to use default settings for any section the user did not configure (e.g., the wake screen section 6012, and the home screen section 6014). This allows the user to quickly configure sections of interest, without forcing the user to configure every section (e.g., every possible setting) for the "Work" mode before the "Work" mode can be used. In such embodiments (e.g., as shown in FIG. 6D), the "Done" affordance 6069 is displayed as long as at least one section for the focus mode has been configured. In some embodiments, the "Done" affordance is not displayed if the user has not configured any sections for the focus mode (e.g., as shown in FIG. 6A).

FIGS. 7A-7Z illustrate example user interfaces for displaying different content with different degrees of emphasis, by default, and while a focus mode is active, in accordance with some embodiments.

Figure 7B:
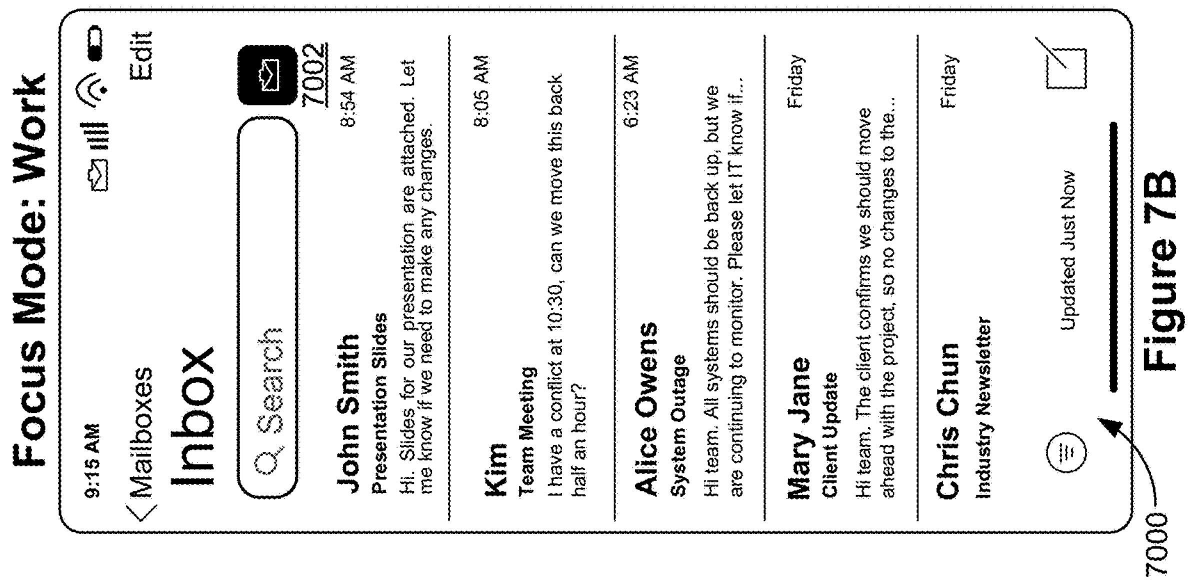
Figure 7C:
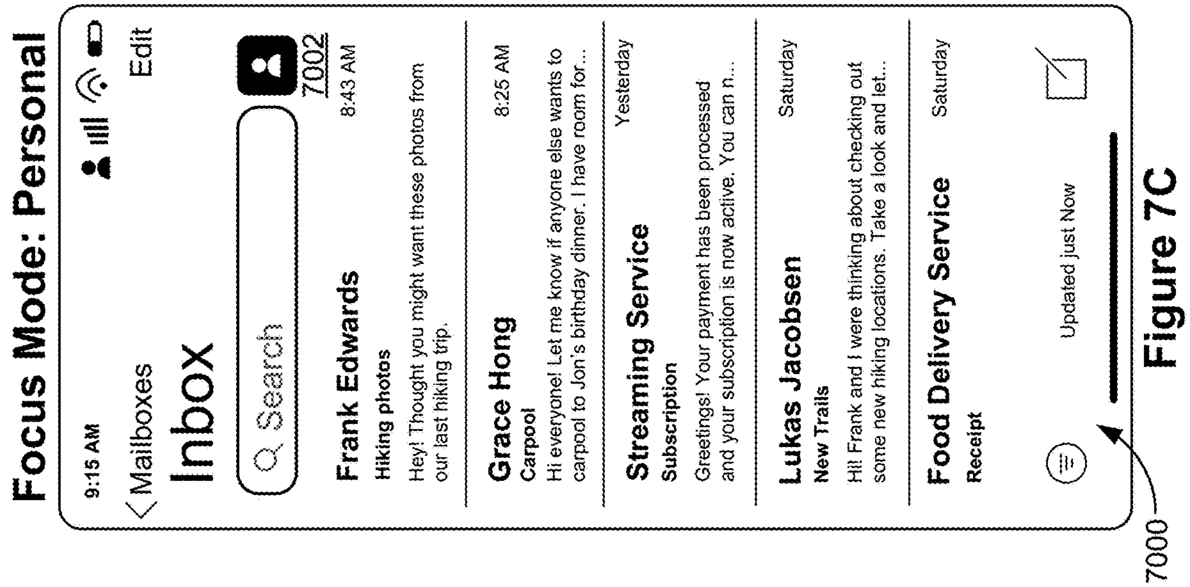

FIGS. 7A-7C show how different content is emphasized in a user interface 7000 for a mail application, based on which focus mode is active for the portable multifunction device 100. For example, in FIG. 7A, no focus mode is active, so all email messages are displayed. In FIG. 7B, the "Work" mode is active, so work-related content is emphasized relative to other content (e.g., email messages from Frank Edwards and Grace Hong are not work-related, and so are not displayed while the "Work" mode is active). In some embodiments, while a focus is active, the user interface 7000 includes a content indicator 7002, which indicates that some content is being emphasized relative to other content (e.g., that some content is not displayed due to the active focus mode). In some embodiments, the content indicator 7002 also includes a visual indication of the active focus mode (e.g., a briefcase indicating the "Work" mode is active). In some embodiments, if no focus mode is active, the content indicator 7002 is not displayed. As shown in FIG. 7C, the "Personal" mode is active, and different content is emphasized (e.g., different email messages are displayed, compared to FIG. 7B) relative to other content (e.g., which is not displayed).

Figures 7D, 7E:
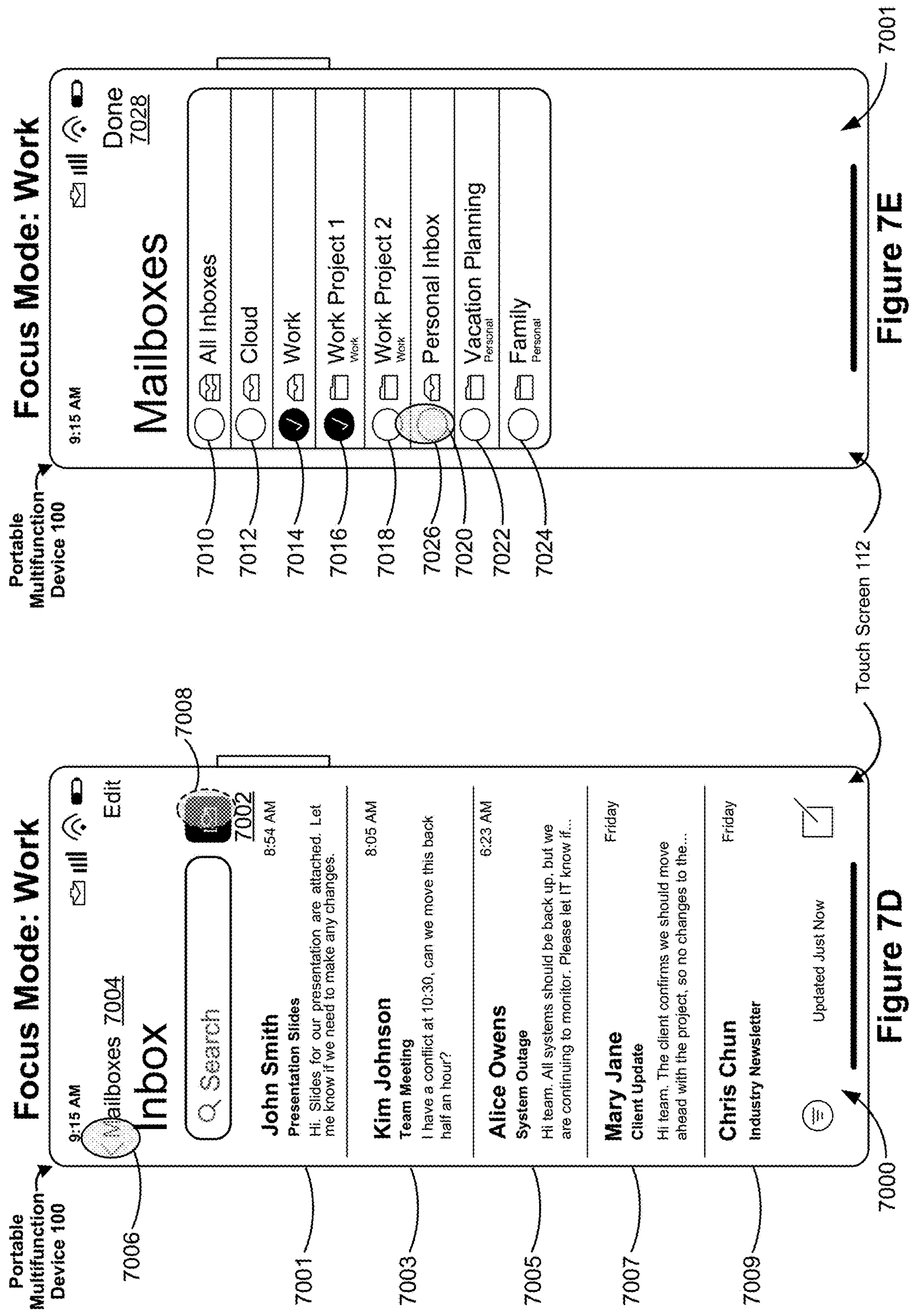

FIG. 7D shows the user interface 7000 in a default state while the "Work" mode is active. Based on settings of the "Work" mode, emails 7001, 7003, 7005, 7007, and 7009 are emphasized (e.g., displayed) relative to other content (e.g., which is not displayed). FIG. 7D also shows that the content indicator 7002 is a toggle. In response to a user input 7008 on the content indicator 7002, the portable multifunction device ceases to emphasize some content relative to other content (e.g., and displays the content as shown in FIG. 7A, when no focus mode is active). As an alternative, the user can also select the "Mailboxes" affordance 7004 for more nuanced control over the emphasized content.

As shown in FIG. 7E, in response to detecting the user input 7006, the portable multifunction device 100 displays the available inboxes. The "Work" inbox 7014 and the "Work Project 1" folder 7016 are already selected (e.g., as they were selected by the user in FIG. 6H, while configuring the "Work" mode). The user selects the "Personal" inbox 7020 via a user input 7026.

Figure 7G:
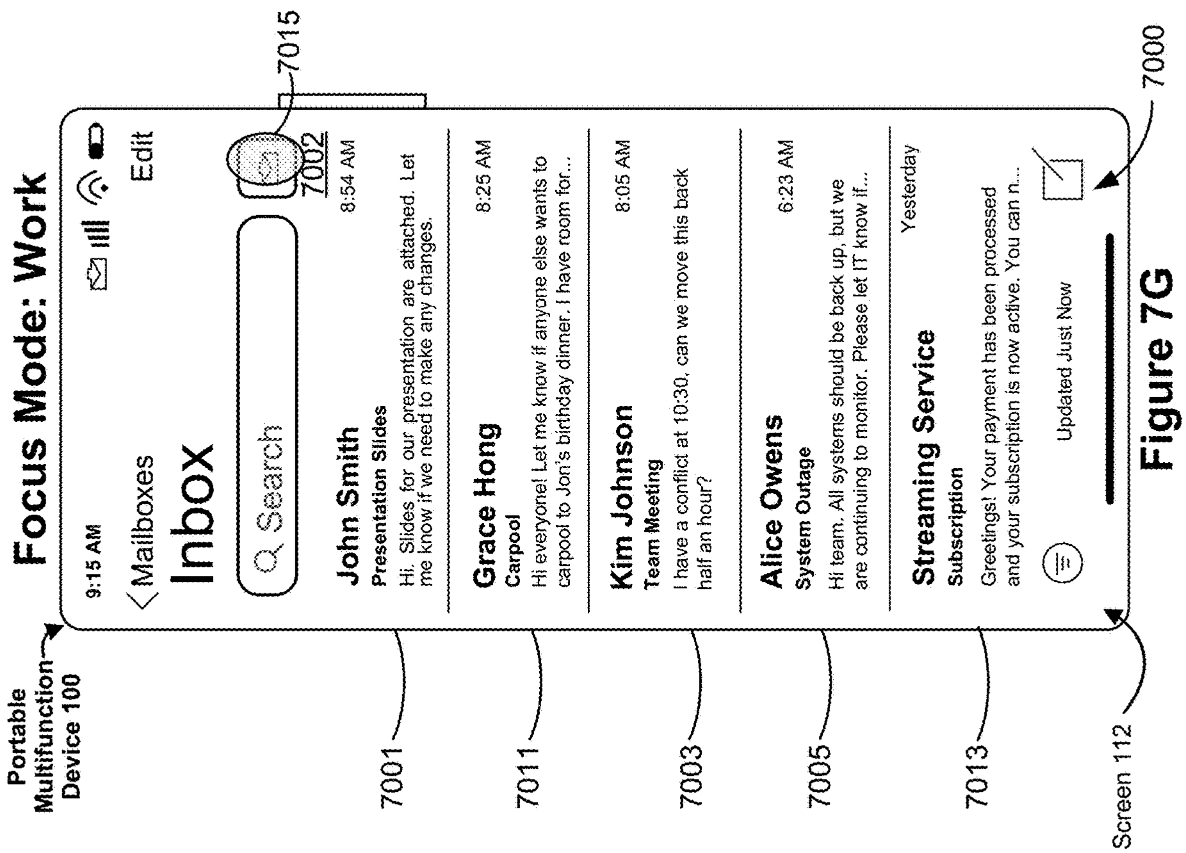
Figure 7F:
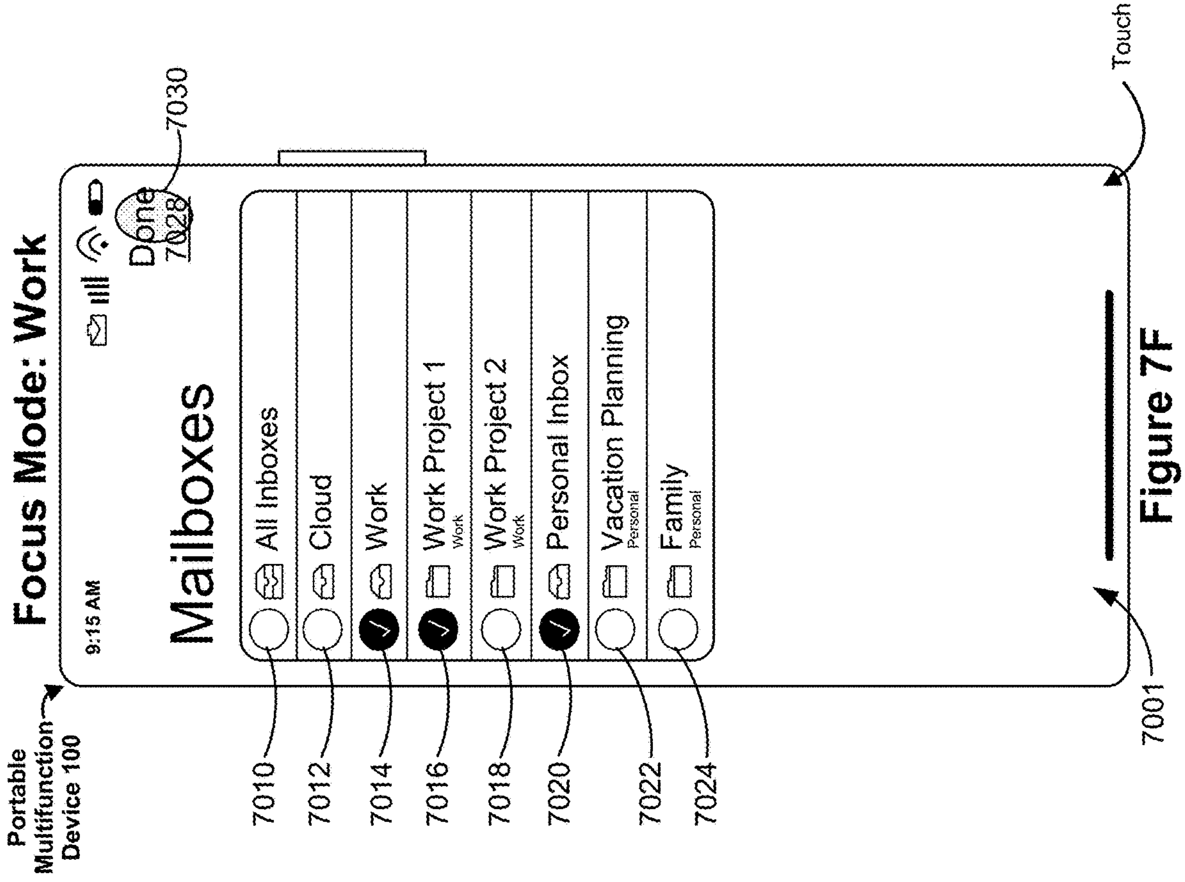

As shown in FIG. 7F, the mailbox user interface 7001 updates to indicate that the "Personal" inbox 7020 has been selected. In response to detecting a user input 7030 on a "Done" affordance 7028, and as shown in FIG. 7G, the portable multifunction device 100 redisplays the user interface 7000. Based on the user's selection in FIGS. 7E and 7F, the user interface 7000 now includes an email 7011 and an email 7013, which were not emphasized by default while the "Work" mode is active. The emails 7001, 7003, and 7005, which were emphasized by default, continue to be emphasized. The emails 7007 and 7009 are not shown in FIG. 7G, but remain emphasized (e.g., would be displayed if the user scrolled the emails in the user interface 7000).

The content indicator 7002 automatically toggles off (as shown by the inverted colors), as the user has manually selected additional content to be emphasized. The focus mode (e.g., "Work" mode), however, remains active (e.g., and so notifications continue to be delivered and displayed in accordance with settings of the focus mode). While the content indicator 7002 is toggled off, a selection input 7015 directed to content indicator 7002 would cause the device to display emphasis of content in accordance with the corresponding focus mode (e.g., "Work" mode) as illustrated in FIG. 7D.

Figure 7H:
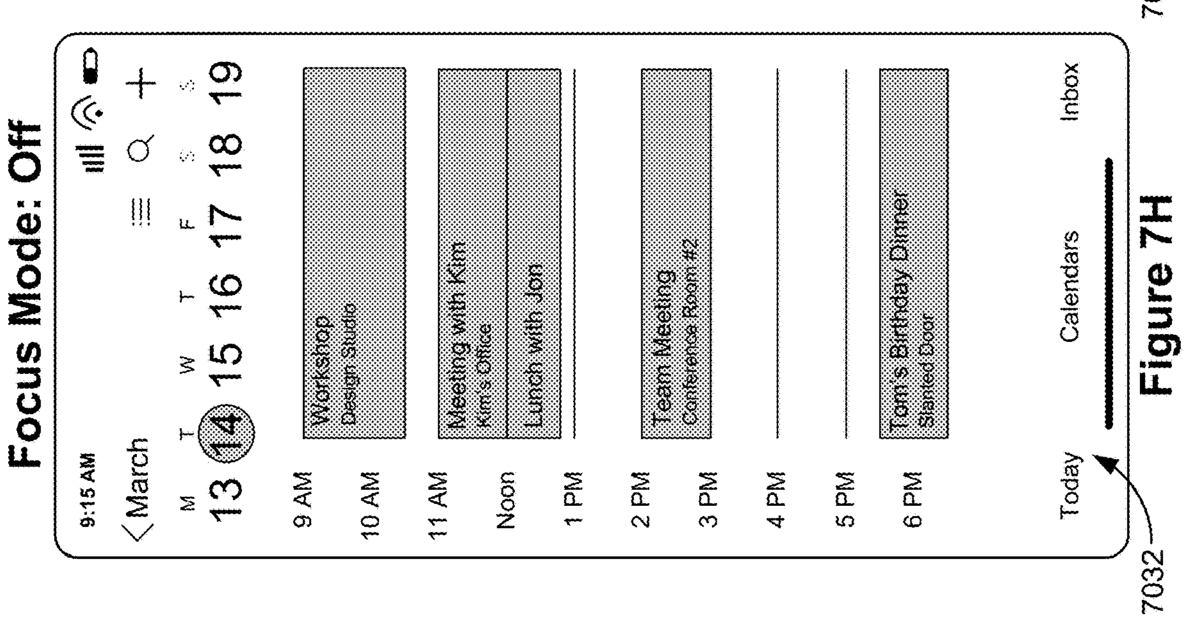
Figure 7I:
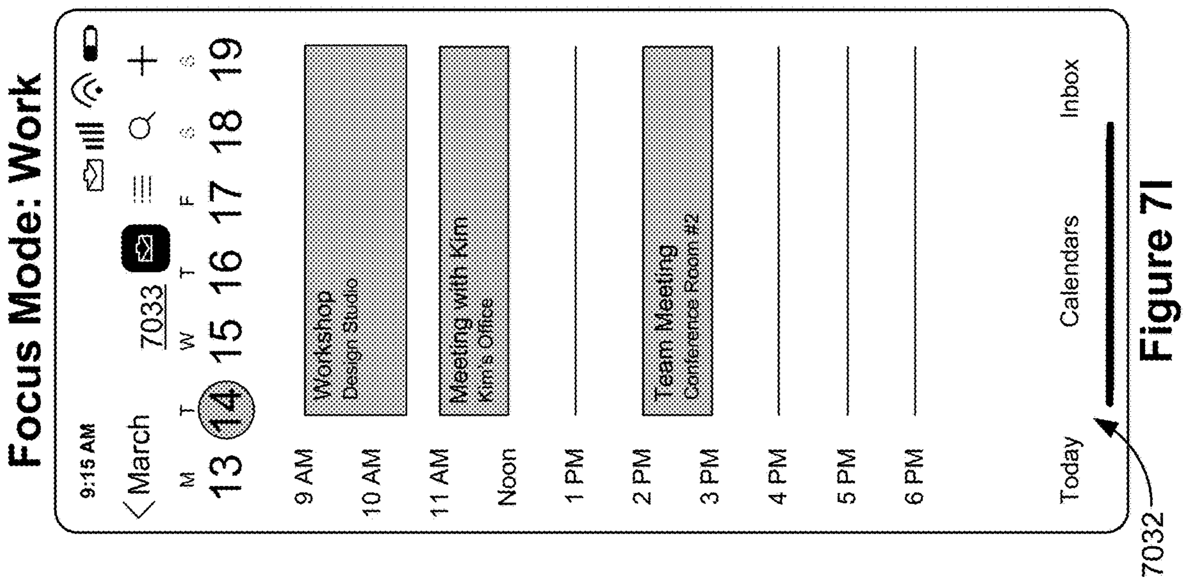
Figure 7J:
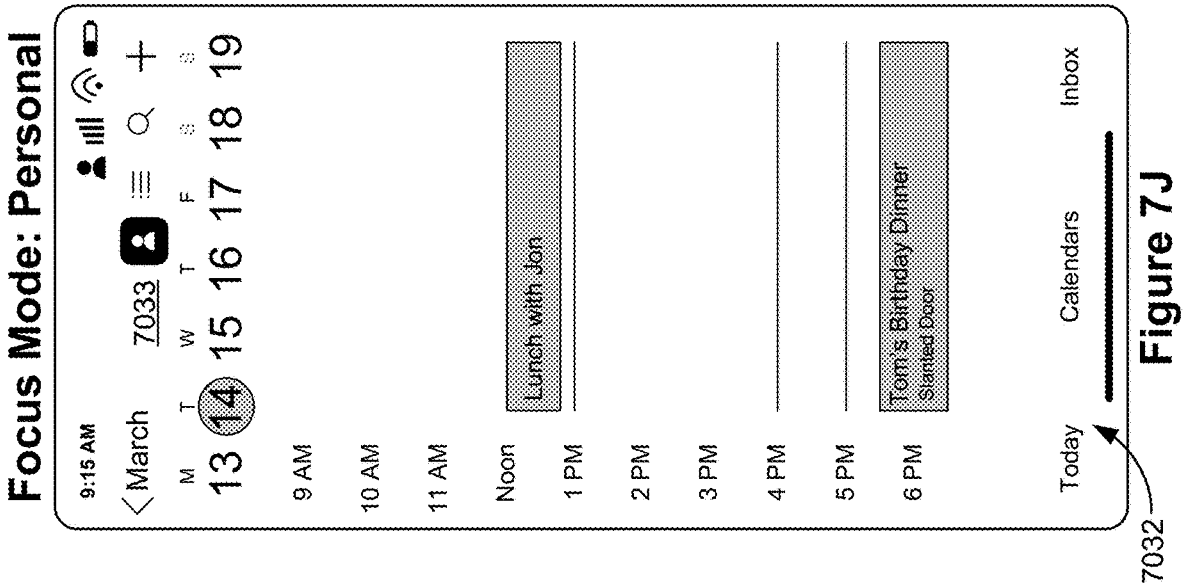

FIGS. 7H-7J show how different content is emphasized in a user interface 7032 for a calendar application, based on which focus mode is active for the portable multifunction device 100. For example, in FIG. 7H, no focus mode is active, so events from all calendars are displayed. In FIG. 7I, the "Work" mode is active, so events from a work calendar are emphasized relative to other content (e.g., the lunch and dinner events are not displayed while the "Work" mode is active). In FIG. 7J, the "Personal" mode is active, and different content is emphasized (e.g., lunch and dinner events are displayed) relative to other content (e.g., the work-related events are not displayed). In some embodiments, the user interface 7032 also includes a content indicator 7033, similar to the content indicator 7002 in FIGS. 7B and 7C which, when selected, causes the device to disable the filtering associated with the active focus mode (e.g., so that calendar events not associated with the focus mode are visible in the calendar application, as illustrated in FIG. 7N).

The content indicator 7033 automatically toggles off (as shown by the inverted colors in FIG. 7N), as the user has manually selected additional content to be emphasized. The focus mode (e.g., "Work" mode), however, remains active (e.g., and so notifications continue to be delivered and displayed in accordance with settings of the focus mode). While the content indicator 7033 is toggled off, a selection input 7063 directed to content indicator 7033 would cause the device to display emphasis of content in accordance with the corresponding focus mode (e.g., "Work" mode) as illustrated in FIG. 7K.

Figure 7K:
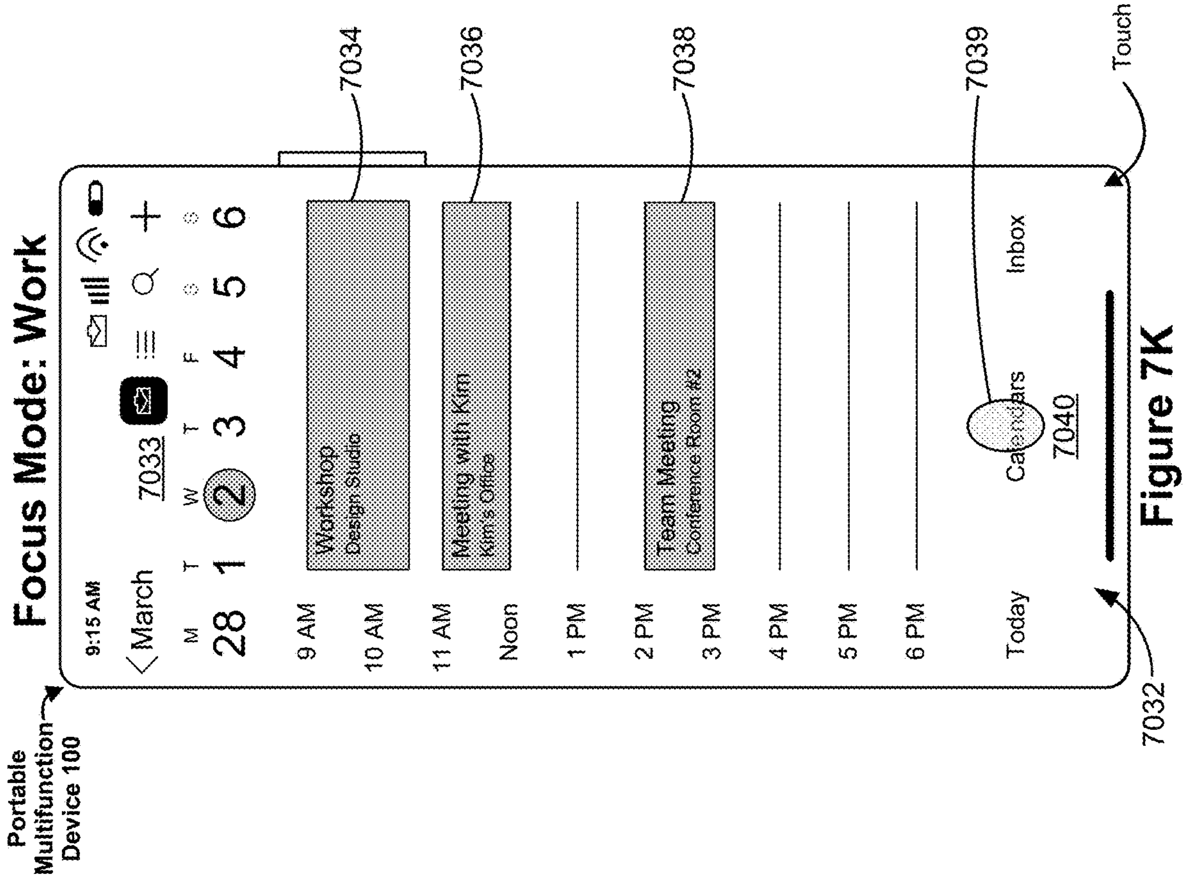
Figure 7L:
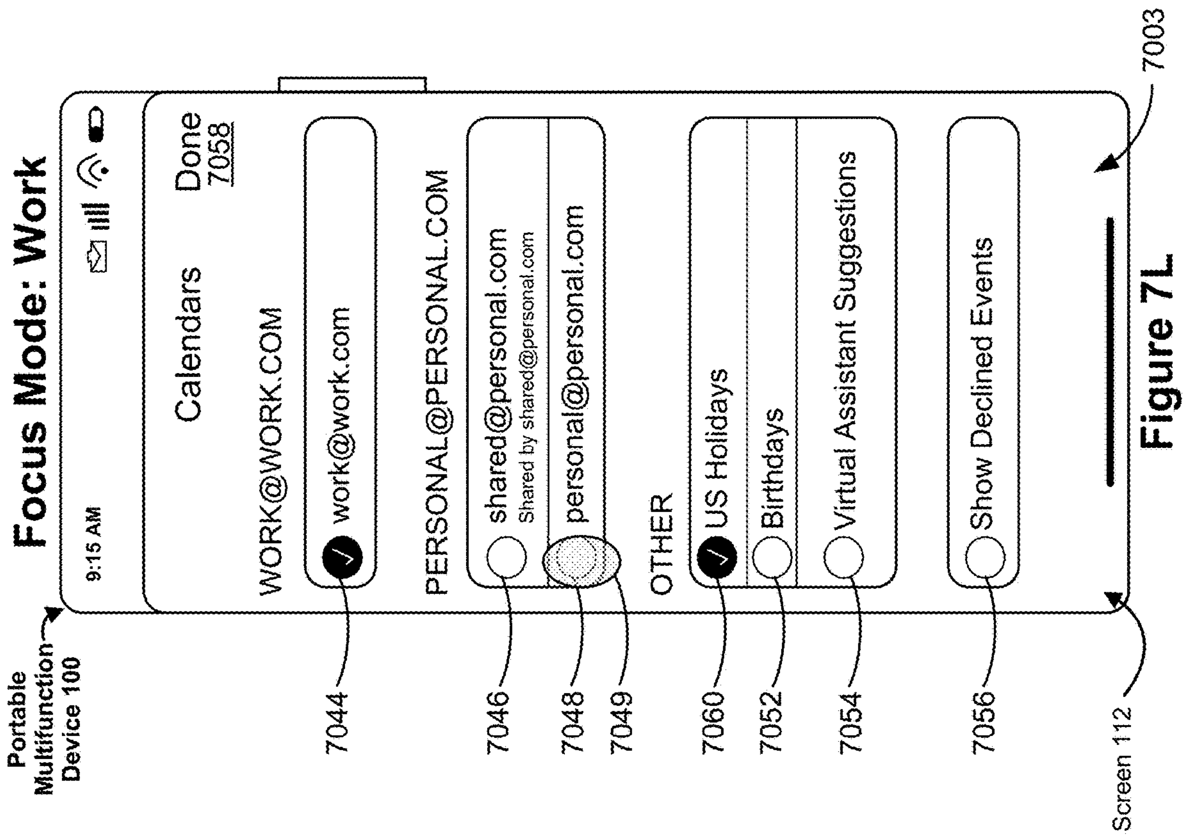
Figure 7N:
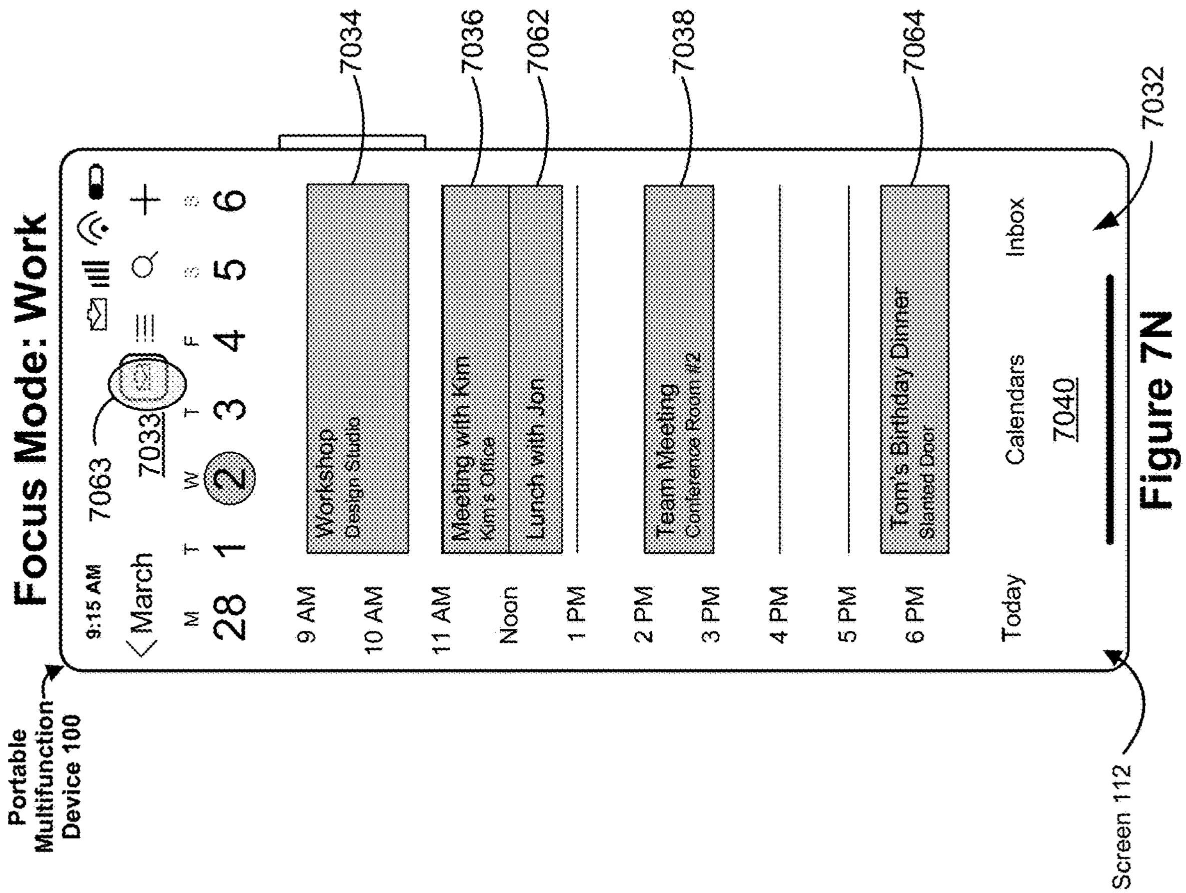

FIG. 7K shows the user interface 7032 in a default state while the "Work" mode is active. Based on settings of the "Work" mode, events 7034, 7036, and 7038 are emphasized (e.g., displayed) relative to other content (e.g., which is not displayed). In response to detecting a user input 7039 on a calendar affordance 7040, and as shown in FIG. 7L, the portable multifunction device 100 displays a calendar user interface 7003 for selecting calendars for which content is emphasized. The calendars selected by default in FIG. 7L correspond to the calendars selected during the initial configuration of the "Work" mode, as shown in FIG. 6J.

In response to detecting a user input 7049 on a personal calendar 7048, and while the "Work" mode remains active, the calendar user interface 7003 is updated to indicate that the personal calendar 7048 has been selected, and events for the personal calendar 7048 will be emphasized.

Figure 7M:
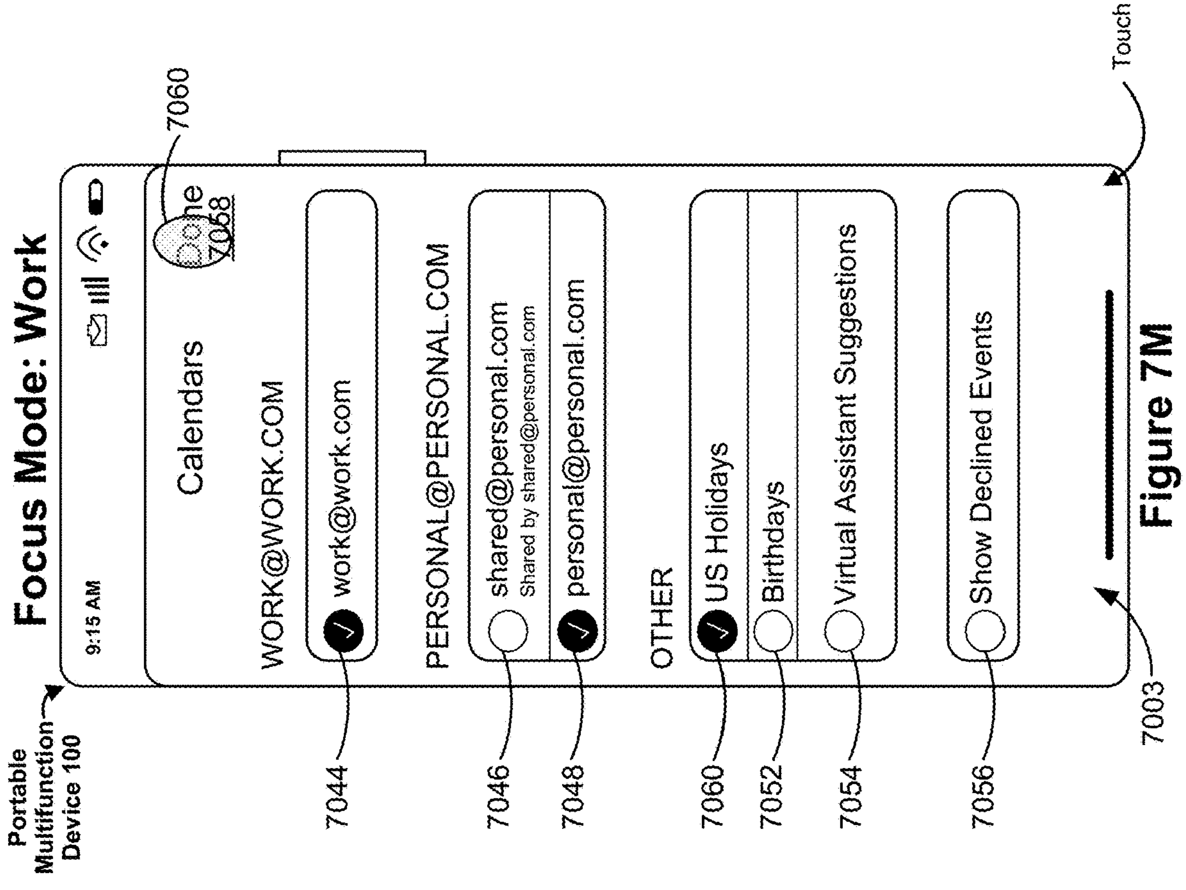

In response to detecting a user input 7060 on a "Done" affordance 7058, and while the "Work" mode remains active, the portable multifunction device 100 redisplays the user interface 7032. Based on the user's selection in FIGS. 7L and 7M, the user interface 7032 now includes an event 7062 and an event 7064, which were not emphasized by default while the "Work" mode is active. The events 7034, 7036, and 7038, which were emphasized by default, continue to be emphasized.

Figure 7O:
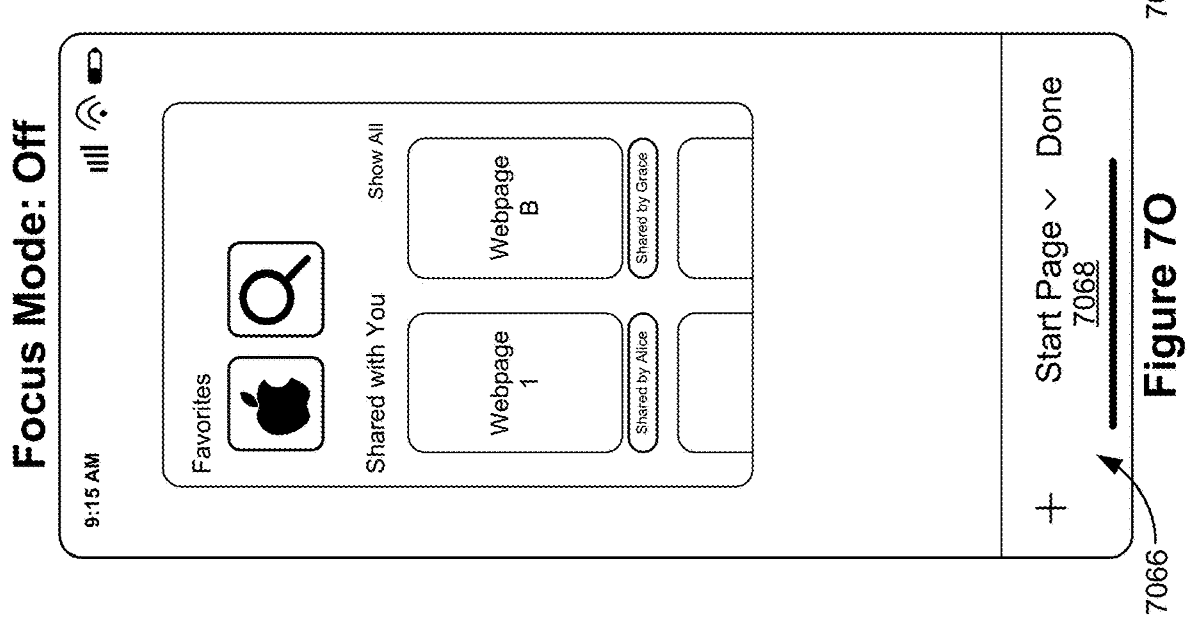
Figure 7P:
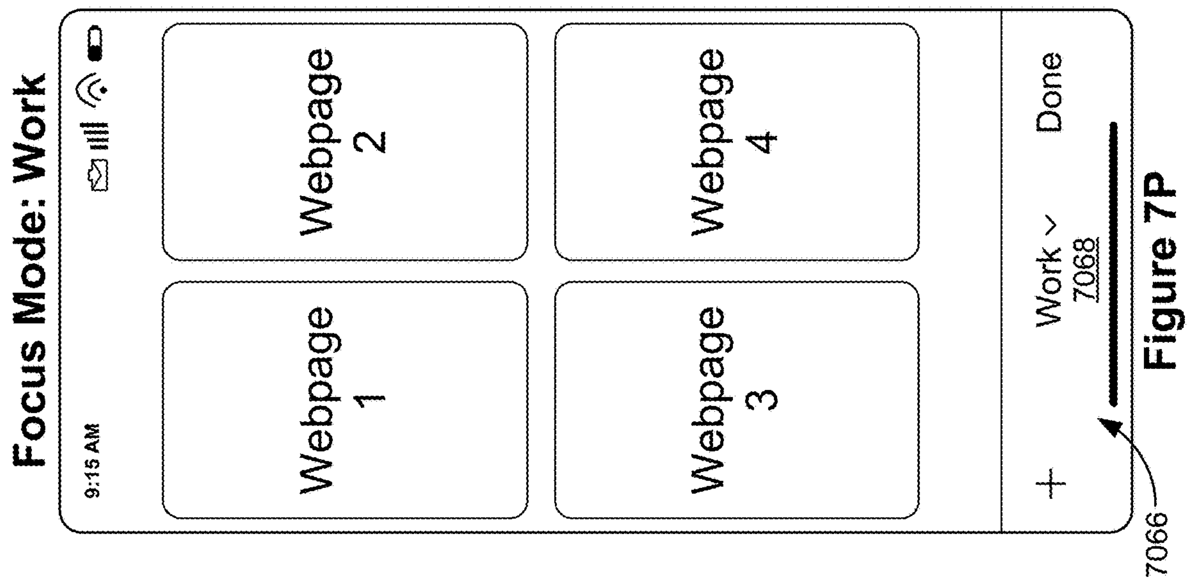
Figure 7Q:
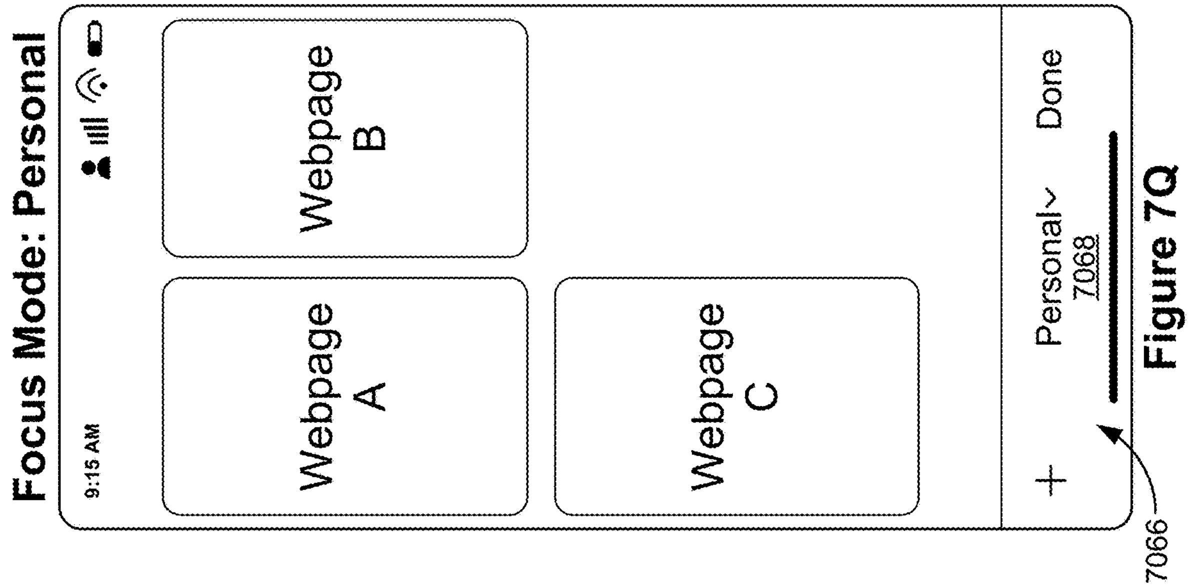

FIGS. 7O-7Q show how different content is emphasized in a user interface 7066 for a web browser, based on which focus mode is active for the portable multifunction device 100. For example, in FIG. 7O, no focus mode is active, so no tab group is displayed by default. A tab group indicator 7068 indicates that the web browser is displaying a start page, and not a specific tab group.

In FIG. 7P, the "Work" mode is active and the web browser displays a work tab group (e.g., as indicated by the tab group indicator 7068) by default, including webpages 1-4. In FIG. 7Q, the "Personal" mode is active and the web browser displays a personal tab group (e.g., as indicated by the tab group indicator 7068) by default, including webpages A-C.

Figure 7S:
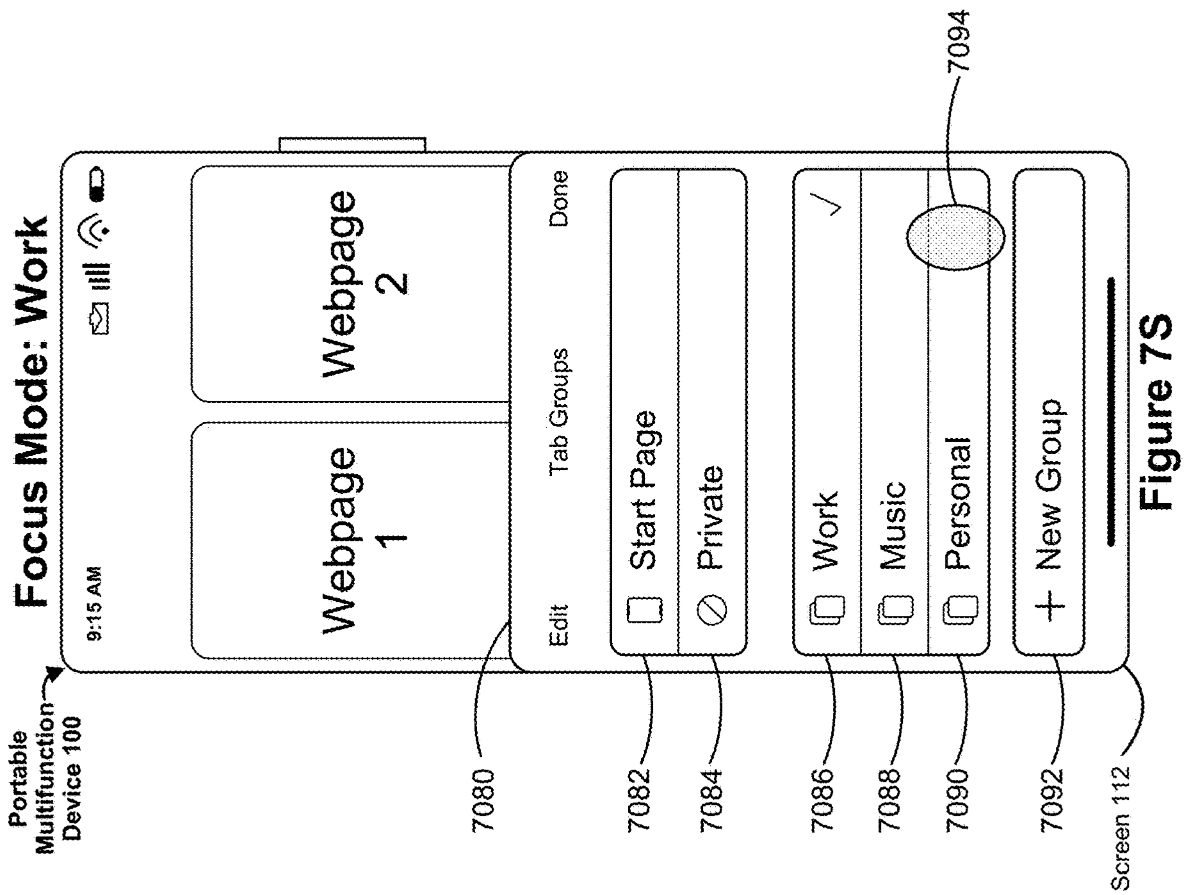
Figure 7R:
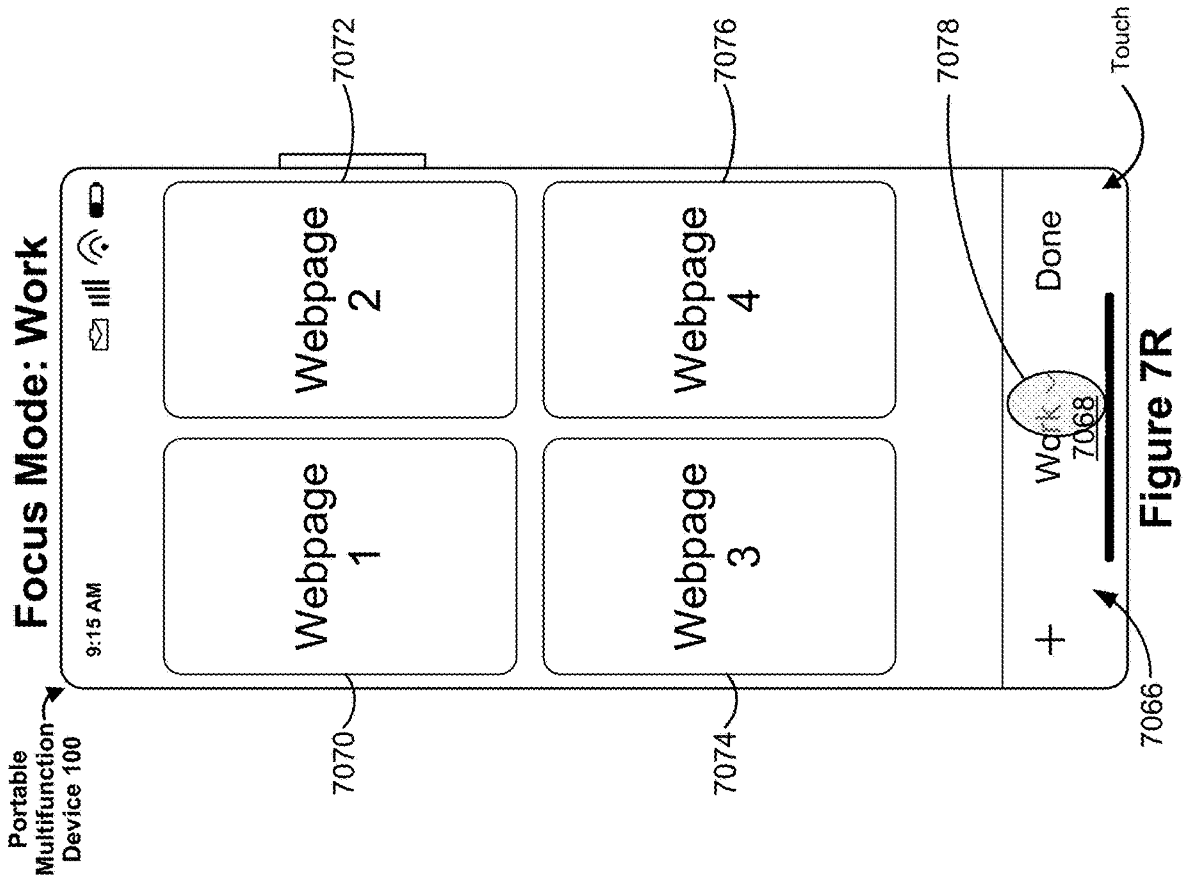

In response to detecting a user input 7078 (FIG. 7R) on the tab group indicator 7068, and as shown in FIG. 7S, the portable multifunction device 100 displays a browser user interface 7080. The browser user interface 7080 includes an option 7082 for opening new tabs (e.g., webpages) without opening an existing tab group, an option 7084 for opening a new tab in a private mode, an option 7086 for opening the "Tab" group (e.g., which is not currently selectable, as the "Work" tab group is already open, as indicated by the checkmark), an option 7088 for opening a "Music" tab group, an option 7090 for opening a "Personal" tab group, and an option 7092 for creating a new tab group.

Figure 7T:
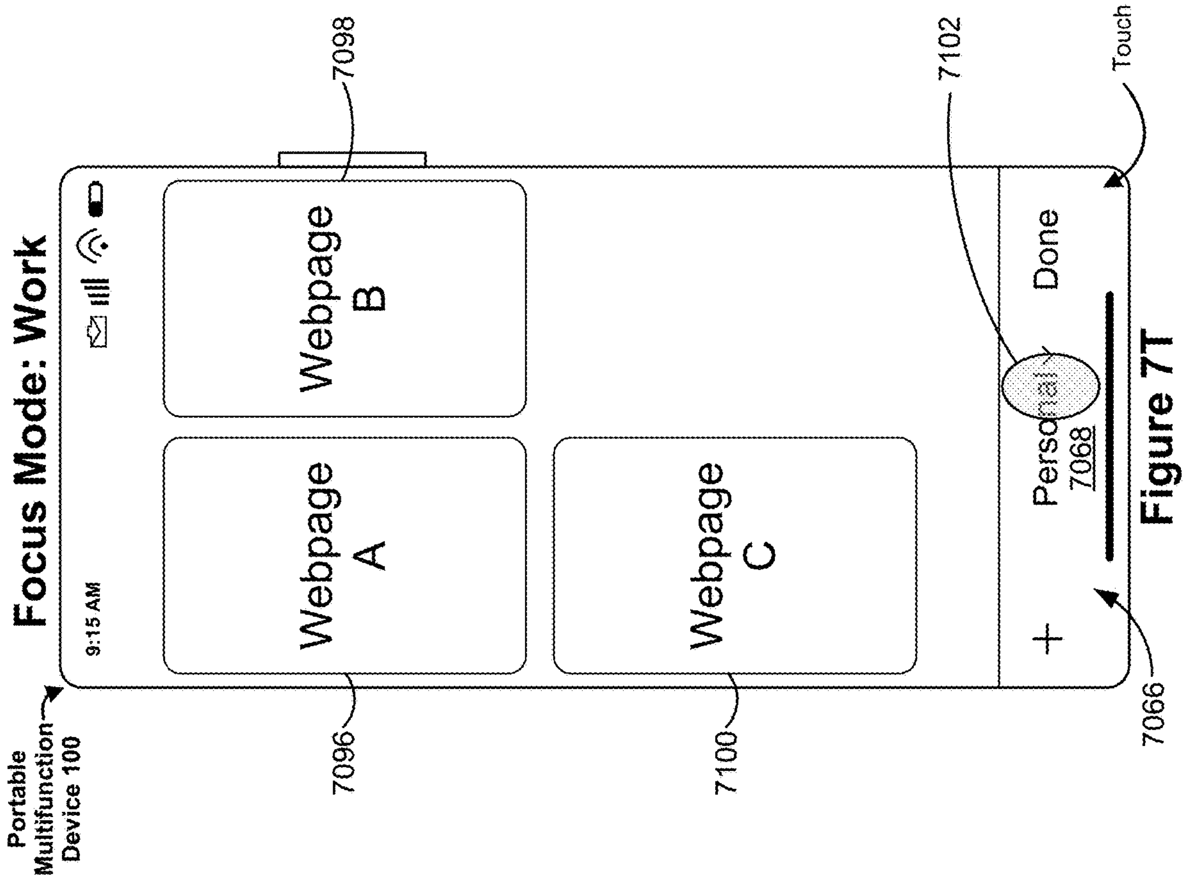
Figure 7U:
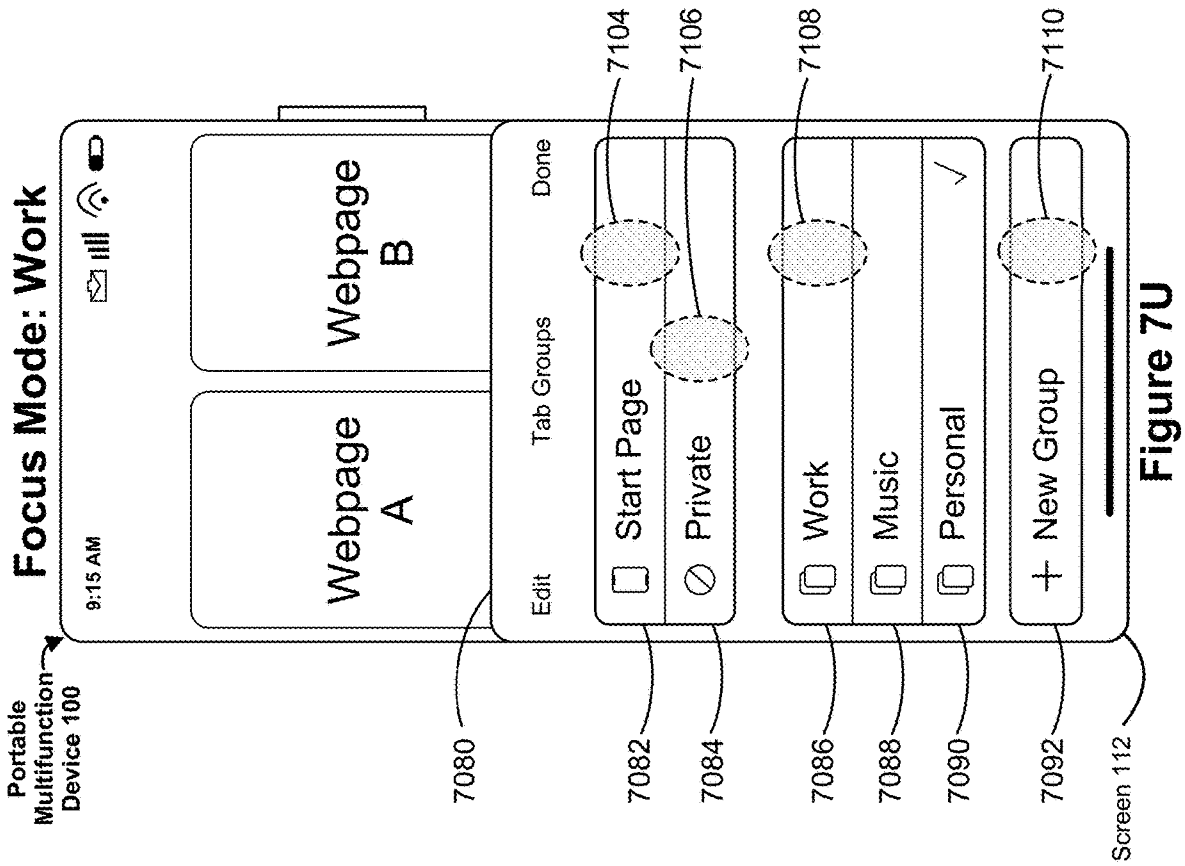

As shown in FIG. 7T, in response to detecting a user input 7094 (FIG. 7S) on the option 7090, and while the "Work" mode remains active, the portable multifunction device 100 redisplays the user interface 7066 with the "Personal" tab group open (e.g., and ceases to display the "Work" tab group). If the user selects the tab group indicator 7068 (e.g., via a user input 7102), the portable multifunction device redisplays the browser user interface 7080. As shown in FIG. 7U, the browser user interface 7080 now indicates that the "Personal" tab group is open (e.g., via the checkmark next to the option 7090). FIG. 7U also shows that the user can continue to configure what content is displayed in the user interface 7066 by interacting with the options 7082, 7084, 7086, and/or 7092 (e.g., via a user input 7104, 7106, 7108, and/or 7110, respectively).

Figure 7V:
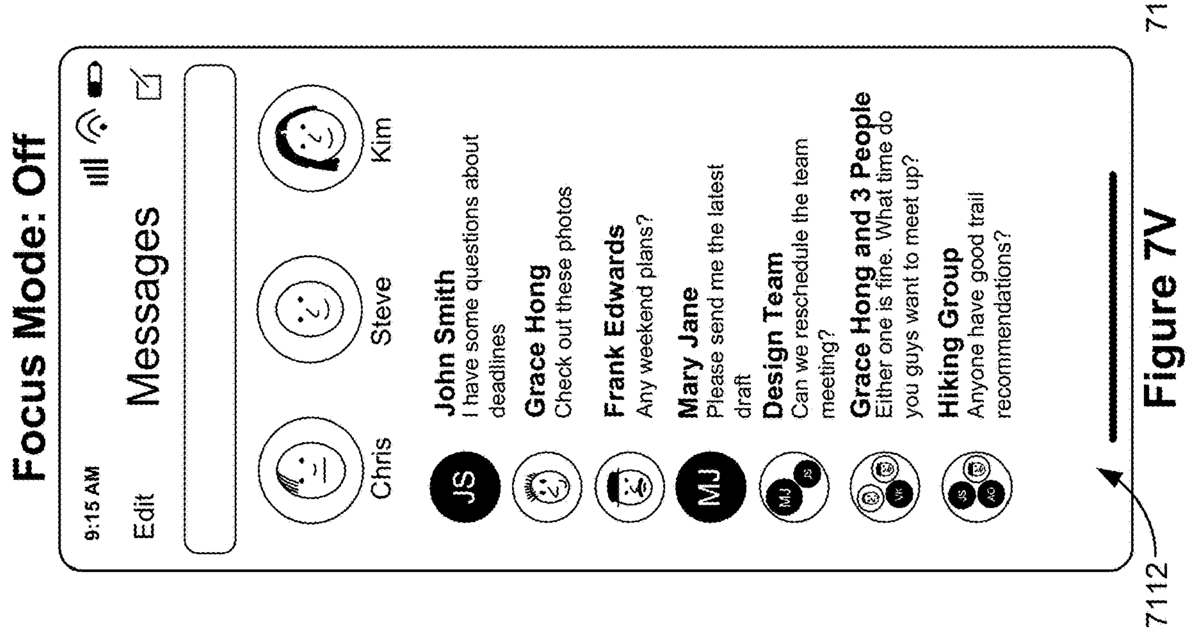
Figure 7W:
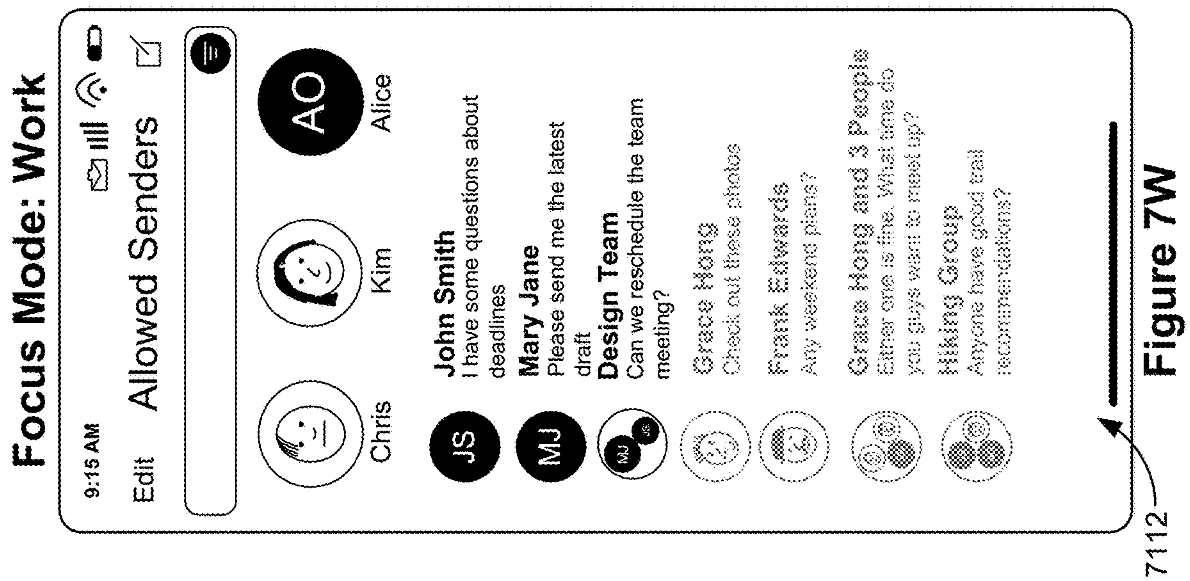
Figure 7X:
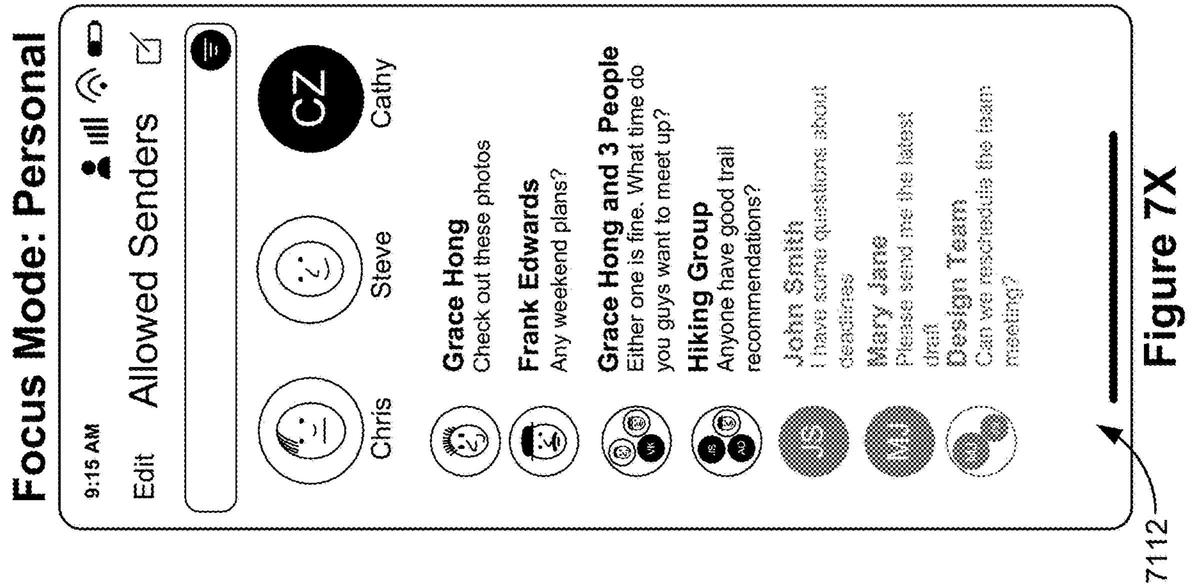
Figure 7Z:
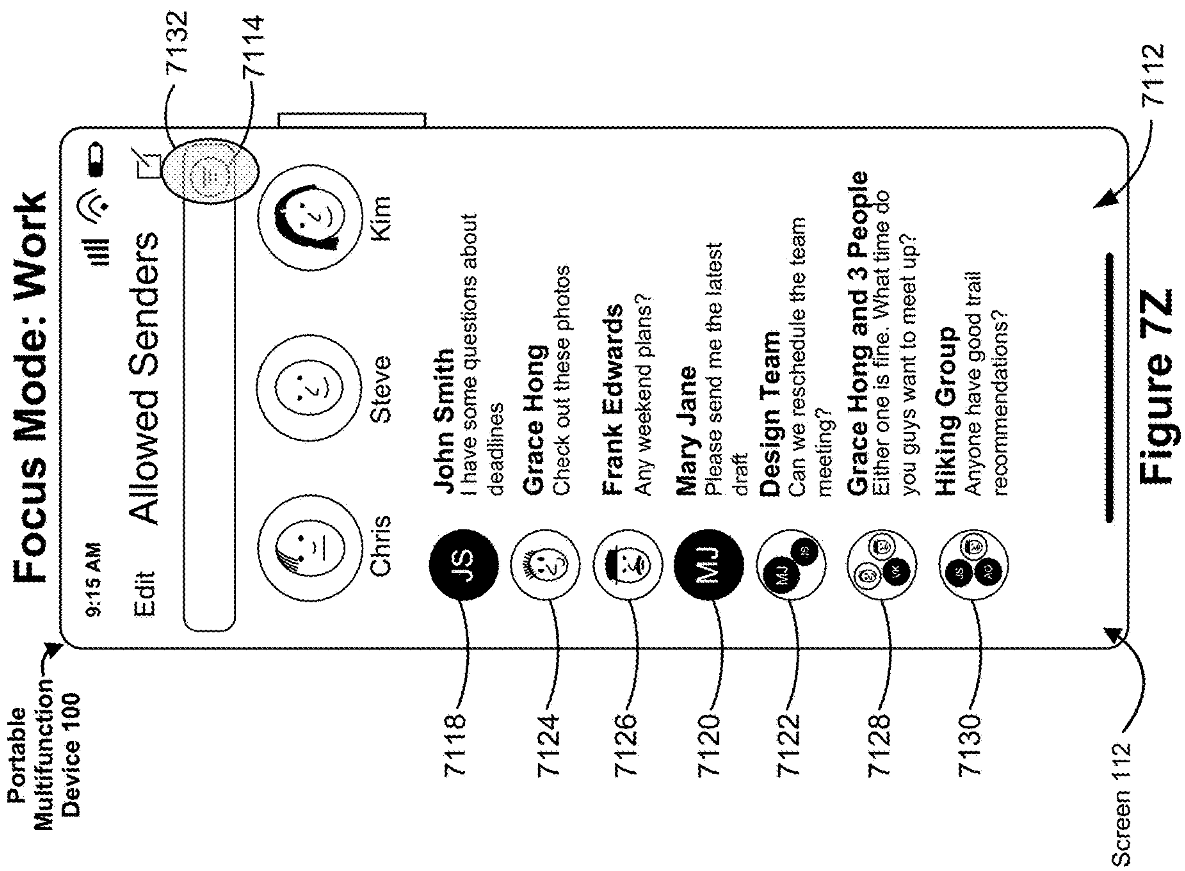

FIGS. 7V-7X show how different content is emphasized in a user interface 7112 for a messaging application, based on which focus mode is active for the portable multifunction device 100. For example, in FIG. 7V, no focus mode is active, so all messages are displayed. In FIG. 7W, the "Work" mode is active, so work-related messages are emphasized relative to (e.g., displayed above, and in black text compared to) other content (e.g., which is displayed at the bottom of the user interface 7112, and in grey text). In FIG. 7C, the "Personal" mode is active, and different content is emphasized (e.g., different messages are emphasized, compared to FIG. 7B) relative to other content. In some embodiments, when the "work" mode is active, messages from whitelisted users (see FIG. 6C) are emphasized/displayed (e.g., the emphasized users are the same users from whom notifications are permitted). In some embodiments, when the work mode is active, messages from blacklisted users are deemphasized/not displayed (e.g., the deemphasized users are the same users from whom notifications are not permitted).

Figure 7Y:
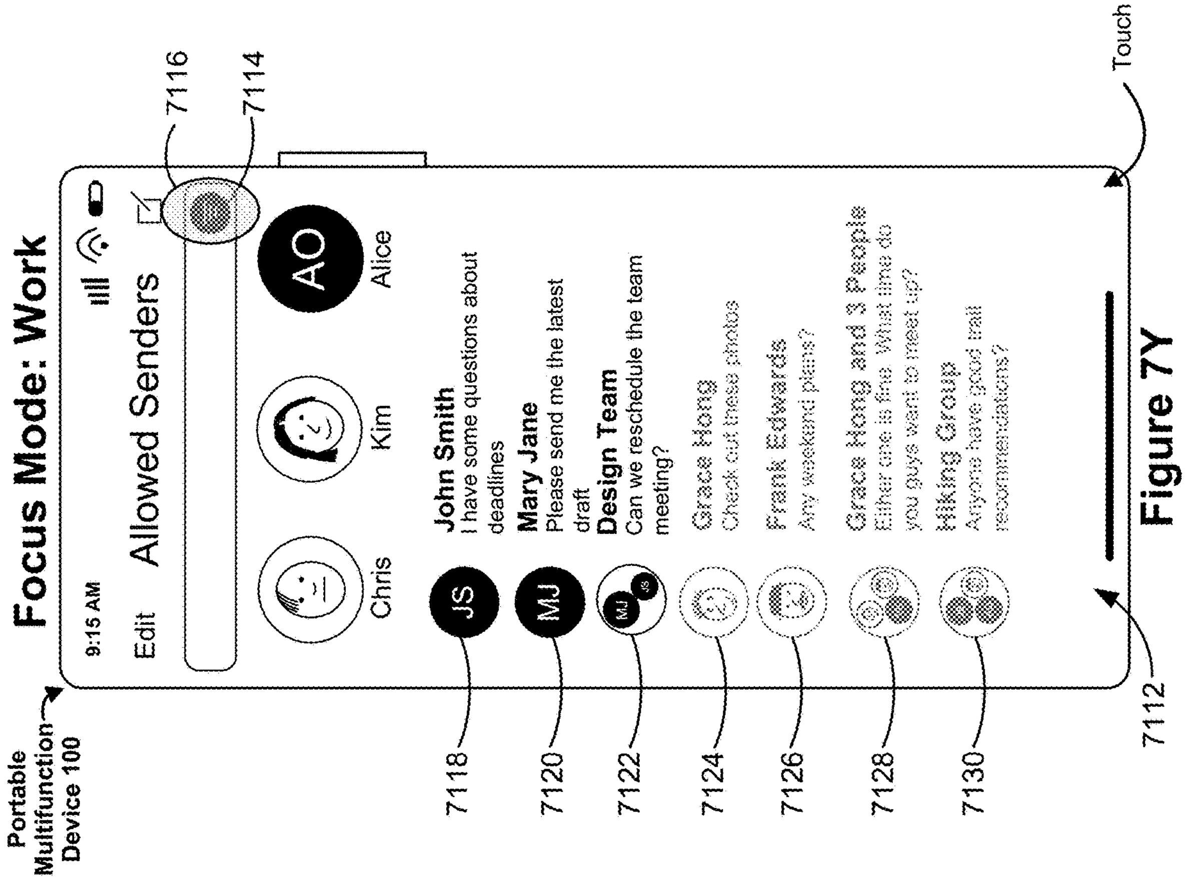
Figure 8A:
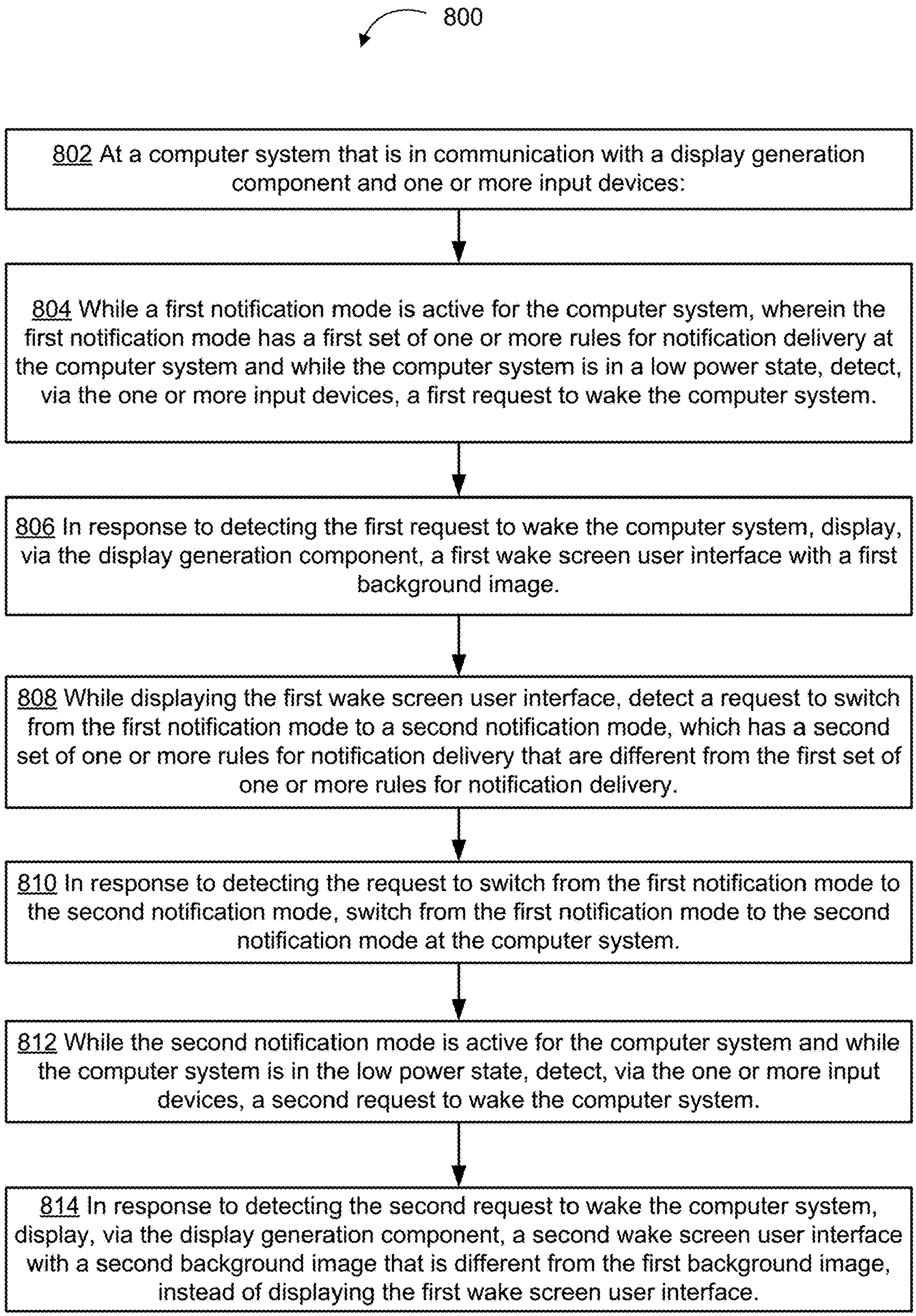

FIG. 7Y shows the user interface 7112 in a default state while the "Work" mode is active. Based on settings of the "Work" mode, messages 7118, 7129, and 7122 are emphasized relative to other content. The messages 7118, 7129, and 7122 are displayed above other messages (e.g., which are not emphasized), and messages that are not emphasized are displayed in grey text (e.g., such that the black text of the messages 7118, 7129, and 7122 appear more prominent).

The user interface 7112 includes a toggle affordance 7114. In some embodiments, while the toggle affordance 7114 is toggled on, the messages displayed in the user interface 7112 are emphasized in accordance with allowed contacts for the "Work" mode (e.g., as configured in the section 6004 in FIGS. 6C and 6D). In such embodiments, the toggle affordance 7114 switches between emphasizing messages for allowed contacts, and not emphasizing any messages relative to other messages.

As shown in FIG. 7Z, in response to detecting a user input 7116 on the toggle affordance 7114, and while the focus mode (e.g., "Work" mode) remains active, the user interface 7112 is updated and no content is emphasized relative to other content. For example, messages 7124, 7126, 7128, and 7130, which were previously displayed below the emphasized messages, and with grey text, are now displayed in a normal order (e.g., in a normal reverse chronological order), and with black text. The appearance of the toggle affordance 7114 changes (e.g., as shown by the inverted colors) to indicate that no content is being emphasized. While the content indicator 7114 is toggled off, a selection input 7132 directed to content indicator 7114 would cause the device to display emphasis of content in accordance with the corresponding focus mode (e.g., "Work" mode as illustrated in FIG. 7Y).

FIGS. 11A-11FF illustrate example user interfaces for configuring home pages, wake screens, and/or application content filtering options for a mode (e.g., a focus mode and/or a notification mode), in accordance with some embodiments.

Figure 11B:
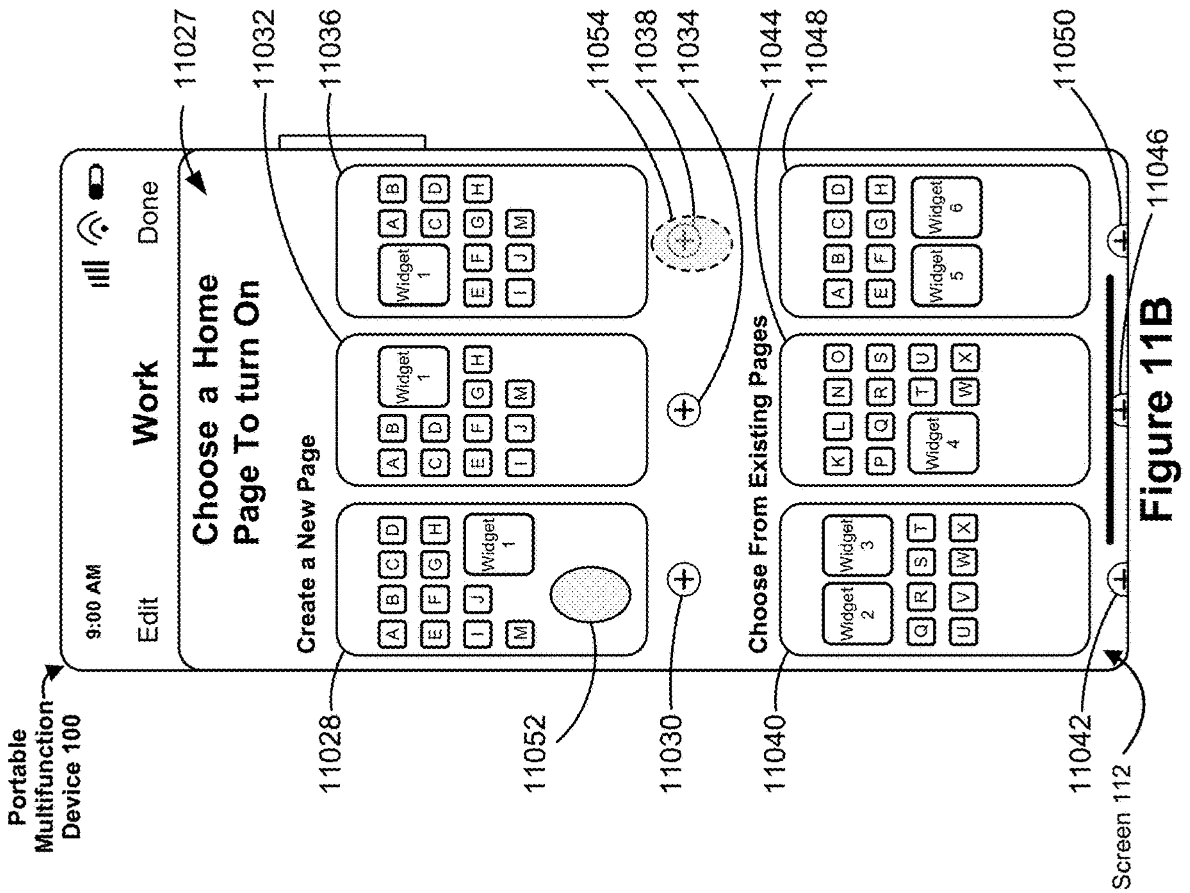
FIGS. 11A-11LL illustrate example user interfaces for configuring home pages, wake screens, and/or application content filtering options for a mode (e.g., a focus mode and/or a notification mode), in accordance with some embodiments.
Figure 11A:
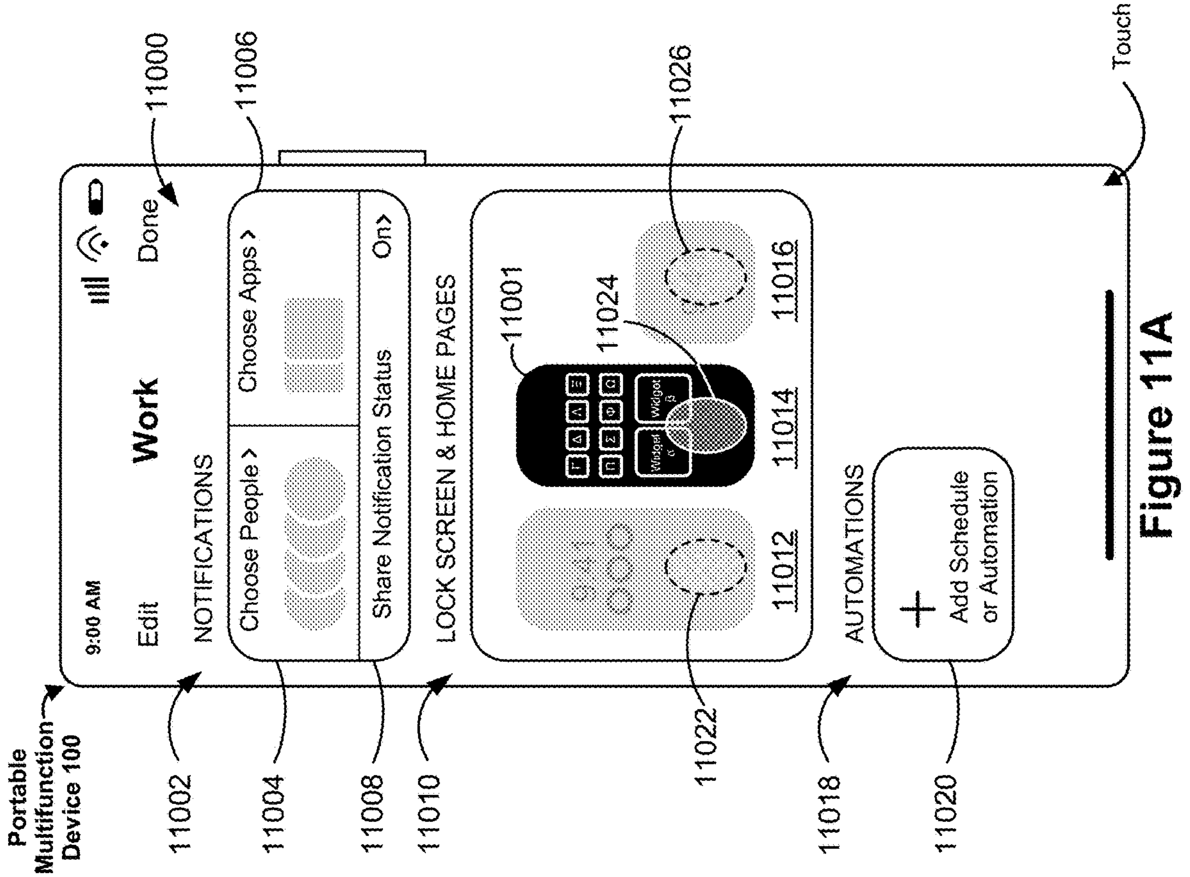

FIG. 11A shows a user interface 11000 for configuring settings of the "Work" mode of the portable multifunction device 100. The user interface 11000 is analogous to the user interface 6000 described above with reference to FIGS. 6A-6R, and the features and descriptions of the user interface 11000 (and other user interfaces described in FIGS. 11A-11FF) are applicable and/or interchangeable with the features of the user interface 6000 (and other user interfaces described in FIGS. 6A-6R).

The user interface 11000 includes multiple sections, including a "Notifications" section 11002, a "Lock Screen and Home Pages" section 11010, and an "Automations" section 11018. In some embodiments, some sections include additional sections (e.g., subsections). In some embodiments, a section includes both additional sections and individual settings. For example, the "Notifications" section 11002 includes two additional sections (a contacts section 11004 and an applications section 11006) as well as an individual setting (a "Share Notification Status" setting 11008). The "Lock Screen and Home Pages" section 11010 includes a wake screen section 11012, a home screen section 11014, and a second device section 11016. The "Automations" section 11018 includes a new automation affordance 11020.

A user can select one or more sections in the user interface 11000 to configure settings for the "Work" mode" (e.g., as described above with reference to the user interface 6000 of FIG. 6A). Detecting a user input 11022 on the wake user interface section 11012 displays a user interface for configuring a background image for a wake user interface while the "Work" mode is active. Detecting a user input 11026 on the second device section 11016 configures a background image for a user interface of a second device (e.g., the second device 5001 as shown in FIG. 5C-2) while the "Work" mode is active for the portable multifunction device 100.

In response to detecting a user input 11024 on the home screen section 11014, and as shown in FIG. 11B, the portable multifunction device 100 displays a user interface 11027 for selecting a home screen (e.g., and/or for configuring a home screen) for the portable multifunction device 100 while the "Work" mode is active. In some embodiments, one or more sections of the user interface 11000 are pre-configured (e.g., with default settings by the portable function device), or have been previously configured by the user. For example, FIG. 11A shows that the home screen section 11014 includes a home screen 11001 that is currently selected for the "Work" mode (e.g., is enabled for display while the "Work" mode is active).

The user interface 11027 includes representations of a plurality of suggested home screen pages, including suggestions for home screen pages that have not yet been configured by the user (e.g., "new" home screen pages) and previously configured home screen pages (e.g., home screen pages that have already been configured by the user, and/or are already in, or available for use, by the computer system (e.g., in other contexts, such as when a different focus mode is active for the computer system, or when no focus mode is active for the computer system)).

For example, home screens 11028, 11032, and 11036 are suggested home screen pages that have not yet been configured by the user. Suggested home screens 11028, 11032, and 11036 each include the same set of application launch affordances (as shown by the application icons A, B, C, D, E, F, G, H, I, J, and M) and widgets (as show by widget 1), but each of the home screens 11028, 11032, and 11036 has a different configuration (e.g., a different layout) for the set of application launch affordances and widgets. For example, in the home screen 11028, widget 1 appears in a lower right portion of the home screen, in the home screen 11032, widget 1 appears in an upper right portion of the home screen, and in the home screen 11036, widget 1 appears in an upper left portion of the home screen. In some embodiments, the suggested home screen pages are automatically suggested by the portable multifunction device 100 (e.g., without user input or intervention). In some embodiments, the portable multifunction device 100 suggests a configuration for the set of application launch affordances and widgets. For example, in some embodiments, the portable multifunction device 100 suggests a configuration of the set of applications launch affordances and widgets ordered by a frequency of use while the "Work" mode is active, and/or a determined relevance to the "Work" mode (e.g., work-related applications are determined to be more "relevant" than non-work applications).

Each displayed home screen has a corresponding plus (e.g., "+") affordance. The home screen 11028 has a corresponding plus affordance 11030, the home screen 11032 has a corresponding plus affordance 11034, and the home screen 11036 has a corresponding plus affordance 11038. The plus affordances allow a user to select a home screen (e.g., without needing to further configure the corresponding home screen) via a user input on (e.g., selecting, or directed to) the plus affordance (e.g., as shown by the user input 11054 on the plus affordance 11038, which would enable the corresponding home screen 11036 for display while the "Work" mode is active without further configuration). The user can also select a home screen (e.g., the home screen 11028) for further configuration, as shown by a user input 11052 at a location corresponding to suggested home screen 11028.

FIG. 11B also shows existing home screens 11040, 11044, and 11048, which are previously configured home screen pages. The user can edit the configuration for an existing home screen by performing a user input analogous to the user input 11052 (but at a location corresponding to an existing home screen), or the user can select an existing home screen (e.g., without further or additional configuration) by performing a user input, analogous to the user input 11038, on or directed to a location corresponding to one of the plus affordances 11042, 11046, or 11050, for selecting the home screen 11040, 11044, or 11048, respectively.

In some embodiments, the user selects a single home screen page for display while the "Work" mode is active for the computer system, and the selected home screen page is the only home screen page that is enabled for display while the "Work" mode is active. In some embodiments, the user can select multiple home screen pages, and each selected home screen page is enabled for display while the "Work" mode is active. In such embodiments, as shown in FIG. 11II, the user interface 11027 displays indicators 11264, 11266, 11268, 11270, 11272, and 11274, instead of (e.g., at the location of) the plus affordances 11030, 11034, 11038, 11042, 10046, and 11050, respectively. In response to detecting a user input 11276 on or directed to the indicator 11264, the portable multifunction device 100 enables the corresponding home screen 11028 for display while the "Work" mode is active. As shown in FIG. 11JJ, the indicator 11264 updates to display a checkmark to indicate the corresponding home screen has been selected. Returning to FIG. 11II, in response to detecting a user input 11278 on the indicator 11268, the portable multifunction device 100 deselects the corresponding home screen 11036 (e.g., the home screen 11036 is no longer enabled for display while the "Work" mode is active). As shown in FIG. 11JJ, the checkmark for the indicator 11268 is replaced by an empty bubble to indicate the corresponding home screen 11036 is no longer selected.

Figures 11C, 11D:
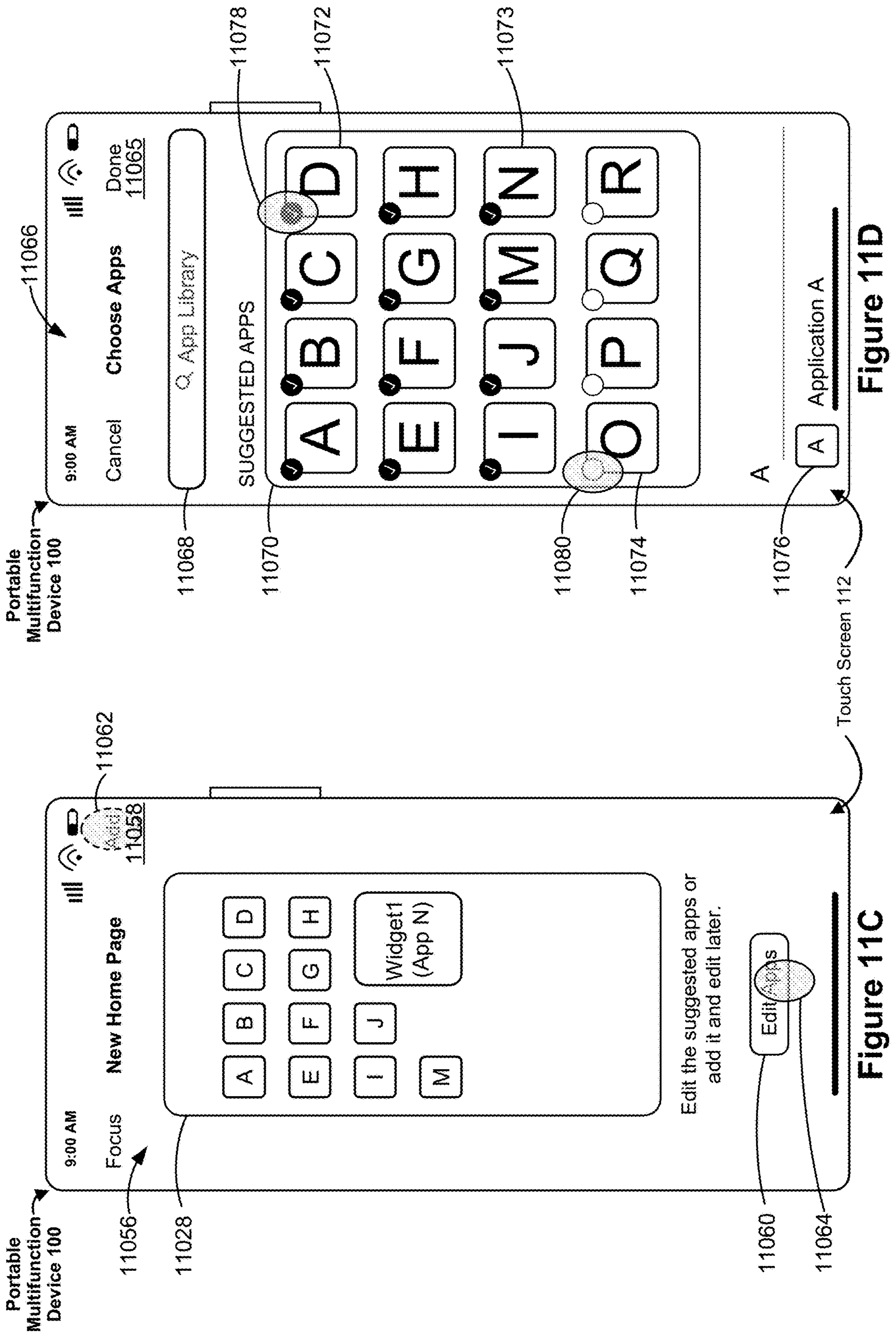
Figure 11F:
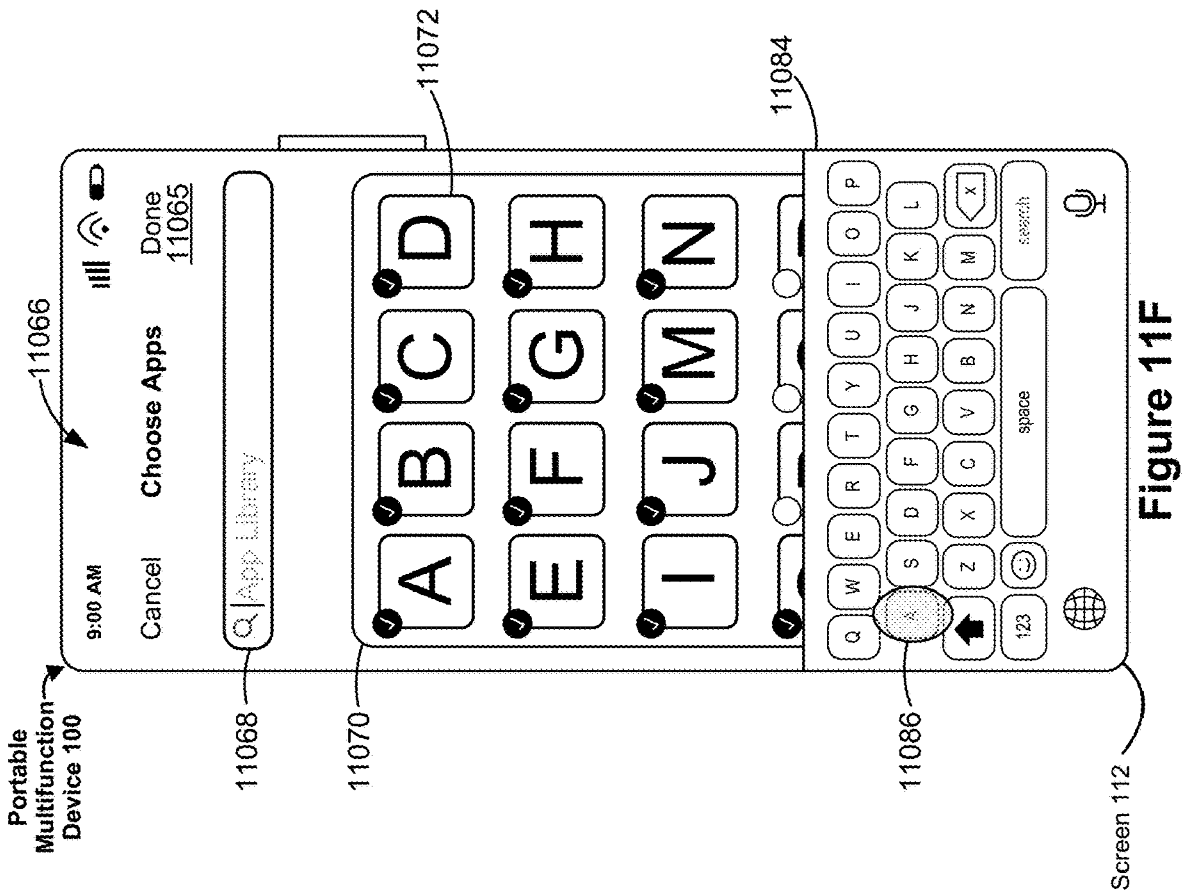
Figure 11E:
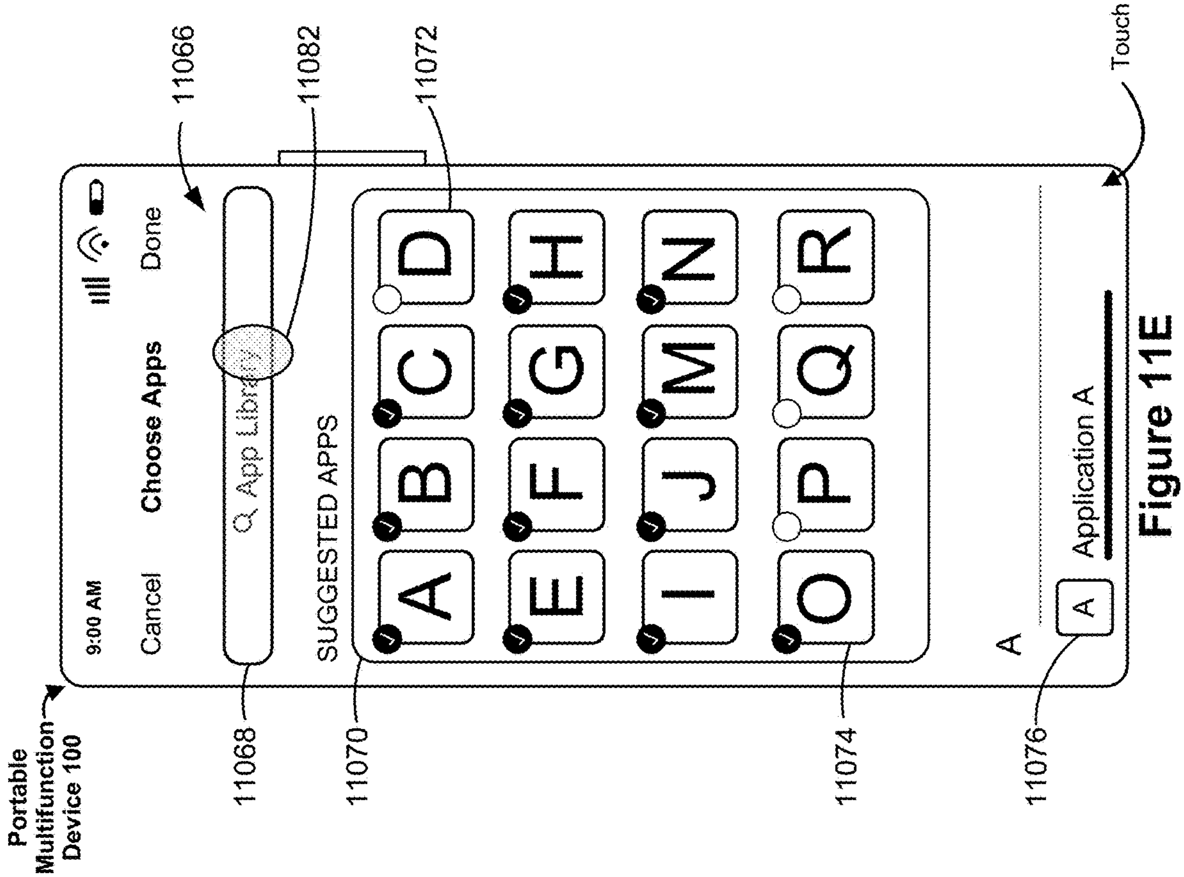
Figure 11H:
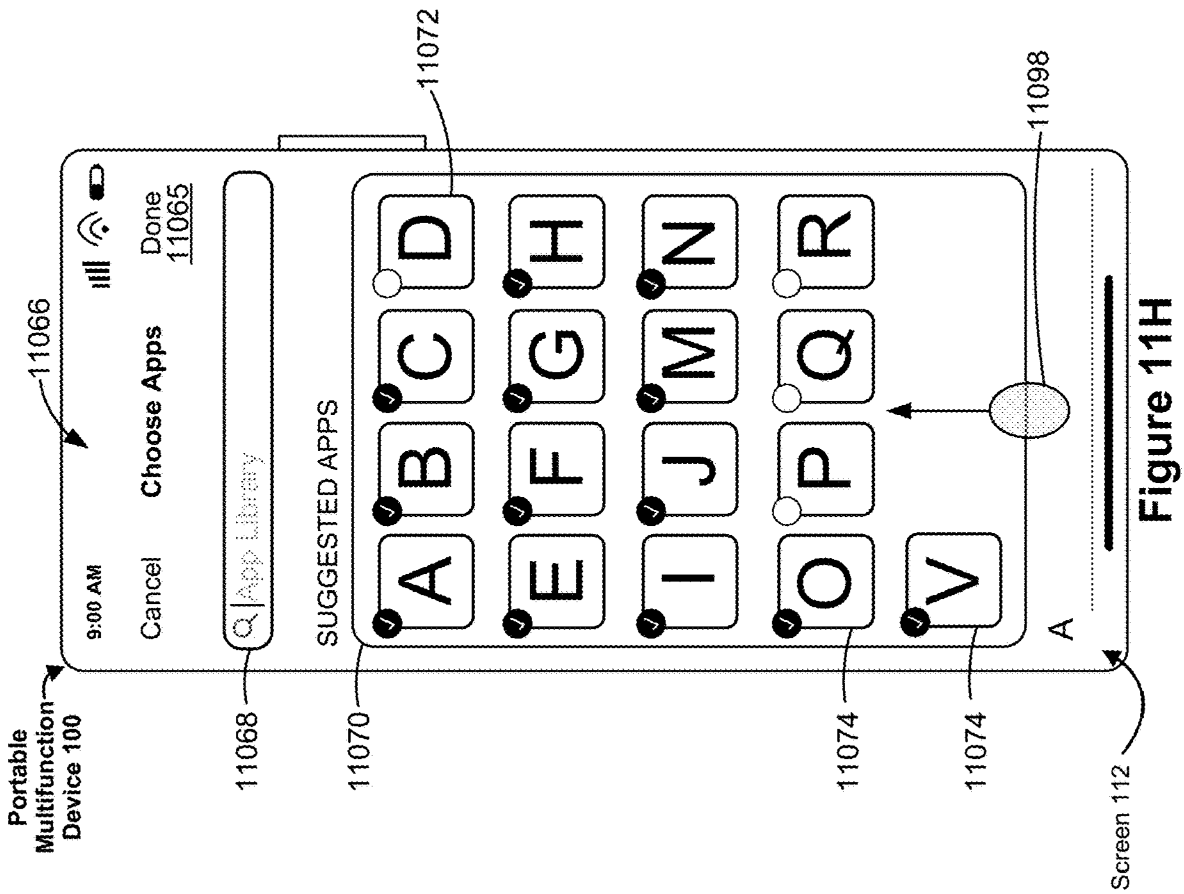
Figure 11G:
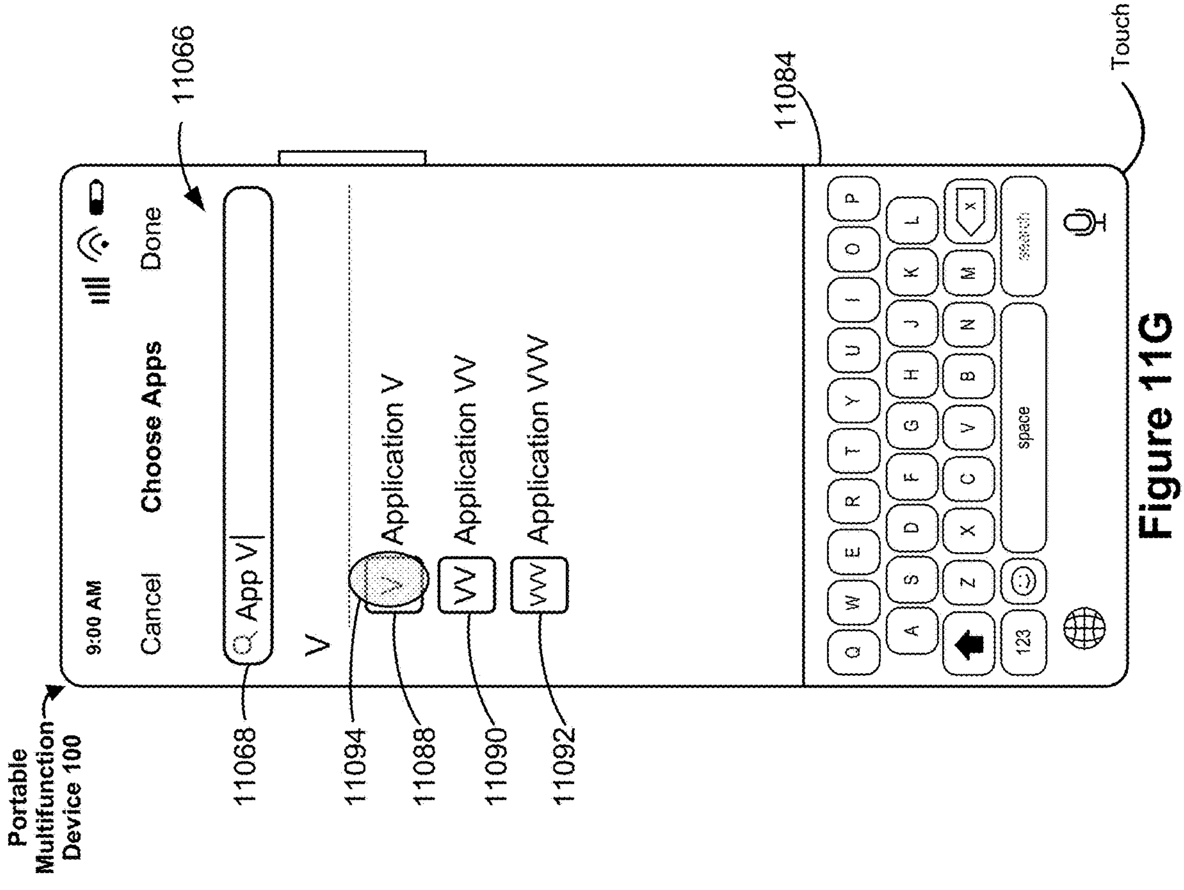
Figures 11I, 11J:
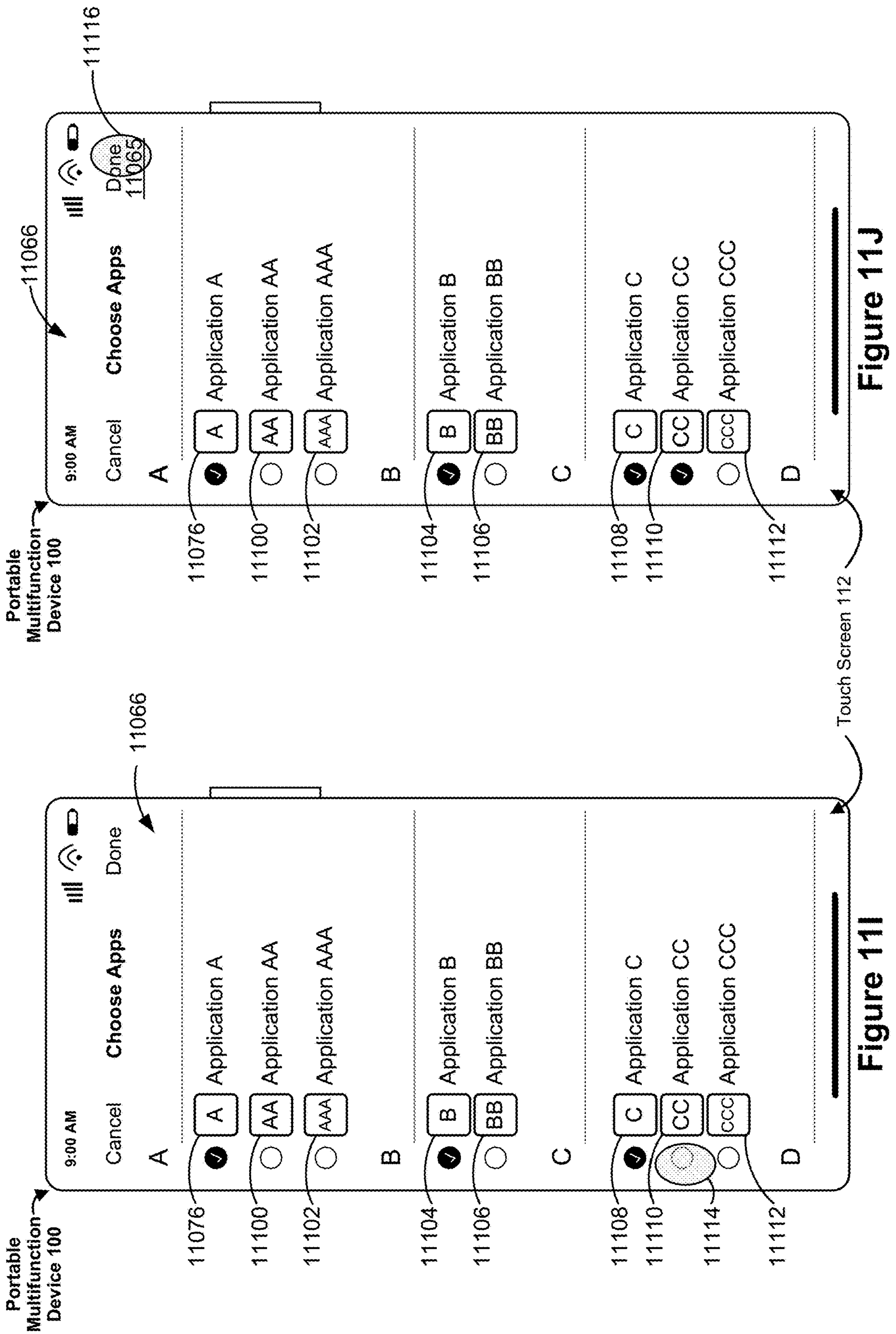
Figure 11L:
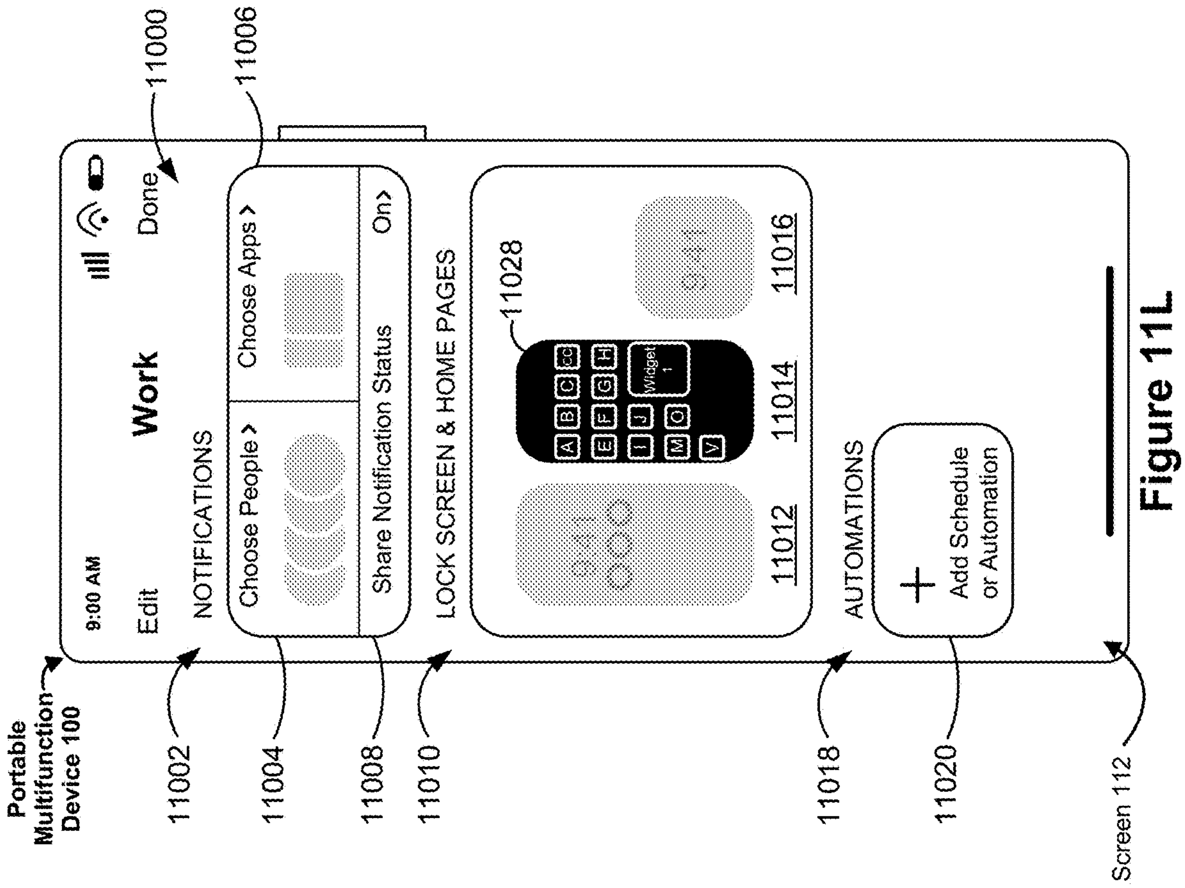
Figure 11K:
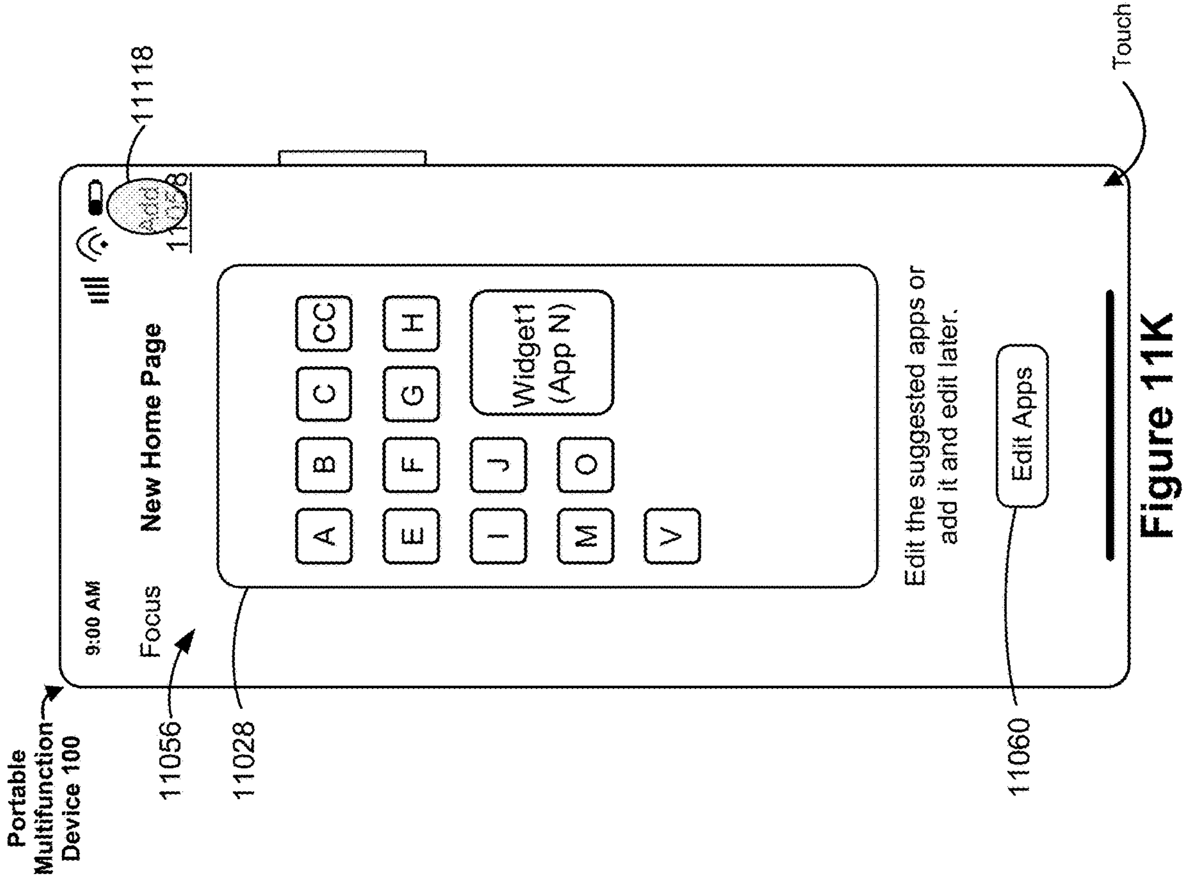

FIGS. 11KK and 11LL show the portable multifunction device 100 while the "Work" mode is active. In FIG. 11KK, the home screen 11028 is displayed (e.g., because it was enabled for display while the "Work" mode is active, in FIGS. 11II and 11JJ). In response to detecting a leftward swipe gesture 11280, the portable multifunction device 100 transitions to displaying the home screen 11044, as shown in FIG. 11LL (e.g., because the home screen 11044 was also enabled for display while the "Work" mode is active, as shown in FIGS. 11II and 11JJ). In some embodiments, the user can continue to navigate through enabled home screen pages. For example, in response to detecting a leftward swipe gesture 11282 in FIG. 11LL, the portable multifunction device 100 transitions to display a third home screen (e.g., a third enabled home screen that is enabled for display while the "Work" mode is active, in addition to the home screen 11028 and the home screen 11044). In response to detecting subsequent leftward swipe gestures (e.g., while displaying the third enabled home screen), the portable multifunction device 100 continues to transition through enabled home screens (e.g., to a fourth enabled home screen, to a fifth enable home screen, and so on).

In some embodiments, the user can navigate through previously displayed home screen pages with an opposite gesture (e.g., a swipe gesture in an opposite direction). For example, while displaying the home screen 11044, in response to detecting a rightward swipe 11284, as shown in FIG. 11LL, the portable multifunction device 100 redisplays the home screen 11028 (e.g., and if the portable multifunction device 100 was displaying the third home screen, in response to detecting a rightward swipe gesture, the portable multifunction device would redisplay the second home screen 11044).

As shown in FIG. 11C, in response to detecting the user input 11052, the portable multifunction device 100 displays a user interface 11056, for configuring the home screen 11028. The user interface 11056 includes a preview of the home screen 11028, including a preview of the configuration (e.g., layout) for the application launch affordances and widgets included in the home screen 11028. The user can further configure the layout and/or included application launch affordances and widgets by selecting an "Edit Apps" affordance 11060 (e.g., via a user input 11064).

As shown in FIG. 11D, in response to detecting the user input 11064 selecting the "Edit Apps" affordance, the portable multifunction device 100 displays a user interface 11066 for selecting and/or deselecting applications for the home screen 11028. The user interface 11066 includes a search bar 11068, a list of suggested applications in a section 11070, and a full list of available applications (e.g., listed in alphabetical order, as shown by an application icon 11076 for Application A, at the beginning of the full list of available applications).

The list of suggested applications in section 11070 include a plurality of suggested applications for the "Work" mode. The suggested applications are optionally suggestions based on a list of installed applications for the computer system, a list of available applications associated with the "Work" mode (e.g., a whitelisted application while the "Work" mode is active, as specified in the applications section 10006 of the "Notifications" section 11002 in FIG. 11A (and/or the applications section 6006 of the "Notifications" section 6002 in FIG. 6A)), and/or a frequency of use (e.g., by the specific user of the portable multifunction device 100, and/or an aggregate usage of multiple users of the portable multifunction device 100).

Some of the suggested applications are selected by default. For example, an application icon 11072 for an application D is selected by default, as shown by the checkmark next to the application icon 11072. The applications that are selected by default appear in the preview of the home screen 11028 shown in FIG. 11C. Optionally, home screen 11028 also includes one or more widgets, such as widget 1, which is associated with application N. Selecting or deselecting an application icon 11073 for application N controls whether widget 1 is or is not included in the home screen 11028 (and the preview of the home screen 11028). In FIG. 11D, the application icon 11073 for application N has a checkmark, indicating that application N is selected, and Widget 1 is included in the home screen 11028 (e.g., as shown in the preview of the home screen 11028 in FIG. 11C).

Some suggested applications are not selected by default, and are displayed without checkmarks, and these applications are not included or displayed in the preview of the home screen 11028 shown in FIG. 11C. For example, an application icon 11074 for an application O is shown without a checkmark, as the application O is not currently included in the home screen 11028 (e.g., no application icon for the application O appears in the preview of the home screen 11028 in FIG. 11C).

The user can add and/or remove applications from the list of suggested applications. For example, a user input 11078 on the checkmark for the application icon 11072 deselects the application D and removes the application icon for application D from the home screen 11028. A user input 11080 on the empty bubble of the application 11074 for application O selections the application O, and adds an application icon for the application O to the home screen 11028.

As shown in FIG. 11E, in response to the user inputs 11078 and 11080, the user interface 11066 updates to reflect the user-configured list of applications in the section 11070. The changes can also be seen in the preview of the home screen 11028, as shown in FIG. 11K, where no application icon for application D appears on the preview of the home screen 11028, while an application icon for the application O appears on the preview of the home screen 11028.

Returning to FIG. 11E, in response to detecting a user input 11082 at a location corresponding to the search bar 11068, and as shown in FIG. 11F, the portable multifunction device 100 displays a keyboard 11084. The user can enter a series of inputs, represented by a user input 11086, to perform a search for a desired application via the keyboard 11084 (e.g., if the desired application does not appear in the list of suggested application in the section 11070, and/or if there are a large number of applications installed on the computer system, which would require a large amount of scrolling to get to the desired application in an alphabetical list of all installed applications).

As shown in FIG. 11G, in response to detecting the series of user inputs represented by the user input 11086, the portable multifunction device 100 displays search results based on the entered search query. For example, the user searches for "App V," and the portable multifunction device 100 returns results that match, or at least partially match, the search query of "App V." The displayed search results include an application icon 11088 for Application V, an application icon 11090 for Application VV, and an application icon 11092 for Application VVV. The application icon 11088 is displayed because Application V is an exact match, and the application icons 11090 and 11092 are also displayed because Application VV and Application VVV also match (e.g., include) the searched term "App V."

In some embodiments, the portable multifunction device 100 displays search results that are updated in real time as the user enters the search query. For example, when the user has only partially entered "App" (e.g., while intending to enter a search query of "App V"), the portable multifunction device 100 displays results matching the search query "App" (e.g., a list similar in appearance to that shown in FIGS. 11I and 11J), even though the user has not completed entry of the search query and/or hit the "Search" affordance of the keyboard 11084. As the search query changes (e.g., as the user continues to enter text for the search query), the portable multifunction device 100 narrows down the search results as the user continues to enter text into the search field 11068 (e.g., the list shown in FIG. 11G does not include results for Application A, which matches the search query for "App," but does not match the search query for "App V").

In response to detecting a user input 11094 at a location corresponding to a search result for the application V, the portable multifunction device 100 adds the selected application to the home screen 11028. As shown in FIG. 11H, the portable multifunction device 100 also adds an application icon 11074 for the selected application V to the suggested applications in the suggested applications section 11070. In response to detecting an upward swipe input 11098, the portable multifunction device 100 scrolls displays of the user interface 11066.

FIG. 11I shows the user interface 11066 after scrolling, and also shows a list of installed applications for the computer system. If the user performs another upward swipe input, similar to the upward swipe input 11098, the portable multifunction device 100 continues to scroll displays of the user interface 11066, and would display additional applications installed on the computer system (e.g., an application D, an application DD, an application E, an application EE, and so on), displayed in alphabetical order.

The installed applications are represented by application icons, such as applications icons 11076, 11100, 11102, 11104, 11106, 11108, 1110, and 11112 in FIG. 11I. The displayed application icons include a visual indicator (e.g., a bubble, displayed next to an application icon) that indicates whether or not the corresponding application is currently selected for inclusion on the home screen 11028. For example, applications A, B, and C are already selected for inclusion (e.g., as they are selected in the suggested applications in section 11070, as shown in FIG. 11H), and the bubbles next to the application icon 11076 for the application A, the application icon 11104 for the application B, and the application icon 11108 for the application C, are displayed with a checkmark.

The user can select, or deselect, applications from the list shown in FIG. 11I. For example, in response to a user input 11114 at a location corresponding to the bubble for the application icon 11110 for the application CC, the portable multifunction device 100 selects the application CC for inclusion in the home screen 11028, and an application icon for the application CC will appear on the home screen 11028. Similar to the process described above with reference to FIG. 11D, the user could also deselect applications from the list (e.g., performing a user input similar to the user input 11114 at a location corresponding to the bubble for the application icon 11076 for the application A, would deselect the application A for inclusion in the home screen 11028, and no application icon for the application A would appear on the home screen 11028).

FIG. 11J shows that the user interface 11066 updates to reflect the user's selections. For example, as the user selected the application CC in FIG. 11I, the bubble for the application icon 11110 for the application CC now appears with a checkmark in FIG. 11J.

In response to detecting a user input 11116 on a "Done" affordance 11065, and as shown in FIG. 11K, the portable multifunction device 100 redisplays the user interface 11056. The user interface 11056 displays an updated preview of the home screen 11028, which reflects the user-selected configuration described previously with reference to FIGS. 11D-11J. In comparison to FIG. 11C (e.g., prior to the user configuring applications and widgets for the home screen 11028), the home screen 11028 now includes an application icon for the application CC, an application icon for the application M, and an application icon for the application V. The application icon for the application D (as shown in FIG. 11C) is no longer displayed (e.g., because it was deselected by the user via the user input 11080 shown in FIG. 11D).

In response to detecting a user input 11118 on an "Add" affordance 11058, the portable multifunction device 100 enables the user-configured home screen 11028 for display while the "Work" mode is active. As shown in FIG. 11L, the portable multifunction device 100 also redisplays the user interface 11000, which has been updated with a visual indication of the user-configured home screen 11028 in the home screen section 11014. In some embodiments, if a home screen (e.g., the home screen 11001 in FIG. 11A) was previously selected for the "Work" mode (e.g., the home screen 11001 was selected in FIG. 11A, prior to any configuration by the user as described above with reference to FIGS. 11A-11K), the portable multifunction device 100 deselects the previously selected home screen, and replaces it with the new user-selected home screen (e.g., as shown in FIG. 11L, the home screen 11001 is replaced by the user-configured home screen 11028).

In some embodiments, once the user-configured home screen 11028 has been selected for the "Work" mode of the portable multifunction device 100, the home screen 11028 is deselected in other modes of the portable multifunction device 100 (e.g., if the home screen 11028 was previously selected for a "Personal" mode of the portable multifunction device 100, the home screen 11028 is deselected for the "Personal" mode after the user selects the home screen 11028 for the "Work" mode). In some embodiments, once the user-configure home screen 11028 has been selected for the "Work" mode of the portable multifunction device 100, the home screen 11028 is deselected for a "normal" mode of the portable multifunction device 100 (e.g., a state where no modes are active for the portable multifunction device 100).

In some embodiments, after configuring the home screen 11028, the home screen 11028 is available for selection when configuring other usage modes of the portable multifunction device 100, and is displayed as an existing home screen page. For example, as shown in FIG. 11GG, the home screen 11028 is displayed as an existing home screen page (but labeled 11028 in FIGS. 11GG and 11HH) in a user interface 11248 for configuring settings of a "Personal" mode, and as shown in FIG. 11HH, the home screen 11028 is also displayed as an existing home screen page in a user interface 11256 for configuring settings for a "Mindfulness" mode. In some embodiments, as shown in FIGS. 11GG and 11HH, different user interfaces for configuring different modes will display different suggested home screen pages (e.g., home screen pages 11250, 11252, and 11254 suggested for the "Personal" mode in FIG. 11GG, are different from the home screen pages 11258, 11260, and 11262 suggested for the "Mindfulness" mode in FIG. 11HH), but the different user interfaces display the same existing home screen pages (e.g., the home screen pages 11028, 11040, and 11044 are displayed in both the user interface 11248 in FIG. 11GG, and in the user interface 11256 in FIG. 11HH).

Figure 11N:
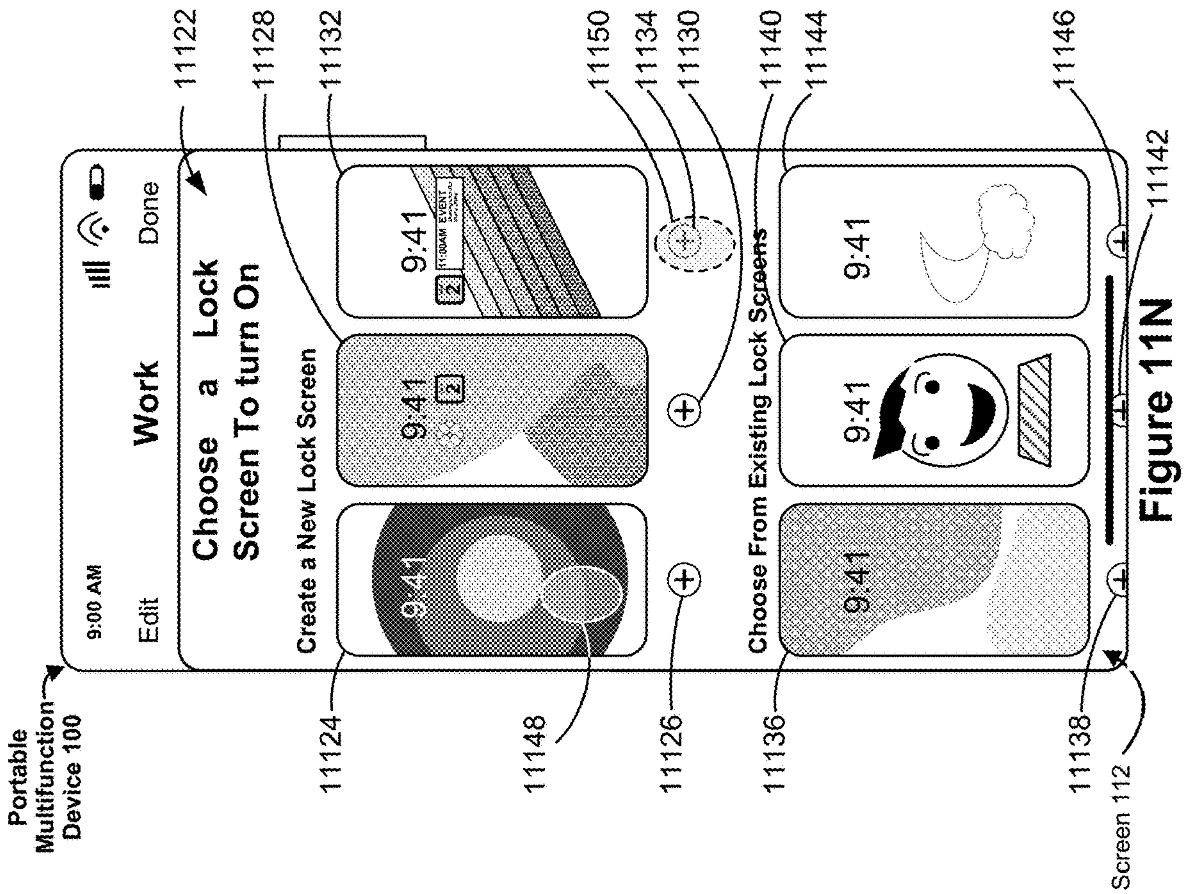
Figure 11M:
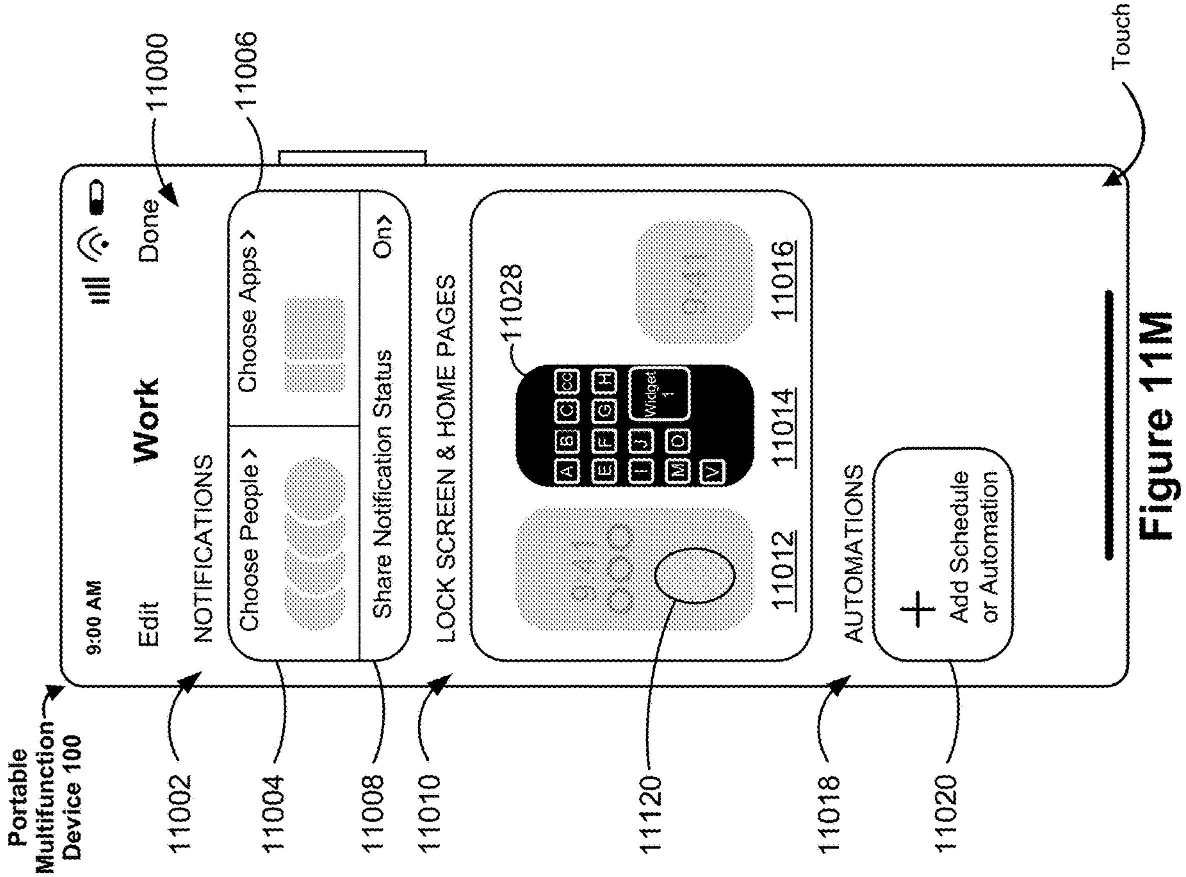

FIG. 11M shows that a user can also configure a wake screen (e.g., a "lock screen") for the "Work" mode. In response to detecting a user input 11120 on the wake screen section 11012, and as shown in FIG. 11N, the portable multifunction device 100 displays a user interface 11122 for selecting a wake screen (e.g., and optionally, for configuring a wake screen) for the portable multifunction device 100 while the "Work" mode is active.

The user interface 11122 includes a plurality of wake screens, including suggestions for wake screens that have not yet been configured by the user (e.g., "new" wake screens) and previously configured wake screens (e.g., wake screens that have already been configured by the user, and/or are already in, or available for use, by the computer system (e.g., in other contexts, such as when a different focus mode is active for the computer system, or when no focus mode is active for the computer system)).

As shown in FIG. 11N, wake screens 11124, 11128, and 11132 are suggested wake screens that have not yet been configured by the user. Wake screens 11124, 11128, and 11132 in FIG. 11N each have a corresponding plus affordance. The wake screen 11124 has a corresponding plus affordance 11126, the wake screen 11128 has a corresponding plus affordance 11130, and the wake screen 11132 has a corresponding plus affordance 11134. These plus affordances allow a user to select a wake screen (e.g., without needing to further configure the corresponding wake screen) via a user input on the plus affordance (e.g., as shown by a user input 11150 on the plus affordance 11134). The user can also select a wake screen for further configuration, as shown by a user input 11148 at a location corresponding to the wake screen 11124.

In some embodiments, the suggested wake screens include different suggested background images (e.g., as shown by the different background images of the wake screens 11124, 11128, and 11132). In some embodiments, the suggested wake screens include a suggested set of widgets (e.g., as shown by the different suggested widgets of the wake screen 11128 and the wake screen 11132).

FIG. 11N also shows existing wake screens 11136, 11140, and 11144, which are previously configured wake screens. The user can edit the configuration for an existing wake screen by performing a user input analogous to the user input 11148 (but at a location corresponding to an existing wake screen), or the user can select an existing wake screen (e.g., without further or additional configuration) by performing a user input analogous to the user input 11150 (but at a location corresponding to one of the plus affordances 11138, 11142, or 11146, for selecting the wake screen 11136, 11140, or 11144, respectively).

Figure 11P:
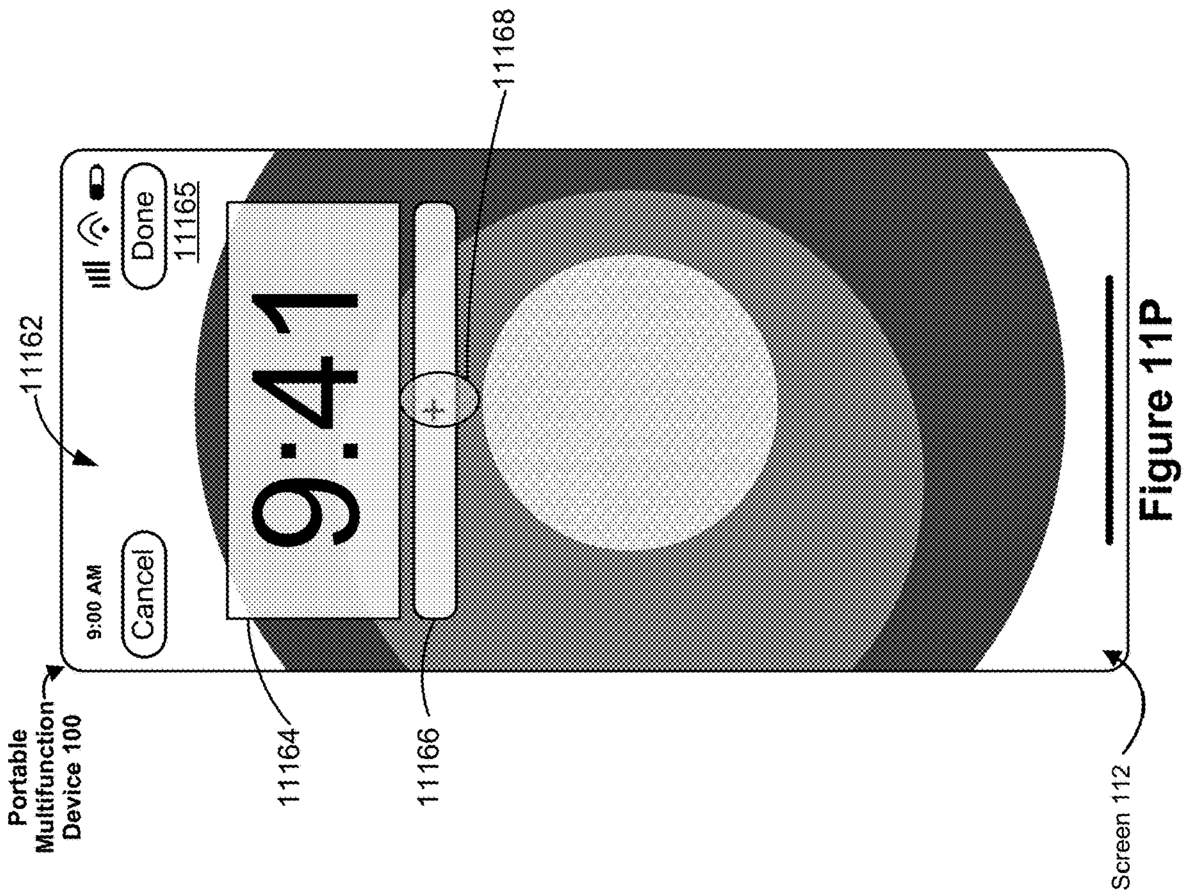
Figure 11O:
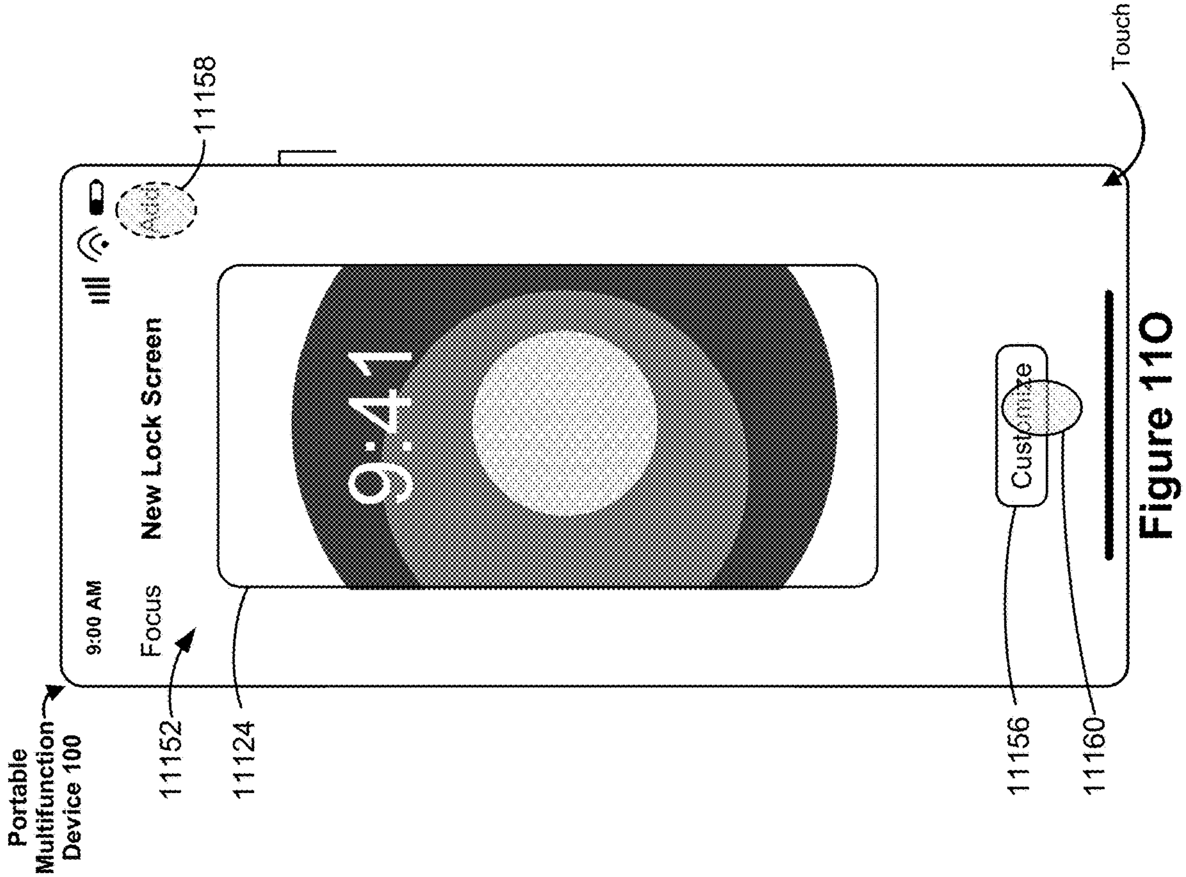

As shown in FIG. 11O, in response to detecting the user input 11148, the portable multifunction device 100 displays a user interface 11152, for configuring the wake screen 11124. The user interface 11152 includes a preview of the wake screen 11124, including a preview of the date and time, and the layout for widgets included in the wake screen 11124 (although the wake screen 11124, as shown in FIG. 11O, is not currently configured to display any widgets). The user can further configure the wake screen 11124 by selecting a "Customize" affordance 11156 (e.g., via a user input 11160).

As shown in FIG. 11P, in response to detecting the user input 11156 selecting the "Customize" affordance 11160, the portable multifunction device 100 displays a user interface 11162 for customizing the wake screen 11124. The user interface 11162 include a date and time section 11164 for customizing the appearance of the date and/or time on the wake screen 11124, and an affordance 11166 for adding one or more widgets to the home screen 11158.

Figures 11Q, 11R:
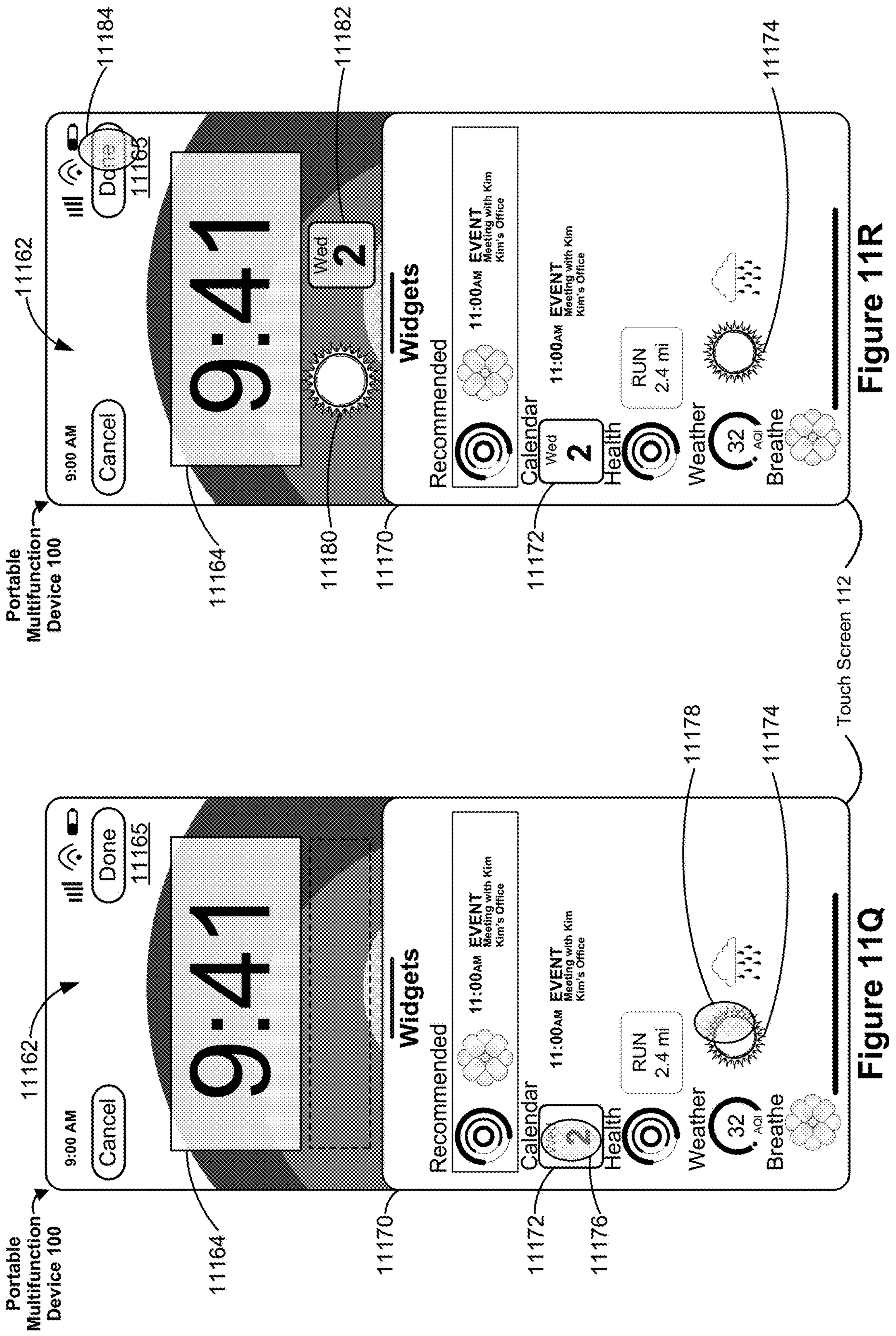

As shown in FIG. 11Q, in response to detecting a user input 11168 at a location corresponding to the affordance 11166, the portable multifunction device 100 displays a user interface 11170 for selecting one or more widgets to add to the wake screen 11124. The user interface 11170 includes a list of available widgets that can be added to the wake screen 11124. In some embodiments, the user interface 11170 includes recommended widgets (e.g., based on application usage data, based on applications that have associated widgets, and/or based on the usage mode being configured), and displays available widgets sorted by category (e.g., "Calendar," "Health," "Weather," and "Breathe," as shown in FIG. 11Q). In some embodiments, the user can scroll display of the available widgets (e.g., by performing an upward swipe gesture, similar to the upward swipe gesture 11098 described with reference to FIG. 11H). In some embodiments, as shown in FIG. 11Q, the user interface 11170 is displayed as partially overlaying the user interface 11162 (e.g., so the user can continue to preview relevant portions of the wake screen 11124 that are being configured).

The user selects one or more widgets in the user interface 11170. As shown in FIG. 11Q, a user input 11176 selects a calendar widget option 11172, and a user input 11178 selects a weather widget option 11174. As shown in FIG. 11R, in response to detecting the user inputs 11176 and 11178, the portable multifunction device updates the user interface 11162 to include a weather widget 11180 (associated with the weather widget option 11174) and the calendar widget 11182 (associated with the calendar widget option 11172), underneath the date and time section 11164. In some embodiments, the user can re-arrange the order of the widgets. For example, in response to detecting a user input dragging the calendar widget 11182 to the opposite side of the weather widget 11180, the portable multifunction device 100 updates the user interface 11162 to display the calendar widget 11182 on the left and the weather widget 11180 on the right (e.g., the positions of the calendar widget 11182 and the weather widget 11180 are flipped, from the positions shown in FIG. 11R).

Figure 11T:
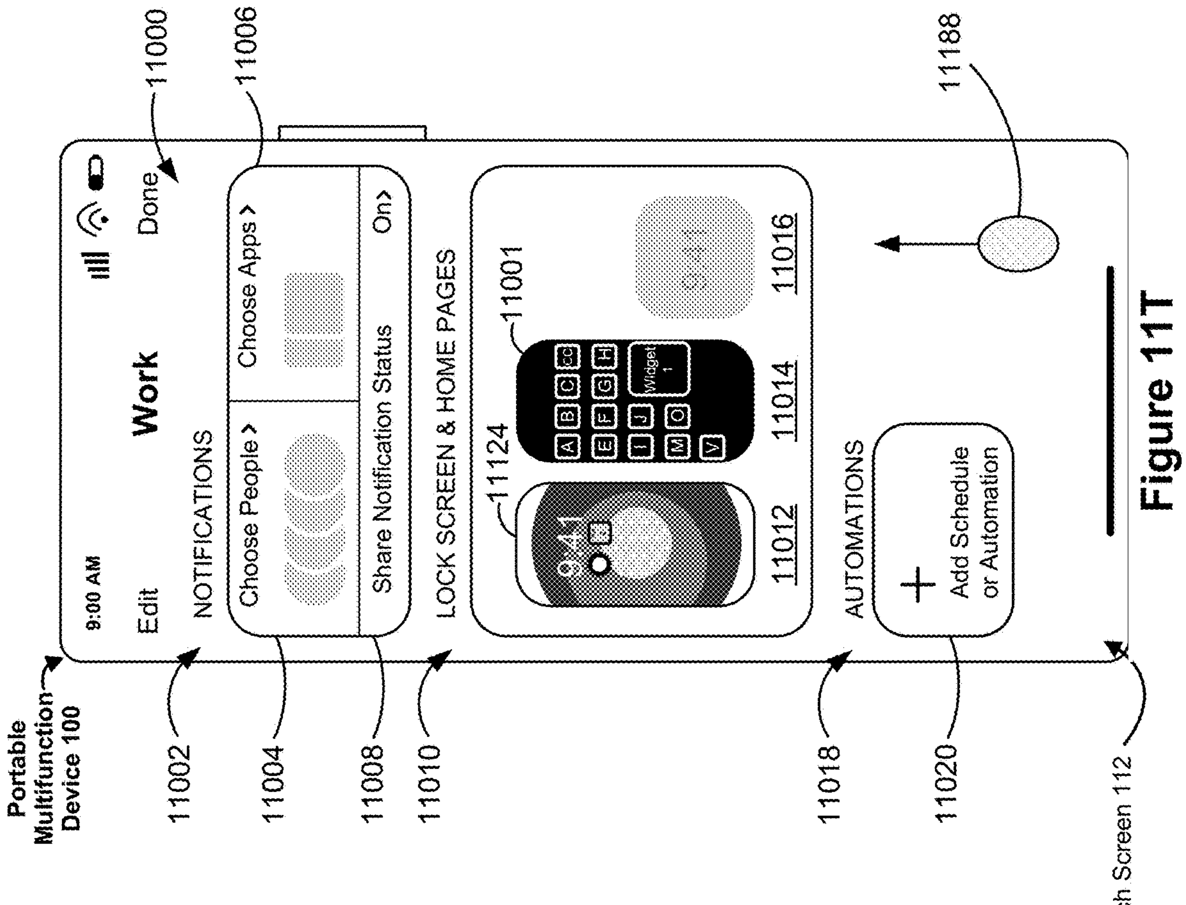
Figure 11S:
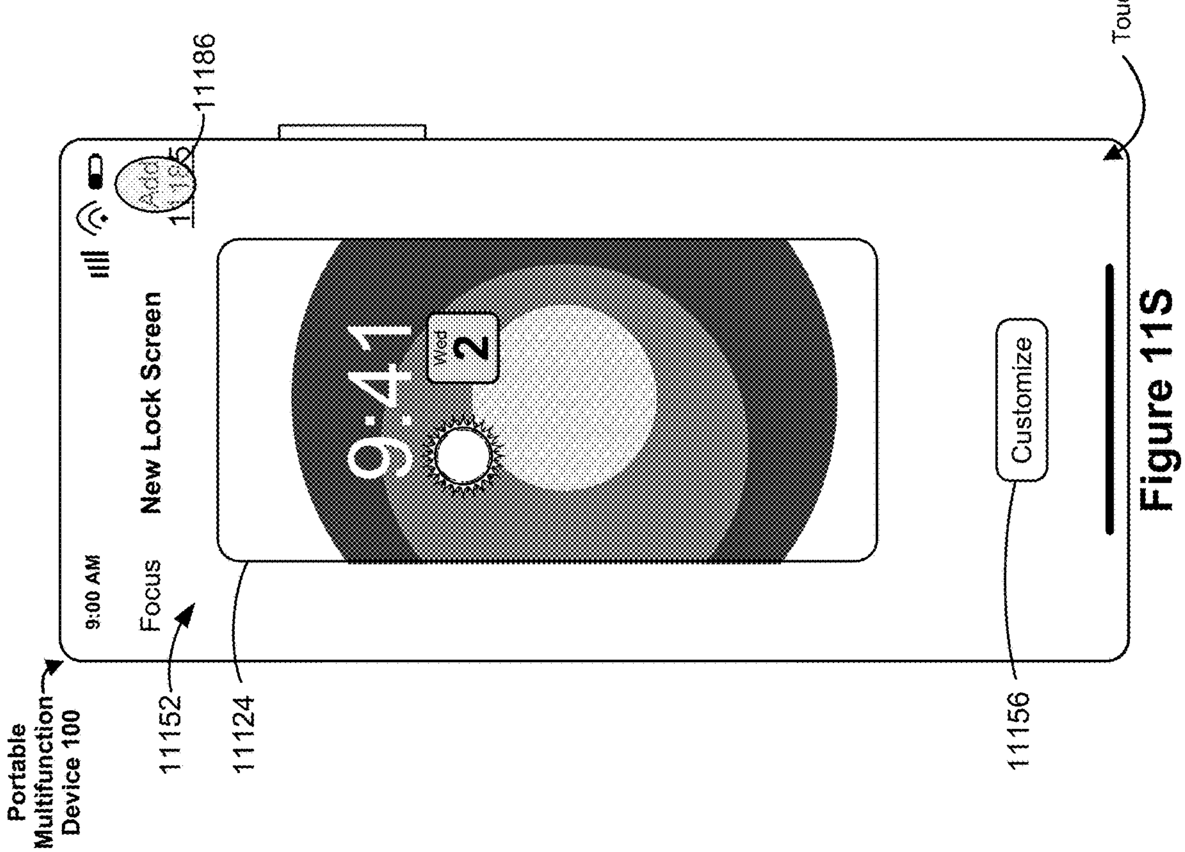

In response to detecting a user input 11184 on a "Done" affordance 11165, and as shown in FIG. 11S, the portable multifunction device 100 redisplays the user interface 11152, and the user interface 11152 reflects the user-selected widgets in the preview of the wake screen 11124.

In response to detecting a user input 11186 on an "Add" affordance 11185, and as shown in FIG. 11T, the portable multifunction device 100 redisplays the user interface 11002. As shown in FIG. 11T, the wake screen section 11012 has been updated to reflect the user selected wake screen 11124.

In response to detecting an upward swipe gesture 11188, the portable multifunction device scrolls displays of the user interface 11002 to display additional options for configuring the "Work" mode of the portable multifunction device 100.

Figure 11V:
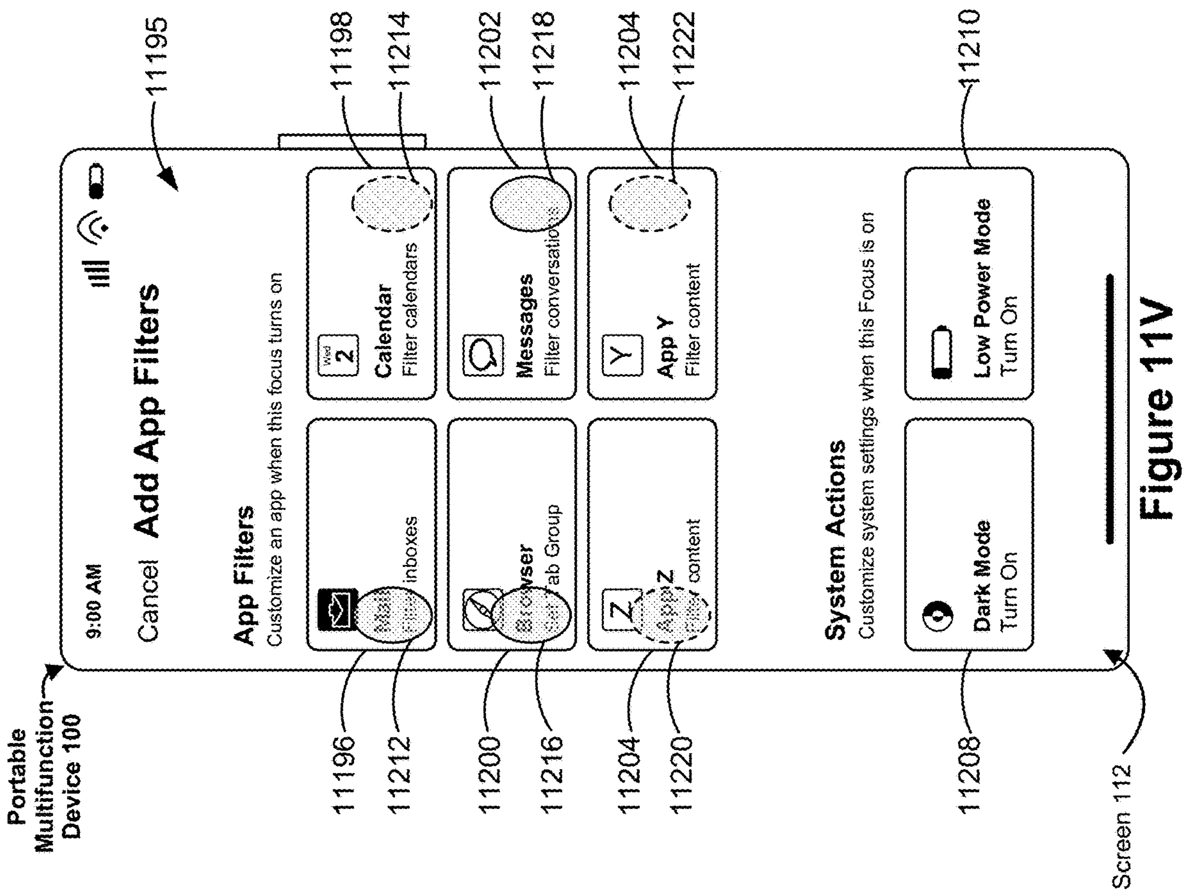
Figure 11U:
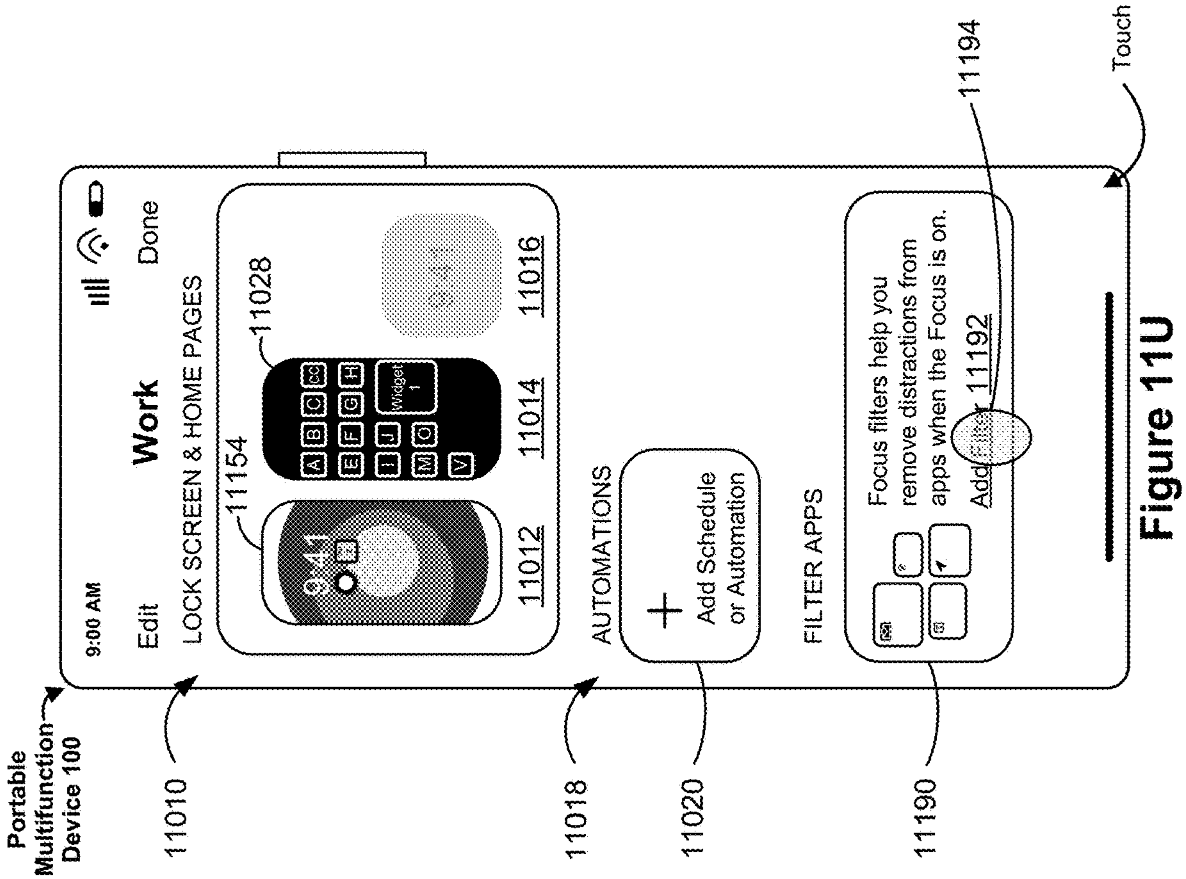

FIG. 11U shows the user interface 11002 after scrolling, and now displays an application filtering section 11190. In some embodiments, before any applications are configured with filtering options, or when no applications are configured with filtering options, the application filtering section 11190 includes an "Add Filter" affordance 11192.

In response to detecting a user input 11194 on the "Add Filter" affordance 11192, and as shown in FIG. 11V, the portable multifunction device 100 displays a user interface 11195 for configuring filter options for one or more applications. The user interface 11195 displays affordances for applications for which content filtering options are available while the "Work" mode is active for the computer system (e.g., a subset of the applications that are installed on the computer system, as not all installed applications have content filtering options).

As shown in FIG. 11V, the user interface 11195 includes an affordance 11196 for a mail application, an affordance 11198 for a calendar application, an affordance 11200 for a browser application, an affordance 11202 for a messaging application, an affordance 11204 for an application Z, and an affordance 11204 for an application Y. In some embodiments, the user interface 11195 optionally includes additional settings for the portable multifunction device 100 while the "Work" mode is active (e.g., a dark mode setting 11208 and a low power setting 11210, which are analogous to the dark mode setting 6104 and the low power mode setting 6108 described above with reference to FIG. 6F).

In some embodiments, the user interface 11195 includes both first party applications and third party applications. A first party application is an application that is developed by a first party, wherein the first party manufactures the computer system and/or develops the operating system of the computer system. In contrast, a third party application is an application that is developed by a third party, wherein the third party is different from the first party (e.g., the third party does not manufacture the computer system and/or does not develop the operating system of the computer system).

In some embodiments, the portable multifunction device 100 provides content filtering information (e.g., regarding the content to be filtered and/or the rules to apply for content filtering) to the applications for which content filtering options are available, without providing information to those applications identifying the active mode of the computer system (e.g., the portable multifunction device 100 provides information that a mode of the computer system is active, but does not provide information that the specific mode of the computer system that is active is the "Work" mode).

Figure 11X:
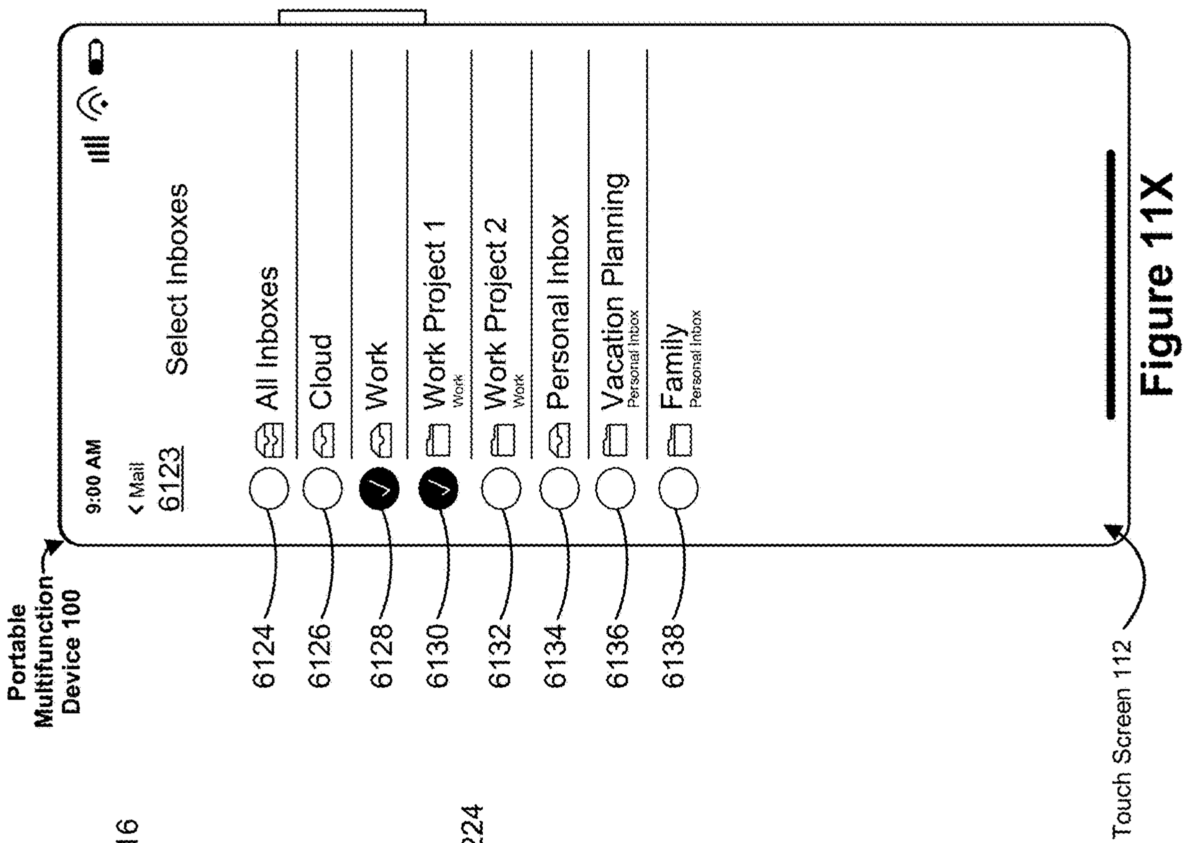
Figure 11W:
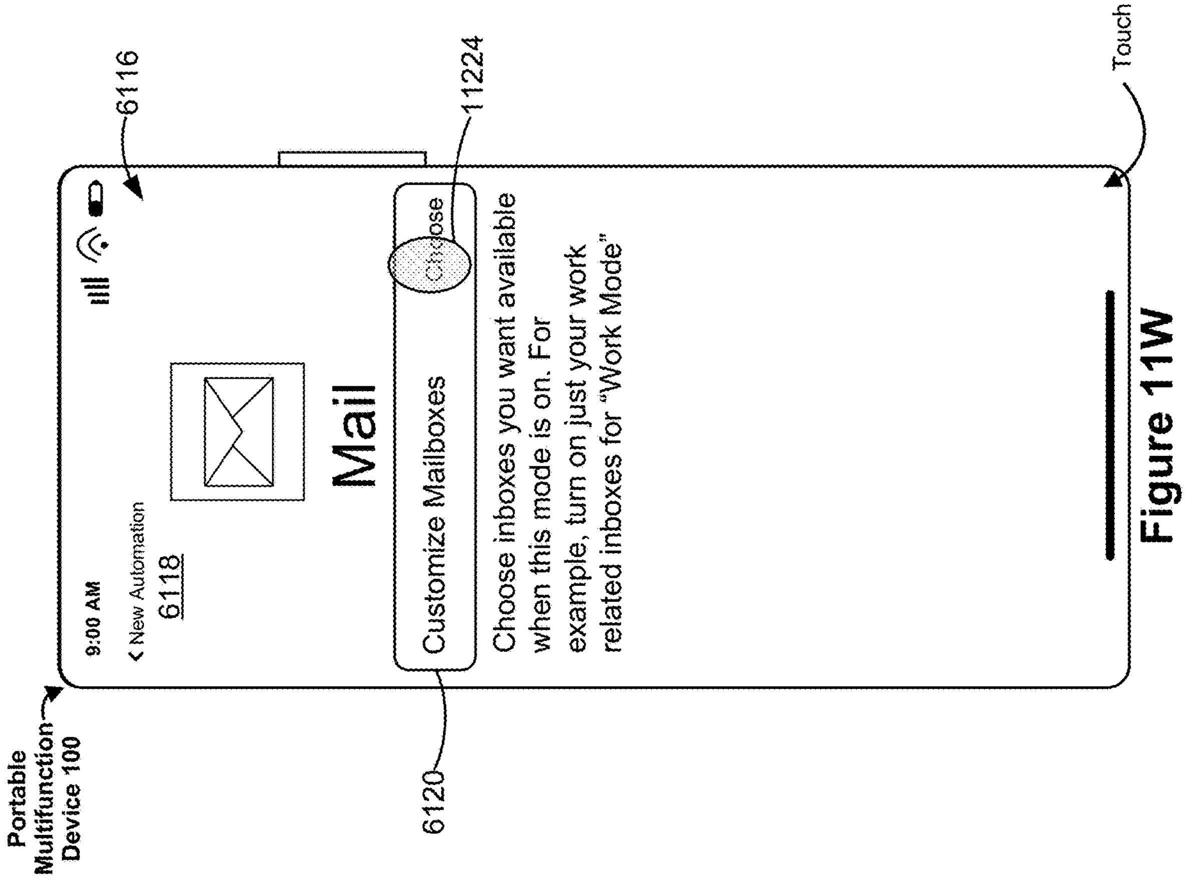
Figure 11Y:
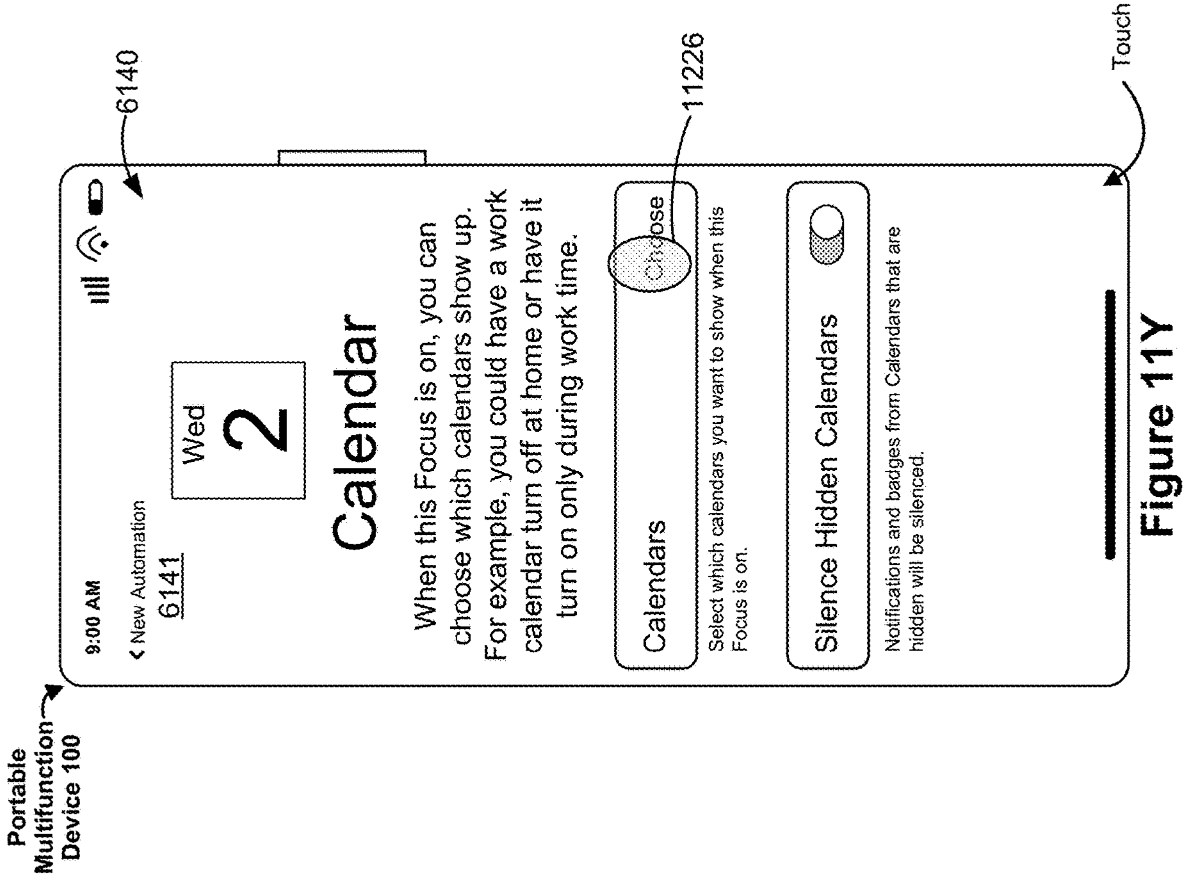
Figure 11Z:
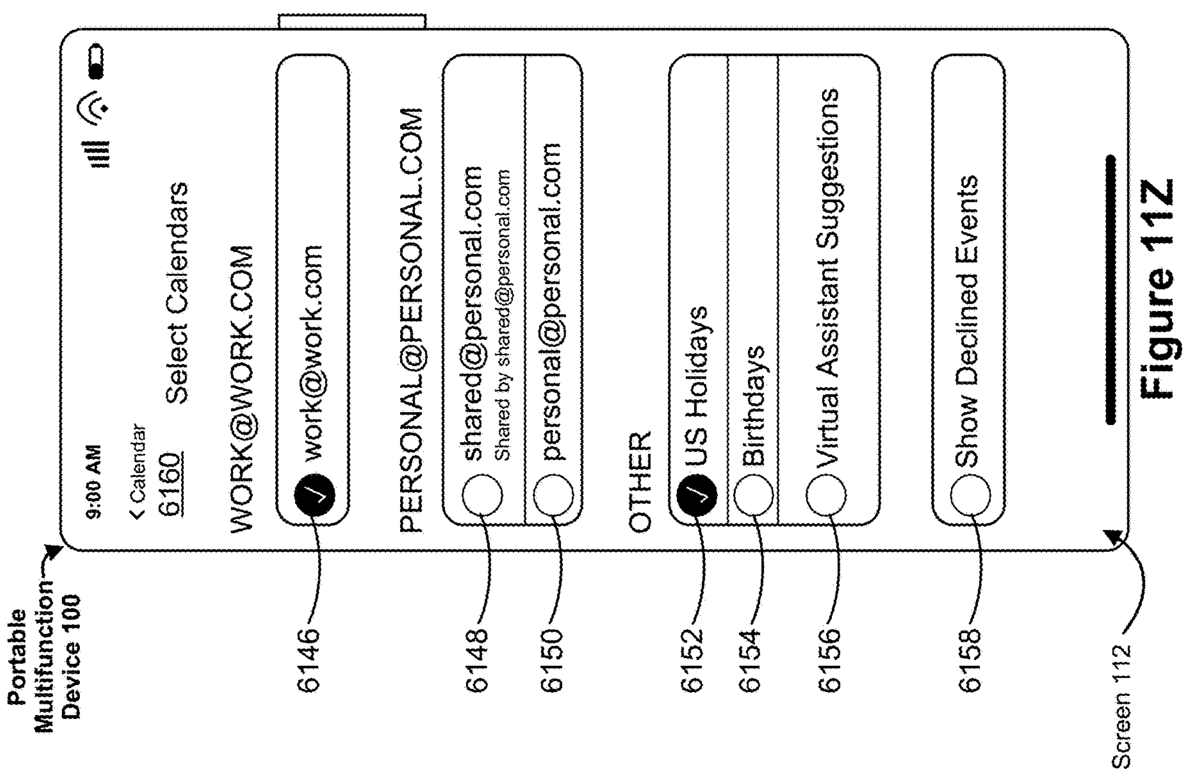
Figures 11A, 11B:
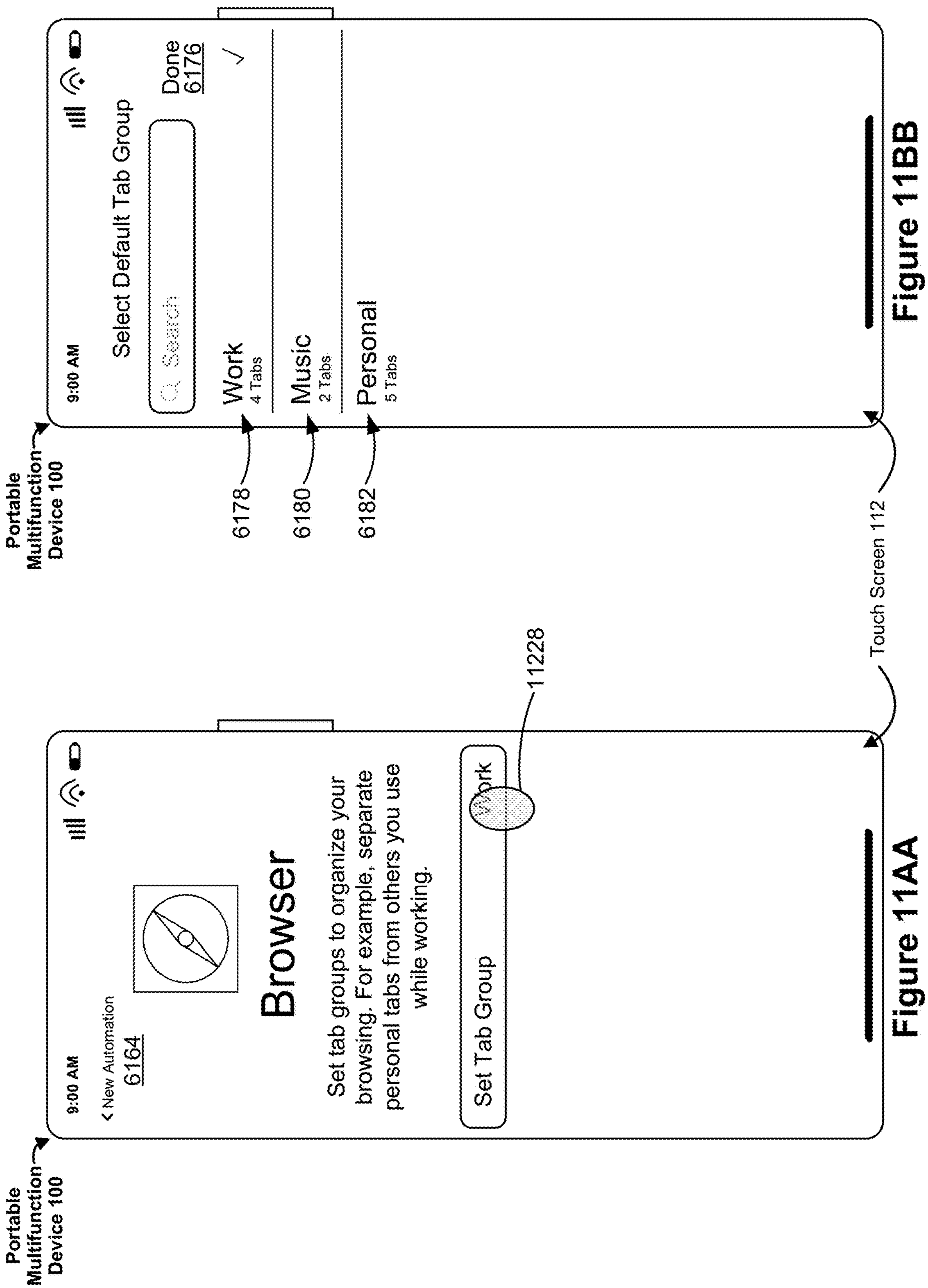
Figure 11D:
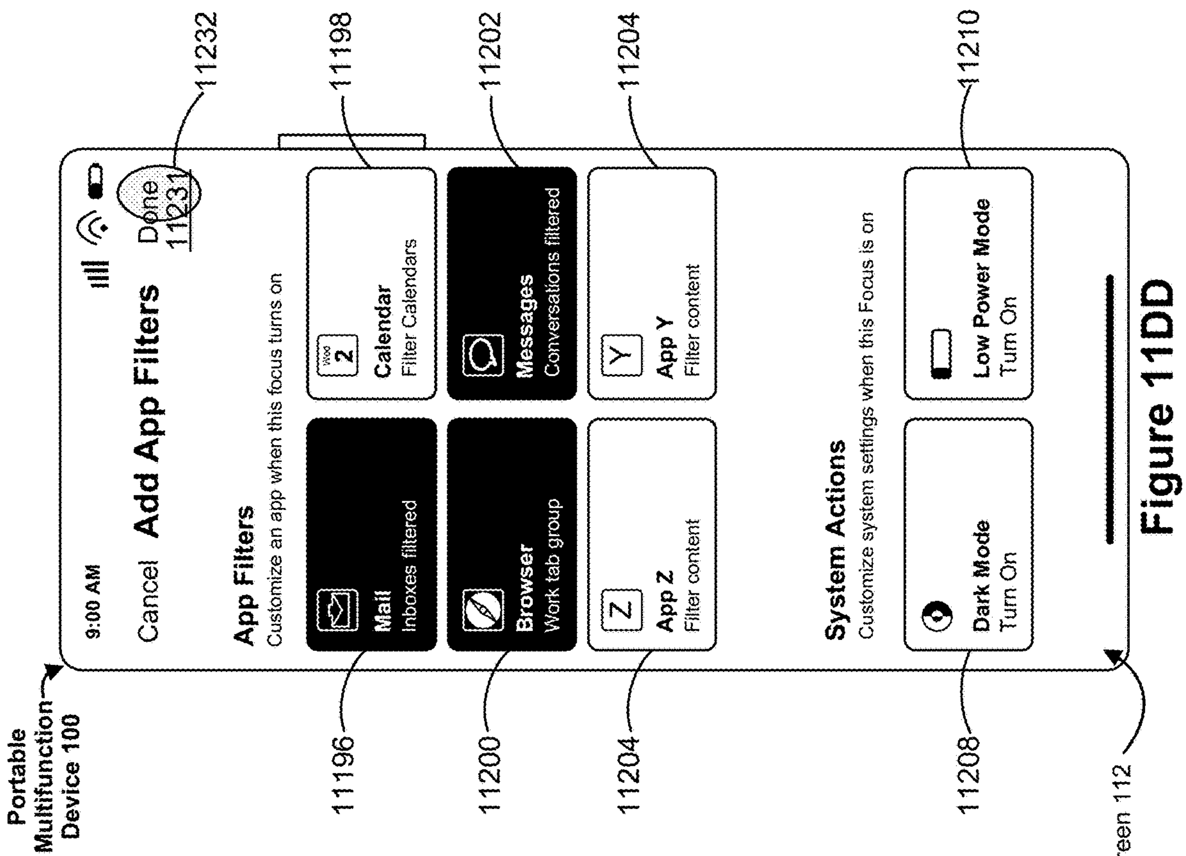
Figure 11C:
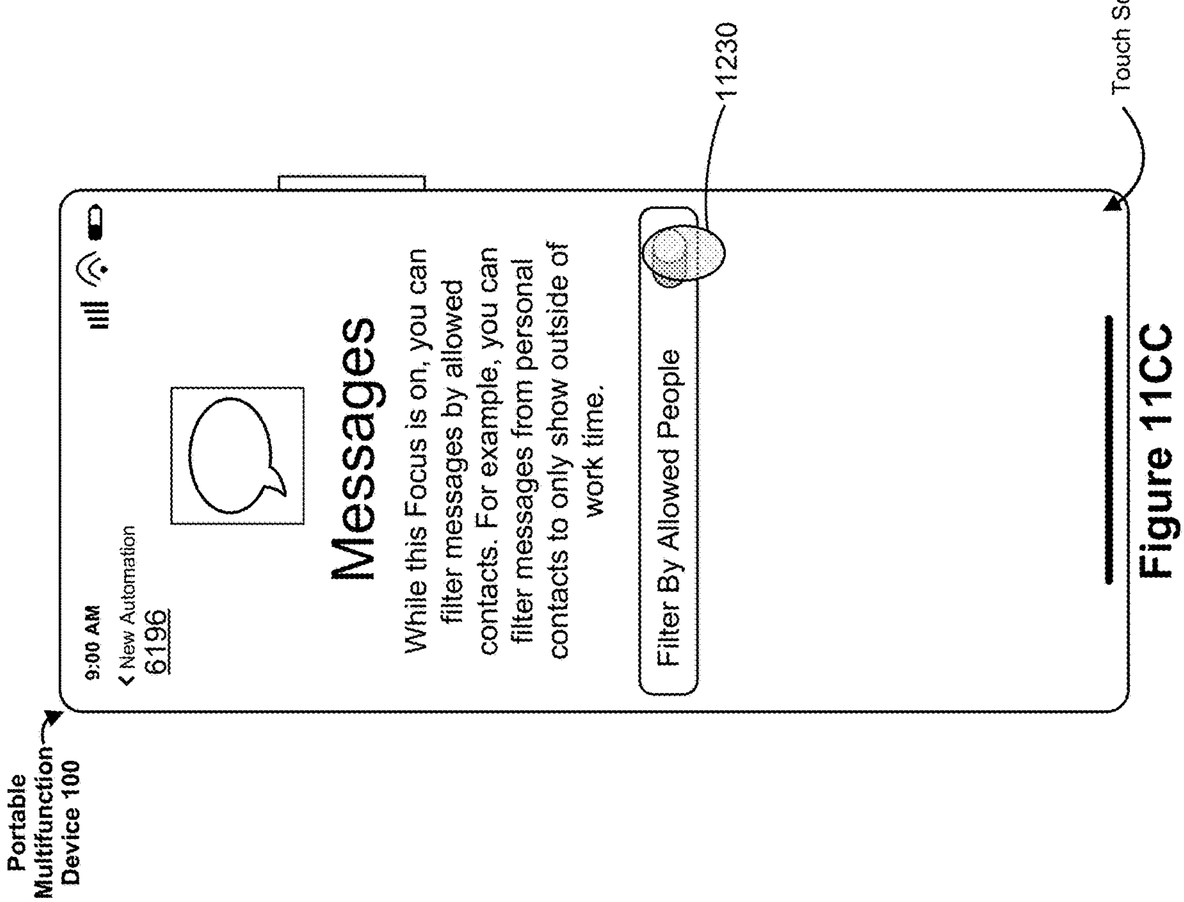
Figure 11E:
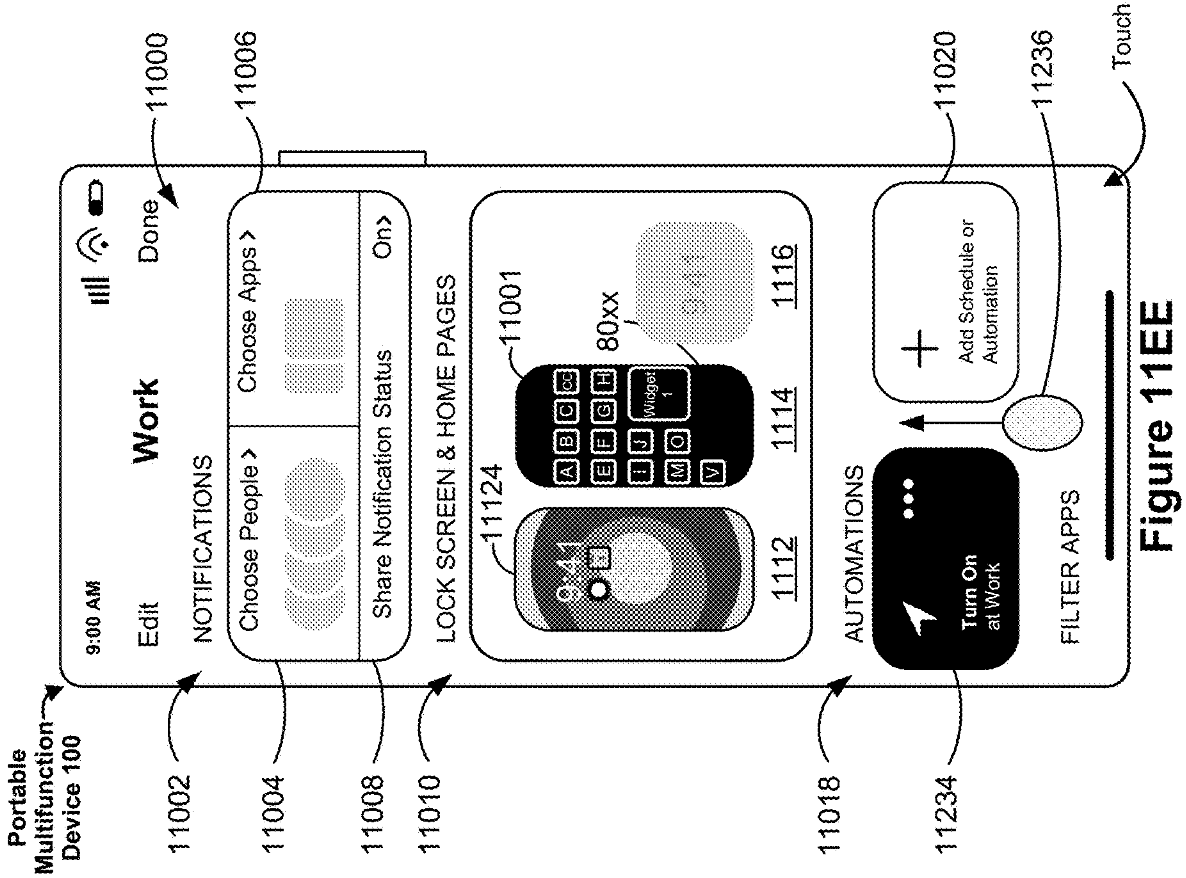
Figure 11F:
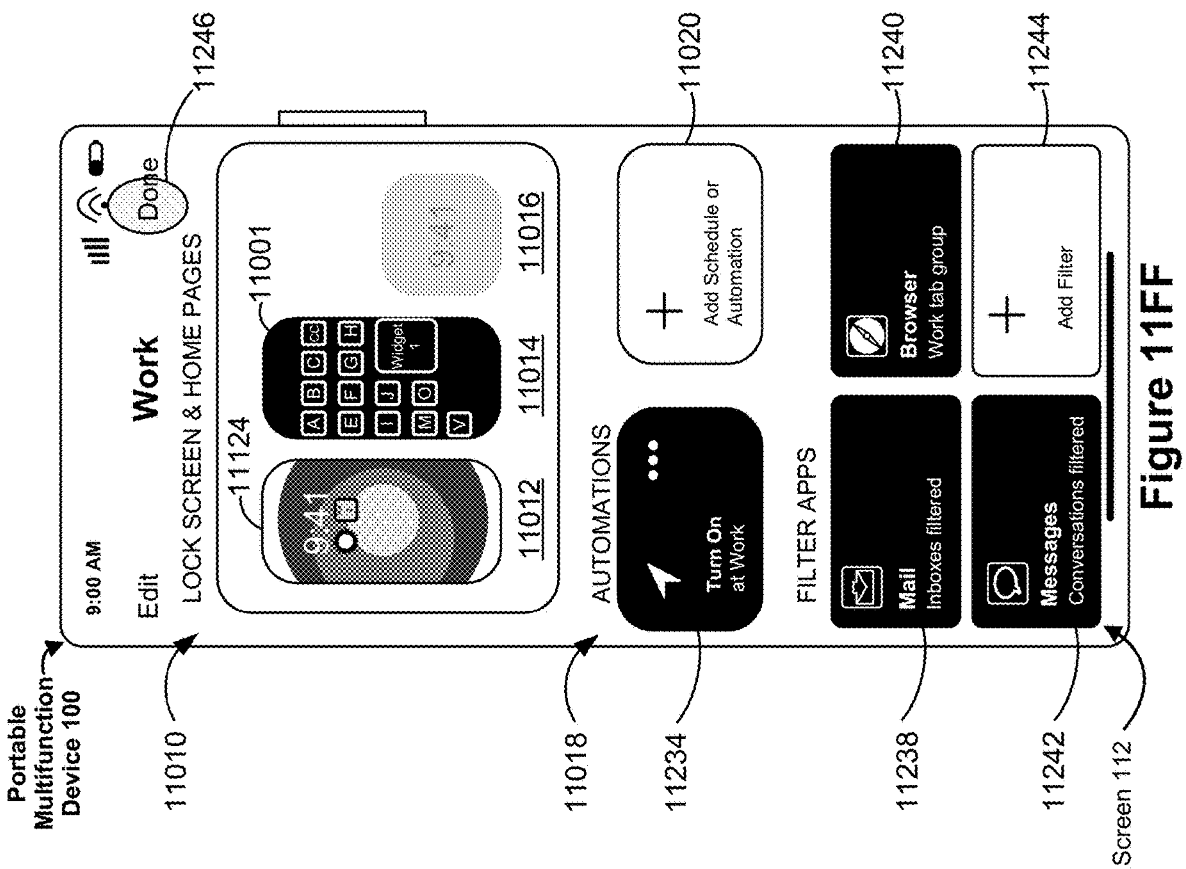
Figure 11H:
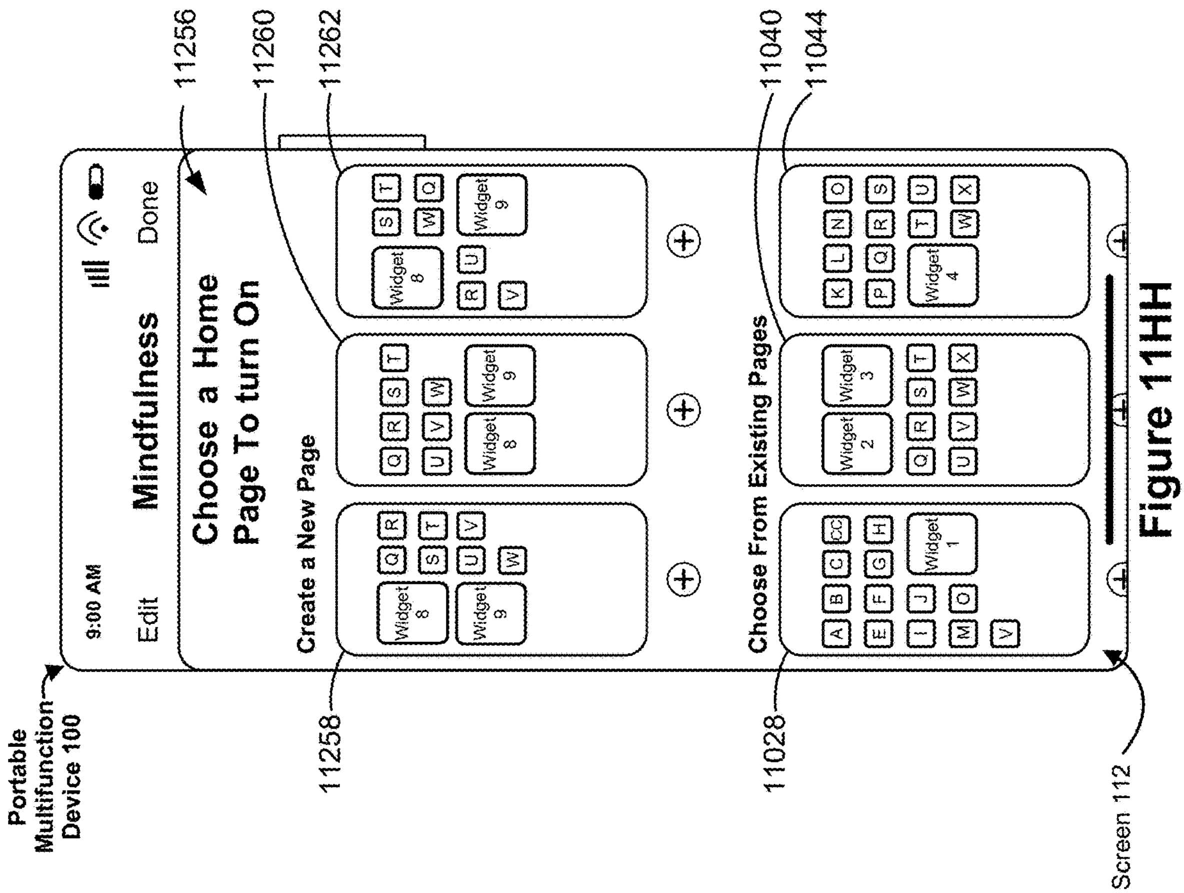
Figure 11G:
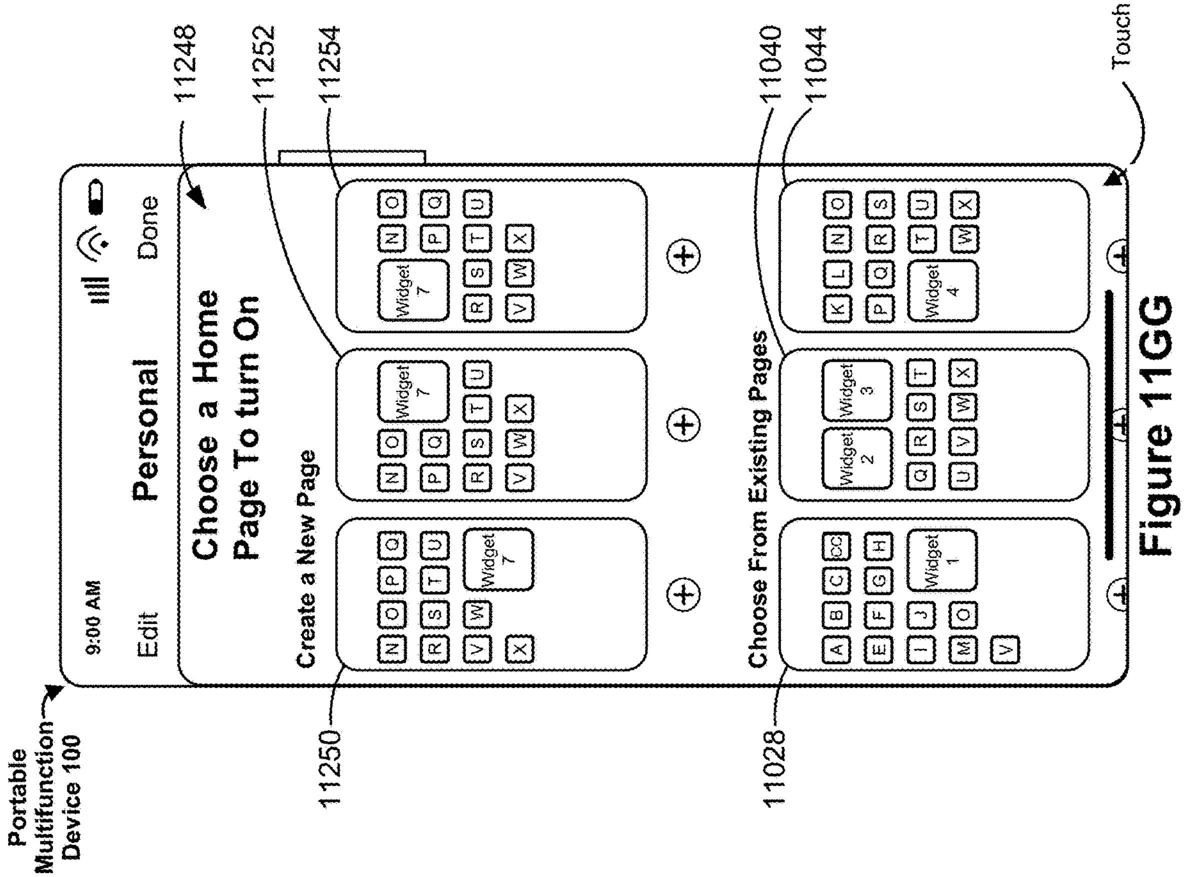
Figure 11J:
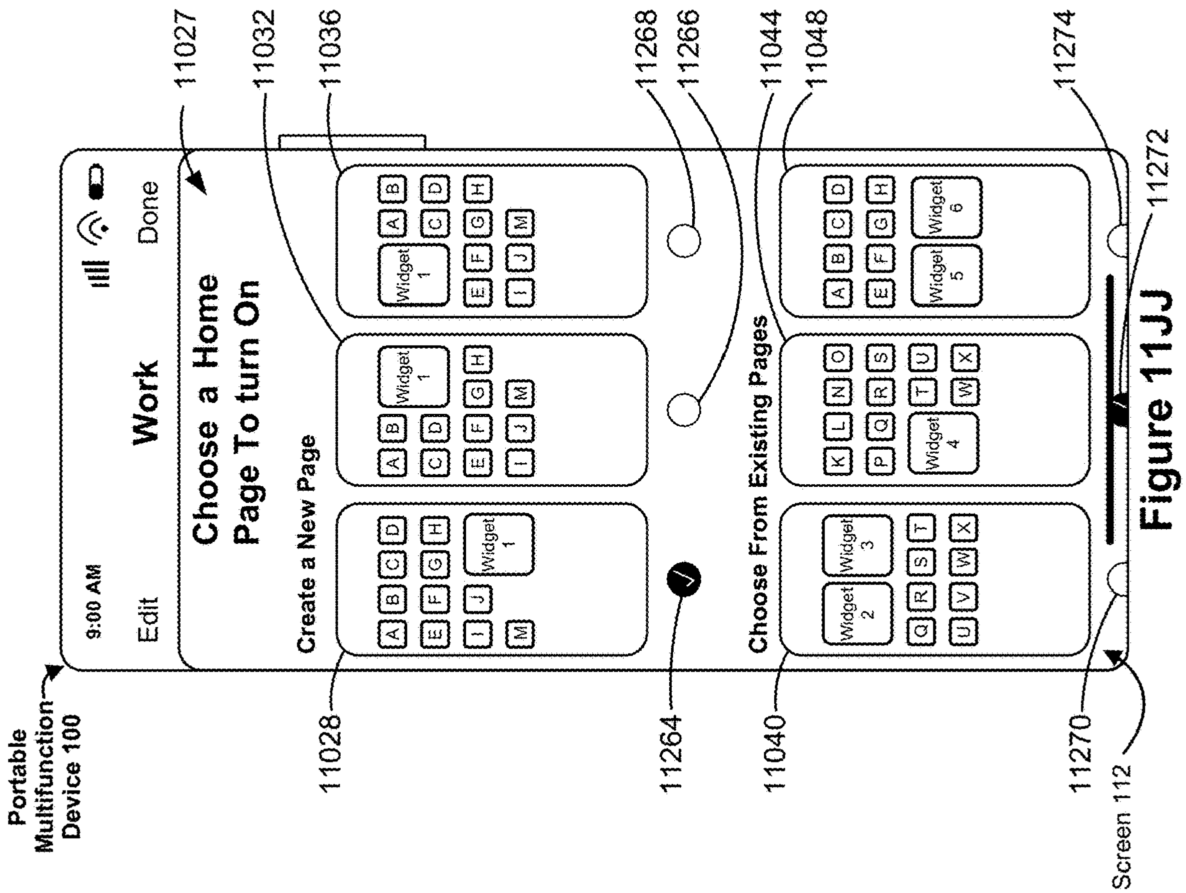
Figure 11I:
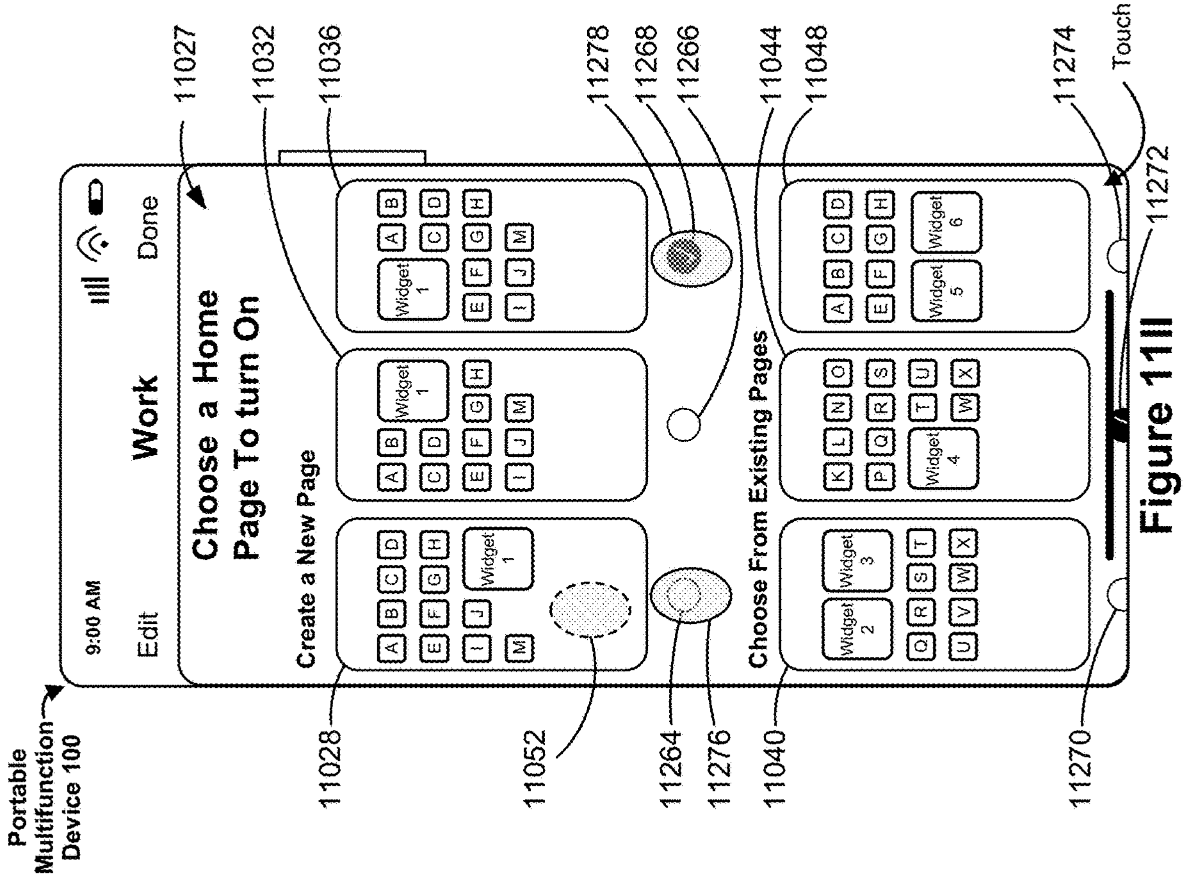
Figure 11L:
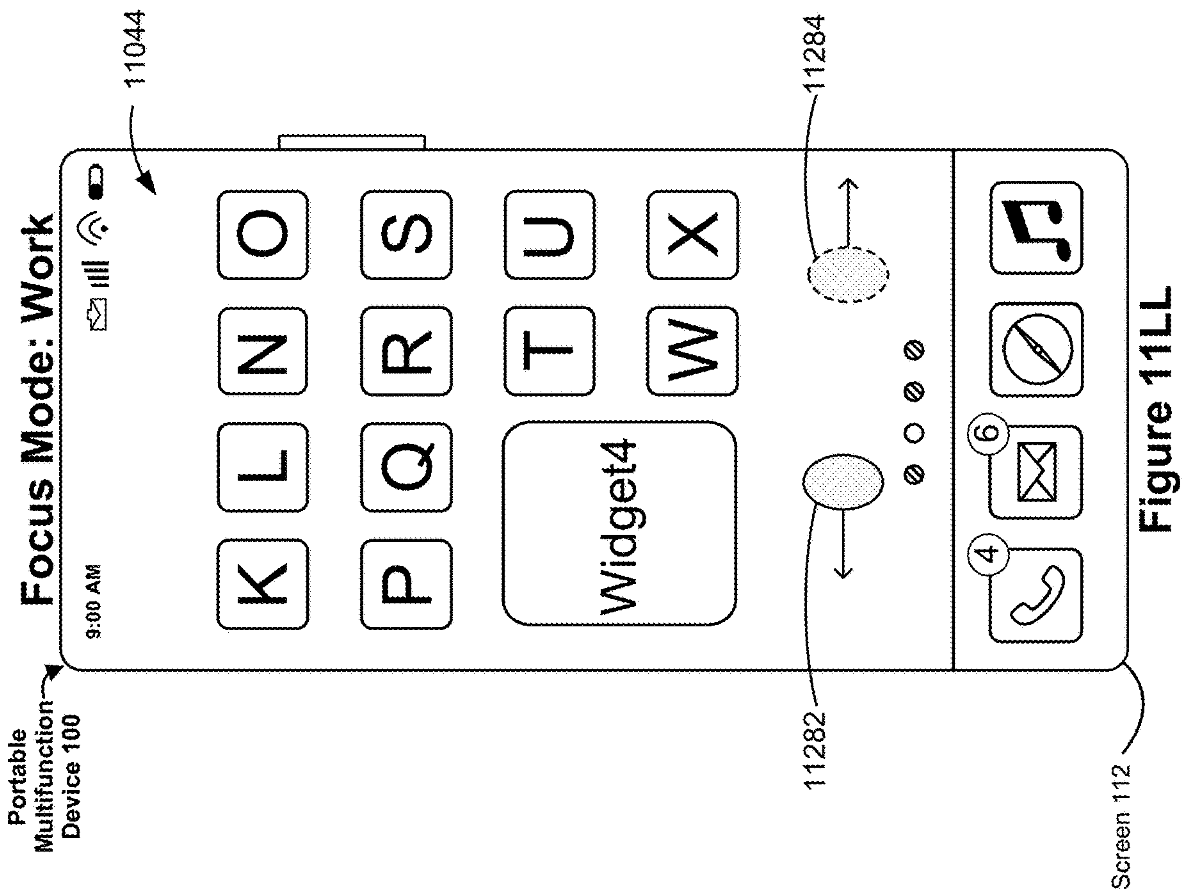
Figure 11K:
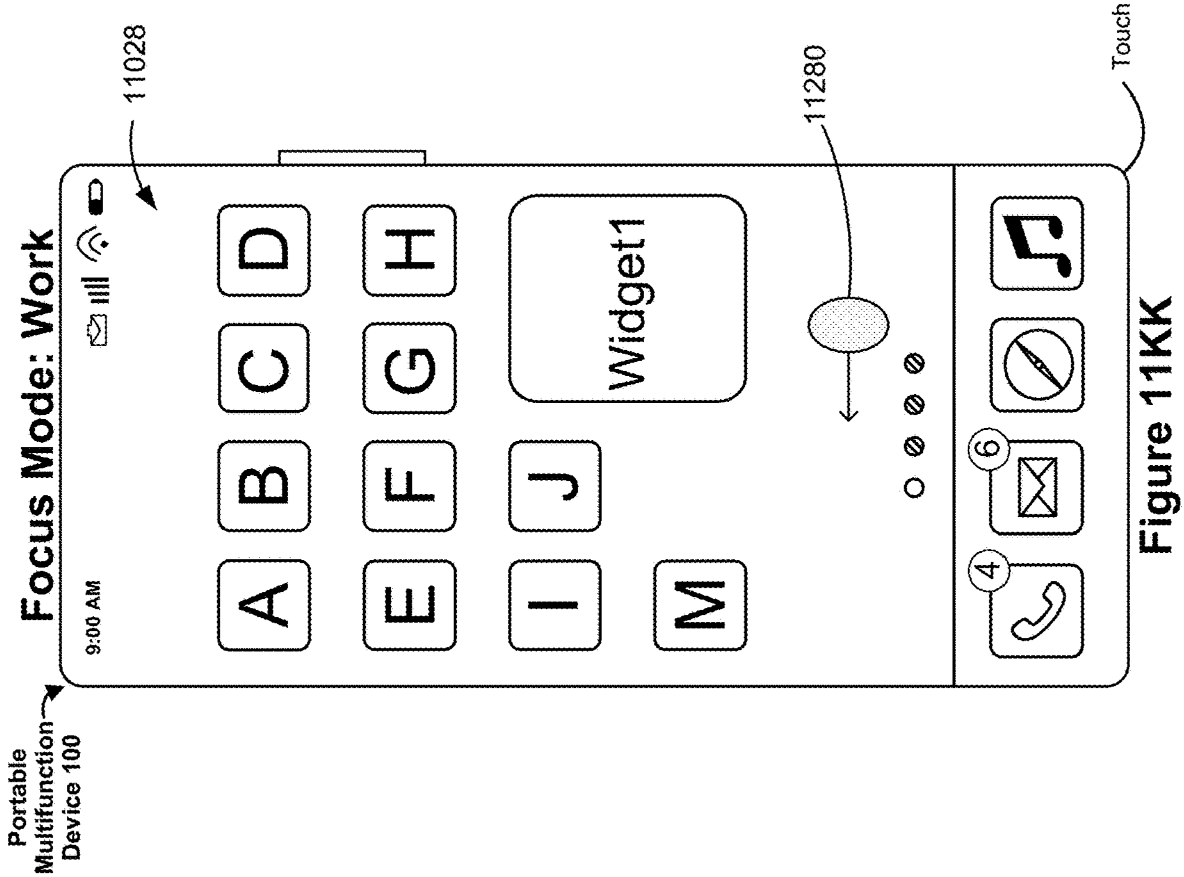

In response to detecting a user input on an application, the portable multifunction device 100 displays a user interface for configuring settings for the selected application. Details regarding this configuration are described above with reference to FIGS. 6G-6M. Specifically, FIGS. 11W and 11X, are analogous to FIGS. 6G and 6H. For example, FIG. 11W shows the same user interface 6116 (e.g., although the user navigates to the user interface 6116 through the user interface 11195 in FIG. 11V, as an alternative to navigating to through the user interface 6005 in FIG. 6E), and the user can configure content filtering by selecting one or more inboxes for which content will be emphasized by default while the "Work" mode is active, as described above with reference to FIGS. 6G and 6H. FIGS. 11Y and 11Z are analogous to FIGS. 6I and 6J, and in FIGS. 11Y and 11Z, the user can configure content filtering for the calendar application by selecting one or more calendars for which content will be emphasized by default while the "Work" mode is active as described above with reference to FIGS. 6I and 6J. FIGS. 11AA and 11BB are analogous to FIGS. 6K and 6L, and in FIGS. 11AA and 11BB, the user can configure content filtering for the browser application by selecting a default tab groups which will be emphasized by default while the "Work" mode is active, as described above with reference to FIGS. 6K and 6L. FIG. 11CC is analogous to FIG. 6M, and the user can configure content for the messaging application by enabling or disabling emphasized content in the messaging application while the "Work" mode is active, as described above with reference to FIG. 6M. For brevity, those details are not repeated here.

FIG. 11DD shows the user interface 11195 after the user has configured content filtering options for some applications. As shown in FIG. 11V, a user inputs 11214 on the affordance 11198 for the calendar application, a user input 11220 on the affordance 11204 for the application Z, and a user input 11222 on the affordance 11204 for the application Y, are shown with dotted lines to indicate these user inputs are optional (e.g., are shown for illustration purposes, but the user does not actually perform these user inputs between FIGS. 11V and 11DD).

The user performs a user input 11212 on the affordance 11196 for the mail application, a user input 11216 on the affordance 11200 for the browser application, and a user input 11218 on the affordance 11202 for the messaging application. After the user configures filtering options for the mail application, the browser application, and the messaging application (e.g., as shown in FIGS. 11W-11X, 11AA-11BB, and 11CC, respectively), the portable multifunction device 100 updates the user interface 11195 to indicate which applications have been configured. The affordance 11196 for the mail application, the affordance 11200 for the browser application, and the affordance 11202 for the messaging application are displayed with a black background and white text to indicate the mail application, browser application, and messaging application have been configured. Unconfigured applications (e.g., the calendar application, the application Z, and the application Y) are displayed with the same appearance as in FIG. 11V.

FIG. 11DD also shows that now that content filtering options for at least one application have been configured, the user interface 11195 now includes a "Done" affordance 11231 (e.g., that is not displayed when no applications have been configured, as in FIG. 11V).

In response to detecting a user input 11232 selecting the "Done" affordance 11231, and as shown in FIG. 11EE, the portable multifunction device redisplays the user interface 11002. In response to detecting an upward swipe gesture 11236, the portable multifunction device 100 scrolls display of the user interface 11000 to the view shown in FIG. 11FF. As some applications have content filtering options configured, the user interface 11000 no longer includes the application filtering section 11190, and the application filtering section 11190 has been replaced by affordances 11238, 11240, and 11242 for the mail application, the browser application, and the messages application, respectively. In response to detecting a user input on one of the affordances 11238, 11240, or 11242, the portable multifunction device 100 displays the corresponding user interface for configuring filtering options of the selected application (e.g., the user interfaces shown in FIGS. 11W-11X, 11AA-11BB, and 11CC). The user interface 11000 also includes an affordance 11244 for configuring additional applications (e.g., applications other than the mail application, the browser application, and the messaging application) of the computer system, and selecting the affordance 11244 cause the portable multifunction device 100 to redisplay the user interface 11195 (as shown in FIG. 11DD).

FIG. 12A-12L illustrate example user interfaces for displaying different content with different degrees of emphasis, on an application by application basis, while a focus mode is active, in accordance with some embodiments.

Figures 12A, 12B, 12C:
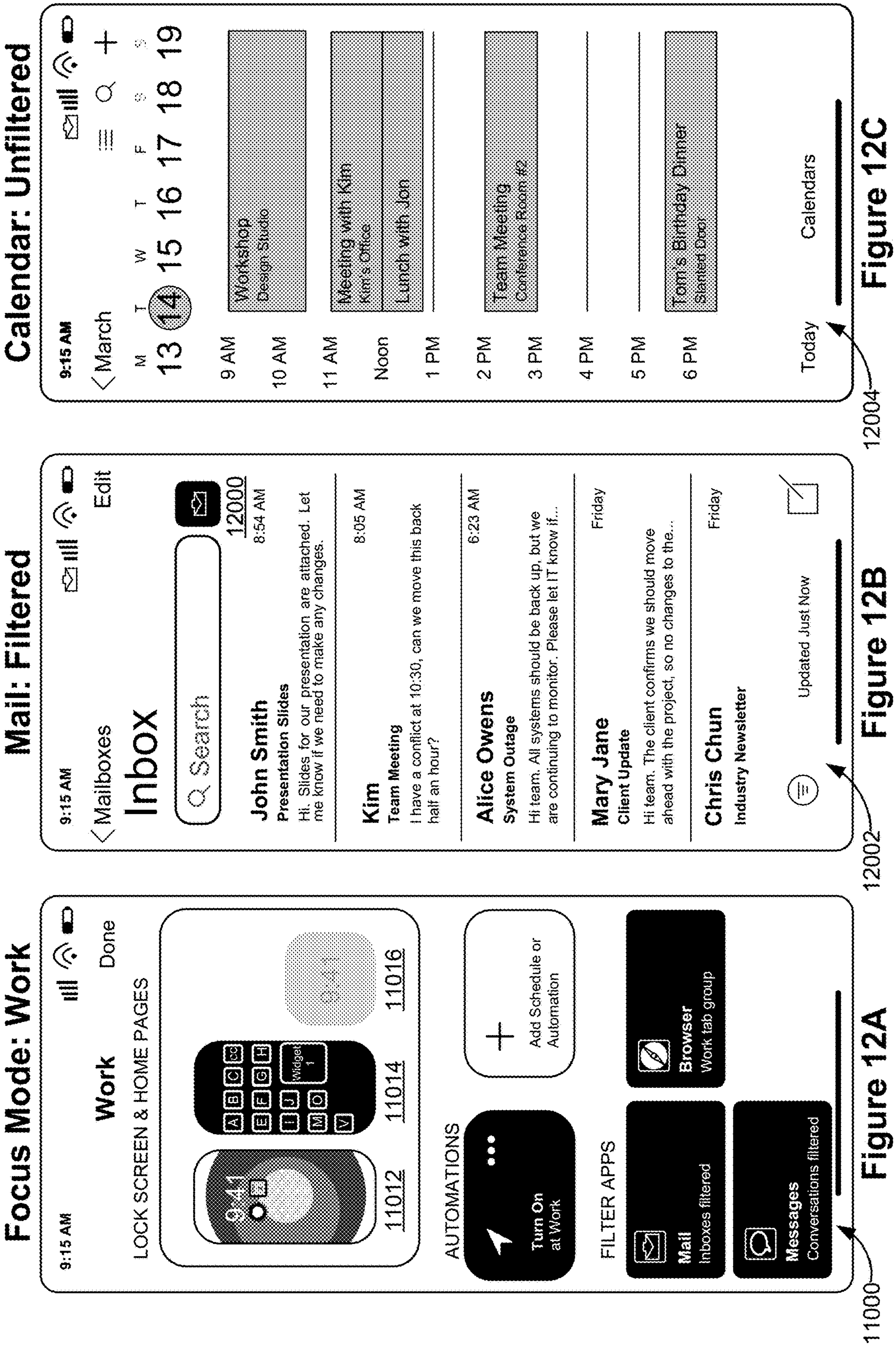
FIGS. 12A-12L illustrate example user interfaces for displaying different content with different degrees of emphasis, on an application by application basis, while a focus mode is active, in accordance with some embodiments.

FIGS. 12A-12C show example user interfaces while a "Work" mode is active for the portable multifunction device 100. FIG. 12A shows the user interface 11000 for configuring settings of the "Work" mode, and that while the "Work" mode is active, a mail application, a browser application, and a messaging application are configured to filter content.

FIG. 12B shows a user interface 12002 for the mail application, while the "Work" mode is active for the portable multifunction device 100. Based on the user-configured settings in the user interface 11000 (shown in FIG. 12A), content (e.g., e-mails) is filtered for the mail application. Some e-mails that appear in the user's unfiltered inbox as shown in FIG. 7A, are not displayed in the user interface 12002 because the mail application is configured to filter content while the "Work" mode is active. The user interface 12002 also includes a content indicator 12000 which displays a visual indication that content is being filtered (e.g., because the "Work" mode is active, and the user has configured the mail application to filter content while the "Work" mode is active). In some embodiments, the content indicator 12000 is the same as the content indicator 7002 described above with reference to FIG. 7D, and the user can switch between filtering content and not filtering content (e.g., as described above with reference to the user input 7008 for FIG. 7D).

FIG. 12C shows a user interface 12004 for a calendar application, while the "Work" mode is active for the portable multifunction device 100. Based on the user-configured settings in the user interface 11000, content (e.g., calendar events) is not filtered for the calendar application. The calendar events shown in FIG. 12C are the same as the calendar events that appear in the user's unfiltered calendar as shown in FIG. 7H.

Figure 12D:
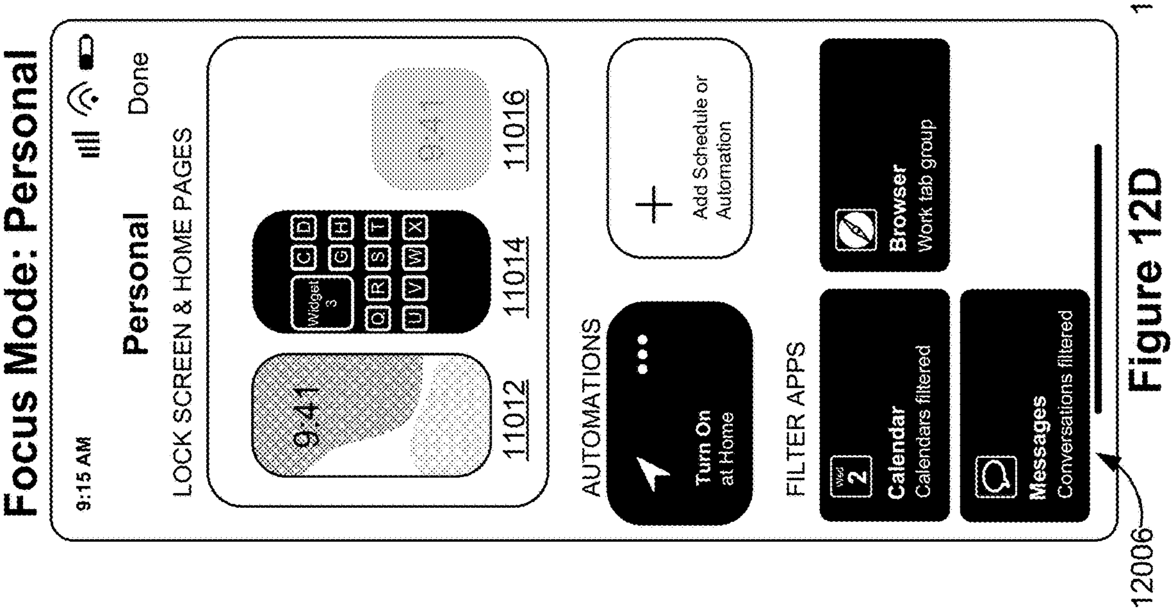
Figure 12E:
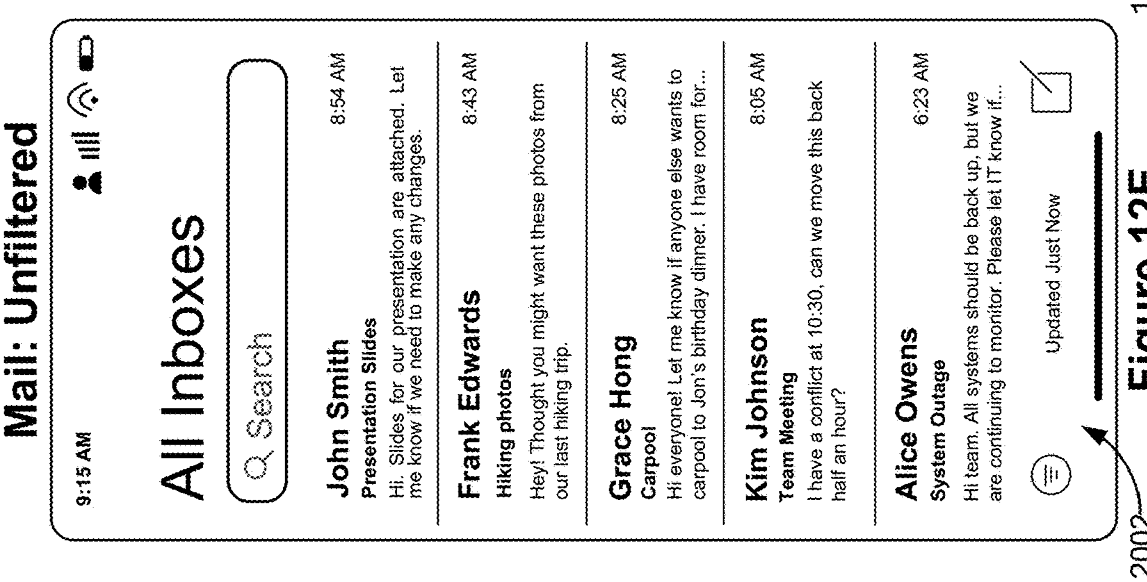

FIGS. 12D-12E show example user interfaces while a "Personal" mode is active for the portable multifunction device 100. FIG. 12D shows a user interface 12006 for configuring settings of the "Personal" mode, and that while the "Personal" mode is active, a calendar application, the browser application, and the messaging application are configured to filter content.

FIG. 12E shows the user interface 12002 for the mail application, while the "Personal" mode is active for the portable multifunction device 100. Based on the user-configured settings in the user interface 12006 (shown in FIG. 12D), content (e.g., e-mails) is not filtered for the mail application. The e-mails shown in FIG. 12E are the same as the e-mails that appear in the user's unfiltered inbox as shown in FIG. 7A. The user interface 12002 does not include the content indicator 12000 while the "Personal" mode is active, as no content is being filtered for the mail application.

Figure 12F:
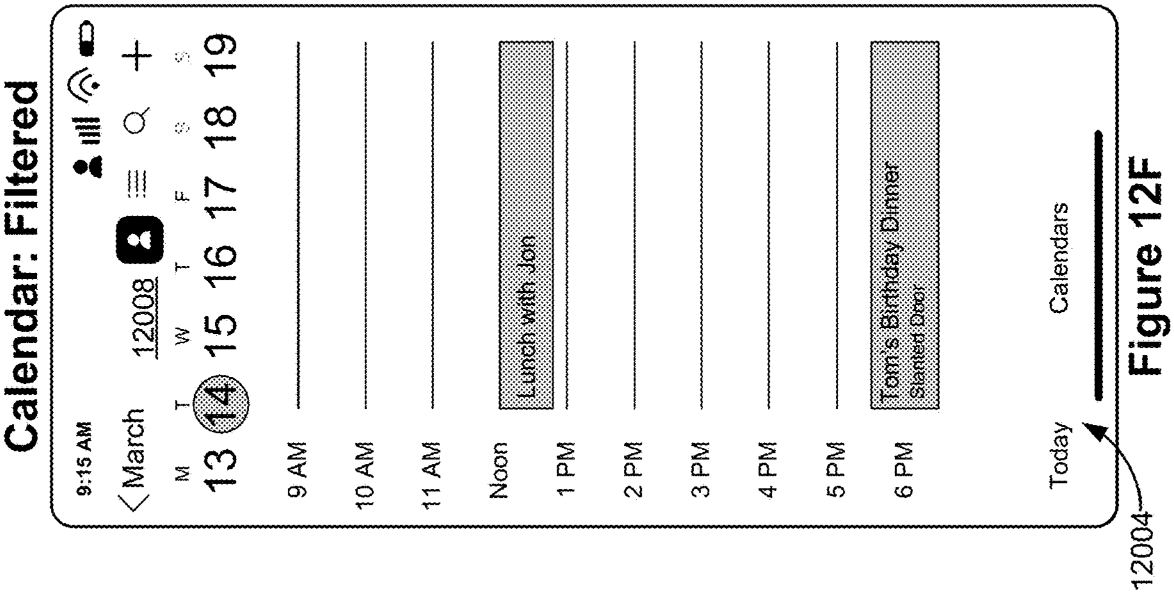

FIG. 12F shows the user interface 12004 for a calendar application, while the "Personal" mode is active for the portable multifunction device 100. Based on the user-configured settings in the user interface 12006, content (e.g., calendar events) is filtered for the calendar application. Some calendar events that appear in the user's unfiltered calendar as shown in FIG. 7H, are not displayed in the user interface 12004 because the calendar application is configured to filter content while the "Personal" mode is active. The user interface 12004 also includes a content indicator 12008 which displays a visual indication that content is being filtered (e.g., because the "Personal" mode is active, and the user has configured the calendar application to filter content while the "Personal" mode is active). In some embodiments, the content indicator 12008 is the same as the content indicator 7033 described above with reference to FIGS. 7I, 7J, 7K, and 7N, and the user can switch between filtering content and not filtering content (e.g., as described above with reference to the user input 7063 for FIG. 7N).

Figures 12G, 12H, 12I:
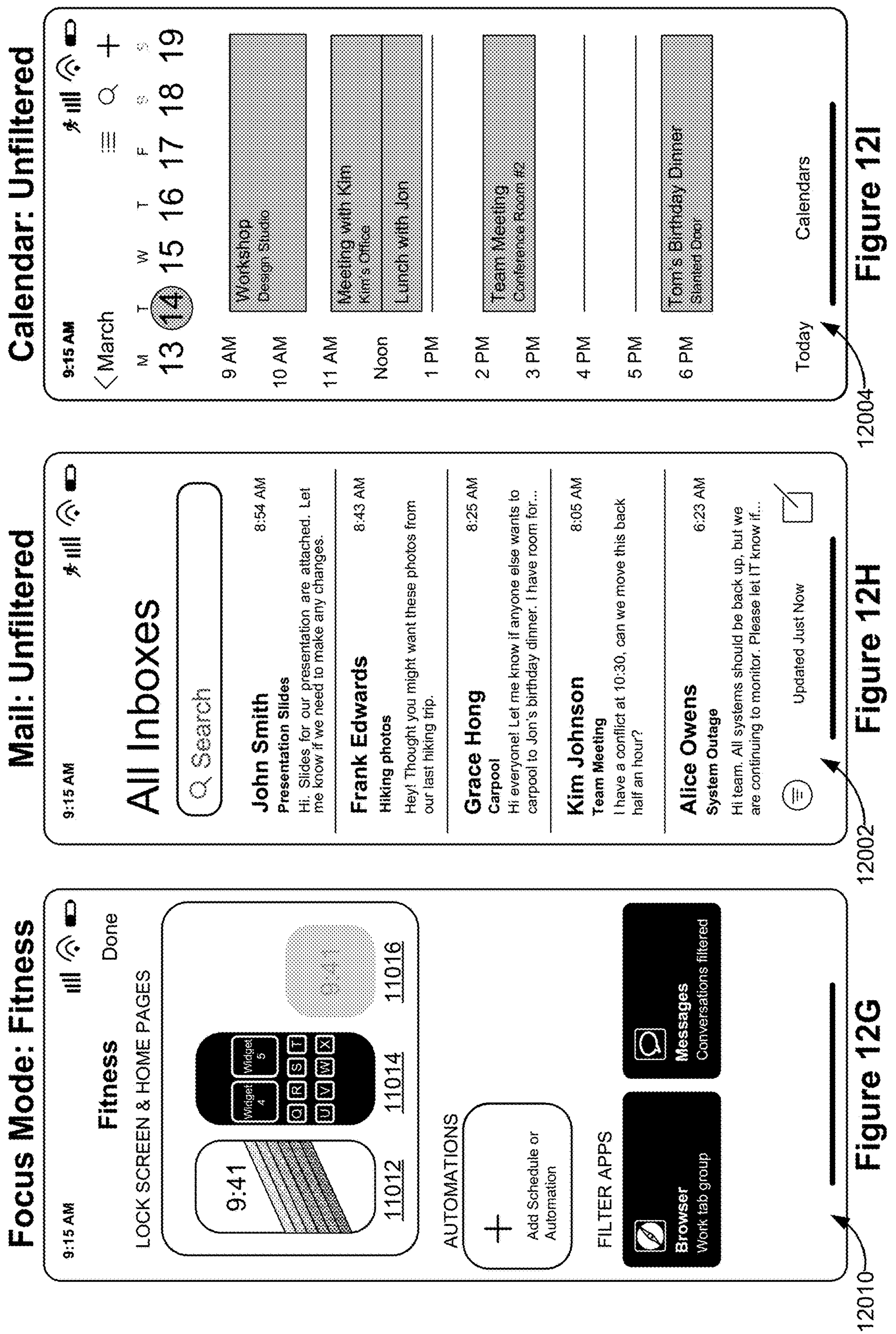

FIGS. 12G-12I show example user interfaces while a "Fitness" mode is active for the portable multifunction device 100. FIG. 12G shows a user interface 12010 for configuring settings of the "Fitness" mode, and that while the "Fitness" mode is active, the browser application and the messaging application are configured to filter content.

FIG. 12H shows the user interface 12002 for the mail application, while the "Fitness" mode is active for the portable multifunction device 100. Based on the user-configured settings in the user interface 12010 (shown in FIG. 12G), content (e.g., e-mails) is not filtered for the mail application.

FIG. 12I shows the user interface 12004 for a calendar application, while the "Fitness" mode is active for the portable multifunction device 100. Based on the user-configured settings in the user interface 12010, content (e.g., calendar events) is not filtered for the calendar application. The user interface 12004 does not include the content indicator 12008 while the "Fitness" mode is active, as no content is being filtered for the calendar application.

Figures 12J, 12K, 12L:
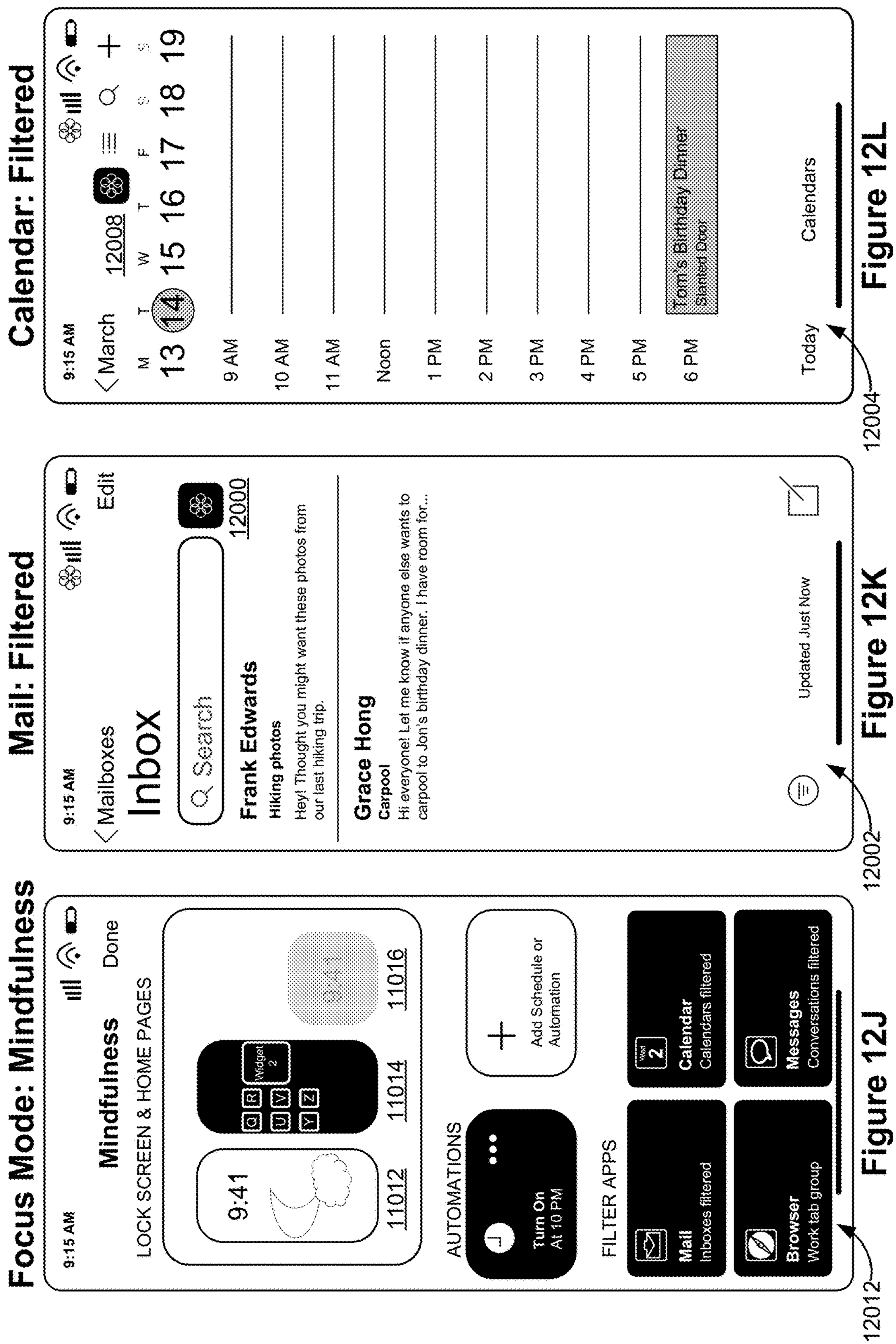

FIGS. 12J-12L show example user interfaces while a "Mindfulness" mode is active for the portable multifunction device 100. FIG. 12J shows a user interface 12012 for configuring settings of the "Mindfulness" mode, and that while the "Mindfulness" mode is active, the mail application, the calendar application, the browser application, and the messaging application are configured to filter content.

FIG. 12K shows a user interface 12002 for the mail application, while the "Mindfulness" mode is active for the portable multifunction device 100. Based on the user-configured settings in the user interface 12012 (shown in FIG. 12J), content (e.g., e-mails) is filtered for the mail application. The mail application can be configured to filter different content while the "Mindfulness" mode is active, compared to the content that is filtered while the "Work" mode is active. As shown in FIG. 12K, the user interface 12002 includes a different set of e-mails when filtering content while the "Mindfulness" mode is active, as compared to the user interface 12002 shown in FIG. 12B, while the "Work" mode is active. FIG. 12K also shows that the content indicator 12000 can include a visual indication of which mode is active for the personal multifunction device 100 (e.g., the icon for the content indicator 12000 is different in FIG. 12K and in FIG. 12B).

FIG. 12L shows the user interface 12004 for the calendar application, while the "Mindfulness" mode is active for the portable multifunction device 100. Based on the user-configured settings in the user interface 12012, content (e.g., calendar events) is filtered for the calendar application. The calendar application can be configured to filter different content while the "Mindfulness" mode is active, compared to the content that is filtered while the "Personal" mode is active. As shown in FIG. 12L, the user interface 12004 includes a different set of calendar events when filtering content while the "Mindfulness" mode is active, as compared to the user interface 12004 shown in FIG. 12F, while the "Personal" mode is active. FIG. 12L also shows that the content indicator 12008 can include a visual indication of which mode is active for the personal multifunction device 100 (e.g., the icon for the content indicator 12008 is different in FIG. 12L and in FIG. 12F).

FIGS. 8A-8E are flow diagrams illustrating method 800 of switching between different focus modes in accordance with some embodiments. Method 800 is performed (802) at a computer system (e.g., device 300, FIG. 3, or portable multifunction device 100, FIG. 1A) that is in communication with a display generation component (e.g., a hardware element, comprising one or more display devices, such as a display, a projector, a touch-screen display, a heads-up display, a head-mounted display, or the like) (and optionally, the computer system is further in communication with one or more input devices, one or more cameras, and/or one or more 3D sensing and/or determination devices, such as lidars, depth sensors, and/or distance sensors) Some operations in method 800 are, optionally, combined and/or the order of some operations is, optionally, changed.

As described below, method 8000 is a method for switching between different focus modes, thereby providing a more efficient way to switch between active focus modes, which reduces the number of inputs needed to activate or deactivate different focus modes.

While a first notification mode is active for the computer system, wherein the first notification mode has a first set of one or more rules for notification delivery at the computer system and while the computer system is in a low power state, the computer system detects (804), via the one or more input devices, a first request (e.g., a touch input via a touch sensitive surface of the computer system, a change in orientation and/or position of the computer system) to wake the computer system (e.g., to transition the computer system out of the low power state into a normal power state, as shown in FIG. 5A).

In response to detecting the first request to wake the computer system, the computer system displays (806), via the display generation component, a first wake screen user interface with a first background image (e.g., a wake user interface as shown in FIG. 5B); (and transitioning the computer system out of the lower power state into a normal power state (e.g., a wake state)).

While displaying the first wake screen user interface, the computer system detects (808) a request (e.g., the user inputs 5011, 5012, 5014, and 5030 in FIGS. 5B, 5C-1, 5D, and 5E, respectively) to switch from the first notification mode to a second notification mode (e.g., the "Personal" mode shown in FIG. 5F-1), which has a second set of one or more rules for notification delivery that are different from the first set of one or more rules for notification delivery (e.g., a different set of notification is displayed on the wake user interface in FIG. 5F-1 for the "Personal" mode, compared to the set of notifications displayed on the wake user interface if FIG. 5A where no focus mode is active).

In response to detecting the request to switch from the first notification mode to the second notification mode, the computer system switches (810) from the first notification mode to the second notification mode at the computer system (e.g., in FIG. 5F-1, the mode indicator 5032 indicates the portable multifunction device has transitioned to the "Personal" mode).

While the second notification mode is active for the computer system and while the computer system is in the low power state (e.g., the portable multifunction device enters the low power state in Figure SI), the computer system detects (812), via the one or more input devices, a second request (e.g., a touch input via a touch sensitive surface of the computer system, a change in orientation and/or position of the computer system) to wake the computer system (e.g., to transition the computer system out of the low power state into a normal power state) (e.g., the user input 5038 in FIG. 5I).

In response to detecting the second request to wake the computer system, the computer system displays (814), via the display generation component, a second wake screen user interface with a second background image that is different from the first background image (e.g., in FIG. 5J, the displayed wake user interface is the same as in FIG. 5H, before the portable multifunction device 100 entered the low power state), instead of displaying the first wake screen user interface. In some embodiments, if the computer system does not detect any user inputs within a threshold amount of time (e.g., 5 second, 10 second, 30 seconds, or 1 minute), the computer system ceases to display the second user interface and returns to a low power or sleep state.

In some embodiments, before detecting the request to switch from the first notification mode to the second notification mode (816): the computer system transitions the computer system from a wake state to the low power state. While the computer system is in the low power state, the computer system detects a third request to wake the computer system. In response to detecting the third request to wake the computer system, the computer system displays the first wake screen user interface with the first background image (e.g., as in FIGS. 5A and 5B). While the second notification mode is active for the computer system, the computer system transitions from a wake state to the low power state. While the computer system is in the low power state, the computer system detects a fourth request to wake the computer system. In response to detecting the fourth request to wake the computer system, the computer system displays the second wake screen user interface with the second background image that is different from the first background image (e.g., as in FIGS. 5I and 5J). In some embodiments, the first wake screen user interface is persistent, and will be displayed in response to multiple different requests to wake the computer system while the first notification mode remains active for the computer system. In some embodiments, the second wake screen user interface is persistent, and will be displayed in response to multiple different requests to wake the computer system while the second notification mode remains active for the computer system. For example, with reference to FIGS. 5G through 5J, the portable multifunction device 100 displays a first wake screen user interface with a first background image. Before detecting the user input 5042 (in FIG. 5J), the portable multifunction device 100 transitions to a low power state (e.g., as shown in Figure SI), and in response to detecting a request to wake the computer system, the portable multifunction device 100 displays the first wake screen user interface with the first background image (e.g., FIG. 5J shows the same wake screen as FIG. 5G).

In some embodiments, the first wake screen user interface is (818) a wake screen user interface for a first user; and the second wake screen user interface is a wake screen user interface for the first user. For example, with reference to FIGS. 5J and 5K-1, both the "Personal" mode and the "Fitness" mode display wake screen user interfaces for the first user (e.g., the same user uses the device in the "Personal" mode in FIG. 5J and in the "Fitness" mode in FIG. 5K-1).

In some embodiments. after switching from the first notification mode to the second notification mode at the computer system, and while the second notification mode is active for the computer system, the computer system transitions (820) from a wake state to the low power state (e.g., in response to a request to put the computer system into the low power state such as a hand cover gesture, a button press, or a verbal input, or in response to the occurrence of a condition associated with transitioning to the low power state such a predetermined period of time elapsing without detecting input at the computer system). For example, in FIGS. 5H and 5I, the portable multifunction device 100 transitions from a wake state (e.g., in FIG. 5H) to a low power state (e.g., in FIG. 5I).

In some embodiments, while the first notification mode is active for the computer system, the computer system suppresses (822) a first subset of received notifications in accordance with the first set of one or more rules for notification delivery. While the second notification mode is active for the computer system, the computer system suppresses a second subset of received notifications, different from the first subset of received notifications, in accordance with the second set of one or more rules for notification delivery. In some embodiments, while the first notification mode is active for the computer system, the computer system detects occurrence of a first plurality of events. In some embodiments, each respective event in the first plurality of events is associated with a respective notification of the received notifications. In response to detecting the occurrence of the first plurality of events, the computer system displays a first plurality of notifications in accordance with the first set of one or more rules for notification delivery. In some embodiments, displaying the first plurality of notifications includes suppressing the first subset of the received notifications in accordance with the first set of one or more rules for notification delivery. In some embodiments, while the second notification mode is active for the computer system, the computer system detects occurrence of a second plurality of events. In some embodiments, each respective event in the second plurality of events is associated with a respective notification of the received notifications. In response to detecting the occurrence of the second plurality of events, the computer system displays a second plurality of notifications in accordance with the second set of one or more rules for notification delivery. In some embodiments, displaying the second plurality of notifications includes suppressing the second subset of the received notifications in accordance with the second set of one or more rules for notification delivery. For example, in FIG. 5F-1, a first subset of notifications (e.g., the notifications 5002 and from FIG. 5B) are suppressed while the "Personal" mode is active, and in FIG. 5K-1, a second subset of notifications (e.g., the notifications 5002, 5004, 5006, and 5008 from FIG. 5B) are suppressed while the "Fitness" mode is active. Suppressing a first subset of received notifications in accordance with the first set of one or more rules for notification delivery while the first notification mode is active, and suppressing a second subset of received notifications in accordance with the second set of one or more rules for notification delivery while the second notification mode is active, reduces the number of user inputs needed to suppress the appropriate notifications (e.g., the user does not need to perform additional user inputs to reconfigure the rules for notification delivery when switching from the first notification mode to the second notification mode).

In some embodiments, switching from the first notification mode to the second notification mode includes (824) enabling a restricted notification mode in which certain types of notifications are suppressed. For example, in FIG. 5F-1, the portable multifunction device 100 enables a restricted notification mode in which certain types of notifications (e.g., notification for the applications A, M, and Z) are suppressed. Enabling a restricted notification mode when switching from the first notification mode to the second notification mode reduces the number of user inputs needed to suppress the appropriate notifications (e.g., the user does not need to perform additional user inputs to enable a restricted notification mode, or to suppress specific notifications, when switching from the first notification mode to the second notification mode).

In some embodiments, switching from the first notification mode to the second notification mode includes (826) disabling a restricted notification mode in which certain types of notifications are suppressed. For example, in FIG. 5N, the portable multifunction device switches from a first notification mode (e.g., the "Fitness" mode in FIG. 5M) to a second notification mode (e.g., no focus mode in FIG. 5N), and disabled a restricted notification mode in which certain types of notifications are suppressed (e.g., the notifications 5002, 5004, and 5006 which were suppressed while the "Fitness" mode was active are no longer suppressed). Disabling a restricted notification mode in which certain types of notifications are suppressed when switching from the first notification mode to the second notification mode reduces the number of user inputs needed to display the appropriate notifications (e.g., the user does not need to perform additional user inputs to disable a restricted notification mode, or to allow delivery of specific notifications, when switching from the first notification mode to the second notification mode).

In some embodiments, the computer system detects (827) a request to transition from a current wake screen to a corresponding home screen user interface (e.g., a press of a home button and/or a gesture such as an air gesture or a swipe on a touch-sensitive surface such as a swipe from an edge of a touch-screen display toward a central region of the touch-screen display). In response to detecting the request to transition from the current wake screen to the corresponding application launch user interface (e.g., a corresponding home screen user interface): in accordance with a determination that the first notification mode is active at the computer system, the computer system displays a first application launch user interface (e.g., transitioning from the first wake screen user interface to a home screen for the first notification mode); and in accordance with a determination that the second notification mode is active at the computer system, the computer system displays a second application launch user interface that is different from the first application launch user interface (e.g., transitioning from the second wake screen user interface to a home screen for the second notification mode). In some embodiments, the first application launch user interface is the user interface that is displayed immediately upon transitioning from the first wake screen user interface, and optionally, what is displayed is a first page of a multi-page application launch user interface. In some embodiments, the second application launch user interface is the user interface that is displayed immediately upon transitioning from the second wake screen user interface, and optionally, what is displayed is a second page of a multi-page application launch user interface, distinct from the first page). For example, in FIGS. 5G and 5H, the portable multifunction device detects a user request to transition from a current wake screen (in FIG. 5G) to a corresponding home screen user interface (in FIG. 5H). In accordance with a determination that the second notification mode is active (e.g., the "Personal" mode is active in both FIGS. 5G and 5H), the portable multifunction device 100 displays a second application launch user interface different from the first application launch user interface (e.g., the home screen user interface in FIG. 5H is different from the home screen user interface in FIG. 5C-1). Displaying a second application launch user interface that is different from the first application launch user interface in accordance with a determination that the second notification mode is active at the computer system reduces the number of user inputs needed to display the appropriate application launch user interface (e.g., the user does not need to perform additional user inputs in order to change the second application launch user interface, when switching to the second notification mode).

In some embodiments, the first application launch user interface includes (828) a first plurality of home screen pages (e.g., a plurality of home screen pages) and the second application launch user interface includes a second plurality of home screen pages different from the first plurality of home screen pages (e.g., the second plurality of home screen pages includes one or more home screen pages that are not included in the first plurality of home screen pages and/or the first plurality of home screen pages include one or more home screen pages not included in the second plurality of home screen pages). In some embodiments, the device, in response to user inputs, navigates between different home screen pages of the first plurality of home screen pages. For example, while a first home screen page is displayed, a user can perform a swipe left to transition to a second home screen page. While the second home screen page is displayed, a user can perform a swipe left to transition to a third home screen page, or a user can perform a swipe right to transition back to the first home screen page. For example, with reference to FIGS. 5H, the home screen user interface can include a plurality of home screen pages (e.g., that the user can navigate between via leftward and rightward swipe gestures).

In some embodiments, the first application launch user interface has (830) a third background image. The second application launch user interface has a fourth background image that is different from the third background image. In some embodiments, the third background image is the same as the first background image. In some embodiments, the fourth background image is the same as the second background image. For example, in FIG. 5C-1, the first application launch user interface has a third background image (e.g., that is the same as the first background image of the wake user interface in FIG. 5B), and in FIG. 5H, the second application launch user interface has a fourth background image different from the third background image (e.g., the background image including horizontal lines in FIG. 5H is different from the light grey background image in FIG. 5C-1). Displaying a second application launch user interface that has a fourth background image, in accordance with a determination that the second notification mode is active at the computer system, and displaying a first application launch user interface that has a third background image, in accordance with a determination that the first notification mode is active at the computer system, reduces the number of user inputs needed to display the appropriate application launch user interface with the appropriate background image (e.g., the user does not need to perform additional user inputs in order to change the second application launch user interface, or the background image for the second application launch user interface, when switching to the second notification mode).

In some embodiments, the first wake screen user interface includes (832) a first plurality of icons (e.g., complications, widgets, and/or representations of applications) and the second wake screen user interface includes a second plurality of icons that is different from the first plurality of icons. (e.g., the second plurality of icons includes one or more icons pages that are not included in the first plurality of icons and/or the first plurality of icons includes one or more icons not included in the second plurality of icons). In some embodiments, while displaying a respective wake screen of the first wake screen and the second wake screen, the device, in response to a user input, navigates to the other wake screen of the first wake screen and the second wake screen. For example, while the first wake screen is displayed, a user can perform a swipe left to transition to the second wake screen. While the second wake screen is displayed, the user can perform a swipe right to transition back to the first wake screen. In some embodiments, the user can perform a swipe left to transition to a third wake screen that includes a third plurality of icons that is different from the first plurality of icons and the second plurality of icons. For example, in FIG. 5F-1, the wake screen user interface includes a first plurality of icons (e.g., between the notification 5006 and the date), and in FIG. 5K-1, the wake screen user interface includes a different plurality of icons (e.g., between the notification 5010 and the date). Displaying a second wake user interface that include a second plurality of icons while the second notification mode is active at the computer system, and displaying a first wake user interface that includes a first plurality of icons while the first notification mode is active at the computer system, reduces the number of user inputs needed to display the appropriate plurality of icons (e.g., the user does not need to perform additional user inputs in order to configure the available icons included in the second wake user interface, when switching to the second notification mode).

In some embodiments, the computer system detects (834) a first set of user inputs. In response to detecting the first set of user inputs, the computer system displays a user interface for editing a respective wake screen of the computer system. The user interface for editing the respective wake screen includes concurrently displaying: one or more controls for editing content and/or a layout of the wake screen for the computer system; and one or more controls for editing a restricted notification mode that is associated with the respective wake screen (e.g., one or more controls for selecting which of a plurality of restricted notification modes to use with the respective wake screen). For example, in FIG. 5V, the portable multifunction device 100 displays a user interface for editing the image 5092, which includes one or more controls for editing content and/or a layout (e.g., the "Customize" affordance 5122) and one or more controls for editing a restricted notification mode that is associated with the respective wake screen (e.g., the focus indicator 5124). Concurrently displaying one or more controls for editing content and/or a layout of the wake screen for the computer system; and one or more controls for editing a restricted notification mode that is associated with the respective wake screen reduces the number of inputs needed to associate a wake screen with a particular focus mode (e.g., the user does not need to perform additional inputs to first configure the respective wake screen, and then additional inputs to navigate to a separate user interface for configuring the associated focus mode.

In some embodiments, the computer system detects (836) a second set of user inputs. In response to detecting the second set of user inputs, the computer system displays a user interface for editing a respective wake screen of the computer system. The user interface for editing the respective wake screen includes concurrently displaying: one or more controls for editing content and/or layout of the wake screen for the computer system; and a plurality of options for selecting different notification modes for use with the respective wake screen. (e.g., an option for selecting the first notification mode for use when the respective wake screen is a current wake screen for the computer system, wherein the first notification mode is a preexisting restricted notification mode, an option for selecting the second restricted notification mode for use when the respective wake screen is a current wake screen for the computer system wherein the second notification mode is a preexisting restricted notification mode that is different from the first notification mode, an option for selecting a third restricted notification mode for use when the respective wake screen is a current wake screen for the computer system wherein the third notification mode is a preexisting restricted notification mode that is different from the first notification mode and the second notification mode, and/or an option for selecting a fourth restricted notification mode for use when the respective wake screen is a current wake screen for the computer system wherein the fourth notification mode is a preexisting restricted notification mode that is different from the first notification mode, the second notification mode, and the third notification mode) (e.g., In some embodiments different notification modes have different rules for suppressing and/or allowing notifications). For example, in FIG. 5W, the portable multifunction device 100 displays a plurality of options for selecting different notification modes for use with the respective wake screen (e.g., the "Do Not Disturb" affordance 5128, the "Work" affordance 5130, the "Sleep" affordance 5132, and the "Driving" affordance 5134 in FIG. 5W). Displaying a plurality of options for selecting different notification modes for use with the respective wake screen reduces the number of user inputs needed to associate a wake screen with an appropriate focus mode (e.g., the user does not need to perform additional inputs to first configure the respective wake screen, and then additional inputs to navigate to a separate user interface for configuring a particular focus mode.

In some embodiments. while displaying the second wake screen user interface, the computer system detects (838) a request to switch from the second wake screen user interface to the first wake screen user interface. In response to detecting the request to switch from the second wake screen user interface to the first wake screen user interface, the computer system: displays the first wake screen user interface with the first background image; and transitions from the second notification mode for the computer system to the first notification mode for the computer system. For example, with reference to FIG. 5J, in response to a user input on or directed to the mode indicator 5032, or a rightward swipe gesture at the bottom of the display of the portable multifunction device 100, the portable multifunction device 100 transitions back to the "Fitness" mode.

In some embodiments, the computer system detects (840) a first request to wake a second computer system (e.g., a peripheral device paired to the first computer system, a companion computer system that syncs with the first computer system) that is in communication with the computer system. In response to detecting the first request to wake the second computer system, and in accordance with a determination that the first notification mode is active on the computer system the computer system displays, via a display device of the second computer system, a third wake screen user interface for the second computer system with a third background image. In response to detecting the first request to wake the second computer system, and in accordance with a determination that the second notification mode is active on the computer system, the computer system displays, via a display device of the second computer system, a fourth wake screen user interface for the second computer system, different from the third wake screen user interface for the second computer system, with a fourth background image. In some embodiments, the first computer system is a smartphone and the second computer system is a peripheral device (e.g., a smartwatch) paired to the smartphone. In some embodiments, the first computer system is a smartphone and the second computer system is a personal computer (e.g., that syncs with the smartphone). In some embodiments, the first computer system and the second computer system are associated with the same user (e.g., the second computer system does not display the third wake screen user interface or the fourth wake screen user interface unless the same user authenticates with both the first computer system and the second computer system). In some embodiments, the first computer system and the second computer system are paired computer systems. For example, the first computer system is a smartphone, and is paired to the second computer system, which is a smartwatch. In another example, the first computer system is a smartphone, and the second computer system is a personal computer. A user logs into the second computer system to authorize a connection or link between the smartphone and the personal computer. For example, in FIG. 5F-2, the "Personal" mode is active for the portable multifunction device 100, and the second device 5001 displays a wake screen user interface with a fourth background image (e.g., a different background image compared to FIG. 5C-2, where no focus mode is active for the portable multifunction device 100, and the same background image as the wake screen user interface for the portable multifunction device 100 in FIG. 5F-1). Displaying a third wake screen user interface for the second computer system in accordance with a determination that the first notification mode is active on the computer system, and displaying a fourth wake screen user interface for the second computer system in accordance with a determination that the second notification mode is active on the computer system, reduces the number of inputs needed to display the appropriate wake screen user interface for the second computer system (e.g., the user does not need to separately configure or select the appropriate wake screen user interface for the second computer system each time the computer system transitions to a different focus mode).

In some embodiments, in response to detecting the request to switch from the first notification mode to the second notification mode, the computer system transmits (842), to a second computer system (e.g., a peripheral device paired to the first computer system, a companion computer system that syncs with the first computer system) that is in communication with the computer system, instructions that when executed by the second computer system, cause the second computer system to switch from a third notification mode for the second computer system to a fourth notification mode for the second computer system. While the third notification mode is active for the second computer system, in response to detecting a request to wake the second computer system, the second computer system displays a third wake screen user interface with a third background image. While the fourth notification mode is active for the second computer system, in response to detecting the request to wake the third computer system, the second computer system displays a fourth wake screen user interface with a fourth background image. In some embodiments, the third notification mode for the second computer system corresponds to the first notification mode for the first computer system (e.g., the first notification mode and the third notification mode both have the same first set of one or more rules for notification delivery, but for notification delivery at the first computer system and second computer system, respectively). In some embodiments, the fourth notification mode for the second computer system corresponds to the second notification mode for the second computer system. In some embodiments, the third background image is the same as the first background image, and the fourth background image is the same as the second background image). For example, with reference to FIG. 5F-2, when the portable multifunction device 100 transitions to the "Personal" mode, it transmits instructions that cause the second device 5001 to also transition to the "Personal" mode (e.g., and to display a different background image for the wake user interface of the second device 5001). Transmitting instructions to a second computer system that cause the second computer system to switch from a third notification mode for the second computer system to a fourth notification mode for the second computer system reduces the number of inputs needed to switch notification modes on multiple devices (e.g., the user does not need to perform additional inputs to switch the second computer system from the third notification mode to the fourth notification mode).

In some embodiments, in response to detecting the request to switch from the first notification mode to the second notification mode, the computer system switches (844) from a light display mode to dark display mode at the computer system, wherein the dark display mode decreases a brightness of a plurality of user interface elements relative to other user interface elements on the display (e.g., reducing a brightness of foreground elements relative to background elements, including darkening blur materials, inverting text so that instead of dark text on a lighter background the computer system displays lighter text on a darker background, and/or changing a wallpaper to a dark mode in which a less bright version of a wallpaper is used to reduce an overall brightness of the user interface). For example, this is described above with reference to FIG. 6F, where the user can configure a focus mode to automatically enable a dark mode 6104 while the focus mode is active. While the dark mode is enabled, a brightness of one or more user interface elements is decreased relative to other user interface elements on the display (e.g., and without dimming or reducing a brightness of the display itself). Switching from a light display mode to a dark display mode at the computer system, including decreasing a brightness of a plurality of user interface elements relative to other user interface elements on the display, reduces the number of inputs needed to display user interface elements with an appropriate brightness (e.g., the user does not need to perform additional inputs to configure the brightness of the plurality of user interface elements when switching from the first notification mode to the second notification mode).

In some embodiments, in response to detecting the request to switch from the first notification mode to the second notification mode, the computer system changes (846) a battery usage mode of the device (e.g., enabling or disabling a battery saving mode where one or more functions of the device are limited and/or reduced in frequency to conserve power and/or extend battery life). In some embodiments, the low power state is also configured to conserve battery power (e.g., the computer system idles in the low power state while not in use). In some embodiments, the battery saving mode is distinct from the low power state (e.g., the battery saving mode remains active even while the computer system in use). In some embodiments, one or more functions and/or features of the computer system are limited and/or restricted in the battery saving mode. For example, while in the battery saving mode, a display of the computer system may be dimmed, a refresh rate of the display of the computer system may be limited, certain animations (e.g., transitions) may not be displayed, cellular and/or wireless communication may be throttled or disabled, and/or applications may not automatically refresh or update (e.g., an email application will not periodically check for new messages while not in use). For example, this is described above with reference to FIG. 6F, where the user can configure low power mode to be enabled while a particular focus mode is active. Changing a battery usage mode of the device in response to detecting the request to switch from the first notification mode to the second notification mode reduces the number of inputs needed to enable the battery usage mode (e.g., the user does not need to perform additional inputs to enable the battery usage mode after switching from the first notification mode to the second notification mode).

In some embodiments, in response to detecting the request to switch from the first notification mode to the second notification mode, the computer system switches (848) a default text size for the device. In some embodiments, in accordance with a determination that the first notification mode is active for the computer system, the computer system displays text in a respective user interface of the computer system at a first size; and in accordance with a determination that the second notification mode is active for the computer system, the computer system displays the text in the respective user interface of the computer system at a second size different from the first size. For example, in FIGS. 5L and 5M, text is displayed with a second size while the “Personal” mode is active for portable multifunction device 100. The second size is different from (e.g., larger than) the text size for the same user interface elements when no focus mode is active (e.g., as shown in FIGS. 5B and 5C-1) or when the “Fitness” focus mode is active (e.g., as shown in FIGS. 5L and 5M). Switching a default text size for the device in response to detecting the request to switch from the first notification mode to the second notification mode reduces the number of inputs needed to display text with the appropriate text size (e.g., the user does not need to perform additional inputs in order to configure the text size after switching from the first notification mode to the second notification mode).

It should be understood that the particular order in which the operations in FIGS. 8A-8E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 9000, 1000, 13000, and 14000) are also applicable in an analogous manner to method 800 described above with respect to FIGS. 8A-8E. For example, the contacts, gestures, user interface objects and animations described above with reference to method 8000 optionally have one or more of the characteristics of the contacts, gestures, user interface objects and animations described herein with reference to other methods described herein (e.g., methods 9000, 1000, 13000 and 14000). For brevity, these details are not repeated here.

FIGS. 9A-9C are flow diagrams illustrating method 9000 of configuring a focus mode in accordance with some embodiments. Method 9000 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 9000 are, optionally, combined and/or the order of some operations is, optionally, changed.

As described below, method 9000 is a method for configuring a focus mode, thereby providing an intuitive user interface for tracking customizations to a focus mode, which provides improved visual feedback to the user regarding which sections and settings for the focus mode have already been configured.

The method 9000 is performed at a computer system that is in communication with a display generation component and one or more input devices. The computer system displays (9002), via the display generation component, a first user interface for configuring notification settings for a respective mode of the computer system (e.g., the user interface 6000 in FIG. 6A), wherein: the first user interface includes a first section and a second section (e.g., the applications section 6006 and the wake screen section 6012, in FIG. 6A); the first section corresponds to a first control for changing at least a first setting for the computer system, wherein the first setting is a first notification setting for the computer system; the second section corresponds to a second control for changing at least a second setting for the computer system, wherein the second setting is a second notification setting for the computer system (e.g., while operating in a particular mode); the first section is displayed with a first appearance (e.g., a default appearance) that represents a default configuration for the first setting; and the second section is displayed with a second appearance (e.g., a default appearance) that represents a default configuration for the second setting. The computer system detects (9004), via the one or more input devices, a first set of one or more user inputs (E.g., the user input 6044 in FIG. 6B). In response to detecting (9006) the first set of one or more user inputs, in accordance with a determination that the first set of one or more user inputs are for configuring the first setting: the computer system configures (9008) the first setting for the computer system to have a user-selected configuration based on the first set of one or more user inputs, without configuring the second setting for the computer system (e.g., the portable multifunction device 100 adds an application the application list 6042 in FIG. 6B); the computer system displays (9010) the first section with a third appearance (e.g., as shown by the black background of icons in the application section 6006, in FIG. 6D, that indicates that the first section has been configured), different from the first appearance; and the computer system displays (9012) the second section with the second appearance (e.g., the wake screen section 6012 does not change in appearance between 6A and 6D, to indicate that the second section remains unconfigured). After detecting the first set of one or more user inputs, the computer system detects (9014) a second set of one or more user inputs for ceasing to display the first user interface (e.g., to leave the first user interface, before configuring the second setting) (e.g., the user input 6214 in FIG. 6R). In response to detecting (9016) the second set of one or more user inputs for ceasing to display the first user interface: the computer system ceases (9018) to display the first user interface; and in accordance with a determination that the first setting for the computer system was configured without configuring the second setting for the computer system, the computer system automatically configures (9020) the second setting for the respective mode of the computer system with the default configuration for the second setting, while the first setting for the respective mode of the computer system has the user-selected configuration based on the first set of one or more user inputs (e.g., with reference to FIG. 6R, the portable multifunction device 100 uses the default configuration for the wake user interface 6012).

In some embodiments, in response to detecting (9022) the first set of one or more user inputs, in accordance with a determination that the first set of one or more user inputs are for configuring the second setting, the computer system configures the second setting for the computer system to have a user-selected configuration based on the first set of one or more user inputs, without configuring the first setting for the computer system. After configuring the second setting for the computer system to have the user-selected configuration (e.g., and, optionally, in response to detecting the first set of one or more user inputs), the computer system displays the second section with a fourth appearance (e.g., that indicates that the second section has been configured), different from the second appearance, and the computer system displays the first section with the first appearance (e.g., to indicate that the first section remains unconfigured). For example, in FIG. 6Q-1, the wake screen section 6012 has been configured and is displayed with a black background, but the home screen section 6014 has not been configured and is displayed with a gray background (e.g., a default appearance)). Displaying the second section with a fourth appearance, different from the second appearance, and displaying the first section with the first appearance, provides improved visual feedback to the user (e.g., improved visual feedback that the second setting has been configured, but the first setting remains unconfigured).

In some embodiments, in response to detecting (9024) the second set of one or more user inputs for ceasing to display the first user interface, in accordance with a determination that the second setting for the computer system was configured without configuring the first setting for the computer system, the computer system automatically uses (e.g., configuring the first setting for the respective mode of the computer system with) the default configuration for the first setting, while the second setting for the respective mode of the computer system has the user-selected configuration based on the first set of one or more user inputs. For example, with reference to FIG. 6R, the wake screen section 6012 and the home screen section 6014 are not user configured, and so the portable multifunction device 100 automatically uses a default configuration for the wake screen section 6012 and the home screen 6014. Automatically using the default configuration for the first setting, in accordance with a determination that the second setting for the computer system was configured without configurating the first setting for the computer system, reduces the number of inputs needed to configure a focus mode for the computer system (e.g., the user does not need to perform inputs to configure every setting for a focus mode).

In some embodiments, before detecting (9026) the second set of one or more user inputs for ceasing to display the first user interface, the computer system detects, via the one or more input devices, a third set of one or more user inputs. In response to detecting the third set of one or more user inputs: in accordance with a determination that the third set of one or more user inputs are for configuring the second setting, the computer system configures the second setting for the computer system to have a user-selected configuration based on the third set of one or more user inputs, without configuring the first setting for the computer system; and after configuring the second setting for the computer system to have the user-selected configuration (e.g., and, optionally, in response to detecting the first set of one or more user inputs), the computer system displays the second section with a fifth appearance (e.g., that indicates that the second section has been configured), different from the second appearance; and the computer system displays the first section with the first appearance (e.g., to indicate that the first section remains unconfigured). For example, in FIG. 6N, before ceasing to display the user interface 6000, the user configures the applications section 6006 and adds an automation for the "Automations" section 6018, and the user interface 6000 indicates that both sections have been configured (e.g., by displaying portions of the section with a black background). Displaying the second section with a fifth appearance different for the second appearance, and configuring the second setting for the computer system to have the user-selected configuration, provides improved visual feedback to the user (e.g., that the second setting for the computer system has been configured with the user-selected configuration).

In some embodiments, in response to detecting (9028) the second set of one or more user inputs for ceasing to display the first user interface: in accordance with a determination that the first setting for the computer system was configured and that the second setting for the computer system was configured, the computer system forgoes automatically configuring the second setting for the respective mode of the computer system with the default configuration for the second setting, such that: the first setting for the respective mode of the computer system has the user-selected configuration of the first setting based on the first set of one or more user inputs; and the second setting for the respective mode of the computer system has the user-selected configuration of the second setting based on the third set of one or more user inputs. For example, with reference to FIG. 6R, the applications section 6006 and the "Automations" section 6018 have been configured by the user. When the portable multifunction device 100 ceases to display the user interface 6000 (e.g., in response to a user input on or directed to the "Done" affordance 6069), the portable multifunction device does not automatically configure either the applications section 6006 or the "Automations" section 6018. Instead, those sections have the user-selected configuration. Forgoing automatically configuring the second setting for the respective mode of the computer system such that the first setting for the respective mode of the computer system has the user-selected configuration of the first, and the second setting for the respective mode of the computer system has the user-selected configuration of the second setting, reduces the number of inputs to configure the respective mode of the computer system (e.g., the computer system does not overwrite user-configured sections such that the user must perform additional inputs to reconfigure the overwritten sections).

In some embodiments, the first user interface further includes (9030) a third section, in addition to the first section and the second section. The third section corresponds to a third control for changing at least a third setting for the computer system, wherein the third setting is a third notification setting for the computer system. The third section is displayed with a sixth appearance (e.g., a default appearance) that represents a default configuration for the third setting. In response to detecting the first set of one or more user inputs, in accordance with a determination that the first set of one or more user inputs are for configuring the third setting, the computer system configures the third setting for the computer system to have a user-selected configuration based on the first set of one or more user inputs, without configuring the first setting for the computer system or the second setting for the computer system. After configuring the third setting for the computer system to have the user-selected configuration (and, optionally, in response to detecting the first set of one or more user inputs): the computer system displays the third section with a seventh appearance (e.g., that indicates that the third section has been configured), different from the sixth appearance; the computer system displaying the first section with the first appearance; and the computer system displaying the second section with the second appearance. For example, with reference FIG. 7R, if the second device setting 6016 is configured without configuring the applications section 6006 and the "Automations" section 6018, the portable multifunction device 100 displays the applications section 6006 and the "Automations" section 6018 with a default appearance (e.g., white or grey backgrounds, as shown in FIG. 6A), but displays the second device setting 6016 with an updated appearance (e.g., with a black background, as in FIG. 7R). Displaying the third section with a seventh appearance, different from the sixth appearance, and displaying the first section with the first appearance; and the computer system displaying the second section with the second appearance, provides improved visual feedback to the user (e.g., improved visual feedback the third section has been configured, but that the first section and the second section have not been configured).

In some embodiments, in response to detecting (9032) the second set of one or more user inputs for ceasing to display the first user interface: in accordance with a determination that the third setting for the computer system was configured without configuring the second setting for the computer system: the computer system automatically uses (e.g., configuring the first setting for the respective mode of the computer system with) the default configuration for the first setting, while the third setting for the respective mode of the computer system has the user-selected configuration based on the first set of one or more user inputs; and the computer system automatically uses (e.g., configuring the second setting for the respective mode of the computer system with) the default configuration for the second setting, while the third setting for the respective mode of the computer system has the user-selected configuration based on the first set of one or more user inputs. For example, with reference to FIG. 6R, if the second device setting 6016 is configured, but the applications section 6006 and the "Automations" section 6018 were not configured, the portable multifunction device automatically uses the default setting for the applications section 6006 and the "Automations" section 6018. Automatically using the default configuration for the first setting, and the second setting, in accordance with a determination that the third setting for the computer system was configured without configuring the first setting or the second setting, reduces the number of inputs needed to configure the respective mode of the computer system (e.g., the user does not need to perform additional inputs to configure every section for the respective mode of the computer system).

In some embodiments, the first user interface further includes (9034) a third section, in addition to the first section and the second section. The third section corresponds to a third control for changing at least a third setting for the computer system, wherein the third setting is a third notification setting for the computer system. The third section is displayed with a default appearance that represents a default configuration for the third settings. After configuring the first setting for the computer system to have a user-selected configuration based on the first set of one or more user inputs, without configuring the second setting for the computer system: the computer system detects, via the one or more input devices, a third set of one or more user inputs. In response to detecting the third set of one or more user inputs, in accordance with a determination that the third set of one or more user inputs are for configuring the third setting: the computer system configures the third setting for the computer system to have a user-selected configuration based on the first set of one or more user inputs, without configuring the second setting for the computer system; the computer system displays the third section with an updated appearance (e.g., that indicates that the first section has been configured); and the computer system displays the second section with the second appearance (e.g., to indicate that the second section remains unconfigured). For example, in FIG. 6D, the applications section 6006 (and the contacts section 6004) has been configured. In FIGS. 6E-6N, the user configures the "Automations" section 6018, and in FIG. 6N, the "Automations" section 6018 is displayed with a different appearance (compared to the appearance in FIG. 6D). Configuring the third setting of the computer system, displaying the third section with an updated appearance, and displaying the second section with the second appearance, in accordance with a determination that the third set of one or more user inputs are for configuring the third section, provides improved visual feedback to the user (e.g., improved visual feedback that the third setting has been configured, but the second setting has not been configured).

In some embodiments, after configuring (9036) the first setting for the computer system to have the user-selected configuration based on the first set of one or more user inputs, and after automatically configuring the second setting for the respective mode of the computer system with the default configuration for the second setting: the computer system activates the respective mode of the computer system (e.g., in response to detecting a request to activate the respective mode for the computer system, in response to satisfying one or more conditions for automatically activating the respective mode, or in response to detecting the second set of one or more user inputs for ceasing to display the first user interface); and the computer system delivers notifications in accordance with the first notification setting and the second notification setting while the respective mode of the computer system remains active. For example, with respect to FIG. 6R, after detecting the user input 6214 on the "Done" affordance 6069, the portable multifunction device activates the "Work" mode for the computer system. Activating the respective mode of the computer system, after configuring the first setting for the computer system, and after automatically configuring the second setting for the respective mode of the computer system, reduces the number of inputs needed to activate the respective mode of the computer system (e.g., the user does not need to perform additional inputs to activate the respective mode of the computer system, after configuring the respective mode of the computer system).

In some embodiments, the first appearance is uses (9038) a first number of colors and the third appearance uses a second number of colors that is greater than the first number of colors (e.g., the first appearance is monochromatic and the third appearance is polychromatic). In some embodiments, the second appearance is also monochromatic. For example, with reference to FIGS. 6A and 6D, before the user configures the applications section 6006 and the contacts section 6004 (e.g., in FIG. 6A), both sections are displayed with a first number of colors (e.g., one color, such as grey). After configuring the applications section 6006 and the contacts section 6004 (e.g., in FIG. 6D), both sections are displayed with a second number of colors greater than the first number of colors (e.g., two or more colors). Displaying the first section with a third appearance that uses a second number of colors that is greater than the first number of colors provides improved visual feedback to the user (e.g., improved visual feedback that the first section has been configured).

In some embodiments, in response to detecting (9040) the first set of one or more user inputs, in accordance with a determination that the first set of one or more user inputs are for configuring the first setting, the computer system replaces at least a portion of the first user interface with display of a second user interface that includes additional content for the first section and the first control for changing the first setting for the computer system (e.g., before configuring the first setting for the computer system to have a user-selected configuration based on the first set of one or more user inputs, before displaying the first section with a third appearance, and before displaying the second section with the second appearance). For example, in FIGS. 6B and 6C, the portable multifunction device replaces the user interface 6000 with the user interface 6003, which provides additional content (e.g., additional options for configuring settings for the "Work" mode) for the first section (e.g., the "Notifications section 6002). Replacing at least a portion of the first user interface with display of a second user interface that includes additional content for the first section and the first control for changing the first setting for the computer system, provides improved visual feedback to the user (e.g., improved visual feedback regarding how to configure the first setting, or the effects of configuring the first setting).

In some embodiments, after configuring (9042) the first setting for the computer system to have a user-selected configuration based on the first set of one or more user inputs, and before displaying the first section with the third appearance and displaying the second section with the second appearance, the computer system ceases to display the second user interface and redisplaying the first user interface (e.g., in response to detecting a user input to navigate away from the second user interface, in response to detecting that the first setting for the computer system has been configured, or in response to detecting that all settings for the first section have been configured). For example, in FIG. 6D, the portable multifunction device redisplays the user interface 6000 after the user configures the applications section 6006 and the contacts section 6004. Redisplaying the first user interface after configuring the first setting for the computer system provides improved visual feedback to the user (e.g., improved visual feedback that the first setting has been configured).

In some embodiments, after ceasing to display the first user interface, the computer system detects (9044) one or more user inputs for modifying settings of the respective mode of the computer system. In response to detecting the one or more user inputs for modifying settings of the respective mode of the computer system, the computer system displays a second user interface that has a same layout as the first user interface. In some embodiments, the first user interface is displayed before the respective mode of the computer system has been configured for the first time (e.g., the first user interface is displayed during the initial setup of the respective mode of the computer system), and the second user interface is displayed after the respective mode of the computer system has been configured for the first time (e.g., the second user interface is a user interface for modifying existing settings of the respective mode). For example, in FIG. 5Y, the user navigates to a settings user interface for a "Sleep" mode which has already been configured. The layout of the settings user interface is the same as the layout of the user interface 6000 in FIG. 6A. Displaying a second user interface that has a same layout as the first user interface, after ceasing to display the first user interface, provides improved visual feedback to the user (e.g., improved visual feedback regarding which sections have been configured, as the user can easily remember where previously configured settings are in the layout of the second user interface, as the layout of both the first user interface and the second user interface are the same).

In some embodiments, the computer system detects (9046), via the one or more input devices, a request to set up a new mode of the computer system, wherein the new mode includes one or more rules for notification delivery. In some embodiments, the new mode is a notification mode (e.g., similar to the first and second notification modes described herein with reference to FIGS. 5A-5K). In some embodiments, the new mode is a restricted notification mode in which certain types of notifications are suppressed (e.g., in accordance with the one or more rules for notification delivery). In response to detecting the request to set up the new mode of the computer system, the computer system displays the first user interface for configuring notification settings for the new mode of the computer system. For example, with reference to FIG. 5P, the portable multifunction device 100 displays a user interface for configuring a new mode of the computer system (e.g., a "Work" mode), and the user interface for configuring the new mode is the same as the user interface 6000 in FIG. 6A. Displaying the first user interface for configuring notification settings for the new mode of the computer system, provides improved visual feedback to the user (e.g., improved visual feedback regarding which settings the user has already configured for the new mode and/or improved visual feedback regarding any preconfigured settings for the new mode).

In some embodiments, the first section includes (9048) an affordance for switching between an option for specifying one or more users for which notifications should not be suppressed and an option for specifying one or more users for which notifications should be suppressed. For example, in FIGS. 6C, the user can toggle between the "Allow Notifications From" option 6038 and the "Silence Notification From" option 6040, while configuring the settings for the contacts section 6004. Displaying an affordance for switching between an option for specifying one or more users for which notifications should not be suppressed and an option for specifying one or more users for which notifications should be suppressed reduces the number of inputs needed to configure the respective mode for the computer system (e.g., the user does not need to specify a large blacklist of contacts if it would be faster to specify a small whitelist of contacts instead, or vice versa).

In some embodiments, in response to user selection of the option for specifying one or more users for which notifications should not be suppressed, the computer system configures (9050) the respective mode to suppress notifications from users other than the specified one or more users for which notifications should not be suppressed. For example, in FIG. 6C, the default state of the toggle that includes the "Allow Notifications From" option 6038 and the "Silence Notification From" option 6040 is with the "Allow Notifications From" option 6038 selected. Displaying an affordance for switching between an option for specifying one or more users for which notifications should not be suppressed and an option for specifying one or more users for which notifications should be suppressed reduces the number of inputs needed to configure the respective mode for the computer system (e.g., the user does not need to specify a large blacklist of contacts if it would be faster to specify a small whitelist of contacts instead, or vice versa). Displaying an affordance for switching between an option for specifying one or more users for which notifications should not be suppressed and an option for specifying one or more users for which notifications should be suppressed reduces the number of inputs needed to configure the respective mode for the computer system (e.g., the user does not need to specify a large blacklist of contacts if it would be faster to specify a small whitelist of contacts instead, or vice versa).

In some embodiments, in response to user selection of the option for specifying one or more users for which notifications should be suppressed, the computer system configures (9052) the respective mode to allow notifications from users other than the specified one or more users for which notifications should be suppressed. For example, with reference to FIG. 6C, the default state of the toggle that includes the "Allow Notifications From" option 6038 and the "Silence Notification From" option 6040 is with the "Silence Notifications From" option selected (e.g., similar to FIG. 6B).

In some embodiments, the first section includes (9054) an affordance for switching between an option for specifying one or more applications for which notifications should not be suppressed and an option for specifying one or more applications for which notifications should be suppressed. For example, in FIG. 6B, the user can toggle between the "Allow Notifications From" option 6038 and the "Silence Notification From" option 6040, while configuring the settings for the applications section 6006. Displaying an affordance for switching between an option for specifying one or more users for which notifications should not be suppressed and an option for specifying one or more users for which notifications should be suppressed reduces the number of inputs needed to configure the respective mode for the computer system (e.g., the user does not need to specify a large blacklist of applications if it would be faster to specify a small whitelist of applications instead, or vice versa).

In some embodiments, in response to user selection of the option for specifying one or more applications for which notifications should not be suppressed, the computer system configures (9056) the respective mode to suppress notifications from applications other than the specified one or more applications for which notifications should not be suppressed. For example, with reference to FIG. 6B, the default state of the toggle that includes the "Allow Notifications From" option 6038 and the "Silence Notification From" option 6040, is with the "Allow Notifications From" option 6038 selected (e.g., similar to FIG. 6C). Displaying an affordance for switching between an option for specifying one or more users for which notifications should not be suppressed and an option for specifying one or more users for which notifications should be suppressed reduces the number of inputs needed to configure the respective mode for the computer system (e.g., the user does not need to specify a large blacklist of applications if it would be faster to specify a small whitelist of applications instead, or vice versa).

In some embodiments, in response to user selection of the option for specifying one or more applications for which notifications should be suppressed, the computer system configures the respective mode to allow notifications from applications other than the specified one or more applications for which notifications should be suppressed. For example, in FIG. 6B, the default state of the toggle that includes the "Allow Notifications From" option 6038 and the "Silence Notification From" option 6040, is with the "Silence Notifications From" option 6040 selected. Displaying an affordance for switching between an option for specifying one or more users for which notifications should not be suppressed and an option for specifying one or more users for which notifications should be suppressed reduces the number of inputs needed to configure the respective mode for the computer system (e.g., the user does not need to specify a large blacklist of applications if it would be faster to specify a small whitelist of applications instead, or vice versa).

It should be understood that the particular order in which the operations in FIGS. 9A-9G have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 1000, 13000, and 14000) are also applicable in an analogous manner to method 9000 described above with respect to FIGS. 9A-9G. For example, the contacts, gestures, and user interface objects, described above with reference to method 9000 optionally have one or more of the characteristics of the contacts, gestures, and user interface objects, described herein with reference to other methods described herein (e.g., methods 8000, 1000, 13000, and 14000). For brevity, these details are not repeated here.

FIGS. 10A-10C are flow diagrams illustrating method 1000 for displaying different content with different degrees of emphasis, by default, and while a focus mode is active in accordance with some embodiments. Method 1000 is performed at an electronic device (e.g., device 300, FIG. 3, or portable multifunction device 80, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface. Some operations in method 1000 are, optionally, combined and/or the order of some operations is, optionally, changed.

As described below, method 1000 is a method for displaying different content with different degrees of emphasis, by default, and while a focus mode is active, thereby providing increased flexibility regarding displayed content while the configured focus mode is active, which reduces the number of inputs needed to display appropriate content while the focus mode is active.

The method 1000 is performed at a computer system that is in communication with a display generation component and one or more input devices. While a first notification mode is active for the computer system, wherein the first notification mode has a first set of one or more rules for notification delivery at the computer system, the computer system displays (1002), via the display generation component, a respective view of a first application, wherein, displaying the respective view of the first application includes concurrently displaying first content and second content different from the first content, wherein the first content is displayed with a first degree of emphasis relative to the second content (e.g., personal and work emails are concurrently displayed in FIG. 7A). After displaying the respective view of the first application and while the first notification mode is active, the computer system switches (1004) (e.g., automatically, or manually in response to a user input) the computer system from the first notification mode to a second notification mode, wherein the second notification mode has a second set of one or more rules for notification delivery at the computer system that are different from the first set of one or more rules for notification delivery at the computer system (e.g., the portable multifunction devices switches to a "Work" mode in FIG. 7B). While the second notification mode is (1006) active for the computer system: the computer system detects (1008), via the one or more input devices, a first request to display the respective view of the first application; in response to detecting the first request, the computer system displays (1010) the respective view of the first application, including displaying the first content with a second degree of emphasis relative to the second content (e.g., in accordance with the second notification mode being active on the computer system) (e.g., in the second notification mode the second content is hidden unless expressly requested, e.g., by a query or opening a particular folder or calendar or the like) (e.g., a personal email from Grace Hong is not displayed while the "Work" mode is active in FIG. 7B); while displaying (e.g., one or more views of, or one or more user interfaces of) the first application (e.g., while displaying the respective view or some other view of the first application), the computer system detects (1012) one or more user inputs to display the second content without deactivating the second notification mode of the computer system (e.g., the user input 7008 in FIG. 7D, or the user inputs 7006 in FIG. 7D and 7026 in FIG. 7E); and in response to detecting the one or more user inputs to display the second content, the computer system displays the second content without deactivating the second notification mode of the computer system (e.g., displaying content hidden by default in the second notification mode (e.g., a do-not-disturb mode), while the second notification mode (e.g., the do-not-disturb mode) remains active) (e.g., the personal email from Grace Hong is displayed while the "Work" mode remains active in FIG. 7G).

In some embodiments, after displaying the respective view of the first application, and before switching the computer system from the first notification mode to the second notification mode, the computer system displays (1016), via the display generation component, a respective view of a second application, wherein displaying the respective view of the second application includes concurrently displaying third content and fourth content different from the third content, wherein the third content is displayed with a third degree of emphasis relative to the fourth content. While the second notification mode is active for the computer system: the computer system detects, via the one or more input devices, a second request to display the respective view of the second application. In response to detecting the second request, the computer system displays the respective view of the second application, including displaying the third content with a fourth degree of emphasis relative to the fourth content (e.g., in accordance with the second notification mode being active on the computer system). While displaying (e.g., one or more views of, or one or more user interfaces of) the second application (e.g., while displaying the respective view or some other view of the second application), the computer system detects one or more user inputs to display the fourth content without deactivating the second notification mode of the computer system. In response to detecting the one or more user inputs to display the fourth content, the computer system displays the fourth content without deactivating the second notification mode of the computer system (e.g., displaying fourth content hidden by the do-not-disturb mode, while the do-not-disturb mode remains active)(optionally, the third degree and fourth degree are the same as the first degree and second degree, respectively). For example, in FIGS. 7H-7J, the calendar application also displays content with different degrees of emphasis based on the active focus mode (e.g., in addition to the mail application shown in FIGS. 7A-7C).

In some embodiments, after displaying the respective view of the first application, and before switching the computer system from the first notification mode to the second notification mode, the computer system displays (1018), via the display generation component, a respective view of a third application (e.g., distinct from the first application and second application) (e.g., a third-party application, wherein the first and second applications are native applications or system applications, or applications from a developer different from (e.g., other than) a developer of the third-party application), wherein displaying the respective view of the third application includes concurrently displaying fifth content and sixth content different from the fifth content, wherein the fifth content is displayed with a fifth degree of emphasis relative to the sixth content. While the second notification mode is active for the computer system, the computer system detects, via the one or more input devices, a third request to display the respective view of the third application. In response to detecting the third request, the computer system displays the respective view of the third application, including displaying the fifth content with a sixth degree of emphasis relative to the sixth content (e.g., in accordance with the second notification mode being active on the computer system). While displaying the third application, the computer system detects one or more user inputs to display the sixth content without deactivating the second notification mode of the computer system. In response to detecting the one or more user inputs to display the fifth content, the computer system displays the sixth content without deactivating the second notification mode of the computer system (e.g., displaying content hidden by the do-not-disturb mode, while the do-not-disturb mode remains active) (optionally, the fifth degree and sixth degree are the same as the first degree and second degree, respectively). For example, in FIGS. 7O-7Q, the web browser application also displays content with different degrees of emphasis based on the active focus mode (e.g., in addition to the mail application shown in FIGS. 7A-7C, and the calendar application shown in FIG. 7H-7J).

In some embodiments, the second degree of emphasis is (1020) a greater degree of emphasis than the first degree of emphasis. In some embodiments, displaying the first content with the second degree of emphasis relative to the second content includes not displaying the second content (e.g., hiding the second content) while continuing to display the first content (e.g., without changing a level of prominence of the first content). In some embodiments, displaying the first content with the second degree of emphasis relative to the second content includes increasing a level of prominence (e.g., a brightness, size, and/or contrast) of the first content relative to the second content. In some embodiments, displaying the first content with the second degree of emphasis relative to the second content includes reducing a level of prominence (e.g., a brightness, size, and/or contrast) of the second content relative to the first content. For example, in FIGS. 7A and 7B, the second content (e.g., an email message 7011 from Grace Hong) is not displayed while the "Work" mode is active, but first content (e.g., an email message 7001 from John Smith) is displayed while the "Work" mode is active. Displaying the first content with a second degree of emphasis that is a greater degree of emphasis relative to the second content, reduces the number of user inputs needed to display appropriate content while the second notification mode is active (e.g., the user does not need to perform additional inputs to filter or hide second content while the second notification mode is active). In some embodiments, displaying the first content with the second degree of emphasis relative to the second content includes (1022) ceasing to display the second content (e.g., absent a user command to display the second content without deactivating the second notification mode). In some embodiments, the second content is hidden by default (e.g., the default view of the respective view of the first application includes a filter than hides the second content) while the second notification mode is active for the computer system. In such embodiments, the second content is redisplayed (e.g., unhidden or unfiltered) in response to detecting the one or more user inputs to display the second content, even though the second notification mode remains active. For example, in FIGS. 7B and 7C, the second content (e.g., an email message 7001 from John Smith) is not displayed while the "Personal" mode is active (in FIG. 7C), but first content (e.g., an email message from Lukas Jacobsen) is displayed while the "Personal" mode is active. Ceasing to display the second content (e.g., while continuing to display the first content), while the second notification mode is active reduces the number of user inputs needed to display appropriate content while the second notification mode is active (e.g., the user does not need to perform additional inputs to filter or hide second content while the second notification mode is active).

In some embodiments, the first application is (1024) a calendar application, the first content is content of (e.g., events or calendar information from) a first calendar of the calendar application, and the second content is content of (e.g., events or calendar information from) a second calendar of the calendar application that is different from the first calendar of the calendar application. For example, in FIGS. 7H-7J, a calendar application displays content with different degrees of emphasis depending on which focus mode is active for the computer system. Displaying the first content with a second degree of emphasis relative to the second content, for a calendar application, while the second notification mode is active, reduces the number of user inputs needed to display appropriate calendar content while the second notification mode is active (e.g., the user does not need to perform additional inputs to filter or hide content from calendars while the second notification mode is active).

For example, the second notification mode could be a work mode. When the work mode is active, a personal calendar (e.g., second calendar of the calendar application) is not displayed by default, and only a work calendar (e.g., first calendar of the calendar application) is displayed. This helps focus the user on work tasks, and avoids cluttering the calendar application with appointments that are not relevant while the user is at work (e.g., while the work mode is active). In some scenarios, however, the user may want to access their personal calendar while still at work (e.g., while the work mode is still active). For example, during lunch, the user may have made weekend plans to connect with a co-worker. The user can quickly access their personal calendar (e.g., via the first request to display the respective view of the first application) without needing to disable the work mode. ISE, the user can also hide/de-activate the personal calendar after adding the personal appointment.

In some embodiments, the first application is (1026) a mail application, the first content includes a first plurality of email messages, and the second content includes a second plurality of email messages that is different from the first plurality of email messages. For example, in FIGS. 7A-7C, a mail application displays content with different degrees of emphasis depending on which focus mode is active for the computer system. Displaying the first content with a second degree of emphasis relative to the second content, for a mail application, while the second notification mode is active, reduces the number of user inputs needed to display appropriate email content while the second notification mode is active (e.g., the user does not need to perform additional inputs to filter or hide content in the mail application while the second notification mode is active).

In some embodiments, the first content is a first inbox or folder of the mail application that includes the first plurality of email messages, or email messages in the first inbox or folder, and the second content is a second inbox or folder of the mail application that includes the second plurality of email messages, or email messages in the second inbox or folder. For example, in FIG. 7E, the user can specify different inboxes (e.g., the "Work" inbox 7014) or folders (e.g., a "Family" folder 7024) to display with different degrees of emphasis. In FIG. 6H, the user can also configure the inboxes and folders to have different degrees of emphasis by default (e.g., when a respective focus mode is initially activated).

For example, the second notification mode could be a work mode. When the work mode is active, emails from a personal inbox or personal e-mail account (e.g., second content of the mail application) are not displayed by default, and only emails from a work inbox or work account (e.g., first content of the mail application) are displayed. This focuses the user on work tasks, and avoids distracting the user with personal emails while the work mode is active. In some scenarios, however, the user may want to access their personal emails while still at work (e.g., while the work mode is still active). For example, a user may want to catch up on personal emails during his or her lunch break. ISE, the user can also hide display of personal emails when they are no longer needed.

In some embodiments, the first application is (1028) a web browser, the first content includes first content from the Internet (e.g., a first webpage displayed within a first tab of the web browser, content from a first website, or content from a first (predefined) set of tabs), and the second content includes second content from the Internet that is different from the first content from the Internet (e.g., a second webpage displayed within a second tab of the web browser different from the first tab of the web browser, content from a second website, or content from a second (predefined) set of tabs). For example, in FIGS. 7O-7Q, a web browser application displays content with different degrees of emphasis depending on which focus mode is active for the computer system. Displaying the first content with a second degree of emphasis relative to the second content, for a web browser application, while the second notification mode is active, reduces the number of user inputs needed to display appropriate web content while the second notification mode is active (e.g., the user does not need to perform additional inputs to display desired content in the web browser application while the second notification mode is active).

In some embodiments, while the first notification mode is active for the computer system, the computer system displays both the first content from the Internet and the second content from the Internet (e.g., a web browser of the computer system displays a first webpage and a second webpage). While the second notification mode is active for the computer system, the computer system displays the first content from the Internet without displaying the second content from the Internet (e.g., the web browser of the computer system displays the first webpage without displaying the second webpage).

For example, the second notification mode could be a work mode. When the work mode is active, the web browser displays a default tab group that includes tabs with work-related content (e.g., a company homepage, and/or a company directory). This allows relevant content to be quickly accessible while the "Work" mode is active, without needing to detect additional user inputs that manually open the relevant content. In some scenarios, however, the user may want to access different content without leaving the work mode. For example, the user may have a tab group for news that the user uses to stay up to date on industry developments. The user, however, may not always have time to read industry news, and so this tab group is not displayed by default (e.g., to avoid displaying too many tabs and/or tabs that are not useful to the user). When the user does have time to read industry news, the user can easily access the tab group for news (e.g., via the first request to display the respective view of the first application).

In some embodiments, the first application is (1030) a messaging application, the first content includes a first message (or first set of messages) of the messaging application, and the second content includes a second message (or second set of messages) of the messaging application that is different from the first message of the messaging application. In some embodiments, the first content includes messages from a first other user different from a user of the computer system or from users in a first contact group, and the second content includes messages from another respective other user different from the first other user, and different from the user of the computer system, or from users in a second contact group different (e.g., including at least some different users) from the first contact group. For example, in FIGS. 7V-7X, a messaging application displays content with different degrees of emphasis depending on which focus mode is active for the computer system. Displaying the first content with a second degree of emphasis relative to the second content, while the second notification mode is active reduces the number of user inputs needed to display appropriate content from messages while the second notification mode is active (e.g., the user does not need to perform additional inputs to filter or hide messages in the messaging application while the second notification mode is active).

For example, the second notification mode could be a work mode. When the work mode is active, messages from contacts not designated as work contacts (e.g., second content of the messaging application) are not displayed by default, and only messages from work contacts (e.g., first content of the messaging application) are displayed. This focuses the user on work tasks, and avoids distracting the user with personal messages while the work mode is active. In some scenarios, however, the user may want to access their personal messages while still at work (e.g., while the work mode is still active). For example, if a family emergency arises, the user may need to access their personal messages in order to address the emergency. ISE, the user can also hide display of personal messages when they are no longer needed.

In some embodiments, while a third notification mode that is different from the first notification mode and the second notification mode is (1032) active for the computer system: the computer system detects, via the one or more input devices, a second request to display the respective view of the first application; and in response to detecting the second request, the computer system displays the respective view of the first application, including displaying the second content with the second degree of emphasis relative to the first content (e.g., in accordance with the second notification mode being active on the computer system) (e.g., in the third notification mode, the first content is hidden or deemphasized while in the second notification mode it is the second content that is hidden or deemphasized). In some embodiments, the first application emphasizes and/or deemphasizes content in the same way while the third notification mode is active for the computer system. In some embodiments, multiple applications (e.g., the second and third applications described above with reference to FIGS. 7H-7J and 7O-7Q) emphasize and/or deemphasize content in the same way as the first application (e.g., with the second degree of emphasis). For example, in FIG. 7C, while a third notification mode is active (e.g., the "Personal" mode), second content is displayed (e.g., the email from Lukas Jacobsen) while first content is hidden (e.g., the email 5001 from John Smith, which is displayed in FIGS. 7A and 7B). Displaying second content with the second degree of emphasis relative to the first content reduces the number of user inputs needed to display appropriate content while the second notification mode is active (e.g., the user does not need to perform additional inputs to filter or hide content while the second notification mode is active).

In some embodiments, the degree of emphasis is instead a seventh degree of emphasis (e.g., different from the first degree of emphasis and different from the second degree of emphasis). In such embodiments, the application may emphasize and/or deemphasize content differently while the third notification mode is active, as compared to when the second notification mode is active.

In some embodiments, applications other than the first application (e.g., the second and third applications described above with reference to FIGS. 7H-7J and 7O-7Q) emphasize and/or deemphasize content differently than the first application while the third notification mode is active (e.g., the second application displays the fourth content with a seventh degree of emphasis relative to the third content, while the third notification mode is active). ISE, each application emphasizes and/or deemphasizes content different from each other application (e.g., while the third notification mode is active for the computer system, the first application displays the second content with the second degree of emphasis relative to the first content, the second application displays the fourth content with the seventh degree of emphasis relative to the third content, and the third application display the sixth content with an eighth degree of emphasis relative to the fifth content).

In some embodiments, while displaying the first application, the computer system detects (1034) one or more user inputs to display the first content without deactivating the third notification mode of the computer system. In response to detecting the one or more user inputs to display the first content, the computer system displays the first content without deactivating the third notification mode of the computer system. For example, in FIGS. 7D-7G, the user selects first content (e.g., an email 7011 from Grace Hong) to display without deactivating the "Work" mode of the computer system. Displaying the first content without deactivating the third notification mode of the computer system reduces the number of inputs needed to display relevant content (e.g., the user does not need to perform additional inputs to deactivate the third notification mode, and/or reactivate the third notification mode after viewing the first content).

It should be understood that the particular order in which the operations in FIGS. 10A-10C have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 13000, and 14000) are also applicable in an analogous manner to method 600 described above with respect to FIGS. 10A-10C. For example, the contacts, gestures, and user interface objects, described above with reference to method 1000 optionally have one or more of the characteristics of the contacts, gestures, and user interface objects, described herein with reference to other methods described herein (e.g., methods 8000, 9000, 13000, and 14000). For brevity, these details are not repeated here.

FIGS. 13A-13E are flow diagrams illustrating method 13000 of configuring different usage modes of a computer system to use different home screen pages, including, while a user is configuring a respective usage mode, providing suggested home screen pages for use when a respective usage mode is active. The suggested home screen pages for the respective usage mode include a new home screen that was not available for use as a home screen page at the computer system prior to the user selecting the new home screen for the respective usage mode, or prior to the suggested home screen pages being provided in a user interface for configuring the respective usage mode.

Method 13000 is performed at a computer system (e.g., device 300, FIG. 3, or portable multifunction device 100, FIG. 1A) that is in communication with a display generation component (e.g., a hardware element, comprising one or more display devices, such as a display, a projector, a touch-screen display, a heads-up display, a head-mounted display, or the like) and one or more input devices. Some operations in method 13000 are, optionally, combined and/or the order of some operations is, optionally, changed.

As described below, method 13000 is a method of configuring the home screens to be displayed by the computer system while the computer system is in various usage modes, and optionally includes configuring the wake screens to be displayed when the computer system is wakened from a low power mode and particular usage mode of the computer system is active. By displaying different home screens when different usage modes are active, the computer system makes it easy for the user of the computer to know the current usage mode of the computer system, without having to look carefully so as to find an displayed icon or textual indication of the current usage mode. This also improves efficiency of the computer system, by reducing mistakes made by the user, resulting from the user forgetting or being mistaken as to which usage mode is active, which also reduces the number of inputs that a user needs to perform in order to perform or activate various functions of the computer system.

In method 13000, the computer system displays (13002), via the display generation component, a first user interface (e.g., the user interface shown in FIG. 11B) for configuring settings for a first usage mode (e.g., a work usage mode, as indicated in FIG. 11B) of a plurality of usage modes for the computer system. The first user interface includes one or more suggested home screen pages (e.g., the six home screen page candidates shown in FIG. 11B) for use on a home screen user interface of the device 100 when the first usage mode is active; the one or more suggested home screen pages includes a suggestion for a first home screen page (e.g., the top left home screen page shown in FIG. 11B). While displaying the first user interface, the computer system detects (13004) a first sequence of one or more inputs (e.g., user input 11054 in FIG. 11B, corresponding to a request to use the home screen 11036 for the "Work" mode (e.g., without further configuring the home screen 11036), or the user input 11052 in FIG. 11B, corresponding to a request to use the home screen 11028 for the "Work" mode (e.g., with further configuration as shown in FIGS. 11C-11K)) that correspond to a first request to use the first home screen page for the first usage mode.

In response to detecting the first sequence of one or more inputs, the computer system enables (13006) the first home screen page for display while the first usage mode is active. For example, FIG. 11L shows that the home screen 11028 has been configured and selected for the "Work" mode (e.g., enabled for display while the "Work" mode is active), and FIG. 11KK shows the home screen 11028 is displayed while the "Work" mode is active. In method 13000, the first home screen page is a new home screen page for the computer system that was not available for use as a home screen page at the computer system prior to receiving the first sequence of one or more inputs that correspond to the first request to use the first home screen page for the first usage mode. For example, the first home screen page may be a home screen page composed (e.g., by the computer system, or a server system in communication with the computer system) based on the first usage mode (e.g., a predefined type or classification of the first usage mode), and/or applications used in or available for use in the first usage mode.

In some embodiments, configured home screens other than the first home screen are available for display while the first usage mode is active, but are not displayed by default while the first usage mode is active. In response to detecting a request (e.g., a leftward or rightward swipe gesture across the first home screen, such as the leftward swipe gesture 11280 in FIG. 11KK) to display another configured home screen (e.g., the home screen 11044 that is an existing, previously configured home screen enabled for display in FIGS. 11II and 11JJ) while the first usage mode remains active for the computer system. In response to navigational inputs, the computer system navigates between the first home page and the other configured home screen (e.g., in response to detecting the user input 11280 in FIG. 11KK, the portable multifunction device 100 transitions to displaying the home screen 11044 in FIG. 11LL). Optionally, subsequent swipes in the same direction would navigate through other configured home screens the user has selected to be enabled for the first usage mode, or that the computer system has automatically configured for display while the first usage mode is active.

In some embodiments, method 13000 includes enabling (13008) the first home screen for display while the first usage mode is active, without enabling the first home screen for display while other usage modes of the plurality of usage modes are active for the computer system. For example, after enabling the first home screen for display while the first usage mode is active, the computer system transitions to a second usage mode that is different from the first usage mode (e.g., a usage mode other than the first usage mode). Such usage mode transitions may occur automatically, e.g., due to a change in the time of day, or a change in location of the computer system (e.g., arriving at the user's place of work, or arriving at the user's home), or may occur in response to one or more user inputs invoking the second usage mode. Continuing with the example, while the second usage mode is active for the computer system, the computer system detects a request to display a home screen of the computer system. In response to detecting the request to display a home screen of the computer system, the computer system displays a home screen page other than the first home screen page (e.g., a second home screen page that is different from the first home screen page). Continuing with the example, while displaying the home screen page other than the first home screen page, the computer system detects one or more requests to navigate through home screen pages. In response to detecting the one or more requests to navigate through home screen pages, the computer system displays additional home screen pages (e.g., a third home screen page in response to a first request to navigate through home screen pages, a fourth home screen page in response to a second (e.g., a subsequent) request to navigate through home screen pages, and so on) without displaying the first home screen page (e.g., because the first home screen page is not enabled for display while the second usage mode (or any usage mode other than the first usage mode) is active for the computer system). Enabling the first home screen for display while the first usage mode is active, without enabling the first home screen for display while other usage modes of the plurality of usage modes are active, reduces the number of inputs needed to enable the first home screen for the appropriate usage mode(s) (e.g., the user does not need to perform additional user inputs to disable the first home screen for display in usage modes other than the first usage mode).

In some embodiments, the first usage mode includes (13010) a first set of one or more rules for notification delivery at the computer system. For example, the first usage mode is a Do Not Disturb mode, or a focus mode (e.g., as described above with reference to FIG. 5D), and/or a notification mode (e.g., as described above with reference to the method 800). Enabling the first home screen page for display while the first usage mode is active, wherein the first usage mode includes a first set of one or more rules for notification delivery at the computer system, reduces the number of user inputs needed to display the appropriate home page (e.g., the user does not need to perform additional user inputs to enable the first home screen for display each time the first usage mode is activated).

In some embodiments, the first home screen page is the only home screen page enabled for display while the first usage mode is active for the computer system (13012). For example, in some embodiments, after enabling the first home screen for display while the first usage mode is active, the computer system transitions to the first usage mode. While the first usage mode is active for the computer system, the computer system detects a request to display a home screen of the computer system. In response to detecting the request to display a home screen of the computer system, the computer system displays the first home screen page. While displaying the first home screen page, the computer system detects a first navigation user input. In response to detecting the first navigation user input, the computer system forgoes displaying home screen pages other than the first home screen page (e.g., because no other home screen pages are enabled for display while the first usage mode is active for the computer system), and optionally, the computer system displays a search user interface (e.g., for searching through available applications of the computer system). For example, the search user interface is displayed instead of, or in place of, home screen pages other than the first home screen page, because no other home screen pages are enabled for display while the first usage mode is active for the computer system. Enabling the first home screen page for display while the first usage mode is active, wherein the first home screen page is the only home screen page enabled for display while the first usage mode is active, reduces the number of user inputs needed to enable the appropriate home screen page(s) while the first usage mode is active (e.g., the user does not need to perform additional user inputs to disable home screen pages other than the first home screen page each time the first usage mode is activated).

In some embodiments, in response to detecting the first sequence of one or more inputs, the computer system deselects (13014) another home screen displayed while the first usage mode was active prior to enabling the first home screen page for display while the first usage mode is active. For example, another home screen (e.g., the home screen 11001 shown in FIG. 11A) was selected prior to the previously described operations performed by the computer system to configure the first usage mode. After performing the previously described operations (e.g., selecting and/or configuring a home screen for a usage mode), the computer system deselects the previously selected home screen, and optionally, replaces the previously selected home screen with the first home screen page (e.g., the user-configured home screen 11028 replaces the home screen 11001 in the home screen section 11014, as shown in FIG. 11L). Deselecting (e.g., automatically deselecting) another home screen that was displayed while the first usage mode was active, prior to enabling the first home screen page for display while the first usage mode is active, reduces the number of user inputs needed to enable the appropriate home screen while the first usage mode is active (e.g., the user does not need to perform a separate user input to deselect the other home screen, and a separate user input to enable the first home screen page for display while the first usage mode is active).

In some embodiments, method 13000 includes (13016), in response to detecting the first sequence of one or more inputs, enabling the first home screen page for display while the first usage mode is active without enabling the first home screen page for display while a second usage mode, different from the first usage mode, is active. For example, after enabling the first home screen for display while the first usage mode is active, the computer system transitions to the second usage mode. While the second usage mode is active for the computer system, the computer system detects a request to display a home screen of the computer system. In response to detecting the request to display a home screen of the computer system, the computer system displays a home screen page other than the first home screen page (e.g., a second home screen page that is different from the first home screen page). While displaying the home screen page other than the first home screen page, the computer system detects one or more requests to navigate through home screen pages. In response to detecting the one or more requests to navigate through home screen pages, the computer system displays additional home screen pages (e.g., a third home screen page in response to a first request to navigate through home screen pages, a fourth home screen page in response to a second (e.g., a subsequent) request to navigate through home screen pages, and so on) without displaying the first home screen page (e.g., because the first home screen page is not enabled for display while the second usage mode (or any usage mode other than the first usage mode) is active for the computer system). Enabling the first home screen page for display while the first usage mode is active without enabling the first home screen page for display while a second usage mode, different from the first usage mode, is active, reduces the number of inputs needed to enable the first home screen for the appropriate usage mode(s) (e.g., the user does not need to perform additional user inputs to disable the first home screen for display in usage modes other than the first usage mode).

In some embodiments, the first usage mode includes (13018) a first set of one or more rules for notification delivery at the computer system (e.g., the first usage mode is a Do Not Disturb mode, or a focus mode as described herein); and the second usage mode includes a second set of one or more rules for notification delivery at the computer system, different from the first set of one or more rules for notification delivery at the computer system (e.g., each usage mode of a set of two or more usage modes, other than the first usage mode, has a corresponding set of one or more rules for notification delivery at the computer system, different from the first set of one or more rules for notification delivery at the computer system). Examples of usage modes are shown in FIG. 5E, and in some embodiments first and second ones of those usage modes have different rules for notification delivery. For example, the first usage mode is the work usage mode, which defers delivery of notifications from applications and/or senders not designated as being associated with work (e.g., not whitelisted as work-related applications or work contacts) while the work usage mode is active, and the second usage mode is the personal usage, which defers work-related notifications until designated delivery times. Enabling the first home screen page for display while the first usage mode that includes a first set of one or more rules for notification delivery at the computer system is active without enabling the first home screen page for display while a second usage mode that includes a second set of one or more rules for notification delivery at the computer system is active, reduces the number of inputs needed to enable the first home screen for the appropriate usage mode(s) (e.g., the user does not need to perform additional user inputs to disable the first home screen for display in usage modes other than the first usage mode).

In some embodiments, the second usage mode does not include a set of one or more rules for restricted notification delivery at the computer system. For example, in such embodiments the second usage mode is a "normal" usage mode for the computer system, which does not control or affect notification delivery. For example, FIG. 5C-1 shows a home screen for portable multifunction device 100 when none of the focus modes are active, which corresponds to the normal usage mode, and FIG. 5B shows notifications being displayed, e.g., without filtering or usage mode-based delay, while the portable multifunction device 100 is operating in the normal usage mode (e.g., with no focus mode being active). Enabling the first home screen page for display while the first usage mode is active without enabling the first home screen page for display while a second usage mode that does not include a set of one or more rules for restricted notification delivery at the computer system is active, reduces the number of inputs needed to enable the first home screen for the appropriate usage mode(s) (e.g., the user does not need to perform additional user inputs to disable the first home screen for display in usage modes other than the first usage mode).

In some embodiments, the computer system, after enabling the first home screen page for display while the first usage mode is active, detects (13022) a request to display a second user interface for configuring settings for the second usage mode (e.g., or a third usage mode) of the plurality of usage modes for the computer system. An example of the request to display the second user interface is user input 5030, shown in FIG. 5E. In response to detecting the request to display the second user interface, the computer system displays the second user interface (e.g., the user interface 11248 for configuring settings for the "Personal" mode shown in FIG. 11GG), including one or more suggested home screen pages for use on a home screen user interface of the device when the second usage mode (e.g., or the third usage mode) is active. Optionally, the one or more suggested home screen pages includes the first home screen page (e.g., as a previously configured home screen page that is available for use as a home screen page without additional configuration). For example, the first home screen previously configured for the work usage mode is displayed as an existing home screen page in the user interface 11248 shown in FIG. 11GG. Displaying the second user interface for configuring settings for the second usage mode, including one or more suggested home screen pages that include the first home screen page, reduces the number of inputs needed to enable an appropriate home screen while the second usage mode is active (e.g., the user does not need to perform additional user inputs to configure, or recreate, the first home screen, for use while the second usage mode is active).

In some embodiments, the computer system, after enabling the first home screen page for display while the first usage mode is active, detects (13024) a second sequence of one or more inputs that correspond to a second request to use a second home screen page of the one or more suggested home screen pages for the first usage mode. For example, FIG. 11II shows an alternative view of the user interface 11027, which allows for selecting a second home screen page (and, optionally, additional home screen pages), which enables the selected home screen pages for display while the "Work" mode is active. In response to detecting the second sequence of one or more inputs, the computer system enables the second home screen page for display while the first usage mode is active, in addition to the first home screen page. For example, the first home screen page and the second home screen page are displayed sequentially in response to user inputs corresponding to request(s) (e.g., swipe gestures such as the leftward swipe gesture 11280 in FIG. 11KK, the leftward swipe gesture 11282 in FIG. 11LL, and/or the rightward swipe gesture 11284 in FIG. 11LL) to navigate through home screen pages for the first usage mode. Enabling the second home screen page for display while the first usage mode is active, in addition to the first home screen page, reduces the number of inputs needed to display appropriate home screen pages while the first usage mode is active (e.g. the user does not need to perform additional user inputs to deselect or disable the first home screen page, and then enable the second home screen page for display while the first usage mode is active).

In some embodiments, the one or more suggested home screen pages includes (13026) a second home screen page enabled for display while a second usage mode is active. For example, in FIG. 11B, one of the existing home screen pages 11040, 11044, 11048 is a home screen page enabled for display while the second usage mode is active. Displaying one or more suggested home screen pages, including a second home screen page enabled for display while a second usage mode is active, reduces the number of inputs needed to select an appropriate home screen page for the first usage mode (e.g., the user does not need to perform additional user inputs to recreate an existing home screen page, to enable that home screen page for display while the second usage mode is active).

In some embodiments, the first home screen page is an automatically generated suggestion of a home screen page (13028). For example, the first home screen page is not available for use as a home screen page prior to receiving the first sequence of one or more inputs (see discussion of 13004, above), and the computer system automatically generates a suggested layout for a suggested set of application launch affordances (e.g., application icons and/or widgets) for the first home screen page in response to detecting the first sequence of one or more inputs. For example, in FIG. 11B, home screen page 11028 is a machine-generated suggested home screen page, in which the suggested layout of application launch affordances is machine generated (e.g., based on predefined criteria). Displaying one or more suggested home screen pages, including an automatically generated suggestion of a home screen page, reduces the number of inputs needed to configure an appropriate home screen page for the first usage mode (e.g., the user does not need to perform additional user inputs to configure an automatically generated suggestion of a home screen page if the user is satisfied with the automatically generated suggestion, or the user does not need to perform as many additional user inputs to configure the first home screen page when starting with the automatically generated suggestion of the home screen page).

In some embodiments, the first home screen page includes (13030) a plurality of application launch affordances. For example, as shown in FIG. 11K, the home screen page 11028 includes application icons for launching respective applications. Displaying one or more suggested home screen pages, including a suggestion for a first home screen page that includes a plurality of application launch affordances, reduces the number of inputs needed to appropriate configure a home screen page for display while the first usage mode is active (e.g., the user can configure the first home screen, including the included application launch affordances, at the same time, without needing to perform additional user inputs to configure application launch affordances for the first home screen after enabling the first home screen for display while the first usage mode is active (e.g., and after displaying the first home screen while the first usage mode is active)).

In some embodiments, the first home screen page includes (13032) a plurality of widgets. For example, in FIG. 11B, one of the suggest home screen pages, suggested home screen page 1048, includes two widgets. In some embodiments, widgets are application objects that provide a limited subset of functions and/or information available from corresponding applications without requiring the corresponding applications to be launched. For example, a widget may display status information, such as the state of a timer, or weather information, or the current score for a game, available from a corresponding application, without requiring the corresponding application to be launched (e.g., in response to a user input on an application launch icon) in order to display that information. Displaying one or more suggested home screen pages, including a suggestion for a first home screen page that includes a plurality of widgets, reduces the number of inputs needed to appropriately configure a home screen page for display while the first usage mode is active (e.g., the user can configure the first home screen, including the included widgets, at the same time, without needing to perform additional user inputs to configure widgets for the first home screen after enabling the first home screen for display while the first usage mode is active (e.g., and after displaying the first home screen while the first usage mode is active)).

In some embodiments, before enabling the first home screen page for display while the first usage mode is active, the computer system displays (13034) a third user interface (e.g., any of the user interfaces 11066 shown in FIGS. 11D-11J) for adding one or more application launch affordances to the first home screen page and/or removing one or more application launch affordances from the first home screen page. Displaying a third user interface for adding one or more application launch affordances to the first home screen page and/or removing one or more application launch affordance from the first home screen page, reduces the number of inputs needed to appropriate configure a home screen page for display while the first usage mode is active (e.g., the user can configure the first home screen, including the included application launch affordances, at the same time, without needing to perform additional user inputs to configure application launch affordances for the first home screen after enabling the first home screen for display while the first usage mode is active (e.g., and after displaying the first home screen while the first usage mode is active)).

In some embodiments, the third user interface (e.g., user interface 11066 shown in FIG. 11D) includes (13036) a plurality of suggested application launch affordances. Including a plurality of suggested application launch affordances in the third user interface, which is used for adding one or more application launch affordances to the first home screen page and/or removing one or more application launch affordance from the first home screen page, reduces the number of inputs needed to appropriate configure a home screen page for display while the first usage mode is active (e.g., the user does not need to perform additional user inputs to add and/or remove application launch affordances if the user is satisfied with the suggested application launch affordances, or the user does not need to perform as many additional user inputs to add and/or remove application launch affordances when starting with the automatically generated suggestion of the home screen page, if the user is satisfied with some, but not all, of the suggested application launch affordances).

In some embodiments, method 13000 includes the computer system detecting (13038), at a location corresponding to a respective application launch affordance (e.g., the application launch affordance for application D in FIG. 11D) of the plurality of suggested application launch affordances, a first user input (e.g., user input 11078). In response to detecting one or more user inputs including the first user input, the computer system removes the respective application launch affordance from the first home screen page. For example, in FIG. 11D, user input 11078 on the checkmark for the application icon 11072 deselects the application D and removes the application icon for application D from the home screen 11028. Thus, in this example, the one or more user inputs correspond to a request to remove the respective application launch affordance of the plurality of suggested application launch affordances from the home page that is being configured.

In some embodiments, the one or more user inputs including the first user input select a first application launch affordance of the plurality of suggested application launch affordances, and also select a second application launch affordance of the plurality of launch affordances. In response to detecting that set of one or more user inputs, including the first user input, the computer system removes the first application launch affordance from the first home screen page, and the computer system removes the second application launch affordance from the first home screen page. Thus, in FIG. 11D, if the one or more user inputs were to select the application icons for application D and application M, both application D and application M would be removed from the first home screen page. Displaying a third user interface that includes a plurality of suggested application launch affordances, and removing a respective application launch affordance from the first home screen page in response to detecting one or more user inputs, reduces the number of inputs needed to appropriate configure a home screen page for display while the first usage mode is active (e.g., the user can start from a list of suggested application launch affordances and remove unwanted application launch affordances, rather than having to manually add each desired application launch affordance).

In some embodiments, method 13000 includes the computer system detecting (13040), at a location corresponding to a respective application launch affordance (e.g., the application icon 11074 for application O in FIG. 11D) of the plurality of suggested application launch affordances, a request (e.g., user input 11080) to add the respective application launch affordance. In response to detecting the request to add the respective application launch affordance, in accordance with a determination that the respective application launch affordance is not included in the first home screen page, the computer system adds the respective application launch affordance to the first home screen page (e.g., as shown in FIG. 11E, an application launch icon for application O has been added to the first home screen page). Displaying a third user interface that includes a plurality of suggested application launch affordances, and adding a respective application launch affordance to the first home screen page in response to detecting a request to add the respective launch affordance, reduces the number of inputs needed to appropriate configure a home screen page for display while the first usage mode is active (e.g., the user can start from a list of suggested application launch affordances and add additional application launch affordances, rather than having to manually add each desired application launch affordance).

In some embodiments, the computer system detects a request to add a first application launch affordance of the plurality of suggested application launch affordances and a second application launch affordance of the plurality of suggested application launch affordances (e.g., user inputs at the locations corresponding to first and second application icons), and in response to the request to add the first application launch affordance and the second application launch affordance, the computer system adds the first application launch affordance to the first home screen page, and the computer system adds the second application launch affordance to the first home screen page. Thus, in FIG. 11D, if the one or more user inputs were a request to add application O and application P to the first homes screen page, both application O and application P would be added to the first home screen page.

In some embodiments, the plurality of suggested application launch affordances are suggested in accordance with usage patterns of a user of the computer system (13042). For example, the computer system suggests one or more application launch affordances based on a frequency of use, particular time of use, and/or particular context of use of the corresponding applications. Displaying a third user interface that includes a plurality of suggested application launch affordances, wherein the plurality of suggested application launch affordances are suggested in accordance with usage patterns of a user of the computer system, reduces the number of inputs needed to appropriate configure a home screen page for display while the first usage mode is active (e.g., the user does not need to perform additional user inputs to add frequently used application launch affordances to the first home screen page).

In some embodiments, method 13000 includes the computer system, while displaying the third user interface (e.g., user interface 11066, FIG. 11H), detecting (13044) a request to display additional application launch affordances (e.g., the upward swipe 11098 in FIG. 11H). In response to detecting the request to display additional launch affordances, the computer system displays in a respective user interface (e.g., the user interface 11066 shown in FIG. 11I, or an update of the third user interface 11066 shown in FIG. 11H) a plurality of application launch affordances for available applications of the computer system (e.g., as shown in FIG. 11I). Displaying, in a respective user interface, a plurality of application launch affordances for available applications of the computer system, reduces the number of inputs needed to appropriate configure a home screen page for display while the first usage mode is active (e.g., if the suggested plurality of application launch affordances does not include a desired application launch affordance, the user does not need to perform additional user inputs to navigate to a different user interface that includes application launch affordances for available applications of the computer system).

In some embodiments, method 13000 includes the computer system, while displaying the respective user interface (e.g., user interface 11066 shown in FIG. 11H), detecting a first navigation input (e.g., scroll input 11098), and in response to detecting the first navigation input, scrolling display of the plurality of application launch affordances for available applications of the computer system (e.g., scrolling display of user interface 11066, resulting in the scrolled version of user interface 11066 shown in FIG. 11I). Scrolling display of the plurality of application launch affordances for available applications of the computer system in response to detecting a first navigation input, provides additional control options without cluttering the UI with additional displayed controls (e.g., additional displayed controls for navigating through the list of available applications, or for navigating between different screens or pages of application launch affordances).

In some embodiments, the third user interface (user interface 11066, as shown in any of FIGS. 11D to 11I) includes a search field (e.g., search bar 11068), and in method 13000, detecting (13044) the request to display additional application launch affordances includes detecting (13048) a third sequence of user inputs entering a search query into the search field of the third user interface (e.g., entering a search term, such as "App V" into the search field, as shown in FIG. 11G); and displaying the plurality of application launch affordances for available applications of the computer system includes displaying application launch affordances that satisfy the search query entered into the search field (e.g., application icons 11088, 11090 and 11092, as shown in FIG. 11G). Displaying a third user interface that includes a search field, and displaying application launch affordances that satisfy the search query entered into the search field, reduces the number of user inputs needed to display (and/or add) a desired application launch affordance (e.g., to the first home screen) (e.g., the user does not need to perform multiple user inputs to manually navigate through a list of all available application launch affordances).

In some embodiments, method 13000 includes the computer system, while displaying the third user interface, detecting (13050) a fourth sequence of one or more inputs (e.g., input 11114, FIG. 11I) selecting application launch affordances (e.g., application launch icons, such as the application launch icon for application CC, FIG. 11I) to include in the first home screen page; and in response to detecting the fourth sequence of one or more inputs, displaying a preview for the first home screen that includes user-selected application launch affordances in accordance with the fourth sequence of one or more inputs (e.g., as shown in FIG. 11K). Displaying a preview for the first home screen that includes user-selected application launch affordances, provides improved visual feedback to the user (e.g., improved visual feedback regarding the user's selected application launch affordances for the first home screen).

In some embodiments, the one or more suggested home screen pages for use on a home screen user interface of the device include (13052) a second home screen page (e.g., suggested home screen page 11032, FIG. 11B) that includes a first set of application launch affordances and/or widgets in a first configuration, and a third home screen page (e.g., suggested home screen page 11036, FIG. 11B) that includes the first set of application launch affordances and/or widgets in a second configuration that is different than the first configuration. For example, as shown by suggested home screen pages 11032 and 11036 in FIG. 11B, the third home screen page includes a same first set of application launch affordances and widgets as the second home screen page, but the application launch affordances and/or widgets are displayed in a second layout that is different from the first layout. Optionally, the second or third home screen page includes one or more application launch affordances and/or widgets not included in the first home screen page. While not shown in FIG. 11B, an example would be suggested home screen page 1032 including an application icon for application W that is not included the first suggested home screen page 1028.

Displaying a second home screen page that includes the first set of application launch affordances and/or widgets in the first configuration, and a third home screen page that includes the first set of application launch affordances and/or widgets in the second configuration that is different from the first configuration, provides the user with the option to select the desired configuration for the first set of application launch affordances and/or widgets (e.g., by selected the corresponding home screen page with the desired configuration), which in turn reduces the number of user inputs needed select a home screen page with an appropriate configuration (e.g., the user does not need to perform additional user inputs in order to manually adjust the configuration of the application launch affordances and/or widgets).

In some embodiments, method 13000 includes (13054) the computer system displaying a fourth user interface (e.g., user interface 11122, shown in FIG. 11N) for configuring settings for the first usage mode (e.g., a work usage mode) of the plurality of usage modes for the computer system, wherein the fourth user interface includes one or more suggested wake screen user interfaces (e.g., suggested wake screen user interfaces 11124, 11128, 11132, 11136, 11140 and 11144 in FIG. 11N) for use as a wake screen when waking the computer system while the first usage mode is active, and the one or more suggested wake screen user interfaces include a first wake screen user interface (e.g., suggested wake screen user interface 11124, FIG. 11N) and a second wake screen user interface (e.g., suggested wake screen user interface 11128, FIG. 11N). Displaying a fourth user interface for configuring settings for the first usage mode, including one or more suggested wake screen user interface for use as a wake screen when waking the computer system while the first usage mode is active, reduces the number of user inputs needed to select an appropriate wake screen user interface for the first usage mode (e.g., the user does not need to perform additional user inputs to configure a wake screen, if the user is satisfied with at least one of the one or more suggested wake screens).

In some embodiments, the first wake screen user interface (e.g., suggested wake screen user interface 11124, FIG. 11N) includes a first suggested background image, and the second wake screen user interface (e.g., suggested wake screen user interface 11128, FIG. 11N) includes a second suggested background image that is different from the first suggested background image (13056). For example, as shown in FIG. 11N, suggested wake screen user interfaces 11124 and 11128 have different suggested background images. Displaying a fourth user interface for configuring settings for the first usage mode, including a first wake screen user interface that includes a first suggested background image, and a second wake screen user interface that includes a second suggested background image different from the first suggested background image, reduces the number of user inputs needed to select an appropriate wake screen user interface for the first usage mode (e.g., the user does not need to perform additional user inputs to select a desired background image).

In some embodiments, the first wake screen user interface includes a first set of suggested widgets (e.g., a first set of application objects that provide a limited subset of functions and/or information available from corresponding applications without requiring the corresponding applications to be launched), and the second wake screen user interface includes a second set of suggested widgets that is different from the first set of suggested widgets (13058). For example, as shown in FIG. 11N, suggested wake screen user interfaces 11128 and 11132 have different suggested widgets. Displaying a fourth user interface for configuring settings for the first usage mode, including a first wake screen user interface that includes a first set of suggested widgets, and a second wake screen user interface that includes a second set of suggested widgets that is different from the first set of suggested widgets, reduces the number of user inputs needed to appropriately configure a wake screen for the first usage mode (e.g., the user does not need to perform additional user inputs to configure the widgets that are included on a wake screen for the first usage mode).

In some embodiments, at least one characteristic (e.g., a suggested background image and/or a set of suggested widgets) of the one or more suggested wake screen user interfaces is (e.g., automatically) selected (e.g., by the computer system) based on the first usage mode (13060) (e.g., based on a characteristic or type of the first usage mode). In some embodiments, the at least one characteristic of the one or more suggested wake screen user interfaces is selected based on available applications (e.g., applications that have corresponding widgets) that are installed on the computer system, applications that are associated with the first usage mode (e.g., enabled for use while the first usage mode is active), and/or a frequency of use (e.g., by a specific user, and/or an aggregate usage of multiple users of the computer system) of applications of the computer system. Displaying a fourth user interface for configuring settings for the first usage mode, including one or more suggested wake screen user interfaces, wherein at least one characteristic of the one or more suggested wake screen user interface is selected based on the first usage mode, reduces the number of user inputs needed to appropriately configure a wake screen for the first usage mode (e.g., the user does not need to perform additional user inputs to manually add widgets that are relevant to the first usage mode).

In some embodiments, the one or more suggested wake screen user interfaces includes (13062) at least one previously configured wake screen user interface (e.g., a wake screen user interface that is configured and immediately available for use as a wake screen of the computer system, for example while the first usage mode is active or alternatively while any usage mode of the computer system is active). For example, as shown in FIG. 11N, suggested wake screen user interfaces 11136, 11140 and 11144 are wake screen user interfaces that have already been configured and are available for immediate use (e.g., without having to be configured by the user prior to use as a wake screen user interface for the first usage mode). In some embodiments, the one or more suggested wake screen user interfaces includes a new wake screen user interface (e.g., a new wake screen user interface that is not available for use as a home screen page without first configuring the new wake screen user interface), in addition to, or in lieu of, the previously configured wake screen user interface. For example, in FIG. 11N, suggested wake screen user interfaces 11124, 11128 and 11132 are new wake screen user interfaces that have not already been configured, and optionally must be configured by a user of the computer system prior to being used as a wake screen user interface, whether for use while the first usage mode is active or alternatively while any usage mode of the computer system is active. Displaying a fourth user interface for configuring settings for the first usage mode, including one or more suggested wake screen user interfaces that includes at least one previously configured wake screen user interface, reduces the number of inputs needed to select an appropriate wake screen user interface for the first usage mode (e.g., the user does not need to perform additional user inputs to recreate the previously configured wake screen user interface for use with the first usage mode)

It should be understood that the particular order in which the operations in FIGS. 13A-13E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 1000, and 14000) are also applicable in an analogous manner to method 9000 described above with respect to FIGS. 13A-13E. For example, the contacts, gestures, and user interface objects, described above with reference to method 13000 optionally have one or more of the characteristics of the contacts, gestures, and user interface objects, described herein with reference to other methods described herein (e.g., methods 8000, 9000, 1000, and 14000). For brevity, these details are not repeated here.

FIGS. 14A-14E are flow diagrams illustrating method 14000 of configuring content filtering to be performed by applications while any of a number of different usage modes are active in a computer system. Some applications can be configured to perform user-specified content filtering while a particular usage mode is active, while some other applications may display content without content filtering without regard to which usage mode is active.

Method 14000 is performed at a computer system (e.g., device 300, FIG. 3, or portable multifunction device 100, FIG. 1A) that is in communication with a display generation component (e.g., a hardware element, comprising one or more display devices, such as a display, a projector, a touch-screen display, a heads-up display, a head-mounted display, or the like) and one or more input devices. Some operations in method 14000 are, optionally, combined and/or the order of some operations is, optionally, changed.

As described below, method 14000 is a method of configuring a first application to filter the content displayed by the first application while a first usage mode is active for the computer system, and, in accordance with a determination that the first usage mode is active for the computer system, displaying content of the first application in a user interface of the first application with content filtering based on the first usage mode.

By displaying filtered content in the user interface of the first application while the first usage mode is active for the computer system, other content that might be distracting, or not useful to the user, while the first usage mode is active is not displayed, thereby making the man-machine interface between the use and the computer system more efficient, for example by reducing the number of inputs that the user needs make in order to access content relevant to the user while the first usage mode is active for the computer system. This also improves efficiency of the computer system, by reducing mistakes made by the user, resulting from the user forgetting or being mistaken as to which usage mode is active, which also reduces the number of inputs that a user needs to perform or activate various functions of the computer system.

In method 14000, while the computer system has a plurality of applications (e.g., applications locally stored or available for execution), including a first application and a second application, and a plurality of usage modes, including a first usage mode that is associated with filtering content in the first application and is not associated with filtering content in the second application, the computer system receives (14002), via the one or more input devices, a request to display a user interface of the first application. For example, the request may be an input on a respective application icon, such as the mail application icon, the or calendar application icon, or the photos application icon displayed in a home screen, as shown in FIG. 5C-1 or FIG. 5Q.

Method 14000 includes, in response (14004) to receiving the request to display the user interface of the first application, in accordance with a determination that the first usage mode is active for the computer system, the computer system displaying (14006) content of the first application in the user interface of the first application with content filtering based on the first usage mode. For example, content obtained by filtering content of the first application based on the first usage mode is displayed in a user interface of the first application. FIG. 12B shows an example of content displayed in a user interface 12002 of a mail application, with content filtering based on a work usage mode, as indicated by content indicator 12000, which displays a visual indication that content is being filtered (e.g., because the "Work" mode is active, and the user has configured the mail application to filter content while the "Work" mode is active). Method 1400 further includes, in accordance with a determination that the first usage mode is not active for the computer system, the computer system displaying (14008) content of the first application in the user interface of the first application without content filtering based on the first usage mode. For example, FIG. 12E shows content displayed by the mail application when the "Work" mode is not active.

Method 1400 further includes, after displaying the user interface for the first application, the computer system receiving (14012), via the one or more input devices, a request to display a user interface of the second application. For example, the request may be an input on a respective application icon, such as the calendar application icon displayed in a home screen, as shown in FIG. 5C-1 or FIG. 5Q. In response to receiving the request to display the user interface of the second application, the computer system displays (14014) content of the second application in the user interface of the second application without content filtering based on the first usage mode, without regard to whether or not the first usage mode is active. For example, the request to display the user interface of the second application may a user input selecting (e.g., directed to) an application icon for the photos application (see FIG. 5C-1 or 5Q), and the content shown in the user interface for the photos application is shown without content filtering, without regard to whether or not the "Work" mode is active in the computer system.

In some embodiments (e.g., as described herein with reference to FIGS. 7A-7Z, and the method 1000), displaying content of the first application in the user interface of the first application with content filtering based on the first usage mode includes displaying first content with a first degree of emphasis relative to second content. In some embodiments, displaying the first content with the first degree of emphasis relative to the second content includes reducing a prominence (e.g., reducing a brightness, reducing a size, and/or changing a color) of the second content. In some embodiments, displaying the first content with the first degree of emphasis relative to the second content includes displaying the first content without displaying the second content.

In some embodiments, the plurality of usage modes includes a second usage mode (e.g., the "Personal" mode, see FIGS. 12D-12F) that is associated with filtering content in the second application (e.g., a calendar application) and is not associated with filtering content in the first application (e.g., a mail application). In such embodiments, method 14000 includes, in response to receiving the request to display the user interface of the first application, displaying (14016) the content of the first application in the user interface of the first application without content filtering based on the second usage mode, without regard to whether or not the second usage mode is active.

Further, after displaying (14016) the user interface for the first application, the computer system receives, via the one or more input devices, the request to display the user interface of the second application, and in response to receiving the request to display the user interface of the second application: in accordance with a determination that the second usage mode is active for the computer system, displaying content of the second application in the user interface of the first application with content filtering based on the second usage mode (e.g., with content obtained by filtering content of the second application based on the second usage mode), and, in accordance with a determination that the second usage mode is not active for the computer system, displaying content of the second application in the user interface of the first application without content filtering based on the second usage mode. For example, as shown in FIGS. 12E-12F, when the "Personal" mode is active in the computer system, content of the calendar application (an example of the second application) is displayed in a user interface of the calendar application with content filtering based on the second usage mode (e.g., by excluding from the content displayed work-related content). Further, as shown in FIG. 12C, if the second usage mode (e.g., the "Personal" mode) is not active for the computer system, for example because the first usage mode (e.g., the "Work" mode) is active, content of the second application is displayed without content filtering based on the second usage mode (e.g., content of the calendar application is displayed without filtering, as shown in FIG. 12C). Displaying content of the first application without content filtering based on the second usage mode, without regard to whether or not the second usage mode is active, and displaying content of the second application with content filtering based on the second usage mode, in accordance with a determination that the second usage mode is active, reduces the number of user inputs to display appropriate content for the first application and the second application while the second usage mode is active (e.g., as not every application needs to display content with content filtering based on the second usage mode while the second usage mode is active, the user does not need to perform additional user inputs to display or redisplay filtered content for the first application).

In some embodiments, the plurality of usage modes includes a third usage mode (e.g., the "Mindfulness" mode, see FIGS. 12J-12L) that is associated with filtering content in the first application (e.g., a mail application) and filtering content in the second application (e.g., a calendar application). In such embodiments, method 14000 includes, in response to receiving the request to display the user interface of the first application, displaying (14018), in accordance with a determination that the third usage mode is active for the computer system, displaying content of the first application in the user interface of the first application with content filtering based on the third usage mode (e.g., with content obtained by filtering content of the first application based on the third usage mode, an example of which is shown in FIG. 12K for the mail application), and in accordance with a determination that the third usage mode is not active for the computer system, displaying content of the first application in the user interface of the first application without content filtering based on the third usage mode (e.g., with content obtained by filtering based on a different usage mode, such as the first usage mode, an example of which is shown in FIG. 12B, or with unfiltered content, an example of which is shown in FIG. 12E).

Continuing with the description of operation 14018, after displaying the user interface for the first application, the computer system receives, via the one or more input devices, a request to display the user interface of the second application (e.g., the calendar application). In response to receiving the request to display the user interface of the second application, in accordance with a determination that the third usage mode (e.g., the "Mindfulness" mode) is active for the computer system, displaying content of the second application in the user interface of the second application with content filtering based on the third usage mode (e.g., with content obtained by filtering content of the second application based on the third usage mode, an example of which is shown in FIG. 12L for the calendar application), and in accordance with a determination that the third usage mode is not active for the computer system, displaying content of the second application in the user interface of the second application without content filtering based on the third usage mode (e.g., with content obtained by filtering based on a different usage mode, such as the second usage mode, an example of which is shown in FIG. 12F, or with unfiltered content, an example of which is shown in FIG. 12C).

Displaying content of the first application with content filtering based on the third usage mode, in accordance with a determination that the third usage mode is active, and displaying content of the second application with content filtering based on the third usage mode, in accordance with a determination that the third usage mode is active, reduces the number of user inputs to display appropriate content for the first application and the second application while the second usage mode is active (e.g., the user does not need to perform additional user inputs to manually filter content for the first application and the second application, each time the third usage mode is activated).

In some embodiments, with respect to operation 14018 of method 14000, displaying content of the first application in the user interface of the first application with content filtering based on the third usage mode includes (14020) displaying content of the first application in accordance with a first set of content filtering rules (e.g., a first set of content filtering rules for filtering content in a first manner), and displaying content of the second application in the user interface of the first application with content filtering based on the third usage mode includes displaying content of the second application in accordance with a second set of content filtering rules that is different from the first set of content filtering rules (e.g., a second set of content filtering rules for filtering content in a second manner that is different from the first manner). For example, the first set of content filter rules may be based on the inboxes to which messages are assigned, while the second set of content filtering rules may be based on the calendars on which calendar events appear or may be based on users associated with content items in the second application. While a third usage mode is active, displaying content of the first application in accordance with a first set of content filtering rules, and displaying content of the second application in accordance with a second set of content filtering rules different than the first set of content filtering rules, reduces the number of user inputs to display appropriate content for the first application and the second application while the third usage mode is active (e.g., as different applications can filter content differently while the third usage mode is active, the user does not need to perform additional user inputs to manually filter or display filtered content in the first application and/or third application).

In some embodiments, the plurality of usage modes includes a fourth usage mode (e.g., the "Fitness" mode, see FIGS. 12G-12I) that is not associated with filtering content in the first application and is not associated with filtering content in the second application, the computer system, in response to receiving the request to display the user interface of the first application, displays (14022) the content of the first application in the user interface of the first application without content filtering based on the fourth usage mode, without regard to whether or not the fourth usage mode is active (e.g., see FIG. 12H). Further, after displaying the user interface for the first application, the computer system receives, via the one or more input devices, a request to display the user interface of the second application, in response to receiving the request to display the user interface of the second application, the computer system displays content of the second application in the user interface of the second application without content filtering based on the fourth usage mode, without regard to whether or not the fourth usage mode is active (e.g., FIG. 12I shows a calendar application user interface without content filtering based on the fourth usage mode; in another example, a photos application user interface may display content of the photos application without filtering, without regard to which usage mode is active). Displaying content of the first application without content filtering based on the fourth usage mode, without regard to whether or not the fourth usage mode is active, and displaying content of the second application without content filtering based on the fourth usage mode, without regard to whether or not the fourth usage mode is active, reduces the number of inputs needed to display appropriate content for the first application and the second application while the fourth usage mode is active (e.g., the user does not need to perform additional user inputs to display filtered content for the first application and the second application, each time the fourth usage mode is activated).

In some embodiments, method 14000 includes, in accordance with a determination that an active usage mode of the computer system includes content filtering for the first application, providing (14024) content filtering information to the first application, without providing information to the first application identifying the active usage mode of the computer system. (e.g., the first application receives information that a usage mode is active, and information as to what content filtering is to be applied, but does not receive information regarding which specific usage mode is active). Configuring the computer system so that content filtering is responsive to the usage mode that is active, but which does not require applications to have any information as to the specific usage mode that is active, reduces the complexity of the applications and enables the set of usage modes to change over time without requiring corresponding revisions to applications configured to filter content in accordance with which usage mode is active. Instead, the computer system informs each such application as to what content filtering is to be performed, based on the currently active usage mode. Providing content filtering information to the first application, without providing information to the first application identifying the active usage mode of the computer system, also allows the user to configure content filtering for the first application without cluttering the UI with additional displayed controls (e.g., additional displayed controls for usage-mode-specific content filtering options that are not relevant for the usage mode that the user is configuring).

In some embodiments, method 14000 includes displaying (14026), via the display generation component, a first user interface (e.g., user interface 11195, FIG. 11V) for configuring settings for the first usage mode of the computer system, the first user interface including information identifying applications (e.g., a list or array of application icons) that have configurable content filtering options, wherein the applications that have configurable content filtering options include the first application (e.g., the mail application, as shown in FIG. 11V). For example, the first user interface, for configuring settings for the first usage mode of the computer system, may be displayed prior to receiving the request to display the user interface of the first application. Displaying a first user interface that includes information identifying applications that have configurable content filtering options (e.g., identifying only applications that have configurable content filtering options), reduces the number of user inputs needed to configure content filtering for applicable applications (e.g., the user does not need to perform additional user inputs to navigate to settings for a respective application to first determine whether the respective application has configurable content filtering options) and provides improved visual feedback to the user (e.g., improved visual feedback regarding which applications have configurable content filtering options).

With respect to operation 14026, in some embodiments, the identified applications that have configurable content filtering options (e.g., applications identified by the information identifying applications that have configurable content filtering options) are a subset of the plurality of applications (14028). As shown in the example in FIG. 11V, the applications identified as having configurable content filtering options are fewer in number than the applications for which application icons are displayed in a home screen, such as the home screen shown in FIG. 5Q. Displaying a first user interface that includes information identifying applications that have configurable content filtering options, wherein the identified applications are a subset of the plurality of applications, reduces the number of user inputs needed to configure content filtering for applicable applications (e.g., the user does not need to perform additional user inputs to navigate to settings for a respective application to first determine whether the respective application has configurable content filtering options) and provides improved visual feedback to the user (e.g., improved visual feedback regarding which applications have configurable content filtering options).

With respect to operation 14026, in some embodiments, the identified applications that have configurable content filtering options include at least one first party application (14030). For example, a first party application is an application that is developed by a first party, wherein the first party manufactures the computer system and/or develops the operating system of the computer system. In contrast, a third party application is an application that is developed by a third party, wherein the third party is different from the first party (e.g., the third party does not manufacture the computer system and/or does not develop the operating system of the computer system). Displaying a first user interface that includes information identifying applications that have configurable content filtering options, wherein the identified applications include at least one first party application, reduces the number of user inputs needed to configure content filtering for applicable applications (e.g., the user does not need to perform additional user inputs to navigate to settings for a respective application to first determine whether the respective application has configurable content filtering options) and provides improved visual feedback to the user (e.g., improved visual feedback regarding which applications have configurable content filtering options).

With respect to operation 14026, in some embodiments, the identified applications that have configurable content filtering options includes at least one third party application (14032). For example, a third party application is an application developed by a third party that is different than a first party that manufactures the computer system and/or develops of the operating system of the computer system. Displaying a first user interface that includes information identifying applications that have configurable content filtering options, wherein the identified applications include at least one third party application, reduces the number of user inputs needed to configure content filtering for applicable applications (e.g., the user does not need to perform additional user inputs to navigate to settings for a respective application to first determine whether the respective application has configurable content filtering options) and provides improved visual feedback to the user (e.g., improved visual feedback regarding which applications have configurable content filtering options).

In some embodiments, displaying the first user interface (14026) includes displaying (14034) a first affordance for the first application, and a second affordance for a third application, different from the first application and the second application, that can be configured to filter displayed content in the third application while the first usage mode is active for the computer system. For example, as shown in FIG. 11V, user interface 11195 includes application icons for the first application (e.g., the mail application) and a third application (e.g., a browser application or messages application).

Furthermore, with respect to operation 14034, method 14000 includes (e.g., prior to receiving the request to display the user interface of the first application): while displaying the first affordance and the second affordance, detecting a second user input at a location corresponding to the first affordance or the second affordance (e.g., a user input 11212 at the location of the mail application affordance 11196, or a user input 11216 at the location of the browser application affordance 11200, as shown in FIG. 11V). In response to detecting the second user input, in accordance with a determination that the second user input was detected at a location corresponding to the first affordance, the computer system displays a second user interface (e.g., user interface 6118 and/or user interface 6123, FIGS. 11W and 11X) for configuring filters for content displayed within the first application while the first usage mode is active. Similarly, in response to detecting the second user input, in accordance with a determination that the second user input was detected at a location corresponding to the second affordance, the computer system displays a third user interface (e.g., user interface 6164 and/or user interface 6176, FIGS. 11AA and 11BB) for configuring filters for content displayed within the third application while the first usage mode is active. Displaying a second user interface for configuring filters for content displayed within the first application while the first usage mode is active, in accordance with a determination that the second user input was detected at a location corresponding to the first affordance, and displaying a third user interface for configuring filters for content displayed within the third application while the first usage mode is active, in accordance with a determination that the second user input was detected at a location corresponding to the second affordance, provides additional control options without cluttering the UI with additional displayed controls (e.g., additional displayed controls for each content filtering options for both the first application and the third application).

With respect to operation 14034, in some embodiments the filters for content displayed within the first application while the first usage mode is active, that are displayed in the second user interface (e.g., user interface 6118 and/or user interface 6123, FIGS. 11W and 11X), are selected (14036) by the first application (e.g., via an application programming interface (API)). Displaying a second user interface for configuring filters for content displayed within the first application while the first usage mode is active, wherein the filters for content are selected by the first application, reduces the number of user inputs needed to configure content filtering for the first application (e.g., the user does not need to perform additional user inputs to determine what content filtering options are available for the first application).

Similarly, with respect to operation 14034, the filters for content displayed within the third application while the first usage mode is active, that are displayed in the third user interface (e.g., user interface 6164 and/or user interface 6176, FIGS. 11AA and 11BB), are selected (14038) by the third application (e.g., via an API). Displaying a third user interface for configuring filters for content displayed within the third application while the first usage mode is active, wherein the filters for content are selected by the third application, reduces the number of user inputs needed to configure content filtering for the third application (e.g., the user does not need to perform additional user inputs to determine what content filtering options are available for the third application).

With respect to operation 14026, in some embodiments the first application has a first set of content filtering options, and a third application, different from the first application and the second application, has a second set of content filtering options that is different from the first set of content filtering operations (14040). For example, the content filtering options shown in FIG. 11X for the mail application are different from the content filtering options shown in FIG. 11BB for the browser application. Displaying a first user interface for configuring settings of the first usage mode, including information identifying a first application that has a first set of content filtering options, and a third application that has a second set of content filtering options that is different from the first set of content filtering options, reduces the number of user inputs to display appropriate content for the first application and the third application while the first usage mode is active (e.g., as different applications can filter content differently while the first usage mode is active, the user does not need to perform additional user inputs to manually filter or display filtered content in the first application and/or third application).

With respect to operation 14026, in some embodiments the first user interface (e.g., user interface 11000, FIG. 11T) for configuring settings for the first usage mode of the computer system includes options (e.g., operations accessed in the "Notifications" section 11002 of user interface 11000) for configuring rules for notification delivery while the first usage mode is active for the computer system. Displaying a first user interface for configuring settings of the first usage mode, including information identifying applications that have configurable content filtering options, and including options for configuring rules for notification delivery while the first usage mode is active for the computer system, reduces the number of user inputs to configure settings for the first usage mode (e.g., the user does not need to perform additional user inputs to navigate to separate user interfaces for configuring content filtering options, and a separate user interface for configuring rules for notification delivery while the first usage mode is active for the computer system).

It should be understood that the particular order in which the operations in FIGS. 14A-14E have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 8000, 9000, 1000, and 13000) are also applicable in an analogous manner to method 9000 described above with respect to FIGS. 14A-14E. For example, the contacts, gestures, and user interface objects, described above with reference to method 14000 optionally have one or more of the characteristics of the contacts, gestures, and user interface objects, described herein with reference to other methods described herein (e.g., methods 8000, 9000, 1000, and 13000). For brevity, these details are not repeated here.

The operations described above with reference to FIGS. 8A-8E, 9A-9G, 10A-10C, 13A-13E, and 14A-14E are, optionally, implemented by components depicted in FIGS. 1A-1B. For example, detection operation 8004 and "Personal" mode entering operation 8010 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:

at a computer system that is in communication with a display generation component and one or more input devices:

while a first notification mode, which has a first set of one more rules for notification delivery at the computer system, is active for the computer system;

detecting, via the one or more input devices, a first request to wake the computer system from a low power state; and in response to detecting the first request to wake the computer system, displaying, via the display generation component, a first wake screen user interface with a first background image, wherein the first background image is an image previously selected for use while the first notification mode is active, based on one or more user selections in one or more settings user interfaces;

after displaying the first wake screen user interface, detecting a request to switch from the first notification mode to a second notification mode, which has a second set of one or more rules for notification delivery that are different from the first set of one or more rules for notification delivery;

in response to detecting the request to switch from the first notification mode to the second notification mode, switching from the first notification mode to the second notification mode at the computer system; and while the second notification mode is active for the computer system;

detecting, via the one or more input devices, a second request to wake the computer system from the low power state; and in response to detecting the second request to wake the computer system, while the second notification mode remains active, displaying, via the display generation component, a second wake screen user interface with a second background image that is different from the first background image, instead of displaying the first wake screen user interface, wherein the second background image is an image previously selected for use while the second notification mode is active, based on one or more user selections in one or more settings user interfaces.

2. The method of claim 1, including:

before detecting the request to switch from the first notification mode to the second notification mode:

transitioning the computer system from a wake state to the low power state;

while the computer system is in the low power state, detecting a third request to wake the computer system;

in response to detecting the third request to wake the computer system, displaying the first wake screen user interface with the first background image; and while the second notification mode is active for the computer system:

transitioning the computer system from a wake state to the low power state;

while the computer system is in the low power state, detecting a fourth request to wake the computer system; and in response to detecting the fourth request to wake the computer system, displaying the second wake screen user interface with the second background image that is different from the first background image.

3. The method of claim 1, wherein:

the first wake screen user interface is a wake screen user interface for a first user; and the second wake screen user interface is a wake screen user interface for the first user.

4. The method of claim 1, including:

after switching from the first notification mode to the second notification mode at the computer system, and while the second notification mode is active for the computer system, transitioning the computer system from a wake state to the low power state.

5. The method of claim 1, including:
while the first notification mode is active for the computer system, suppressing a first subset of received notifications in accordance with the first set of one or more rules for notification delivery; and
while the second notification mode is active for the computer system, suppressing a second subset of received notifications, different from the first subset of received notifications, in accordance with the second set of one or more rules for notification delivery.

6. The method of claim 1, wherein switching from the first notification mode to the second notification mode includes enabling a restricted notification mode in which certain types of notifications are suppressed.

7. The method of claim 1, wherein switching from the first notification mode to the second notification mode includes disabling a restricted notification mode in which certain types of notifications are suppressed.

8. The method of claim 1, including:
detecting a request to transition from a current wake screen to a corresponding application launch user interface; and
in response to detecting the request to transition from the current wake screen to the corresponding application launch user interface:
in accordance with a determination that the first notification mode is active at the computer system, displaying a first application launch user interface; and
in accordance with a determination that the second notification mode is active at the computer system, displaying a second application launch user interface that is different from the first application launch user interface.

9. The method of claim 8, wherein:
the first application launch user interface includes a first plurality of home screen pages; and
the second application launch user interface includes a second plurality of home screen pages different from the first plurality of home screen pages.

10. The method of claim 8, wherein:
the first application launch user interface has a third background image; and
the second application launch user interface has a fourth background image that is different from the third background image.

11. The method of claim 1, wherein:
the first wake screen user interface includes a first plurality of icons; and
the second wake screen user interface includes a second plurality of icons that is different from the first plurality of icons.

12. The method of claim 1, including:
detecting a first set of user inputs; and
in response to detecting the first set of user inputs, displaying a user interface for editing a respective wake screen of the computer system, wherein the user interface for editing the respective wake screen includes concurrently displaying:
one or more controls for editing content and/or a layout of the respective wake screen of the computer system; and
one or more controls for editing a restricted notification mode that is associated with the respective wake screen.

13. The method of claim 1, including:
detecting a second set of user inputs; and
in response to detecting the second set of user inputs, displaying a user interface for editing a respective wake screen of the computer system, wherein the user interface for editing the respective wake screen includes concurrently displaying:
one or more controls for editing content and/or layout of the respective wake screen of the computer system; and
a plurality of options for selecting different notification modes for use with the respective wake screen.

14. The method of claim 1, including:
while displaying the second wake screen user interface, detecting a request to switch from the second wake screen user interface to the first wake screen user interface; and
in response to detecting the request to switch from the second wake screen user interface to the first wake screen user interface:
displaying the first wake screen user interface with the first background image; and
transitioning from the second notification mode for the computer system to the first notification mode for the computer system.

15. The method of claim 1, including:
detecting a second request to wake a second computer system that is in communication with the computer system;
in response to detecting the second request to wake the second computer system, and in accordance with a determination that the first notification mode is active on the computer system, displaying, via a display device of the second computer system, a third wake screen user interface for the second computer system with a third background image; and
in response to detecting the second request to wake the second computer system, and in accordance with a determination that the second notification mode is active on the computer system, displaying, via a display device of the second computer system, a fourth wake screen user interface for the second computer system, different from the third wake screen user interface for the second computer system, with a fourth background image.

16. The method of claim 1, including:
in response to detecting the request to switch from the first notification mode to the second notification mode, transmitting, to a second computer system that is in communication with the computer system, instructions that when executed by the second computer system, cause the second computer system to switch from a third notification mode for the second computer system to a fourth notification mode for the second computer system;
wherein while the third notification mode is active for the second computer system, in response to detecting a second request to wake the second computer system, the second computer system displays a third wake screen user interface with a third background image; and
wherein while the fourth notification mode is active for the second computer system, in response to detecting the second request to wake the second computer system, the second computer system displays a fourth wake screen user interface, different from the third wake screen user interface, with a fourth background image.

17. The method of claim 1, including in response to detecting the request to switch from the first notification mode to the second notification mode, switching from a light display mode to dark display mode at the computer system, wherein the dark display mode decreases a brightness of a plurality of user interface elements relative to other user interface elements displayed via the display generation component.

18. The method of claim 1, including in response to detecting the request to switch from the first notification mode to the second notification mode, changing a battery usage mode of the computer system.

19. The method of claim 1, including in response to detecting the request to switch from the first notification mode to the second notification mode, switching a default text size for the computer system.

20. A computer system in communication with a display generation component and one or more input devices, comprising:

one or more processors; and memory storing one or more programs, wherein the one or more programs are configured to be executed by the one or more processors, the one or more programs including instructions for:

while a first notification mode, which has a first set of one more rules for notification delivery at the computer system, is active for the computer system;

detecting, via the one or more input devices, a first request to wake the computer system from a low power state; and in response to detecting the first request to wake the computer system, displaying, via the display generation component, a first wake screen user interface with a first background image, wherein the first background image is an image previously selected for use while the first notification mode is active, based on one or more user selections in one or more settings user interfaces;

after displaying the first wake screen user interface, detecting a request to switch from the first notification mode to a second notification mode, which has a second set of one or more rules for notification delivery that are different from the first set of one or more rules for notification delivery;

in response to detecting the request to switch from the first notification mode to the second notification mode, switching from the first notification mode to the second notification mode at the computer system; and while the second notification mode is active for the computer system;

detecting, via the one or more input devices, a second request to wake the computer system from the low power state; and in response to detecting the second request to wake the computer system, while the second notification mode remains active, displaying, via the display generation component, a second wake screen user interface with a second background image that is different from the first background image, instead of displaying the first wake screen user interface, wherein the second background image is an image previously selected for use while the second notification mode is active, based on one or more user selections in one or more settings user interfaces.

21. The computer system of claim 20, wherein the one or more programs include instructions for:

before detecting the request to switch from the first notification mode to the second notification mode:

transitioning the computer system from a wake state to the low power state;

while the computer system is in the low power state, detecting a third request to wake the computer system;

in response to detecting the third request to wake the computer system, displaying the first wake screen user interface with the first background image; and while the second notification mode is active for the computer system:

transitioning the computer system from a wake state to the low power state;

while the computer system is in the low power state, detecting a fourth request to wake the computer system; and in response to detecting the fourth request to wake the computer system, displaying the second wake screen user interface with the second background image that is different from the first background image.

22. The computer system of claim 20, wherein:

the first wake screen user interface is a wake screen user interface for a first user; and the second wake screen user interface is a wake screen user interface for the first user.

23. The computer system of claim 20, wherein the one or more programs include instructions for:

while the first notification mode is active for the computer system, suppressing a first subset of received notifications in accordance with the first set of one or more rules for notification delivery; and while the second notification mode is active for the computer system, suppressing a second subset of received notifications, different from the first subset of received notifications, in accordance with the second set of one or more rules for notification delivery.

24. The computer system of claim 20, wherein the one or more programs include instructions for:

detecting a request to transition from a current wake screen to a corresponding application launch user interface; and in response to detecting the request to transition from the current wake screen to the corresponding application launch user interface:

in accordance with a determination that the first notification mode is active at the computer system, displaying a first application launch user interface; and in accordance with a determination that the second notification mode is active at the computer system, displaying a second application launch user interface that is different from the first application launch user interface.

25. The computer system of claim 20, wherein:

the first wake screen user interface includes a first plurality of icons; and the second wake screen user interface includes a second plurality of icons that is different from the first plurality of icons.

26. The computer system of claim 20, wherein the one or more programs include instructions for:

detecting a second set of user inputs; and in response to detecting the second set of user inputs, displaying a user interface for editing a respective wake screen of the computer system, wherein the user interface for editing the respective wake screen includes concurrently displaying:

one or more controls for editing content and/or layout of the respective wake screen of the computer system; and a plurality of options for selecting different notification modes for use with the respective wake screen.

27. The computer system of claim 20, wherein the one or more programs include instructions for:

while displaying the second wake screen user interface, detecting a request to switch from the second wake screen user interface to the first wake screen user interface; and in response to detecting the request to switch from the second wake screen user interface to the first wake screen user interface:

displaying the first wake screen user interface with the first background image; and transitioning from the second notification mode for the computer system to the first notification mode for the computer system.

28. The computer system of claim 20, wherein the one or more programs include instructions for:

detecting a second request to wake a second computer system that is in communication with the computer system;

in response to detecting the second request to wake the second computer system, and in accordance with a determination that the first notification mode is active on the computer system, displaying, via a display device of the second computer system, a third wake screen user interface for the second computer system with a third background image; and in response to detecting the second request to wake the second computer system, and in accordance with a determination that the second notification mode is active on the computer system, displaying, via a display device of the second computer system, a fourth wake screen user interface for the second computer system, different from the third wake screen user interface for the second computer system, with a fourth background image.

29. The computer system of claim 20, wherein the one or more programs include instructions for:

in response to detecting the request to switch from the first notification mode to the second notification mode, transmitting, to a second computer system that is in communication with the computer system, instructions that when executed by the second computer system, cause the second computer system to switch from a third notification mode for the second computer system to a fourth notification mode for the second computer system;

wherein while the third notification mode is active for the second computer system, in response to detecting a second request to wake the second computer system, the second computer system displays a third wake screen user interface with a third background image; and wherein while the fourth notification mode is active for the second computer system, in response to detecting the second request to wake the second computer system, the second computer system displays a fourth wake screen user interface, different from the third wake screen user interface, with a fourth background image.

30. The computer system of claim 20, wherein the one or more programs include instructions for:

in response to detecting the request to switch from the first notification mode to the second notification mode, switching from a light display mode to dark display mode at the computer system, wherein the dark display mode decreases a brightness of a plurality of user interface elements relative to other user interface elements displayed via the display generation component.

31. The computer system of claim 20, wherein the one or more programs include instructions for:

in response to detecting the request to switch from the first notification mode to the second notification mode, changing a battery usage mode of the computer system.

32. A non-transitory computer readable storage medium storing one or more programs, the one or more programs comprising instructions that, when executed by a computer system in communication with a display generation component and one or more input devices, cause the computer system to:

while a first notification mode, which has a first set of one more rules for notification delivery at the computer system, is active for the computer system;

detect, via the one or more input devices, a first request to wake the computer system from a low power state; and in response to detecting the first request to wake the computer system, display, via the display generation component, a first wake screen user interface with a first background image, wherein the first background image is an image selected based on one or more user selections in one or more settings user interfaces;

after displaying the first wake screen user interface, detect a request to switch from the first notification mode to a second notification mode, which has a second set of one or more rules for notification delivery that are different from the first set of one or more rules for notification delivery;

in response to detecting the request to switch from the first notification mode to the second notification mode, switch from the first notification mode to the second notification mode at the computer system; and while the second notification mode is active for the computer system;

detect, via the one or more input devices, a second request to wake the computer system from the low power state; and in response to detecting the second request to wake the computer system, while the second notification mode remains active, display, via the display generation component, a second wake screen user interface with a second background image that is different from the first background image, instead of displaying the first wake screen user interface, wherein the second background image is an image previously selected for use while the second notification mode is active, based on one or more user selections in one or more settings user interfaces.

33. The non-transitory computer readable storage medium of claim 32, wherein the one or more programs include instructions that, when executed by the computer system, cause the computer system to:

before detecting the request to switch from the first notification mode to the second notification mode:

transition the computer system from a wake state to the low power state;

while the computer system is in the low power state, detect a third request to wake the computer system;

in response to detecting the third request to wake the computer system, display the first wake screen user interface with the first background image; and while the second notification mode is active for the computer system:

transition the computer system from a wake state to the low power state;

while the computer system is in the low power state, detect a fourth request to wake the computer system; and in response to detecting the fourth request to wake the computer system, display the second wake screen user interface with the second background image that is different from the first background image.

34. The non-transitory computer readable storage medium of claim 32, wherein:

the first wake screen user interface is a wake screen user interface for a first user; and the second wake screen user interface is a wake screen user interface for the first user.

35. The non-transitory computer readable storage medium of claim 32, wherein the one or more programs include instructions that, when executed by the computer system, cause the computer system to:

while the first notification mode is active for the computer system, suppress a first subset of received notifications in accordance with the first set of one or more rules for notification delivery; and while the second notification mode is active for the computer system, suppress a second subset of received notifications, different from the first subset of received notifications, in accordance with the second set of one or more rules for notification delivery.

36. The non-transitory computer readable storage medium of claim 32, wherein the one or more programs include instructions that, when executed by the computer system, cause the computer system to:

detect a request to transition from a current wake screen to a corresponding application launch user interface; and in response to detecting the request to transition from the current wake screen to the corresponding application launch user interface:

in accordance with a determination that the first notification mode is active at the computer system, display a first application launch user interface; and in accordance with a determination that the second notification mode is active at the computer system, display a second application launch user interface that is different from the first application launch user interface.

37. The non-transitory computer readable storage medium of claim 32, wherein:

the first wake screen user interface includes a first plurality of icons; and the second wake screen user interface includes a second plurality of icons that is different from the first plurality of icons.

38. The non-transitory computer readable storage medium of claim 32, wherein the one or more programs include instructions that, when executed by the computer system, cause the computer system to:

detect a second set of user inputs; and in response to detecting the second set of user inputs, display a user interface for editing a respective wake screen of the computer system, wherein the user interface for editing the respective wake screen includes concurrently displaying:

one or more controls for editing content and/or layout of the respective wake screen of the computer system; and a plurality of options for selecting different notification modes for use with the respective wake screen.

39. The non-transitory computer readable storage medium of claim 32, wherein the one or more programs include instructions that, when executed by the computer system, cause the computer system to:

while displaying the second wake screen user interface, detect a request to switch from the second wake screen user interface to the first wake screen user interface; and in response to detecting the request to switch from the second wake screen user interface to the first wake screen user interface:

display the first wake screen user interface with the first background image; and transition from the second notification mode for the computer system to the first notification mode for the computer system.

40. The non-transitory computer readable storage medium of claim 32, wherein the one or more programs include instructions that, when executed by the computer system, cause the computer system to:

detect a second request to wake a second computer system that is in communication with the computer system;

in response to detecting the second request to wake the second computer system, and in accordance with a determination that the first notification mode is active on the computer system, display, via a display device of the second computer system, a third wake screen user interface for the second computer system with a third background image; and in response to detecting the second request to wake the second computer system, and in accordance with a determination that the second notification mode is active on the computer system, display, via a display device of the second computer system, a fourth wake screen user interface for the second computer system, different from the third wake screen user interface for the second computer system, with a fourth background image.

41. The non-transitory computer readable storage medium of claim 32, wherein the one or more programs include instructions that, when executed by the computer system, cause the computer system to:

in response to detecting the request to switch from the first notification mode to the second notification mode, transmit, to a second computer system that is in communication with the computer system, instructions that when executed by the second computer system, cause the second computer system to switch from a third notification mode for the second computer system to a fourth notification mode for the second computer system;

wherein while the third notification mode is active for the second computer system, in response to detecting a second request to wake the second computer system, the second computer system displays a third wake screen user interface with a third background image; and wherein while the fourth notification mode is active for the second computer system, in response to detecting the second request to wake the second computer system, the second computer system displays a fourth wake screen user interface, different from the third wake screen user interface, with a fourth background image.

42. The non-transitory computer readable storage medium of claim 32, wherein the one or more programs include instructions that, when executed by the computer system, cause the computer system to:

in response to detecting the request to switch from the first notification mode to the second notification mode, switch from a light display mode to dark display mode at the computer system, wherein the dark display mode decreases a brightness of a plurality of user interface elements relative to other user interface elements displayed via the display generation component.

43. The non-transitory computer readable storage medium of claim 32, wherein the one or more programs include instructions that, when executed by the computer system, cause the computer system to:

in response to detecting the request to switch from the first notification mode to the second notification mode, change a battery usage mode of the computer system.

* * * * *